US012316610B1

(12) United States Patent
Muth et al.

(10) Patent No.: US 12,316,610 B1
(45) Date of Patent: May 27, 2025

(54) PRIVACY NETWORK AND UNIFIED TRUST MODEL FOR PRIVACY PRESERVING COMPUTATION AND POLICY ENFORCEMENT

(71) Applicant: WebShield Inc., San Francisco, CA (US)

(72) Inventors: Richard Arthur Muth, San Francisco, CA (US); Jonathan Paul Hare, San Francisco, CA (US)

(73) Assignee: WebShield, Inc., San Francisco, CA (US)

( * ) Notice: Subject to any disclaimer, the term of this patent is extended or adjusted under 35 U.S.C. 154(b) by 957 days.

(21) Appl. No.: 17/321,700

(22) Filed: May 17, 2021

Related U.S. Application Data

(63) Continuation-in-part of application No. 16/357,662, filed on Mar. 19, 2019, now abandoned, and a continuation-in-part of application No. 15/925,125, filed on Mar. 19, 2018, now abandoned, and a continuation-in-part of application No. 15/461,400, filed on Mar. 16, 2017, now abandoned.

(60) Provisional application No. 62/644,950, filed on Mar. 19, 2018, provisional application No. 62/472,811, filed on Mar. 17, 2017, provisional application No. 62/309,153, filed on Mar. 16, 2016.

(51) Int. Cl.
*H04L 9/40* (2022.01)

(52) U.S. Cl.
CPC ...... *H04L 63/0421* (2013.01); *H04L 63/0435* (2013.01); *H04L 63/102* (2013.01); *H04L 63/166* (2013.01)

(58) Field of Classification Search
CPC ............ H04L 63/0421; H04L 63/0435; H04L 63/102; H04L 63/166
USPC ........................................................ 726/1
See application file for complete search history.

(56) References Cited

U.S. PATENT DOCUMENTS

2016/0300223 A1 * 10/2016 Grey ................. G06Q 20/3825

OTHER PUBLICATIONS

Schwittmann et al., 2014 IEEE Computer Society, "Privacy Preservation in Decentralized Online Social Networks" pp. 16-23 (Year: 2014).*

Zhang et al. 2008 IEEE, "Towards A Secure Distribute Storage System", pp. 1612-1617 (Year: 2008).*

* cited by examiner

*Primary Examiner* — Khalil Naghdali
(74) *Attorney, Agent, or Firm* — Staniford Tomita LLP

(57) ABSTRACT

A privacy network and unified trust model runs privacy algorithms that can completely obfuscate any data or rendering the data opaque and meaningless so they can be freely aggregated and shared without risk of security or privacy breach. The obfuscated algorithms can be applied to obfuscated data to produce obfuscated output. The obfuscated output is identical to what would have been produced had the algorithms been applied to data and then obfuscated with the same privacy algorithm. Information from disparate sources is virtually aggregated, linked, analyzed, transformed and used without revealing any meaningful information to any person or any system—even to the processors performing the computation.

19 Claims, 157 Drawing Sheets

Individual users gain direct control of privacy and personalization policies

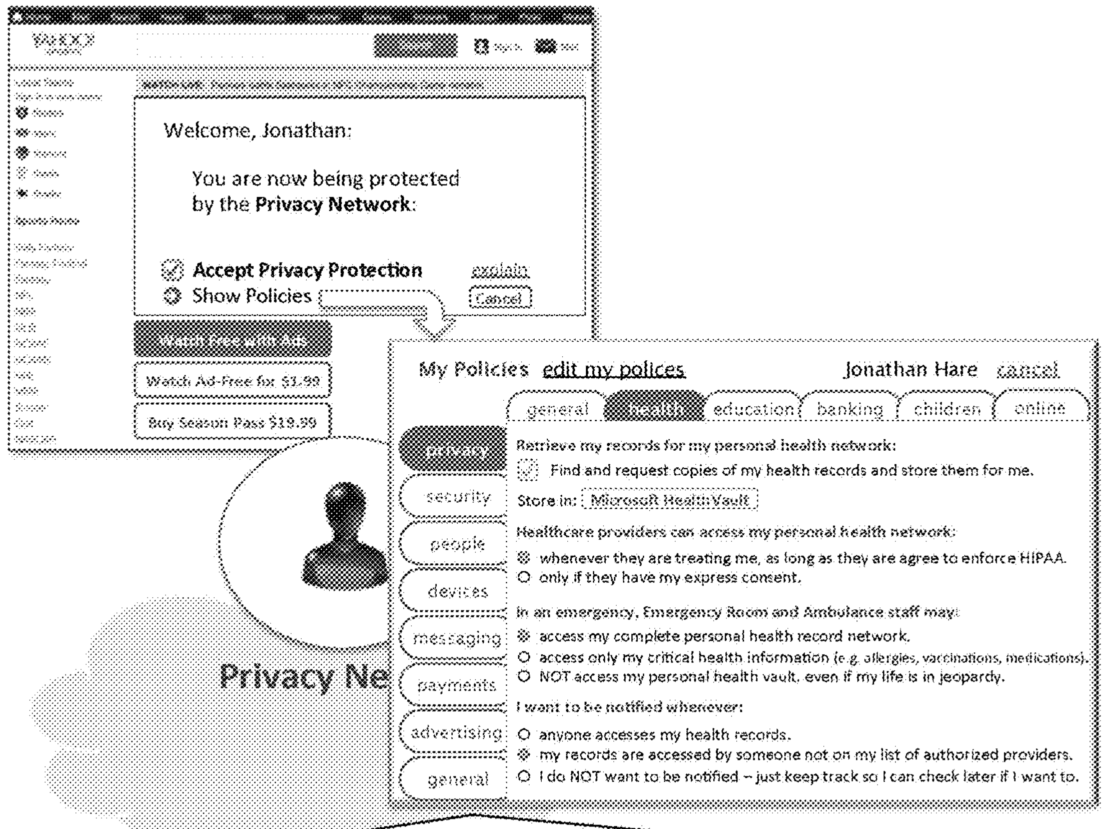

- Individuals control personal policies that are enforced globally on records and accounts held by any participating publisher, organization or online service.
- Enables consumers to assert their legal rights to access and share their healthcare (HIPAA), educational (FERPA), financial and government records.

FIG. 4

Privacy Network Business Model

Syndicates are virtual joint ventures whose members pool resources to create value-added services, receiving a share of resulting revenues and/or access to free services…

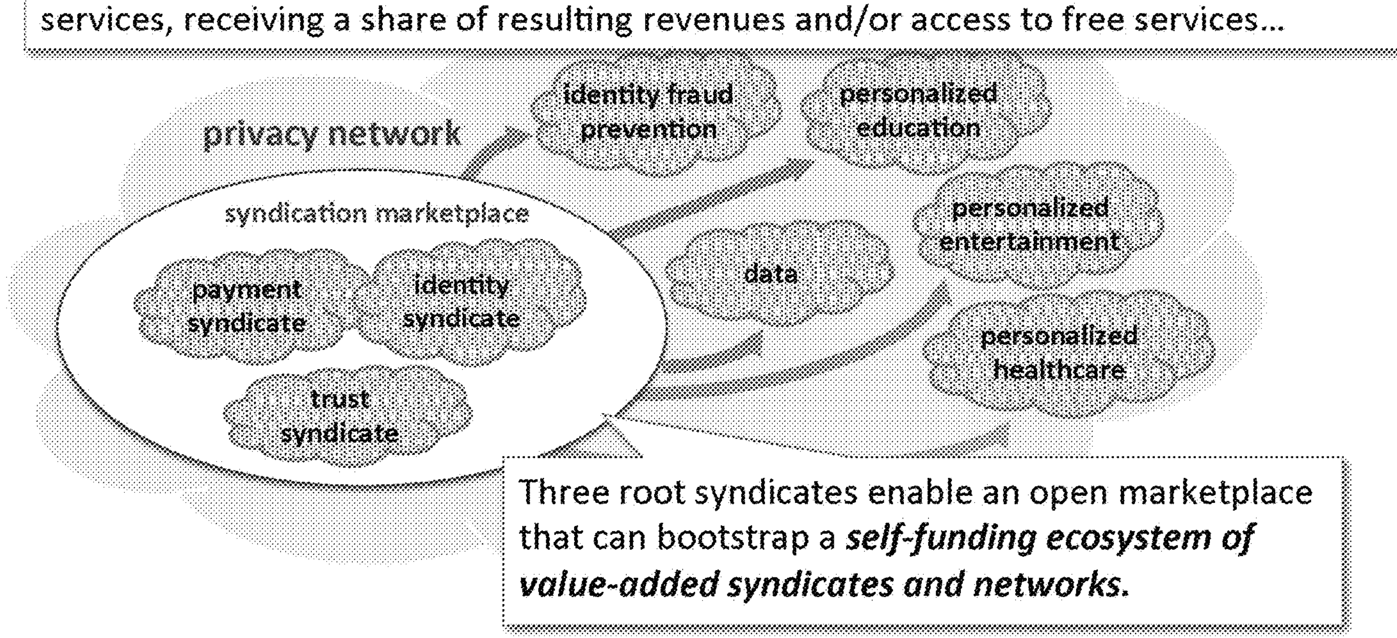

Trust Syndicates enable neutral cloud-based policy enforcement and eliminates need for consensus on policies, regulations, practices, and technology.

Identity Syndicates enable record linking, authentication, proofing and authorization of people, organizations and devices on a global basis.

Payment Syndicates anonymously meter activities, enforces payment and syndication terms, settle transactions and make payments.

FIG. 9

Example: Medication Adherence

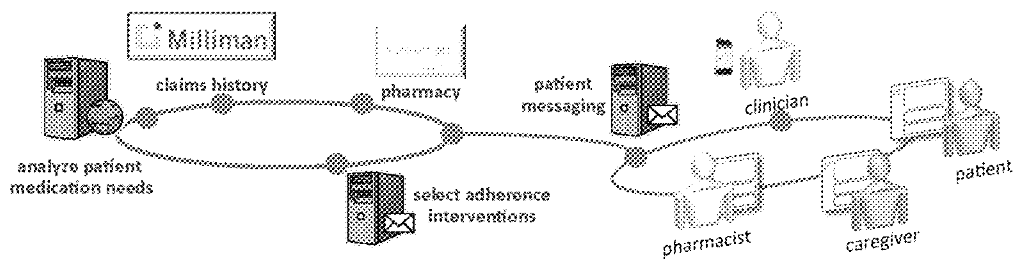

- Monitor prescription histories to detect prescriptions due but unfilled, or personalized care management analytics.
- Adherence eligibility model determines whether intervention is authorized based on patient history and payer policies.
- Adherence selection model chooses interventions based on patient profile and sponsor (payer or pharma) policies.
- Engage with patients, providers, pharmacists, and caregivers to implement adherence interventions.
- Detect when prescription has been filled.
- Payments due calculated based on subscription terms, allocated to suppliers based on neutral metering services.

FIG. 13

Privacy Matrix

| | Input Source Provenance | Input Source Payload | Request Metadata | Orchestration Metadata | Recipient Provenance | Reference Source Attributes | Reference Source Provenance |
|---|---|---|---|---|---|---|---|
| Input Sources | C | C | C | P | C | P | P |
| Trust Network Node | O | O | C | C | O | O | O |
| Reference Source | P | P-O | P | P | P | C | C |
| Administrator | O | O | C | C | O | O | O |
| Output Recipients | C, O | P-C | P-C | P | | P-C | P |

Bill of Materials Unified Trust Model

Trust Model – Information Model

Policy Enforcement Model: (taxonomies)
- Policy Intent:
- Enforcement Requirements:
- Enforcement Mechanisms:

Trust Criteria Model: (taxonomies)
- Regulatory Compliance
- Payment Terms
- Identity Assurance
- Security Assurance
- IT Interoperability
- Authorized Uses
- Authorized Recipients
- Authorized Requestors
- Authorized Reference Sources

Trust Validation Model: (taxonomies)
- Assessment Methodology
- Audit & Certification
- Rating & Reputation
- Attestations
- Utilization Metrics
- Trust Authority
- Governance

Resource Registry Model: (taxonomies)
- Resource Description
- Provenance
- Trust Requirements

Domain Model: (taxonomies)

Trust Model IDE (Integrated Development Environment) Component

Trust Model Navigator

Trust Model Resource Registry (Metatdata, Offline Documents, Online Documents, APIs)
- Policy Definition Taxonomy Editor
- Policy Enforcement Model Editor
- Trust Network Resource Registry Editor

Trust Authority Service
- Trust Authority Editor (Individual, Organization)
- Trust Validation Criteria Editor
- Trust Assertion Editor (Certification, Attestation, Assessment, Utilization, Reputation)
- Trust Graph Navigator
- Trust Resource Collababorative Review, Approval & Attestation
- Trust Validation Service (Boolean, Ranking)

Metadata Models
- Policy Definition Model
  - Policy Configuration Model
- Policy Enforcement Model
  - Trust Network Software Classification Model
  - Legal Agreement Classification Model
  - Training Material Classification Model
- Trust Validation Model
  - Ecosystem Model (Actors, Organizations, Regulatory Jurisdiction)
  - Trust Validation Criteria Model
  - Rating, Assessment and Audit Model
  - Provenance Description Model
  - Payment & Licensing Terms Model
- Privacy Algorithm Model
- Identity Syndication Model
- Domain Information Model

FIG. 21

HIPAA enforcement requirements – clinical treatment purpose

- User identity and credentials must be proofed and authenticated to required assurance level by approved services.
- Authorization to access patient records must be verified by approved services based on one of the following criteria:
  - Patient may access their own records subject to checking for applicable restrictions on patient access specified by the provider or legal authorities.
  - Family members or authorized caregivers may access patient records subject to verification of consent by patient or authorized guardian.
  - Provider (clinician or business associate) may access records subject to checking for applicable patient-specified restrictions on provider access, and by verifying of one of the following:
    - Attestation of treatment purpose by provider.
    - Attestation of patient consent by provider.
    - Verification of patient consent by patient or guardian.
- Match of patient records to patient identifiers specified for access authorization must be verified by an approved service to required assurance level.
- Access to patient records must be logged by an approved disclosure management service (for access by any user), and by approved records retention and access audit services (for access by providers).
- Disclosure management service must support notification and online access by patient or authorized guardian subject to verification of identity to required assurance level by approved services.
- Authorization of business associate to view patient records or attest to patient consent or treatment purpose on behalf of provider must be confirmed either by verifying they have appropriate role at the provider organization, or by attestation by provider staffer who has been authenticated to required assurance level.

FIG. 25

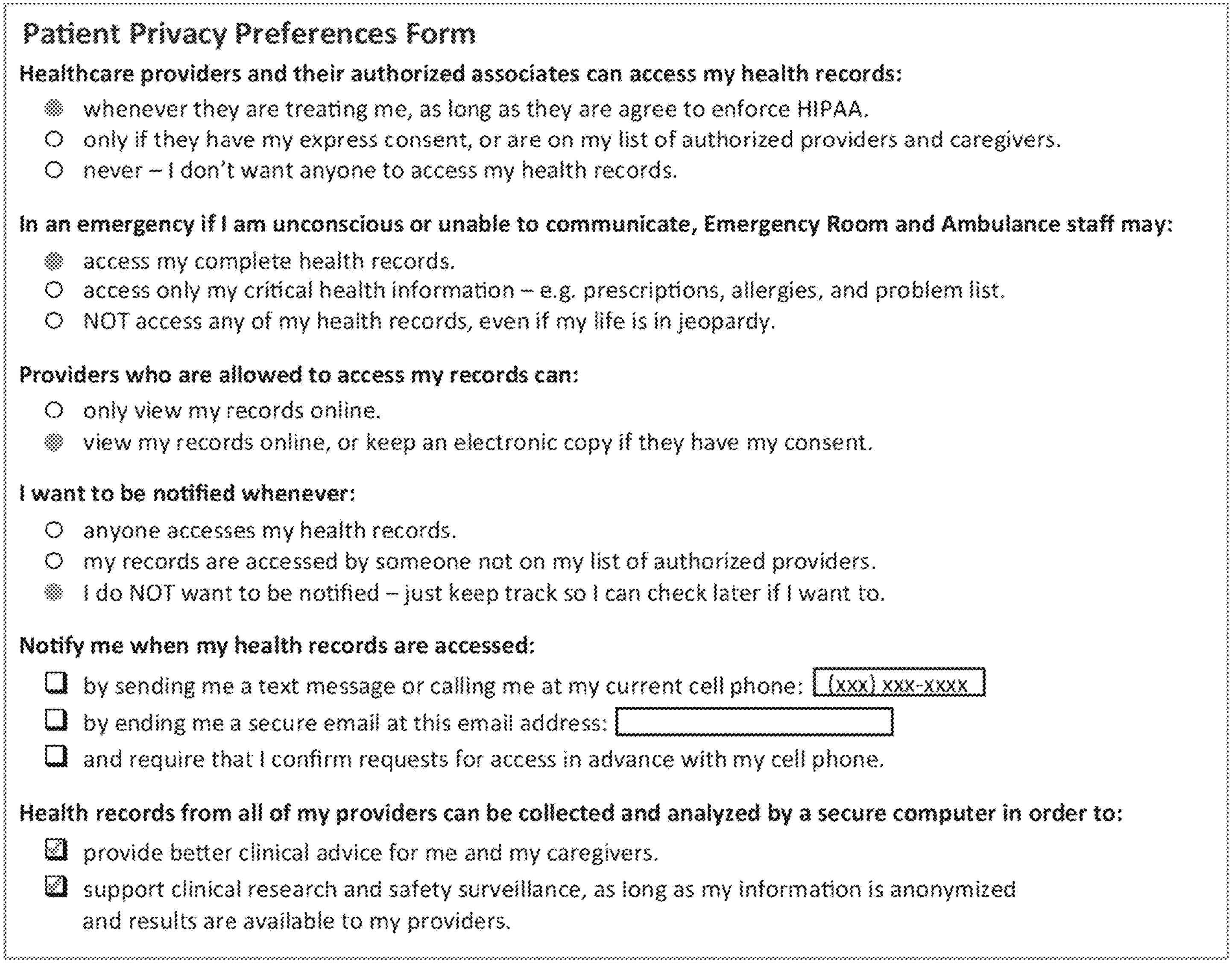

Patient Privacy Preferences Form

Healthcare providers and their authorized associates can access my health records:

- (●) whenever they are treating me, as long as they are agree to enforce HIPAA.
- ( ) only if they have my express consent, or are on my list of authorized providers and caregivers.
- ( ) never – I don't want anyone to access my health records.

In an emergency if I am unconscious or unable to communicate, Emergency Room and Ambulance staff may:

- (●) access my complete health records.
- ( ) access only my critical health information – e.g. prescriptions, allergies, and problem list.
- ( ) NOT access any of my health records, even if my life is in jeopardy.

Providers who are allowed to access my records can:

- ( ) only view my records online.
- (●) view my records online, or keep an electronic copy if they have my consent.

I want to be notified whenever:

- ( ) anyone accesses my health records.
- ( ) my records are accessed by someone not on my list of authorized providers.
- (●) I do NOT want to be notified – just keep track so I can check later if I want to.

Notify me when my health records are accessed:

- [ ] by sending me a text message or calling me at my current cell phone: (xxx) xxx-xxxx
- [ ] by ending me a secure email at this email address:
- [ ] and require that I confirm requests for access in advance with my cell phone.

Health records from all of my providers can be collected and analyzed by a secure computer in order to:

- [x] provide better clinical advice for me and my caregivers.
- [x] support clinical research and safety surveillance, as long as my information is anonymized and results are available to my providers.

FIG. 26

HIPAA enforcement requirements – clinical research and analysis purpose

Research and analysis purposes includes the analysis of aggregated patient records for clinical research, comparative effectiveness research, patient safety surveillance, public health reporting, quality reporting, and healthcare operations. Each of these benefit from the ability to create and analyze comprehensive longitudinal patient records drawn from multiple sources. Public health, quality reporting and healthcare operations also require the ability to support evaluation of the relative outcomes and costs for patients treated by specific provider organizations, facilities and clinicians.

The functional requirements and privacy protocols for each of the types of research or analysis are similar, although the specific legal and regulatory basis for the privacy protocols vary. For clinical or comparative effectiveness research in particular, the policy enforcement requirements are as follows:

- Authorization by Institutional Review Board (IRB) for user to access research content according to a particular privacy protocol (complete or redacted patient records, de-identified records, statistical summaries, restricted processing node, etc.) with specified parameters must be confirmed by an approved service.
- User identity and credentials must be proofed and authenticated to required assurance level by approved services. The IRB and the research sites sponsoring investigators must have independent identity proofing systems to verify users.
- Access to any research content incorporating or derived from patient records must be logged by an approved access audit service.
- Access to identified patient records for research purposes requires the following:
    - Authorization to access the patient records must be confirmed by an approved service. Patient consent to have their identified records be used for research purposes is required for researchers who do not have a treatment relationship with the patient.
    - Match of patient records to patient identifiers specified for access authorization must be verified by an approved service to the required assurance level.
    - Access must be logged by approved disclosure management and records retention services.

FIG. 32 policy enforcement requirements enabling software infrastructure and services

- user authentication services: ...
- identity proofing and credential verification services: ...
- authorization management service: ...
- disclosure management service: ...
- records retention service: ...
- access audit service: ...
- policy authority: ...
- directory services (organizations, infrastructure): ...
- privacy broker: ...
- discovery service: ...
- identity matching service: ...
- restricted processing node: ...
- de-identification (pseudonomization) service: ...
- terminology mapping service: ...
- format translation service: ...
- record redaction service: ...
- privacy scrubbing service: ...

FIG 33 transform records redact sensitive information

The privacy of patient records can be protected by 'redacting' them to eliminate sensitive attributes or values. This requires a classification scheme for sensitive health information, and mechanisms for detecting sensitive information, generating 'policy metadata', redacting records, and fine-grained access control.

redact sensitive information
- mask sensitive attributes or values
- exclude records w/ sensitive contents
- summarize or transform values
- exclude notes and unstructured data access control based on contents of records

Mechanisms for Redacting Records
- Remove, mask or hash sensitive attributes or attribute values.
- Exclude records or sections with sensitive contents.
- Summarize or transform attributes to obscure sensitive information.
- Exclude or segregate notes or unstructured data which might contain sensitive information.

Top-level Classifications of Sensitive Information
- Mental health
- Substance Abuse
- Communicable diseases
- Sexually transmitted diseases (e.g. HIV status)
- Reproductive or sexual health
- Identifying or Sensitive Genomic information
- Pictures
- Protected Source (e.g. behavior health center)

Mechanisms for Detecting Sensitive Information
- Patterns of prescriptions or treatments
- Diagnosis codes
- Lab values or test results
- Specialty of treating clinicians or healthcare facility
- Natural language parsing of unstructured text and notes

*Note: detecting and redacting sensitive information accurately can be challenging and may require combinations of sophisticated techniques. The mechanisms depend upon records being in well-known data formats and terminologies.*

Fine-grained Access Control Based on Contents of Records

Records can be annotated with 'Policy Metadata' that indicates if data came from a protected source or includes sensitive elements based on a specific classification scheme. This policy metadata can be used to support fine-grained patient consent and authorization control, where records are selectively redacted based upon on their contents or source; the identity of the user and their relationship to the patient; and/or policies specified by the source of the data, the recipient, or the patient.

FIG. 35 transform records privacy scrub to limit pattern matching

Patient records may include very detailed information (e.g. diagnostic codes, lab values, dates of treatment, etc.) that are either inherently sensitive (e.g. HIV status), or which can be used to infer the identity of a patient in de-identified records by pattern-matching against a reference source of identified records. Such records may be transformed or 'privacy scrubbed' in various ways to obscure sensitive information or to make pattern-matching more difficult.

privacy scrub to limit pattern-matching
- roll-up leaf-level codes
- classify codes & continuous variables
- "dither" continuous variables
- substitute opaque tokens
- segregate/exclude unstructured text Privacy scrubbing can be tailored to protect against specific privacy risks, while at the same time minimizing the impact for specific analytic purposes. Privacy scrubbing techniques include:

- Summarize or classify detailed codes or continuously variable attribute values into discrete ranges, categories, indices, averages, or rankings.
- Roll-up "leaf-level" codes to higher levels in terminology taxonomies – e.g. substitute a higher-level diagnostic code which will apply for a significant portion of the overall population (cardiovascular disease) for a more specific diagnostic code (ischemic cardiomyopathy).
- "Dither" continuously variable attributes (e.g. weight, lab values, etc.) by adding random errors that make pattern matching more difficult, but which do not have a significant impact on the analytic output.
- Substitute an opaque token (e.g. a GUID, crypto-hash, or homomorphically encrypted value) for sensitive values that support analytic algorithms that yield useful results while obscuring privacy sensitive information.
- Remove or segregate unstructured text, which lends itself to easy re-identification via pattern-matching, and also may allow sensitive information that is difficult to detect algorithmically.

FIG. 36 restrict processing constrain analysis

The unauthorized release of personally identifiable information can be made more difficult by limiting the analytics that can be run against datasets, enforcing conditions on the datasets that can be queried or analyzed, or by limiting how different datasets can be compared, analyzed and combined.

constrain analysis
- minimum input record count
- limit queries per user
- constrain query criteria
- limit joins with reference data There are two ways of enforcing such constraints. The first is to limit processing of datasets to a set of approved (and possibly peer-reviewed) scripts, analytic services or programs, with specified configuration options for each. The second is to use a clinical analysis platform that evaluates queries, joins and datasets to be analyzed at runtime, and blocks results if constraints are violated.

There are a variety of constraints that could contribute to privacy protection, including the following:

- Minimum input record count: If the identity of patients in a dataset is known, the smaller the dataset, the easier it is to discover sensitive personal information from statistical output. Specifying a minimum count protects against this risk.
- Limit input to de-identified or limited datasets: Requiring that all inputs analyzed be either de-identified or limited datasets prevents disclosures based on queries using patient identifiers, and protects against re-identification attacks.
- Limit processing to approved scripts, services or programs: Analytic or reporting resources can be evaluated to verify that they cannot be used to disclose protected or sensitive information.
- Limit queries per user: Repeated queries can be used to support "brute force" attacks to reveal protected information. Creating audit records of queries and limiting the number of queries per user or per session can protect against this.
- Constrain query criteria: Query criteria that distinguishes specific individuals or which include sensitive information (e.g. HIV status) can be used to discover sensitive personal information. Query criteria can be evaluated (either at runtime or in a prior approval process) to determine whether they pose a risk.
- Limit joins or comparisons with identified reference data: Allowing identified datasets to be joined, analyzed or pattern matched against de-identified or limited datasets with sensitive information creates a risk of a re-identification attack that links patient identities to sensitive information. Strictly segregating identified and de-identified / limited datasets eliminates this risk.

FIG. 37

| assessment of privacy protocols<br>for research and analysis purposes | restrict user access<br>patient authorization | <br>user credentials | transform records<br>de-identify | <br>redact | <br>privacy scrub | restrict processing<br>constrain analysis | <br>constrain output | <br>trusted servers |
|---|---|---|---|---|---|---|---|---|
| **restricted processing node** | | ● | ○ | ○ | ○ | ● | ● | ● |

A restricted processing node is a secure computing service or platform capable of strictly enforcing the elements of a specified privacy protocol. These might include the following:

- Restrict who (machines or users) can upload datasets; access or download datasets or analytic output; or initiate processing to analyze, aggregate or transform datasets.
- Limit the processing that can be performed upon specific datasets to a set of specific scripts, analytic services or programs, with specified configuration options for each.
- Pre-process datasets according to specific protocols before allowing them to be joined, analyzed or aggregated with other data sets. This could include redacting, scrubbing or de-identifying datasets, or mapping them into a specified terminologies or formats.
- Analyze datasets or analytic output to verify that they conform to privacy policy requirements (e.g. de-identified or redacted, minimum dataset or cohort size, randomized dataset composition, etc.)
- Persistently link metadata specifying privacy protocols to datasets, and to any analytic outputs or datasets derived from them, and ensure that those protocols are enforced.
- Maintain audit trails documenting the usage of, access to, approvals for, and source of datasets, processing logic (programs, scripts, services, etc.) and analytic outputs; as well as the privacy protocols enforced for each.

constrain analysis
- minimum input record count
- limit queries per user
- constrain query criteria
- limit joins with reference data constrain output
- minimum output record count
- limit attributes returned
- limit to statistical summaries restrict to trusted servers
- security certified, white-lists
- business associate agreements specifying policies A restricted processing node might either be used by a single organization (such as a HIPAA covered entity), or be a shared resource that allows multiple organizations to aggregate and analyze patient records while ensuring that the security, privacy and rights management policies of each participating data source and the patient are enforced. Policies would be enforced by the restricted processing node itself based on policy metadata linked to each dataset and processing output, as opposed to relying upon appropriate behavior of users or administrators. Business associate agreements would be required for access to identified patient records or limited datasets. Independently auditing systems and administrative processes to confirm that security, access control and policy enforcement mechanisms are in place and robust would improve assurance and trust, and simply the process of establishing business associate agreements.

FIG. 38 assessment of privacy protocols for research and analysis purposes

| | restrict user access | | transform records | | | restrict processing | | |
|---|---|---|---|---|---|---|---|---|
| | patient authorization | user credentials | de-identify | redact | privacy scrub | constrain analysis | constrain output | trusted servers |
| **de-identified inputs & restricted processing node** | | ● | ● | ○ | ○ | ● | ● | ● |

The most serious privacy risk associated with releasing de-identified records to another organization is that the recipient may have identified records for some of the same people, and use them to execute a re-identification attack. Extremely robust protection against any leaks or inferences about personally identifiable information can be ensured using a restricted processing node that:

1) requires that all datasets be transformed into pseudonomized limited datasets before being uploaded;
2) limits researchers to statistical output only; and
3) either requires minimum dataset and output cohort size and randomized dataset composition, or peer review of any analytics programs or services used to ensure that they are incapable of re-identification attacks.

This protocols allows for rich analysis of comprehensive longitudinal records assembled and reconciled from many sources on a national scale, while avoiding the potential privacy risks of uncontrolled sharing of de-identified records.

Using the same pseudonomization service for all datasets makes it possible to assemble longitudinal records for patients from disparate sources.

This would also make it possible to selectively (after verifying user identity and consent) re-identify records or analytic results to alert the patient's authorized clinicians of important risk factors or provide personalized decision support as to the relative efficacy of various treatment options based on population-scale safety surveillance and observational research. In addition, it would allow anonymous interaction with the patient and their clinicians to request important missing information or to confirm suspected results.

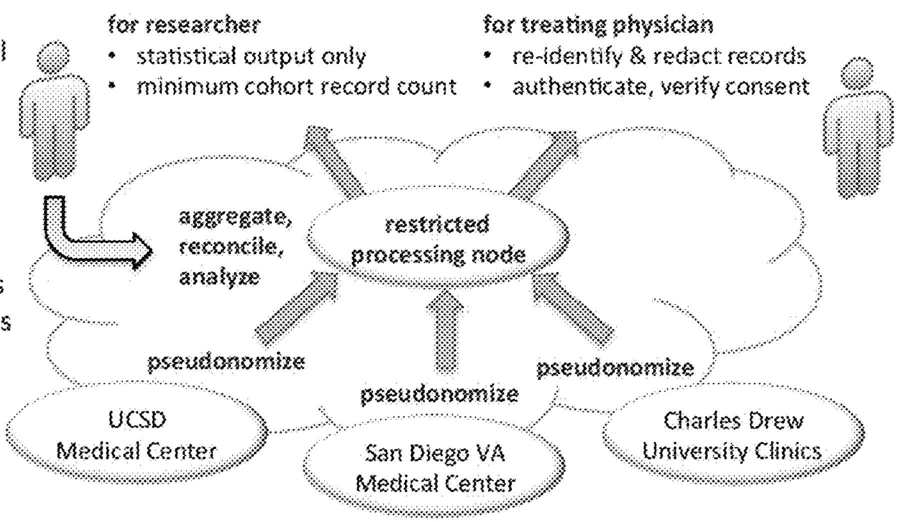

FIG. 39

Trust Criteria are art of the signed JWT containing the data so cryptographically bound

```
{ header: {
    alg: 'RS255',
    http://pn.schema.webshield.io/prop#x5c_pem: 'holds the payer 1 x509 cert pem file',
  }
  payload: {
   iss: 'payer1.com',
   sub: 'https://id.webshield.io/com/payer1/er/999999',
   iat: 'now',
   'https://pn.schema.webshield.io/prop#pn_data_model: 'https://md.pn.id.webshield.io/data_model/com/payer1#enrollment_records',
   'https://pn.schema.webshield.io/prop#subject_syndication_id': 'https://pn.id.webshield.io/syndication_request/com/payer1#72728282'
   'https://pn.schema.webshield.io/prop#trust_critera': 'Trust Criteria protecting this piece of data'
   'https://pn.schema.webshield.io/subject': {
      @id: 'https://id.webshield.io/com/payer1/er/999999',
      @type: ['https://payer1.schema.webshield.io/type#EnrollmentRecord',
              'https://pn.schema.webshield.io/type#PrivacyGraph]
      https://pn.schema.webshield.io/prop#sourceID: ['#1-aes-0', '#2-sha-0']
      https://schema.org/giveName: '#1-aes-1'
      https://schema.org/familyName: '#1-aes-2',
      https://schema.org/birthDate: #1-aes-3',
      https://payer1.schema.webshield.io/prop#enrollmentStatus: '#1-aes-4',
      https://subject.pn.schema.webshield.io/prop#memberID: [#1-aes-5, #2-sha-2],
      https://schema.org/address: {
        @id: 'https://id.webshield.io/postal_address/com/payer1/1',
        @type: https://schema.org/PostalAddress',
        https://schema.org/postalCode: '#1-aes-6',}
     }}}
  }
  signature: {
   // contains signature using payer private key associated with the embedded certificate'
  }
}
```

FIG. 47

Trust Criteria Protecting Payer 1 Enrollment records.
Note this can also be represented as Tags on
Enrollment Records and ABC.com's Privacy Agent.

```
rule:
  id: /com/payer1/is_authorized_recipient
  description. Permit access some Enrollment Records fields if accessor is an Authorized Recipient
  effect: permit
  condition: Subject-Access is 'https://.../type#Authorized_Recipient' issuer 'payer1.com' AND
             Resource.schema in [
                 'https://schema.org/givenName,'https://schema.org/familyName']
policy:
  id: /com/payer1/policy_1
  description: Appies to reading payer 1 Enrollment Records for Identity Verification
  target: Resource is 'https://payer1.schema..../type#EnrollmentRecord' issuer 'payer1.com' AND
          Action.actionType === 'read' AND
          Action.purpose === 'https://...../IdentityVerfication'
  ruleCombiningAlgId: firstApplicable
  rules: [ 'com/payer1/is_authorized_recipient']
```

```
rule:
  id: /com/payer1/is_target_of_record
  description: Permit access to Enrollment Records if accessor is subject of record
  effect: permit
  condition: Subject-Access is 'https://.../type#Level5_Verified' issuer 'trusted.com' AND
             Resource['https://schema.org/email] === AccessSubject['https://schema.org/email']
policy:
  id: /com/payer1/policy_1
  description: Appies to reading payer 1 Enrollment Records
  target: Resource is 'https://payer1.schema..../type#EnrollmentRecord' issuer 'payer1.com' AND
          Action.actionType === 'read'
  ruleCombiningAlgId: firstApplicable
  rules: [ 'com/payer1/is-target_of_record']
```

FIG. 48

Global Identity Graphs Created from Link Credentials issued by trusted parties.

```
{ header : {
   alg: 'RS256',
   https://pn.schema.webshield.io/prop#x5c_pem: 'holds an xyz domain x509 cert pem file',
  },
  payload": {
    iss: { @type: https://pn.schema.webshield.io/type#CNAME, @value: 'pn.experian.com' },
    sub: 'https://id.webshield.io/com/xyz/pn/link_credential/929829-92929-92992',
    iat: now,
    exp: 1 year from now
    https://pn.schema.webshield.io/prop#trust_critera: 'protect crdential',
    https://pn.schema.webshield.io/prop#jwt_type: http://..../link-credential',
    https://pn.schema.webshield.io/prop#credential: {
     @id: "http://id.webshield.io/com/experian/pn/link_credential/828282-29929292-92929292,
     @type : [ "https://pn.schema.webshield.io/type#SubjectLinkCredential",
                "https://experian.schema.webshield.io/type#GoldLinkCredential"],

     https://pn.schema.webshield.io/subject: "http://id.webshield.io/com/payer1/er/999999",
     https://pn.schema.webshield.io/link_subject: "http://id.webshield.io/com/xyz/929829-92929-92992",

     https://safari.schema.webshield.io/xyz_score: { '#88-cipher-text' },
     https://pn.schema.webshield.io/prop#link_confidence: { "@type": "xsd:percent", "@value": "83" },
    },
    // Experian has been authorized to issue subject link credentials from the link-evaluation authority
   https://link-evaluation-authority/credentials/subject/link_level_4,
  },
  signature: { // contains signature using an xyz domain private key paired with the embedded cert }
}
```

FIG. 51

Query Example using GraphQL [can extend to other formats]

```
{
 '@context': {}
 @id: either a url or value - used in log messages and for aynch return of message
 @type: SubjectQuery - the query is for subject data so query will look for a subject property
   that is the root of the query
 @graph: { // the subject graph that should be returned, defines restriction and what fields to
   return.
   bob: {
    __params: {
       'id': 'https://...../', // a globally unique id for bob that the person has
       type: the globally unique type that expect the result subject to be in}
    __quality: {
          // criteria on tags data must have, what identity syndication algorithm to use, etc
    familyName:
    givenName:
    taxId:
   }
 }
}
```

FIG. 52

Normalize to JSON-LD

Privacy Agent Adapter converts to this Format

Payer 1

```
{ id: '1',
  type: 'SyndicationRequest',
  user_tag: 'process_23',
  subjects: [ {
    id: /er/999999,
    type: EnrollmentRecord,
    sourceID: 999999,
    giveName: 'Alice'
    familyName: 'Smith',
    birthDate: '01/01/1951',
    enrollmentStatus: 'A',
    memberID: 'mem1'
    address: {
      type: PostalAddress
      postalCode: '94107',}
  }]}
```

Privacy Agent converts to JSON-LD using expand and payer 1 @context.

Payer 1

```
{ @id: 'https://pn.id.webshield.io/synd_request/com/payer1/1',
  @type: 'https://pn.schema.webshield.io/type#SyndicationRequest',
  https://pn.schema.webshield.io/prop#user_tag: 'process_23',
  subjects: [ {
    @id: 'https://id.webshield.io/com/payer1/er/999999',
    @type: 'https://payer1.schema.webshield.io/type#EnrollmentRecord',
    https://pn.schema.webshield.io/prop#sourceID: '999999',
    https://schema.org/giveName: 'Alice'
    https://schema.org/familyName: 'Smith',
    https://schema.org/birthDate: '01/01/1951',
    https://payer1.schema.webshield.io/prop#enrollmentStatus: 'A',
    https://subject.pn.schema.webshield.io/prop#memberID: 'mem1',
    https://schema.org/address: {
      @id: 'https://id.webshield.io/postal_address/com/payer1/1',
      @type: https://schema.org/PostalAddress',
      https://schema.org/postalCode: '94107',}
  }]}
```

JSON-LD provides globally unique: ids and a globally unique vocabulary for types and properties.

Payer 2

```
{ id: '1',
  type: 'SyndicationRequest',
  user_tag: 'test_23',
  subjects: [ {
    id: /ic/ABCDE,
    type: PatientRecord,
    sourceID: ABCDE,
    giveName: 'Alice'
    familyName: 'Smith',
    birthDate: '01/01/1951',
    memberID: '092-292',
    physicianID: 'abc-29202-2929'
    address: {
      type: PostalAddress,
      postalCode: '94123',}
  }]}
```

Privacy Agent converts to JSON-LD using expand and payer 2 @context.

Payer 2

```
{ @id: 'https://pn.id.webshield.io/synd_request/com/payer2/1',
  @type: 'https://pn.schema.webshield.io/type#SyndicationRequest',
  https://pn.schema.webshield.io/prop#user_tag: 'test_23',
  subjects: [ {
    @id: 'https://id.webshield.io/com/payer2/ic/ABCDE',
    @type: 'https://health-lifgsi.schema.org/PatientRecord',
    https://pn.schema.webshield.io/prop#sourceID: 'ABCDE',
    https://schema.org/giveName: 'Alice'
    https://schema.org/familyName: 'Smith',
    https://schema.org/birthDate: '01/01/1951',
    https://subject.pn.schema.webshield.io/prop#memberID: '092-292
    https://schema.org/physicianID: 'abc-92020-29029',
    https://schema.org/address: {
      @id: 'https://id.webshield.io/postal_address/com/payer2/1',
      @type: https://schema.org/PostalAddress,
      https://schema.org/postalCode: '94123',}
  }]}
```

FIG. 60

One Step Privacy Algorithm that applies AES encryption, using AWS KMS for the Keys.

```
id: /com/payer1#aws-pa1
type: PrivacyAlgorithm, Resource
description:AES256 encrypt Payer 1 subject data using a new AWS KMS data key that is
generated and encrypted by a specific AWS KMS Customer Master Key.
privacy_step:
 -id: /com/payer1/aws-pa1-pstep1
  node_type: privacy_agent
  privacy_action:
   -id: /com/payer/aws-pa1-pstep1-paction1
    kms: @id
   content_obfuscation_algorithm: https://ietf.org/rfc7518/A256GCM
   key_encryption_key_md:@id
   content_encryption_key_md: null
   obfuscation_provider: https://aws.amazon.com
   skip_orchestration: false
   obfuscation_service: null
   schema: { $schema: 'http//json-schema.org/v4',
     title: 'https://acme.schema.webshield.io/type#EnrollmentRecord',
     properties: {
       'https://schema.org/givenName': { type: string },
       'https://schema.org/familyName': { type: string },
       'https://schema.org/taxID':  { type: string },
       'https://acme.schema.webshield.io/prop#EnrollmentStatus' : { type: string },
       'https://pn.schema.webshield.io/prop#sourceID' : { type: string },
       'https://schema.org/address: { $ref: '#/definitions/https://schema.org/PostalAddresss'
     }
   }
```

```
id: kms/com/amazon/aws/kms#us-west-2-region
type: KMS, Resource
description: ACME aws kms us-west-2 region
provider: https://aws.amazon.com
algorithm: [ https://ietf.org/rfc7518/A256GCM ]
endpoint: 'https://kms.us-west-2.amazonaws.com

id: encrypt_key_md/com/acme/cmk/testing_1
type: EncryptKeyMetadata, Metadata
description: created at configure time
raw_encrypt_key_metadata:  // base64 encoded string that contains
 kty: pn_t.AWS_KMS_CMK
 alg: AES_256
 region: 'us-west-2'
 k: 'arn:aws:kms:us-west-2:282828282:key/8298292-92929292-90292'

id: encrypt_key_md/com/acme/gdk/82828288
type: EncryptKeyMetadata, Metadata
descrption: generated at runtime and pointed to by the instance
raw_encrypt_key_metadata: base64 encoded string that contains
 kty: pn_t.AWS_KMS_DATAKEY
 alg: AES_256
 region: 'us-west-2'
 k: base64(byte[]) // the AWS KMS encrypted data key
```

FIG. 62

Obfuscated Data Representation
(shows graph that has passed through two privacy steps, one AES, one SHA256)
(note for clarity the schema is not obfuscated)

PN Obfuscated Value is base64(nonce).base64(aad).base64(value)
- nonce is an optional byte[] only there if PN is required to track
- aad is an optional byte[] only there if PN is required to track
- value is byte[] holds out from obfuscation

```
{  pn_p.v: base64(byte[]).base64(byte[]).base64(byte[])
  @type: the @id of the privacy action instance that obfuscated  }

{ @id: 'https://id.webshield.io/com/acme/er/999999',
  @type: ['https://payer1.schema.webshield.io/type#EnrollmentRecord',
            'https://pn.schema.webshield.io/type#PrivacyGraph]
  https://pn.schema.webshield.io/prop#sourceID: [
    { https://pn.schema..../prop#v: base64(#1-aes-0),
     @type: 'https://md.pn.../privacy_action_instance/com/payer1/aws-pai-aes-1' }
    { https://pn.schema.../prop#v: base64(#2-sha-0),
      @type: 'https://md.pn.../privacy_action_instance/com/payer1/aws-pai-sha256-1}
  ]
  https://schema.org/giveName: { pn_p.v: base64(#1-aes-1), @type:'...aes-1'},
  https://schema.org/familyName: { pn_p.v: base64(#1-aes-2), @type:'...aes-1'},
  https://schema.org/birthDate: { pn_p.v: base64(#1-aes-3), @type: '...aes-1'},
  https://acme.schema.webshield.io/prop#enrollmentStatus:
        { pn_p.v: base64(#1-aes-4), @type: '...aes-1'},
  https://subject.pn.schema.webshield.io/prop#memberID: [
    { pn_p.v: base64(#1-aes-5), @type: '...aes-1' },
    { pn_p.v: base64(#2-sha-2), @type: '...sha256-1' ],
  https://schema.org/address: {
    @id: 'https://id.webshield.io/postal_address/com/payer/1',
    @type: https://schema.org/PostalAddress',
     https://schema.org/postalCode: {pn_p.v:base64(#1-aes-6), @type:'...aes-1'}
    }
  }
}
```

id: /com/payer1/aws-pai-aes-1
type: PrivacyActionInstance
privacy_pipe: @id of pipeA
privacy_action: @id of action
kms: @id of kms
key_encrypt_key_md: @id
content_key_encrypt_key_md: @id of key generated for this action instance
skip_orchestration: false
content_obfuscation_algorithm: A256GCM
obfuscation_provider:
obfuscate_service: @id
schema: json schema used to obfuscate id: /com/payer1/aws-pai-sha256-1
type: PrivacyActionInstance
privacy_pipe: @id of pipe A
privacy_action: @id
kms: @id of kms used to decrypt salt
key_encrypt_key_md: @id
content_key_encrypt_key_md: @id copied from action
skip_orchestration: false
content_obfuscation: SHA256
obfuscate_service: @id
schema: json schema used to obfuscate

FIG. 63

Protect Actors

Resource Credential

[claims about resources ]

```
{ payload: {
   "iss": { "@type": "pn_t.CNAME", "@value": "payer1.com" },
   "exp": "expire date",
   "iat": "JWT issue date",
   "sub": { "@type": "pn_t.CNAME", "@value": "experian.com"}
   "http://pn.schema.webshield.io/prop#credential": {
      "@id": "http://id.webshield.io/com/payer1/credential/1",
      "@type": [
        "http://pn.schema.webshield.io/type#ResourceCredential",
        "http://trusted_credential_party/Authorized_Recipient"],
    }
  },
  signature: // signed by private key of a trusted issued, for example payer1
}
```

FIG. 65

Trust Criteria are part of the signed JWT containing the data so cryptographically bound.

```
{ header: {
    alg: 'RS255',
    http://pn.schema.webshield.io/prop#x5c_pem: 'holds the payer 1 x509 cert pem file',
  }
  payload: {
   iss: 'payer1.com',
   sub: 'https://id.webshield.io/com/payer1/er/999999',
   iat: 'now',
   'https://pn.schema.webshield.io/prop#pn_data_model: 'https://md.pn.id.webshield.io/data_model/com/payer1#enrollment_records',
   'https://pn.schema.webshield.io/prop#subject_syndication_id': 'https://pn.id.webshield.io/syndication_request/com/payer1#72728282'
   'https://pn.schema.webshield.io/prop#trust_critera': 'Trust Criteria protecting this piece of data'
   'https://pn.schema.webshield.io/subject': {
      @id: 'https://id.webshield.io/com/payer1/er/999999',
      @type: ['https://payer1.schema.webshield.io/type#EnrollmentRecord',
               'https://pn.schema.webshield.io/type#PrivacyGraph]
      https://pn.schema.webshield.io/prop#sourceID: ['#1-aes-0', '#2-sha-0']
      https://schema.org/giveName: '#1-aes-1'
      https://schema.org/familyName: '#1-aes-2',
      https://schema.org/birthDate: #1-aes-3',
      https://payer1.schema.webshield.io/prop#enrollmentStatus: '#1-aes-4',
      https://subject.pn.schema.webshield.io/prop#memberID: [#1-aes-5, #2-sha-2],
      https://schema.org/address: {
        @id: 'https://id.webshield.io/postal_address/com/payer1/1',
        @type: https://schema.org/PostalAddress',
         https://schema.org/postalCode: '#1-aes-6',}
     }]}
  }
  signature: {
   // contains signature using payer private key associated with the embedded certificate'
  }
}
```

FIG. 66

Trust Criteria Protecting Payer 1 Enrollment records. Note this can also be represented as Tags on Enrollment Records and ABC.com's Privacy Agent.

```
rule:
  id: /com/payer1/is_authorized_recipient
  description: Permit access some Enrollment Records fields if accessor is an Authorized Recipient
  effect: permit
  condition: Subject-Access is 'https://.../type#Authorized_Recipient' issuer 'payer1.com' AND
                Resource.schema in [
                    'https://schema.org/givenName,'https://schema.org/familyName']
policy:
  id: /com/payer1/policy_1
  description: Appies to reading payer 1 Enrollment Records for Identity Verification
  target: Resource is 'https://payer1.schema..../type#EnrollmentRecord' issuer 'payer1.com' AND
            Action.actionType === 'read' AND
            Action.purpose === 'https://..../IdentityVerfication'
  ruleCombiningAlgId: firstApplicable
  rules: [ 'com/payer1/is_authorized_recipient']
```

```
rule:
  id: /com/payer1/is_target_of_record
  description: Permit access to Enrollment Records if accessor is subject of record
  effect: permit
  condition: Subject-Access is 'https://.../type#Level5_Verified' issuer 'trusted.com' AND
                Resource['https://schema.org/email] === AccessSubject['https://schema.org/email']
policy:
  id: /com/payer1/policy_1
  description: Appies to reading payer 1 Enrollment Records
  target: Resource is 'https://payer1.schema..../type#EnrollmentRecord' issuer 'payer1.com' AND
            Action.actionType === 'read'
  ruleCombiningAlgId: firstApplicable
  rules: [ 'com/payer1/is-target_of_record']
```

FIG. 67

Policy Evaluation
[Note the evaluation uses Privacy Pipes to ensure that only valid parties see de-obfuscated data]

Example of an Ingest Privacy Agent
sending subject data to the Identity Syndicate
[Software system]

Global Identity Graphs Created from Link Credentials issued by trusted parties.

```
{ header : {
   alg: 'RS256',
   https://pn.schema.webshield.io/prop#x5c_pem: 'holds an xyz domain x509 cert pem file',
  },
  payload": {
    iss: { @type: https://pn.schema.webshield.io/type#CNAME, @value: 'pn.experian.com' },
    sub: 'https://id.webshield.io/com/xyz/pn/link_credential/929829-92929-92992',
    iat: now,
    exp: 1 year from now
    https://pn.schema.webshield.io/prop#trust_critera: 'protect crdential',
    https://pn.schema.webshield.io/prop#jwt_type: http://..../link-credential',
    https://pn.schema.webshield.io/prop#credential: {
     @id: "http://id.webshield.io/com/experian/pn/link_credential/828292-29929292-92929292,
     @type : [ "https://pn.schema.webshield.io/type#SubjectLinkCredential",
               "https://experian.schema.webshield.io/type#GoldLinkCredential"],

     https://pn.schema.webshield.io/subject: "http://id.webshield.io/com/payer1/er/999999",
     https://pn.schema.webshield.io/link_subject: "http://id.webshield.io/com/xyz/929829-92929-92992",

     https://safari.schema.webshield.io/xyz_score: { '#88-cipher-text' },
     https://pn.schema.webshield.io/prop#link_confidence: { "@type": "xsd:percent", "@value": "83" },
    },
    // Experian has been authorized to issue subject link credentials from the link-evaluation authority
   https://link-evaluation-authority/credentials/subject/link_level_4,
  },
  signature: { // contains signature using an xyz domain private key paired with the embedded cert }
}
```

FIG. 70

Query Example using GraphQL [can extend to other formats]

```
{
 '@context': {}
 @id: either a url or value - used in log messages and for aynch return of message
 @type: SubjectQuery - the query is for subject data so query will look for a subject property
  that is the root of the query
 @graph: { // the subject graph that should be returned, defines restriction and what fields to
  return.
  bob: {
   __params: {
      'id': 'https://...../', // a globally unique id for bob that the person has
      type: the globally unique type that expect the result subject to be in}
   __quality: {
         // criteria on tags data must have, what identity syndication algorithm to use, etc
   familyName:
   givenName:
   taxId:
  }
 }
}
```

FIG. 71

Example of a Reference Source Privacy Agent getting subject verify, enrich and link request from the Identity Syndicate [Software system]

Mapping Subject Identity Data

[Subject data models]

Control Plane, Management Plan, Data Plane, and Obfuscation Plane

Privacy Network Context Diagram showing parties involved in a syndicate

Unified Trust Model Layers

Unified Trust Model
Trusted IT Security Taxonomies

IT Security Assurance Level

! Low Assurance
! Medium Assurance
! High Assurance

Basis of Verification

! Unverified Attestation
! Verified Attestation
! Informal Security Audit
! Formal Security Certification

Access Control Granularity

! Organization Level
! System Level
! Person Level
! Attribute Level

Trusted IT Security Taxonomy
Control Level Criteria

! Secure Hosting
! Authenticated Connections
! Administrative Controls
! Software Components
! Encryption/Obfuscation
! Metadata Provenance
! Trusted Authorization

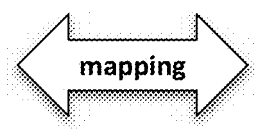

IT Security
Assessment Methodologies

! Enterprise Self-Assessment
! HITRUST
! SAS 70
! ISO 27001/2
! FISMA / NIST-SP 800-53
  - FISMA Low
  - FISMA Medium
  - FISMA High
  - FedRAMP Certified

IT Security
Regulatory Standards

! HIPAA Security Rule (HIPAA Guide)
! GLBA
! FISMA (US Federal Government)
! PCI DSS (Credit Card Industry)
! SAS 70
! EU Data Protection Directive

FIG. 86

Payer Trust Criteria for Payer Enrollment Records

Purpose of Use supported by HIPAA Authorized Basis<plan administration> AND

Purpose of Use is Authorized Purpose of Use<for Payer inc.> AND

Payer Inc. has agreed to Commercial Terms with Recipient Org AND

Payer Inc. trusts IT Security Practices of Recipient Org AND

Recipient Organization is Authorized Recipient<for Payer Inc.> AND

Recipient Org has IT Security Assurance Level<Medium> AND

Payer Inc. has executed HIPAA Business Associate Agreement with Recipient Org

FIG. 97

Payer Trust Criteria for authorizing access to cleartext Payer Enrollment Records by Acme

Purpose of Use<identity verification> supported by HIPAA Authorized Basis<plan administration> AND Purpose of Use<identity verification> is Authorized Purpose of Use<for Payer Inc.> AND Payer Inc. has executed HIPAA Business Associate Agreement with Recipient Organization<Acme> AND WHERE HIPAA Business Associate Agreement authorizes HIPAA Authorized Basis<plan administration> AND WHERE HIPAA Business Associate Agreement authorizes HIPAA Authorzied Basis<de-identified use>

Payer Inc. has agreed to Commercial Terms with Recipient Organization covering Purpose of Use<identity verification> AND Payer Inc. trusts IT Security Practices of Recipient Organization<Acme> AND Recipient Organization<Acme> is Authorized Recipient<for Payer Inc.> AND Recipient Organization<Acme>has IT Security Assurance Level<Medium>

FIG. 99

Figure 3: Acme Trust Criteria for Acme Enrichment Records

Purpose of Use supported by GLBA Authorized Basis<consumer consent or fraud prevention> AND Purpose of Use is Authorized Purpose of Use<for Acme Inc.> AND Acme Inc. has agreed to Commercial Terms with Recipient Organization AND Acme Inc. trusts IT Security Practices of Recipient Organization AND Recipient Organization is Authorized Recipient<for Acme Inc.> AND Recipient Organization has IT Security Assurance Level<Medium>

FIG. 101

Flow 4: Authorization Query from Authorization Service to Identity Syndicate

Resource: Acme PN Domain (Reference Source Connector for ID Match Service)

Trust Credential Category: IT Security Assurance

| Trust Criteria | Assessment Credentials | Validation Credentials |
|---|---|---|
| **1) Secure Hosting** | Hosting environment documentation and credentials assessed by authorized staff to verify secure hosting (e.g. has been FISMA or FedRAMP certified, or has been audited for ISO 2701 or SAS70 compliance.)<br><br>Account administered by authorized staff overseen by trusted administrative controls.<br><br>Written attestation of compliance with assessment criteria by authorized staff overseen by trusted administrative controls.<br><br>Provisioning of assessment and validation credentials by authorized staff overseen by trusted administrative controls. | > Signed document verifying:<br>- trusted hosting provider (e.g. AWS)<br>- admin authorities trusted by data source and recipient<br><br>> Trusted policy validation service verifies that validation credentials satisfy trust criteria.<br>> Creddentials stored in trusted repository<br>> Validation Credentials delivered as signed JWSs/JWTs |
| **2) Authenticated Connections**<br>- to PN Privacy Node<br>- to Experian API<br>- to Ionic Encryption Service<br>- to Admin Authorization Service | Review by authorized staff of secure connection and validation mechanism implementation.<br><br>Written attestation of compliance with assessment criteria by authorized staff overseen by trusted administrative controls.<br><br>Provisoning of assessment and validation credentials by authorized staff overseen by trusted administrative controls. | Options:<br>> Mutually authenticated TLS, API keys, Oauth, etc.<br>> IP address end-point verification<br>> TLS connections established using signed directory metadata<br><br>> Trusted policy validation service verifies that assessment and validation credentials satisfy trust criteria.<br>> Credentials stored in trusted repository<br>> Validation credentials delivered as signed JWSs/JWTs |
| **3) Trusted Administrative Controls** | Administrative controls or relevent audit documentation assessed by authorized staff of relying party.<br><br>Written attestation of compliance with assessment criteria by authorized staff overseen by trusted administrative controls.<br><br>Provisoning of assessment and validation credentials by authorized staff overseen by trusted administrative controls. | > Trust Criteria and Validation Credentials delivered as JWSs/JWTs signed by trusted resource authority.<br>> Trusted policy validation service verifies that assessment and validation credentials satisfy trust criteria.<br>> Credentials stored in trusted repository |
| **4) Trusted Software Components** | Assessment of functional specs and implementation of software components to verify compliance with trust criteria.<br><br>Software components digitally signed using Docker Content Trust model, or similar code signing/verification mechanisms.<br><br>Written attestation of compliance with assessment criteria by authorized staff overseen by trusted administrative controls.<br><br>Provisoning of validation metadata by authorized staff overseen by trusted administrative controls. | > Software cryptographically verified using Docker Content Trust, signed with key of trusted publisher.<br><br>> Trusted policy validation service verifies that assessment and validation credentials satisfy trust criteria.<br>> Credentials stored in trusted repository<br>> Validation credentials delivered as signed JWSs/JWTs |
| **5) Trusted Encyption** | Verification that encryption package used by encryption service is FIPS-140-2 certified.<br><br>Assessment of key management infrastructure and admin practices.<br><br>Written attestation of compliance with assessment criteria by authorized staff overseen by trusted administrative controls.<br><br>Provisoning of assessment and validation credentials by authorized staff overseen by trusted administrative controls. | > Mutually Authenticated TLS connection between Connector and Encryption Service.<br>> Trusted policy validation service verifies that assessment and validation credentials satisfy trust criteria.<br>> Credentials stored in trusted repository<br>> Validation credentials delivered as signed JWTs |
| **6) Trusted Authorization** | Assessment of authorization policy criteria, infrastructure and metadata.<br><br>Assessment of authentication and identity / attribute proofing of authorizers.<br><br>Written attestation of compliance with assessment criteria by authorized staff overseen by trusted administrative controls.<br><br>Provisoning of validation credentials by authorized staff overseen by trusted administrative controls. | > Mutually Authenticated TLS connection between Connector and Authentication/Authorization/Encryption Service(s)<br>> Trusted policy validation service verifies that assessment and validation credentials satisfy trust criteria.<br>> Credentials stored in trusted repository<br>> Validation credentials delivered as signed JWSs/JWTs |

FIG. 105

Resource Credential Profile: Payer Inc.

Resource Credential - PN Directory Information

| | |
|---|---|
| Resource Name | Payer Inc. |
| Resource Type | Organization, Commercial Payer |
| Cname/Hostname | N/A |
| TLS Mutual Auth Credential | xxx |
| Trust Authority Credential | Payer Inc. Credential (Self Attestations), and/or Acme Inc. Credential |
| Admin Credential | xxx |

Resource Credentials

Organizational Credentials is a Corporation *<Verified Attestation>*
Legal Notice Address is <address> *<Verified Attestation>*
is a Licensed Insurance Company <Verified Attestation>

Regulatory Credentials is a GLB Authorized Recipient *<Unverified Attestation>*
is a GLB Qualified Organization *<Verified Attestation>* has executed GLB Qualified Legal Agreement with Acme *<Verified Attestation>*
GLB Qualified Legal Agreement covers <Commercial Operations, Consumer Consent, Governmental Reporting> *<Unverified Attestation>* has executed HIPAA Business Associate Agreement with Acme *<Verified Attestation>*
HIPAA Business Associate Agreement with Acme covers < Plan Administration, Government Functions> *<Unverified Attestation>*

Commercial Credentials trusts Acme as Authorized Recipient of Payer Enrollment Records
has agreed to Commercial Terms for Acme ID Match for <Regulatory Reporting, Identity Verification, Release to Subject>
has agreed to Commercial Terms for Acme Regulatory Reporting Solution

Technical Credentials

IT Security Practices satisfies Assurance Level <Medium, High> *<Verified Attestation>*
> Encrytion satisfies <FIPS 140-2> *<Informal Audit>*
> Key Management satisfies <NIST SP 800-56 and NIST SP 800-57> *<Informal Audit>*
> Hosting Platform for Security Sensitive Components meets Assurance Level <Medium, High>
> Access Authorization meets Assurance Level <Medium, High> *<Informal Audit>*
> Attribute Assurance Requirement<Level 1, Level 2, Level 3> for 6055 Reporting Solution *<Unverified Attestation>*

Resource Credentials - Trust Relationships

Trusts Acme IT Security to Assurance Level <Medium> *<Verified Attestation>*
Trusts Acme Verified Attestations for Trusted IT Security to Assurance Level <Low, Medium> *<Verified Attestation>*
Trusts IRS IT Security to Assurance Level <Medium> *<Verified Attestation>*

FIG. 106

Resource Credential Profile: Acme Inc.

Resource Credential - PN Directory Information

| | |
|---|---|
| Resource Name | Acme Inc. |
| Resource Type | Organization, Data Service Provider |
| Cname/Hostname | N/A |
| TLS Mutual Auth Credential | xxx |
| Trust Authority Credential | Payer Inc. Credential, and/or Acme Inc. Credential |
| Admin Credential | xxx |

Resource Credentials - Attributes and Relationships

Organizational Credentials is a Corporation <*Verified Claim*>
Legal Notice Address is <address> <*Verified Claim*>
is a Audited for GLB Regulatory Compliance. <Verified Claim>

Regulatory Credentials is a HIPAA Authorized Recipient <*Unverified Claim*> has executed GLB Qualified Legal Agreement with Payer Inc. <*Verified Claim*>
GLB Qualified Legal Agreement covers <Commercial Operations, Consumer Consent, Governmental Reporting> <*Unverified Claim*> has executed HIPAA Business Associate Agreement with Payer Inc. <*Verified Claim*>
HIPAA Business Associate Agreement with Payer Inc. covers < Plan Administration, Government Functions> <*Unverified Claim*>

Commercial Credentials trusts Payer Inc. as Authorized Recipient of Acme ID Match Records

Technical Credentials

IT Security Practices satisfies Assurance Level <Medium, High> <*Verified Claim*>
> Encrytion satisfies <FIPS 140-2> <*Verified Claim*>
> Key Management satisfies <NIST SP 800-56 and NIST SP 800-57> <*Verified Claim*>
> Hosting Platform for Security Sensitive Components meets Assurance Level <Medium, High> <*Verified Claim*>
> Access Authorization meets Assurance Level <Medium, High> <*Verified Claim*>
> Attribute Assurance Requirement<Level 1, Level 2, Level 3> for 6055 Reporting Solution <*Unverified Claim*>

Resource Credentials - Trust Relationships

Trusts Payer Inc. IT Security to Assurance Level <Medium> <*Verified Claim*>
Trusts Payer Inc. Verified Attestations for Trusted IT Security to Assurance Level <Low, Medium> <*Verified Claim*>
Trusts IRS IT Security to Assurance Level <Medium> <*Verified Claim*>

FIG. 107

Resource Credential Profile: Payer Enrollment Records

Resource Credentials - PN Directory Information

| | |
|---|---|
| Resource Name | Enrollment Records |
| Resource Type | Database |
| Cname/Hostname | xxx |
| TLS Mutual Auth Credential | xxx |
| API Metadata | xxx |
| Responsible Organization | Payer Inc. |
| Admin Credential | xxx |
| Trust Authority Credential | Payer Inc. Credential and/or Acme Inc. Credential |

Trust Criteria

Regulatory Criteria:

Application Purpose of Use is an HIPAA Authorized Use <Identity Verification, Regulatory Reporting, Release to Subject>
Payer Inc. has executed HIPAA Business Associate Agreement with Recipient Organization
HIPAA Business Associate Agreement covers Application Purpose of Use

Commercial Criteria:

Application Purpose of Use is an Payer Authorized Use <Identity Verification, or Regulatory Reporting, or Release to Subject>
Recipient Organization is Payer Inc. Authorized Recipient Organization <Acme Inc., or IRS>
Recipient Service's Commercial Terms accepted by Payer Inc.
Basis of Verification is <Verified Attestation, Informal Audit, Formal Certification> *parameter for each trust criteria

Technical Criteria:

Recipient's IT Security is trusted by Payer Inc.
Recipient Organization's IT Security Assurance Level is <Medium, High>
Encryption meets <140-2>
Key Management meets <800-56 and 800-57>
Hosting of Security Sensitive Components is trusted by Payer Inc.
Access Authorization is trusted by Payer Inc.
Matching Assurance for Linked Attributes meets Matching Assurance Requirement of Payer Inc. for Application Purpose of Use Resource Credential Profile: Acme ID Match

Resource Credentials - PN Directory Information

| | |
|---|---|
| Resource Name | ID Match |
| Resource Type | Identity Enrichment Service |
| Cname/Hostname | xxx |
| TLS Mutual Auth Credential | xxx |
| API Metadata | xxx |
| Responsible Organization | Acme Inc. |
| Admin Credential | xxx |
| Trust Authority Credential | Payer Inc. Credential and/or Acme Inc. Credential |

Trust Criteria

Regulatory Criteria:

Application Purpose of Use is an GLB Authorized Use <Identity Verification, Regulatory Reporting, Release to Subject>
Recipient Organization<Payer Inc., IRS> is GLB Authorized Recipient
Acme Inc. has executed GLB Qualified Legal Agreement with Recipient Organization
Qualified Legal Agreement covers Application Purpose of Use

Commercial Criteria:

Application Purpose of Use is an Acme Inc. Authorized Use <Identity Verification, or Regulatory Reporting, or Release to Subject>
Recipient Organization is Acme Inc. Authorized Recipient Organization <Payer Inc. or IRS>
Customer <Payer Inc.> has agreed to License Terms for Application Purpose of Use
Acme Inc. Commercial Terms accepted by Customer <Payer Inc.>
Basis of Verification is <Verified Attestation, Informal Audit, Formal Certification> *parameter for each trust criteria

Technical Criteria:

Recipient's IT Security <Payer Inc., IRS> is trusted by Acme Inc.
Recipient Organization's IT Security Assurance Level is <Medium, High>
Encryption meets <140-2>
Key Management meets <800-56 and 800-57>
Hosting of Security Sensitive Components is trusted by Acme Inc.
Access Authorization is trusted by Acme Inc.
Matching Assurance for Linked Attributes meets Matching Assurance Requirement of Acme Inc. for Application Purpose of Use

FIG. 108

Resource Credential Profile: Payer PN Domain

Resource Credentials - PN Directory Information

| | |
|---|---|
| Resource Name | Payer PN Domain |
| Resource Type | PN Domain |
| Cname/Hostname | N/A |
| TLS Mutual Auth Credential | xxx |
| Responsible Organization | Payer Inc. |
| Trust Authority Credential | Payer Inc. Credential (Self Attestations), and/or Acme Inc. Credential |
| Admin Credential | xxx |

Resource Credentials

Technical Credentials

*Payer Inc. Credential>* IT Security Practices satisfies Assurance Level <Medium, High> *<Verified Attestation>*
*Derived Credential>* Encrytion satisfies <FIPS 140-2> *<Informal Audit>*
*Derived Credential>* Key Management satisfies <NIST SP 800-56 and NIST SP 800-57> *<Informal Audit>*
*Derived Credential>* Hosting Platform for Security Sensitive Components meets Assurance Level <Medium, High>
*Derived Credential>* Connection Security meets Assurance Level <Medium, High> *<Informal Audit>*
*Derived Credential>* Policy Enforcement meets Assurance Level <Medium, High> *<Informal Audit>*
*Derived Credential>* Access Authorization meets Assurance Level <Medium, High> *<Informal Audit>*

Resource Credential Profile: Payer Middleware

Resource Credentials - PN Directory Information

| | |
|---|---|
| Resource Name | Payer Middleware |
| Resource Type | Software Component |
| Cname/Hostname | xxx |
| TLS Mutual Auth Credential | xxx |
| API Metadata | xxx |
| Responsible Organization | Payer Inc. |
| Trust Authority Credential | Payer Inc. Credential (Self Attestations) |
| Admin Credential | xxx |

Resource Credentials

Technical Credentials

*Payer Inc. Attestation>* IT Security Practices satisfies Assurance Level <Medium, High> *<Verified Attestation>*
*Payer Inc. Attestation>* Encrytion satisfies <FIPS 140-2> *<Informal Audit>*
*Payer Inc. Attestation>* Key Management satisfies <NIST SP 800-56 and NIST SP 800-57> *<Informal Audit>*
*Payer Inc. Attestation>* Hosting Platform for Security Sensitive Components meets Assurance Level <Medium, High>
*Payer Inc. Attestation>* Connection Security meets NIST SP 800-62 standards
*Payer Inc. Attestation>* Access Authorization meets Assurance Level <Medium, High> *<Informal Audit>*

FIG. 109

Resource Credential Profile: Acme PN Domain

Resource Credentials - PN Directory Information

| | |
|---|---|
| Resource Name | Acme PN Domain |
| Resource Type | PN Domain |
| Cname/Hostname | N/A |
| TLS Mutual Auth Credential | xxx |
| Responsible Organization | Acme Inc. |
| Trust Authority Credential | Acme Inc. Credential (Self Attestations) |
| Admin Credential | xxx |

Resource Credentials

Technical Credentials

IT Security Practices satisfies Assurance Level <Medium, High> *<Verified Attestation>*

> Encrytion satisfies <FIPS 140-2> *<Informal Audit>*

> Key Management satisfies <NIST SP 800-56 and NIST SP 800-57> *<Informal Audit>*

> Hosting Platform for Security Sensitive Components meets Assurance Level <Medium, High>

> Access Authorization meets Assurance Level <Medium, High> *<Informal Audit>*

FIG. 110

Resource Credential Profile: Acme PN Domain

Resource Credentials - PN Directory Information

| | |
|---|---|
| Resource Name | Acme PN Domain |
| Resource Type | PN Domain |
| Cname/Hostname | N/A |
| TLS Mutual Auth Credential | xxx |
| Responsible Organization | Acme Inc. |
| Trust Authority Credential | Acme Inc. Credential |
| Admin Credential | xxx |

Resource Credentials

Technical Credentials

IT Security Practices satisfies Assurance Level <Medium, High> *<Verified Attestation>*

> Encrytion satisfies <FIPS 140-2> *<Informal Audit>*

> Key Management satisfies <NIST SP 800-56 and NIST SP 800-57> *<Informal Audit>*

> Hosting Platform for Security Sensitive Components meets Assurance Level <Medium, High>

> Access Authorization meets Assurance Level <Medium, High> *<Informal Audit>*

FIG. 111

```
{ header:{ < as per integrity>}
  payload: {
   iss: { @type: 'pn_t.mult_address', @value: /ethereum/<network-id>/address> }, // issuer
   sub:{ @type: 'pn_t.multi_address', '@value:/ethereum/network-id>/address }, // subject
   iat: 'now',
   exp: <as needed>
   pn_p.jwt_id: <globally unique id>
   pn_p.jwt_type:[ globally unique types that are classifiers ok to share],
   pn_p:metadata: {
    '@context':{...}
    '@id': <>, '@type':[pn_t.data_graph_metadata],
    'pn_p.pn_data_model': <ptr to data model that describes claim>,
    'pn_p.trust_criteria': <that protects data at graph/field level, i.e. json schema with tc hanging of >,
    'pn_p.prov': [prov claims associated with claim when issued>
    'pn_p.source_jwts:[]
   }
   'pn_p.data: {
       @context:{}
       @id: <globally unique id of the claim>, for example
               https://id.pn.aetna.com/claim/authorizied_recipient/82828282
       @type: <globally unique type of the claim>, for example
               ['https://schema.pn.aetna.com/Authorized_Recipient',
                 'https://schema.pn.webshield.io/type#Trust_Claim,
       pn_p.of: <address of Enrollment Data Resource>
   }}
  signature: { signature using the private key associated with the authorities public signing key}}
```

FIG. 130

Information Format – JSON-LD Graphs

Representing data as graphs that supporting diverse and decentralized parties sharing information Questions
1. How represent as a graph in some canonical form?
2. How handle clashing names?
3. How enable s/w to reason about schema?

Company A

```
{ enrollment_records:[
  {
     givenName: 'Bob'
     familyName: 'Smith',
     birthDate: '01/01/1951',
     enrollmentStatus: 'A',
     memberID: '99999'
     primaryMemberID: '12345',
     address: {
       city: 'San Francisco',
       postalCode: '94107',}
  }]
}
```

privacy agent converts to JSON-LD →

Company A - Enrollment Record PN Data Model

```
{ '@graph': [
 { @id: 'https://id.pn.companyA.com/enrollment_record/999999',
  @type: 'https://schema.pn.companyA.com/EnrollmentRecord',
   https://pn.schema.webshield.io/prop#sourceID: '999999',
   https://schema.org/giveName: 'Bob'
   https://schema.org/familyName: 'Smith',
   https://schema.org/birthDate: '01/01/1951',
   https://schema.pn.companyA.com/enrollmentStatus: 'A',
   https://schema.pn.companyA.com/memberID: '999999',
   'https://schema.pn.companyA.com/primaryMemberID': https://.../enrollment_record/12345'
   https://schema.org/address: {
     @id: 'https://id.pn.companyA.com/enrollment_record/99999/postal_address/99999',
     @type: https://schema.org/PostalAddress',
     https://schema.org/postalCode: '94107',}
   }]}
```

Company B

```
{ patient_record: [ {
     givenName: 'Robert'
     familyName: 'Smith',
     birthDate: '01/01/1951',
     memberID: '092-292',
     physicianID: 'abc-29202'
     address: {
       city: 'San Francisco',
       zipCode: '94123',}
  }],
  physicians: [
   { givenName: 'Paul',
     familyName: 'Good',
     physicianID: 'abc-29202'
   }
]
```

privacy agent converts to JSON-LD →

Company B - Patient PN Data Model

```
{  '@id': https://pn.companyB.com/dataset/1',
   '@graph': [
    { @id: 'https://id.pn.companyB.com/patient_record/092-292',
      @type: 'https://schema.pn.companyB.com/PatientRecord',
      https://pn.schema.webshield.io/prop#sourceID: '092-292',
      https://schema.org/giveName: 'Robert'
      https://schema.org/familyName: 'Smith',
      https://schema.org/birthDate: '01/01/1951',
      https://schema.pn.companyB.com/memberID: '092-292',
      https://schema.pn.companyB.com/physicianID: 'https://...../abc-29302',
      https://schema.org/address: {
        @id: 'https://id.pn.companyB.com/patient_record/092-292/postal_address/092-292',
        @type: https://schema.org/PostalAddress',
        https://schema.org/postalCode: '94123',}
    },
    { @id: 'https://id.pn.companyB.com/physician/abc-29202',
      @type: https://schema.pn.companyB.com/Physician,
      ...]}
```

FIG. 135

Information Format – JSON-LD Operations

JSON-LD provides graph operations and format conversions algorithms: flatten, frame, compact, expand, etc

JSON-LD Expanded Format

```
{
 @graph: [ {
   @id: 'https://id.pn.companyA.com/er/999999',
   @type: 'https://schema.pn.companyA.com/EnrollmentRecord',
   https://schema.org/giveName: 'Bob'
   https://schema.org/familyName: 'Smith',
   https://schema.org/birthDate: '01/01/1951',
   https://schema.pn.companyA.com/enrollmentStatus: 'A',
   https://pn.schema.companyA.com/memberID: '99999',
   https://pn.schema.webshield.io/prop#sourceID: '999999'
   https://schema.org/address: {
     @id: 'https://id.pn.payer1.com/....postal_address//99999',
     @type: https://schema.org/PostalAddress',
     https://schema.org/postalCode: '94107',}
   }]}
```

JSON-LD compact operation using a @context

```
{ @context: {  // JSON-LD context
   @id: 'id',
   @type: 'type',
   @graph: 'graph',

   companyA_s: 'https://schema.pn.companyA.com/',
   schema: 'https://schema.org/'
   webshield_p: 'https://schema.webshield.io/prop#'

   EnrollmentRecord: 'companyA_s:EnrollmentRecord',
   EnrollmentStatus: 'companyA_s:EnrollmentStatus',
   memberID: 'companyA_s:memberID",
   sourceID: 'webshield_p:sourceID',
   birthDate: 'schema:birthDate',
   givenName: 'schema:givenName',
   familyName: 'schema:familyName',
   postalAdress: 'schema:postalAddress',
   postalCode: 'schema:postalCode' }}
```

Compact JSON-LD

```
{ @context:'...',
 graph:[
   { id: https://payer1.com/er/999999,
   type: EnrollmentRecord,
   sourceID: 999999,
   giveName: 'Alice'
   familyName: 'Smith',
   birthDate: '01/01/1951',
   enrollmentStatus: 'A',
   memberID: '99999'
   address: {
     type: PostalAddress
     postalCode: '94107',}
   }]}
```

FIG. 136

Information Format - Adapters

Adapters convert from native data models & protocols to PN data model, If already JSON little work needed, standard Adapters

Information Integrity - JWTs

JWT payload is a JSON-LD graph, with metadata and data that can be obfuscated

```
{ header: {
    alg: 'RS255',
    http://pn.schema.webshield.io/prop#jwt_public_key: // examples are
      - {@type: "pn_t:x5c_pem", @value: 'holds the payer 1 x509 cert pem file',}
      - {@type: "pn_t:multi_format_address", @value: '/ethereum/<network-id>/<address>'}
      - {@type: "pn_t:multi_format_address", @value: '/dns/abc.com/https/keys/key1.jwk'}}
  payload: {
   @context: <context for jwt payload so can treat as json-ld>
   iss: // examples are:
    - {'@type': 'pn_t:cname', '@value': payer1.com' },
    - { '@type:'pn_t.multi_format_address', '@value': '/ethereum/<network-id>/<address' }
   sub: '/multihash-format/crypto-hash-1', // if graph id of graph, if a subject record id of subject
   iat: 'now,
  'pn_p.jwt_id': <globally unique id, ok to use sub. Can convert payload into JSON-LD graph >
  'pn_p.jwt_type':[ globally unique uri that classifies type at a very high level: data, claim, etc],
   pn_p.metadata: {
     @context: {}
     @id: <crypto-hash>, @type: [pn_t.data_graph_metadata]
     'pn_p.pn_data_model: 'id of PN data model',
     'pn_p.trust_criteria': '<trust criteria protecting data, see later>'
     'pn_p.prov_claims: ['addresses of provenance claims for data]
      pn_p.source_jwts:['address of  JWTs that were inputs, contains hash of JWT']
   }
   'pn_p.data': { // can be a graph or an object
      @context: {}
      @id: multihash format crypto-hash-1',
      @type: ['https://schema.pn.payer1.com/type#EnrollmentRecord',
             'https://pn.schema.webshield.io/type#PrivacyGraph]
      https://pn.schema.webshield.io/prop#sourceID: ['#1-aes-0', '#2-sha-0']
      https://schema.org/giveName: '#1-aes-1'
      https://schema.org/familyName: '#1-aes-2',
      etc.  }}}
  signature: {
   // contains digital signature using private key associated with jwt_public_key ' }}
```

FIG. 138

Information Hiding – Privacy Graph

Privacy Graphs is the output of a Privacy Pipe – Example shows after applied two steps (1) AES encrypt fields, (2) SHA256 fields

Information Hiding – Sequence Diagram

Example creating a privacy pipe that encrypts a graph using a privacy algorithm with one step, and one action

Information Hiding – End-2-End-Encryption

Privacy Agent executes Privacy Step Instances to obfuscate/de-obfuscate JSON-LD graphs inside admin domain of trusted parties

UTM - example Trust Criteria and Claims

Trust Criteria protect assets and define the set of claims that the Destination must have; both policy and claims are in JSON-LD

| Trust Criteria for Authorizing use of Graph (or field) by Destination | | Verifiable Claims that satisfying the Trust Criteria |
|---|---|---|
| SAFE-BioPharma Certifies that PN Recipient uses Identity Credentials that Satisfies Assurance Level <2,3> | [ ⟷ ] | SAFE-BioPharma Certifies that I&A Network uses Identity Credentials that Satisfies Assurance Level <2> |
| EHNAC Certifies that PN Recipient uses Authorization Service that Complies with HIPAA Privacy Rule | [ ⟷ ] | EHNAC Certifies that I&A Network uses Authorization Service that Complies with HIPAA Privacy Rule |
| EHNAC Certifies that PN Recipient has IT Security that Satisfies Assurance Level <Medium, High> | [ ⟷ ] | EHNAC Certifies that I&A Network has IT Security that Satisfies Assurance Level <Medium> |
| NH-ISAC Asserts that PN Recipient has IT Security that Satisfies Assurance Level <Medium, High> | [ ⟷ ] | NH-ISAC Asserts that I&A Network has IT Security that Satisfies Assurance Level <Medium> |
| NH-ISAC Asserts that PN Recipient uses Privacy Algorithms that Satisfies Assurance Level <Medium, High> | [ ⟷ ] | NH-ISAC Asserts that I&A Network uses Privacy Algorithms that Satisfies Assurance Level <Medium> |
| EHNAC Asserts that PN Recipient uses Licensing Network that Satisfies Assurance Level <Medium, High> | [ ⟷ ] | EHNAC Asserts that I&A Network uses Licensing Network that Satisfies Assurance Level <Medium> |
| Resource Publisher Asserts that PN Recipient is Authorized Recipient of Enrollment Data | [ ⟷ ] | Aetna Asserts that I&A Network is Authorized Recipient of Enrollment Data |
| Resource Publisher Agrees To Payment and Licensing Terms of PN Recipient | [ ⟷ ] | Aetna Agrees To Payment and Licensing Terms of I&A Network |

FIG. 146

UTM – Example Claim about a Resource

Verifiable claims are signed attestations by an authority about a resource, is a PN Data Model

```
{ header:{ < as per integrity>}
  payload: {
   iss: { @type: 'pn_t.mult_address', @value: /ethereum/<network-id>/address> }, // issuer
   sub:{ @type: 'pn_t.multi_address', '@value:/ethereum/network-id>/address }, // subject
   iat: 'now',
   exp: <as needed>
   pn_p.jwt_id: <globally unique id>
   pn_p.jwt_type:[ globally unique types that are classifiers ok to share],
   pn_p:metadata: {
     '@context':{...}
     '@id': <>, '@type':[pn_t.data_graph_metadata],
     'pn_p.pn_data_model': <ptr to data model that describes claim>,
     'pn_p.trust_criteria': <that protects data at graph/field level, i.e. json schema with tc hanging of >,
     'pn_p.prov': [prov claims associated with claim when issued>
     'pn_p.source_jwts:[]
   }
   'pn_p.data: {
       @context:{}
       @id: <globally unique id of the claim>, for example
               https://id.pn.aetna.com/claim/authorizied_recipient/82828282
       @type: <globally unique type of the claim>, for example
               ['https://schema.pn.aetna.com/Authorized_Recipient',
                'https://schema.pn.webshield.io/type#Trust_Claim,
       pn_p.of: <address of Enrollment Data Resource>
  }}
 signature: { signature using the private key associated with the authorities public signing key}}
```

FIG. 148

```
{ header : { < as per the integrity example >},
  payload": {
    "@context": {}
    iss:  { <the issuer as as per integrity example> },
    sub: "https://id.pn.linker.com/link_credential/929829-92929-92992",
    iat: now,
    exp: 1 year from now
    pn_p.jwt_id:<globally unique id can be sub>
    pn_p.jwt_type: [ pn_p.link_claim ]
    pn_p.metadata: { <as per integrity>}
      // the prov claims hold external claims about the quality of link
    pn_p.data: {
     @id: "http://id.pn.linker.com/link_credential/828292-29929292-92929292,
     @type : [ "pn_t. IdentityLinkCredential",
               "https://schema.pn.linker.com/GoldLinkCredential"],

     pn_p.input_identity: "@id of the input identity",
     pn_p.input_identity_source: "content hash ptr of identity graph used",
     pn_p.linked_to_identity: "@id of the identity it was linked to, if pin then pin id",
     pn_p.linked_to_source: "content hash ptr of identity graph used "
     pn_p.link_confidence: {@type:pai_id @value:'#88-cipher-text' },  // only share with certain
parties
    },
  },
  signature: { <as per integrity example}}
```

FIG. 149

UTM – Smart Contracts - DLT agnostic

Designed to separate concerns, use action driven architecture, include permissions, extensible; Block Service provide REST API over

UTMs and Privacy Domains

UTM used to determine if pipes can be formed to move data in/out Privacy Domains

Privacy Domains - the PN data plane controls flow in/out of domains using privacy agents and provisioned privacy pipes that execute privacy algorithms and check trust criteria

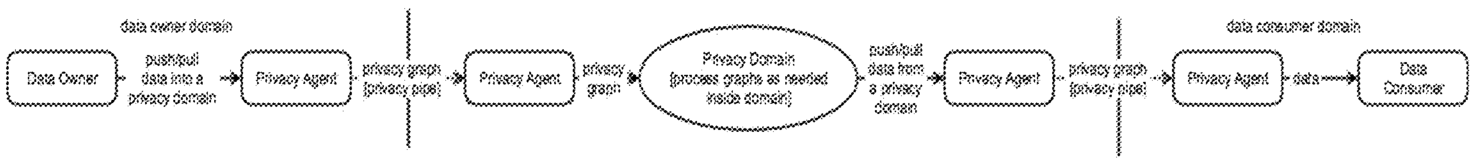

Privacy Network - showing the decentralized management plane UTMs recorded in blockchain with off chain storage; the decentralized control plane evaluating criteria using UTMs to determine if create privacy pipes between agents; the peer-2-peer data plane privacy agents executing privacy algorithms, checking criteria, and moving privacy graphs between parties.

FIG. 154

Data Flow - Data Lake

Reference Architecture that uses AWS Big Data Services, diagram only shows data plane and privacy domains.

Privacy Agent – All Services

Privacy Agent Software System: services, external extension points, where clear text data

PRIVACY NETWORK AND UNIFIED TRUST MODEL FOR PRIVACY PRESERVING COMPUTATION AND POLICY ENFORCEMENT

CROSS REFERENCE TO RELATED PATENT APPLICATIONS

This patent application is a continuation-in-part (CIP) of U.S. patent application Ser. No. 16/357,662 Privacy Network And Unified Trust Model For Privacy Preserving Computation And Policy Enforcement" filed Mar. 19, 2019 which claims priority to U.S. Provisional Patent Application No. 62/644,950, "Privacy Network" filed Mar. 19, 2018. U.S. patent application Ser. No. 16/357,662 is also a continuation in part of U.S. patent application Ser. No. 15/925,125, "Privacy Network And Unified Trust Model For Privacy Preserving Computation And Policy Enforcement" filed Mar. 19, 2018 which claims priority to U.S. Provisional Patent Application No. 62/472,811, "Privacy Network And Unified Trust Model For Privacy Preserving Computation And Policy Enforcement" filed Mar. 17, 2017 and this application is a continuation-in-part (CIP) of U.S. Ser. No. 15/461,400, "Privacy Network And Unified Trust Model For Privacy Preserving Computation And Policy Enforcement" filed Mar. 16, 2017, which claims priority to Patent Application No. 62/309,153, "Privacy Network And Unified Trust Model For Privacy Preserving Computation And Policy Enforcement" filed Mar. 16, 2016. U.S. patent application Ser. Nos. 15/925,125, 15/461,400, 62/472,811, 62/644,950, and 62/309,153 are hereby incorporated by reference in their entirety.

BACKGROUND

The traditional enterprise centric model for IT security has long been fighting a losing war against proliferating cyber security threats perpetrated by rogue insiders, criminals and nation states bent on financial fraud, espionage or even cyber terrorism. Breaches have become routine, even for the most sophisticated banks, technology vendors and intelligence organizations. The conventional wisdom has become that no matter how much an organization invests in IT security, the best that can be achieved is to mitigate the economic and PR damage from the nearly inevitable breaches.

The root of the problem is the flawed assumption that an individual enterprise can rigorously define and protect a defensive perimeter, control which people and which devices can gain access to protected information or application functionality, and monitor user activities to detect and block unauthorized behavior.

The fact is that this approach to policy enforcement has not only proven to be failure prone, it exposes both users and subjects of records to privacy abuses and security breaches by the enterprises and systems administrators that implement them. Problematic even for individual enterprises, this is completely untenable across disparate organizations and individuals that don't agree upon policies or trust each other.

The reality is that organizations and individuals participate in a highly interconnected and dynamically changing web of business processes and ad hoc communication flows. To be most useful, sensitive information must flow across organizational, technological and political boundaries, and be aggregated and analyzed to support personalization, process optimization and coordination.

How is the enterprise centric model supposed to accommodate such requirements across an Internet connecting billions of users and millions of organizations and applications, with billions of sensor rich devices privy to the most intimate details of our lives and business practices?

Who is trusted to manage all these user identities, define their privileges, and monitor their activities? Who has the encryption keys? Who gets to be Big Brother?

The bottom line is that enterprise centric policy enforcement model simply can't accommodate the diversity and scale of a highly interconnected Internet society. No amount of brute force or expertise can overcome an inherently vulnerable architecture.

SUMMARY OF THE INVENTION

The present application is directed towards a privacy network and trust model that overcome data sharing limitations by automatically enforcing trust between organizations, privacy for end users, and data exchange regulatory compliance. These data-driven network effects enable deep personalization of end products and the creation of entirely new business models through safely unlocked data. More specifically, a Privacy Network and Proof of Trust BlockChain can overcome the barriers to trust that have undermined the sharing and reuse of regulated and proprietary resources. This simultaneously enables precision personalization on a global scale, while at the same time offering unprecedented privacy, cybersecurity and regulatory compliance. By eliminating the conflict between privacy and personalization, individuals can have direct control over their privacy and online experience, while giving enterprises the ability to tap into previously unavailable data and other resources that enable vastly more efficient and more personalized services.

The privacy network and trust model allow companies to share data and apply policies on a per attribute basis, and support shared computation without revealing sensitive information to any person or organization. Policies are enforced at the finest level of granularity possible, such as per user client computer's attribute, per recipient, for only a specified purpose, for only one time, or for only a single trusted device. Granular sharing puts the individual back to the front and center and ensures unprecedented enforcement of privacy and security controls while empowering individuals to access information to which they have rights.

Policies of the privacy network and trust model are consistently enforced through trust criteria to ensure no information is revealed during computation. The privacy networks can obfuscate data for secure transport to authorized and identity-proofed recipients, and enables revocation of trust as necessary. An established distributed ledger technology can be used to track trust and data across networks.

Privacy Networks (PN) can allow computers of individuals and organizations that don't trust each other or agree on policies to easily pool, share, transact, and re-use their most sensitive, regulated and proprietary resources, and transform them into new services and business models. The Privacy Networks can use metadata to orchestrate the transformation of data into 'privacy graphs' that are fully opaque yet at the same time are fully computable with no loss of information. The transformation uses industry standard algorithms and products and as it is metadata driven, new algorithms and products can be introduced without changes to application code.

Trust criteria can express details such as regulatory compliance requirements and payment and licensing terms, and privacy; trust credentials express provenance and descriptive metadata. These are both cryptographically bound to resources such as data, apps, algorithms, digital content, brands, and users to create a Trust Block. Trust Blocks are automatically inherited by any aggregates, analytic outputs or derived resources via a Proof of Trust BlockChain.

In some embodiments, dockerized applications can run in a computer network environment that allowing users to set up Privacy Networks and share resources with the network. Anything of value can be published to the Privacy Network as a protected resource, including the right to use data, algorithms, apps, services or infrastructure, the right to rely upon policies, accreditations or contracts, the right to display a brand or image, the right to send a message to or interact with a person or organization. Resources can be protected by trust criteria which express requirements for authorizing access or use of the resource, including regulatory compliance requirements, payment and licensing terms, privacy policies, and authorized recipients or purposes of use. Resources can also gain trust credentials which specify its semantics, interfaces, provenance and accreditations.

Trust credentials and trust criteria can be cryptographically bound to resources in order to create a Trust BlockChain, and then written to one or more databases or distributed ledgers to create a "Proof of Trust" BlockChain. This creates a distributed governance network that documents the credentials and relationships of resources, and ensures proper enforcement of specified policies across organizations and through time.

A "Privacy Domain" can be a resource and can act as a trusted privacy and compliance preserving perimeter around an organization's local services. As part of Privacy Network enabling services the organization sets up their own Privacy Domains and connects them to one another using privacy pipes into an internal Privacy Network. An organization can run an internal privacy network, just like an intranet. Privacy Networks can be connected together into a network of networks and controlled by different network operators.

"Privacy pipes" can be conceptually similar to "smart proxies" that sit in front of your local services. Pipes produce and consume the Trust Blocks™ that envelop data resources flowing between the domains, enforce information flow control between domains, and apply algorithms to the data before it leaves the domain.

Trust authorities can certify Privacy Networks for compliance with diverse policies and regulatory requirements (HIPAA, CFR 42-2, FERPA, COPPA, GLBA, IRS 6103, EU GDPR, FISMA, etc.). Trust authorities can leverage a Unified Trust Model, which defines a common vocabulary language between them and establishes a mutual trust with shared governance. The Unified Trust Model (UTM) is a meta model designed to help resolve the conflicts and interoperability issues between models and credentials.

Organizations can have independent trust authorities certify their policies for compliance. Once a domain is certified with credentials, data and other resources may become shareable according to these policies and related trust criteria can be tracked. For example, organizations may embed trust into their resource and data flows and demonstrate HIPAA compliance as per a specific authority. This verified certification is stamped into any data transactions via Trust Blocks, providing an auditable compliance trail.

An "Authorization Network" can be a specialized Privacy Network that contains identities, identity verifiable claims, and linked data related to identity proofing and authorizing access. Enterprises and organizations can utilize the Authorization Network as an outsourced service for access authorization, identity proofing, and compliance while absolving enterprises of liability for such data. The inventive system can be used by security companies who want to run their services inside the Authorization Network. The Authorization Network will incorporate privacy-preserving shared services for cybersecurity, surveillance, reputation, and systems management.

BRIEF DESCRIPTION OF THE DRAWINGS

FIG. 4 illustrates a screen shot of an embodiment of a user policy settings user interface for a privacy network.

FIG. 9 illustrates a block diagram of an embodiment of a privacy network that includes a syndication marketplace that can pool resources to create value-added services.

FIG. 13 illustrates a block diagram of an embodiment of a privacy network used with a medication application.

FIG. 21 illustrates an embodiment of a bill of materials for a unified trust model.

FIG. 25 illustrates a listing of HIPAA enforcement requirements for clinical treatment purposes.

FIG. 26 illustrates an embodiment of a user interface for inputting patient privacy preferences.

FIG. 32 illustrates a listing of HIPAA enforcement requirements for clinical research and analysis purposes.

FIG. 33 illustrates a listing of policy enforcement requirements for enabling software infrastructure and services.

FIG. 35 illustrates a listing of redaction of sensitive information in transform records.

FIG. 36 illustrates a listing of privacy scrubbing of information to limit pattern matching in transform records.

FIG. 37 illustrates a listing of constraint analysis for restriction processing.

FIGS. 38 and 39 illustrate assessment information for privacy protocols for research and analysis purposes.

FIG. 47 illustrates an embodiment of code used with trust criteria are art of the signed JWT containing the data cryptographically bound.

FIG. 48 illustrates an embodiment of code used with the privacy network and trust model for protecting the payer enrollment records.

FIG. 51 illustrates an embodiment of code used with the privacy network and trust model for global identity graphs created from link credentials issued by trusted parties.

FIG. 52 illustrates an embodiment of code used with the privacy network and trust model for query examples using GraphQL.

FIG. 60 illustrates an example of processing for normalization of data to JavaScript Object Notation for Lined Data.

FIG. 62 illustrates an example of data processing with a one step privacy algorithm that applies advanced encryption standard (AES) encryption using Amazon web services (AWS) key management service (KMS) for the keys.

FIG. 63 illustrates an example of data processing for obfuscation of data representation.

FIG. 65 illustrates an example of code for resource credentials.

FIG. 66 illustrates an example of code for trust criteria as part of the signed JSON Web Token (JWT) containing the data so cryptographically bound.

FIG. 67 illustrates an example of code for trust criteria protecting payer enrollment records.

FIG. 70 illustrates an example of code for global identity graphs created from link credentials issued by trusted parties.

FIG. 71 illustrates an example of code for a query using GraphQL.

FIGS. 82-87 illustrate examples of the unified trust model trust criteria for multiple system applications.

FIG. 97 illustrates an embodiment of a payer trust criteria for payer enrollment records.

FIGS. 98 and 99 illustrate a block diagram of the Payer Enrollment Records transmitted from Identity Syndicate to an ID Match Service.

FIG. 101 illustrates an example of trust criteria for enrichment records.

FIG. 105 illustrates a table containing examples of trust criteria, assessment credentials and validation credentials.

FIGS. 106-111 illustrate tables with examples of resource credentials.

FIG. 130 illustrates a portion of code for the privacy network.

FIGS. 135 and 136 illustrate code for information format conversions to JSON-LD.

FIG. 138 illustrates code for data and metadata obfuscation.

FIG. 146 illustrates examples of trust criteria and claims.

FIG. 148 illustrates an example of a claim about a resource.

FIG. 149 illustrates an example of an identity link claim.

FIG. 150 illustrates a diagram of a distributed ledger.

FIG. 151 illustrates a block diagram of smart contracts.

FIG. 152 illustrates an embodiment of a privacy pipe.

FIG. 153 illustrates an embodiment of an example of a privacy network blockchain.

FIG. 154 illustrates an embodiment of UTMs usage.

FIG. 155 illustrates an embodiment of a privacy domain data flow diagram.

FIG. 156 illustrates an embodiment of a data flow architecture.

FIG. 157 illustrates an embodiment privacy agent services.

FIG. 158 illustrates a diagram of a computer system.

DETAILED DESCRIPTION

Figure 1:
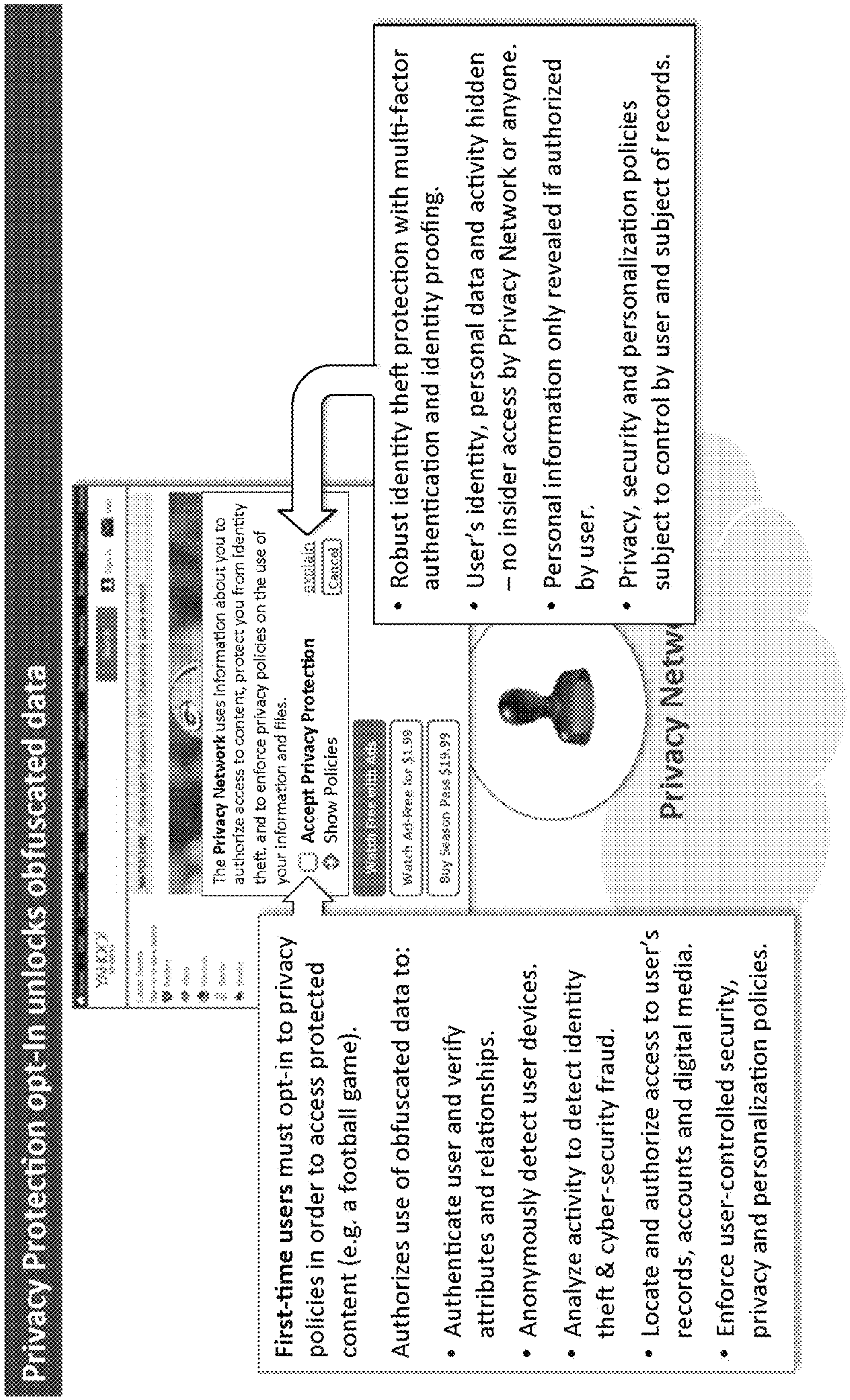
FIG. 1 illustrates an embodiment of a privacy network opt-in user interface.

A privacy network and trust model are needed that are much more robust, and eliminate the conflict between protecting security and privacy while at the same time enabling personalization and cross organizational coordination on a global scale. Specifically, a model where: robust security enforcement doesn't infringe upon the privacy, civil liberties or commercial rights of the individuals and organizations it is meant to protect. Personalized policies can be independently specified by people and organizations and enforced anywhere across the network on any device, instead of being imposed at enterprise boundaries. Policy enforcement is robust, redundant and fail safe, and does not depend upon the trustworthiness of individual "insiders", devices, systems or enterprises. Participants can pool their resources to enable precision personalization and process optimization without sacrificing privacy, individual control, commercial or civil rights.

The Privacy Network combines two breakthrough innovations-Privacy Algorithms and a Trust Model that enable this seemingly impossible combination of requirements. Privacy algorithms can completely obfuscate any data or algorithms, rendering them opaque and meaningless so they can be freely aggregated and shared without risk of security or privacy breach. Unlike for traditional encryption, however, data obfuscated by privacy algorithms remains fully "computable". Specifically, obfuscated algorithms can be applied to obfuscated data to produce obfuscated output. Such computation will be semantically correct, in that the output would be identical to what would have been produced had the algorithms been applied to data "in the clear" and then obfuscated with the same privacy algorithm. This allows information from disparate sources to be virtually aggregated, linked, analyzed, transformed and used without revealing any meaningful information to any person or any system-even to the processors performing the computation.

The Trust Model allows any Privacy Network participant to specify their "trust criteria" for authorizing the use of resources, either in obfuscated form within the Privacy Network, or in clear text form outside it. Privacy algorithms can also be selectively "reversed", transforming obfuscated data into meaningful clear text views for authorized recipients but only after all specified trust criteria are first satisfied. Trust criteria can include regulatory compliance requirements, commercial terms, restrictions on authorized uses and recipients, assessment criteria for policy enforcement mechanisms anything necessary for participants to trust that their policy requirements will be properly enforced.

Trust criteria are linked to resource metadata as they are uploaded to the Privacy Network, and then obfuscated via the same privacy algorithms. This effectively encodes the trust criteria directly into the obfuscated metadata itself—there is simply no way that they can be resolved into meaningful information unless the Privacy Network first enforces the specified trust criteria.

Further, trust criteria are automatically "inherited", and are enforced not only on the individual resources they were originally linked to, but also on any aggregates or analytic output derived from the original resources. This supports extremely robust and fine grained policy enforcement. Everything remains completely obfuscated until access to each attribute has been authorized for a specific recipient for a specific purpose of use on a specific device.

A privacy algorithm is itself defined by obfuscated metadata, and its implementation can be globally distributed and partitioned across a virtual pipeline of independent nodes. With each step of the algorithm, individual attributes are obfuscated and tokenized in a variety of ways, creating a "privacy graph" that is completely opaque, yet at the same supports arbitrary computation. In addition, with each obfuscation step, opaque tokens are linked to a global "Trust Graph" capable of enforcing the associated trust criteria and selectively resolving obfuscated data into meaningful clear text.

Both the definition and execution of the privacy algorithms and the Trust Graph can be partitioned across disparate systems, organizations and legal jurisdictions. All information flows, algorithms, routing instructions and policy enforcement mechanisms are fully tokenized to ensure privacy, and digitally signed to enable tamper detection. Attempted attacks against the Privacy Network would be random, and any compromised or faulty nodes could be detected and routed around.

The core Privacy Network infrastructure runs on ubiquitous Internet standards and cloud infrastructure. Since it implements its own obfuscated address space and routing mechanisms, it can essentially be hidden among all the systems and infrastructure software that make up the overall Internet and web.

Compared to traditional enterprise centric approaches, a well designed privacy algorithm is vastly more robust from a security and privacy standpoint-easily many thousands if not millions of times more difficult to breach. Trust criteria will be rigorously enforced regardless of rogue insiders, implementation bugs, court orders, malicious governments, denial of service attacks, or security breaches among participating organizations.

The bottom line is that no matter how obfuscated resources are aggregated, analyzed, transformed or otherwise relied upon, their original publishers can be assured that all of their trust criteria will be strictly enforced before any output that directly or indirectly relied upon their resources will be revealed to anyone.

This means that people and organizations that don't agree on policies and don't trust each other can safely collaborate and pool information and other resources for mutual benefit on a global scale. Moreover, enterprises can harness a global network of proprietary data, devices and algorithms to deliver precision personalization and process optimization for their employees, customers and suppliers, yet have no ability to violate the trust criteria of others even if they (or a rogue insider) wanted to, and even if their IT systems are hacked.

Solving the Cyber Security and Identity Fraud Challenge

There are three primary reasons cyber security breaches and fraud have become pandemic: it is easy to perpetrate, and hard to defend, it is hard to get caught and it is very lucrative. Leveraging the Privacy Network to create more trustworthy global identity and payment authorization networks will not only cure the most significant cyber-security vulnerabilities, but also substantially remove the financial incentives to breach systems in the first place. Fortunately, data about identity and payments are highly standardized and simple to tokenize, making them easy to syndicate via the Privacy Network. In addition, numerous existing payment networks and identity aggregators can be leveraged to quickly achieve critical mass for a national or global scale network.

Global Identity Syndicate: Leverages a diverse network of databases, devices and online systems to enable an extremely convenient, robust and privacy-preserving shared cloud service for verifying the identity, attributes and relationships of both online users and subjects of records on a global scale.

Supports on-demand multi-factor authentication, proofing, records matching, consent and authorization management on a global scale.

Eliminates the need for users, identity providers or relying parties to reveal privacy sensitive information when authenticating users, authorizing access, or matching or discovering records.

Makes it possible to link records and verify identities across organizations and systems even when they don't agree on identifying attributes, and without revealing any attributes to each other.

Increases assurance and accountability by leveraging a broad network of diverse and authoritative sources, including biometric authentication against government issued IDs.

Enables global single sign on capability across disparate existing accounts and systems, eliminates the need for users to create accounts or remember passwords.

Cyber-Security Syndicate: Privacy algorithms and the global identity syndicate enable a cooperative cyber security surveillance, reputation and systems management service.

Aggregates obfuscated access audit logs, trust assertions, version and patch history, availability, utilization metrics and incident reports from participating organizations and individuals in order to accumulate comprehensive longitudinal profiles and reputations for users, organizations, devices, online services or technology infrastructure.

Analyzes obfuscated audit profiles to detect real time risk factors for potential compromise, failure or misuse of individuals' identities or online credentials, devices, or software infrastructure.

Detection of risk factors can be configured by individuals or organizations to trigger policy-based mitigation actions, including escalated authentication, proofing, or authorization requirements, loss of privileges, software upgrades or patches, administrator or user alerts, etc.

Privacy algorithms ensure that neither the creation, storage or analysis of obfuscated audit logs and profiles, nor any mitigation actions or alerts can reveal any sensitive or proprietary information. This combined with global identity syndicate offers robust protection against stolen administrative credentials and insider threats by rogue administrators, and enables "administration as a service" by neutral third parties.

Enables each individual or organization to independently specify their own security and privacy policies, both for their own resources, as well trust criteria required for interacting with or trusting the IT infrastructure or people of customers, partners or suppliers.

Global tokenized storage, backup, sharing and messaging service for both digital content and structured data storage. Leverages the unique capabilities of the Privacy Network combined with mature cloud infrastructure to overcome the vulnerabilities of traditional enterprise centric security models, as well as privacy compliance challenges.

Payment Syndicate: Leverages global identity and cyber security syndicates to make payment systems more convenient and dramatically less vulnerable to privacy or security breaches, identity theft or fraud.

Supports on demand high assurance verification of the identities, attributes and affiliations of the participating people, organizations and accounts for payer, recipient and financial intermediaries.

Enables enhanced fraud surveillance and dynamic escalation to additional out of band factors of authentication, proofing, approvals or alert/notifications for high risk transactions.

Enables independently verifiable obfuscated audit trail including transaction description, payment and commercial terms, and documentation of approval process or purchase contract.

Enhances security and privacy by obfuscating and tokenizing all information flows, transaction information and audit trails.

Eliminates need for payer or recipient to reveal sensitive identity, credit card or bank account information when conducting transactions, provisioning users or establishing accounts.

Enables fine grained privacy controls, obfuscated fraud surveillance and neutral privacy preserving dispute resolution.

Fraud Prevention Compliance and Care Management

The Privacy Network enables a fundamentally new approach to preventing fraud and abuse before it happens, rather than tacking compliance on after the fact with burdensome documentation and audits. This involves three key elements, as follows:

1) Neutral identity verification and identity matching to better screen, identity proof, and authenticate users will keep "bad guys" out; support forgery proof audit trails to keep "good guys" honest; and support the cross organizational access control, workflows, policy enforcement, secure messaging, and network-based data aggregation necessary to enable preemptive fraud analytics and compliance interventions.
2) Preemptive fraud detection analytics can be triggered as care is scheduled or delivered; instead of only after claims are submitted and paid. The Privacy Network supports virtually aggregating information from different organizations that do not necessarily trust each other, with each source controlling which analytic services can access their data and how analytic output can be used. The network architecture supports use of disparate plug-and-play analytics providers with more timely access to more data sources. "Connecting the dots" between the care scheduled and the patient's clinical records and/or claims history as well as the backgrounds and relationships of the people and providers involved will more accurately highlight inconsistencies and suspicious patterns. Routing information about scheduled care and online activities from provider IT systems to Privacy Network-enabled analytic services makes it possible to preemptively detect risk factors for fraud and abuse, and trigger compliance interventions while the "trail is hot", and before services have been delivered or payments have been made.
3) Preemptive Compliance services can be embedded into routine care coordination and administrative activities, with selective escalations triggered when risk factors for fraud and abuse are detected. Forgery-proof audit trails of scheduling, referrals and delivery based on neutral identity verification serve as both deterrents to fraud and collusion and also as verifiable evidence of compliant practices. Compliance interventions can include: requiring prior authorizations or real-time adjudication; prior submission of supporting documentation; provider verification or documentation of medical necessity; personal attestations, task re-assignment; compliance pre-review; and verification of services delivery or medical necessity by the patient, providers, or caregivers, etc.

Care Management

The focus of the care management track is providing useful, personalized information and decision support to providers and patients before services are delivered and to align financial incentives with the patient's medical needs by presenting them with the expected out of pocket costs and reimbursement and compliance requirements of various options before they make treatment decisions.

The care management track leverages two unique abilities of the Privacy Network architecture to facilitate the large-scale adoption of more efficient patient-centered and personalized approaches to care coordination, care management, and reimbursement.

Privacy Network for Fraud Prevention and Personalized Care Management

First is the Privacy Networks' ability to enable convenient HIPAA compliant access by any authorized patient, clinician, staff or caregiver to information and application content from disparate sources across the network. Users can use their standard browser or email clients, or the administrative or clinical portals they are already using. These can function as Privacy Network "access points", so users can receive, navigate among, and interact with patient records, decision support, data entry, collaboration and secure messaging tools from disparate sources, all combined into unified virtual applications. Security, consent and authorization, records retention, and disclosure management can be handled by the Privacy Network via certified cloud-based services, allowing robust compliance with HIPAA while minimizing privacy and liability concerns.

Second, the Privacy Network supports "virtual aggregation" of longitudinal patient and population records from disparate sources across the network that do not necessarily trust each other. This can enable better, more personalized clinical and administrative decision support, as well as provider or population benchmarking and actuarial calculations that support more effective alignment of reimbursement incentives.

Reusing clinical information and decision support feedback captured during the clinical consultation phase would streamline the administrative burden associated with a traditional reimbursement system. For example, when a provider chooses a treatment or test, they could be presented with an intelligent form walking them through a prior approval/adjudication process where they record the patient's diagnosis and symptoms, and which would then automatically generate supporting documentation necessary for reimbursement. This steers providers and patients towards more appropriate and effective care, simultaneously reducing costs, improving outcomes, and streamlining administration.

The care management track can also leverage the ability to securely interact with patients and to connect existing patient records to population health and personalized patient education and outreach services to enable more targeted and cost effective patient outreach and chronic condition management.

The Privacy Network for Healthcare

The Privacy Network for Healthcare that will connect individuals, devices, applications and databases from across the healthcare ecosystem in order to enable a much more efficient "learning health system". Based on the breakthrough innovation of the Privacy Network, it will support ecosystem wide "big data" analytics of privacy sensitive and proprietary information, while at the same time enabling highly personalized decision support, secure messaging and collaboration for patients and their personal networks of clinicians and caregivers.

Rigorous obfuscation of data and precision policy enforcement by neutral Privacy Network services will give each participating individual or organization the ability to precisely control the purposes and terms of use for their data, provide robust assurance of regulatory compliance, and offer unprecedented protection against unauthorized disclosure of personally identifiable or proprietary information. This supports virtually unlimited aggregation and analysis of sensitive and proprietary data and secure collaboration among people and organizations that don't trust each other and don't agree on policies.

The Privacy Network for Healthcare offers compelling value propositions for both internal adoption and cross organizational sharing across the entire healthcare ecosystem, including for HHS entities (FDA, CMS, NIH, etc.), state and local governments, private sector payers, providers, researchers, pharmaceutical and device manufacturers—as well as for patients themselves and their personal network of caregivers.

The Network will support a wide range of clinical, research and administrative applications, including:

Patient Safety: Bio-surveillance, post-market surveillance, pharmaceutical vigilance, adverse event reporting, etc.

Clinical Research: Translational science, clinical trials management, clinical trials recruitment, protocol compliance, comparative effectiveness research, public health and quality reporting, etc.

Care Management: Patient-centered coordination of care, personalized care management, medication therapy management, e-referrals, patient and provider secure messaging, etc.

Administrative: Eligibility verification, fraud prevention, evidence-based reimbursement models, Accountable Care Organization management, etc.

The Privacy Network has an open architecture that doesn't require consistent technology standards or common privacy and rights management policies across participants, and doesn't force different participants to trust each other's infrastructure or practices. It makes it possible to conveniently 'harvest' the common enabling resources (e.g. data, identity information, policy enforcement, analytic and user interaction capabilities) embedded in existing applications, databases, infrastructure, and devices, and to republish them as protected online resources. These in turn can be dynamically 'syndicated' via the Privacy Network to create a whole range of compelling services that attract more users and organizations, creating an organically growing ecosystem. The end result is that fragmented enterprise siloes of applications, infrastructure and practices spanning different regulatory jurisdictions will be connected into a self-organizing global network.

A key advantage of the Privacy Network is that it will create a powerful network effect. This is because adoption for any purpose in any domain—e.g. personalized care management by payers—generates as a by-product convenient access to data, users, policy enforcement or analytic capabilities that support other purposes—e.g. post-market surveillance by the FDA. The easy reuse enabled by the Privacy Network means that data and other resources published for any reason are available to other participants to support any other purpose at minimal incremental cost. Thus, disparate organizations can each focus on publishing or consuming Privacy Network resources to support their own missions and priorities, making it easy for them to satisfy the data and interoperability needs of others.

This web-like "ecosystem crowdsourcing" capability will combine with low-friction viral adoption to enable rapid growth of the Privacy Network for Healthcare to nationwide scale with minimal upfront investments. Because every participant in the healthcare ecosystem can benefit from the ability to access data or interact with the users and processes of others, once the network demonstrates nationwide capabilities, it will attract massive investments by the overall ecosystem to satisfy the vast unmet demand for sharing, collaboration and process optimization.

Global Scale "Big Data" Analytics of Proprietary Data

The Privacy Network for Healthcare will leverage the unique capabilities of the Privacy Network to connect disparate sources of clinical, claims, laboratory, genomic, proteomic, behavioral, demographic and other information in order to virtually assemble longitudinal patient records on a population scale.

Information from participating organizations and systems will first be normalized and transformed into consistent formats and terminologies, annotated to record provenance, and then linked and reconciled to create end-to-end longitudinal patient records. Data and other resources published to the network can be linked with security, privacy, rights management and payment requirements specified by each source. All of this (data, algorithms, policies, provenance, etc.) can then be rigorously obfuscated via novel 'privacy algorithms' so that the resulting records are rendered provably opaque, yet are still capable of supporting analytics and policy enforcement.

Any analytic algorithms expressed as metadata can be run through privacy algorithms, yielding a computationally equivalent but obfuscated algorithm as an output. When such obfuscated analytic algorithms are executed on identically obfuscated data, the resulting outputs will be semantically equivalent to the output that would have been generated if the original algorithm had been executed 'in the clear', and then obfuscated via privacy algorithms.

The key point is that the data, analytic algorithms and policy enforcement mechanisms can be distributed, combined, executed and stored while remaining obfuscated and fully opaque at all times. Once obfuscated, algorithms can be run with modest computational overhead compared to clear text execution. Moreover, obfuscated databases can efficiently support any sort of analytics or policy enforcement that can be done in the clear. This is a major advantage compared with traditional cryptographic approaches for privacy preserving multi-party computation, which tend to be limited to specialized types of computation, involve very high computational overhead, and are vulnerable to insider threats.

In addition, the machine intelligence algorithms characteristic of 'big data' analytics are typically natively implemented to execute declarative metadata, and therefore are particularly easy to convert for use with opaque data.

By addressing the key vulnerabilities of traditional security models (insider threats, key management, brute force attacks, etc.), and allowing data to be aggregated and analyzed without ever revealing it to anyone, the Privacy Network for Healthcare will enable a level of security assurance that is vastly superior-many orders of magnitude harder to crack—than anything currently available.

If a privacy algorithm is properly designed and implemented at scale across a diverse network, the obfuscated records will be invulnerable to a breach, which means they can be freely copied and shared without risking security. There is no encryption key that can be lost, no insiders or computing infrastructure anywhere that must be trusted, and no brute-force attack, court order or malicious act that can cause a breach. Thus, data contributed to the Network will not only much more valuable to participants and useful to society, it will also be much more secure than it is in existing enterprise siloes where it is currently stored.

Global Scale Personalization and Anonymous User Interaction

In addition to obfuscating information from existing applications and databases so that it can be freely combined and analyzed to create new knowledge, the Privacy Network for Healthcare will also be able to apply that knowledge and learn more by selectively interacting with individual patients, providers and researchers, or with 'legacy' applications or systems that have not been upgraded to natively understand obfuscated data.

Specifically, privacy algorithms make it possible to selectively resolve opaque records back into meaningful 'clear text' views, but only after the security, privacy, rights management and payment requirements of every Privacy Network resource that directly or indirectly contributed to creating that information has first been satisfied.

This makes it possible to support anonymous interaction with the patient and their clinicians to deliver personalized decision support and care alerts, and to confirm or clarify suspected results or capture new information-all without violating the privacy or intellectual property rights of any participants.

This means "big data" analytics can be used to detect potential risks, treatment options or to assess outcomes for individual patients based upon the experiences of the entire population, and to 'ask' very specific questions of the patient, their caregivers, or devices in order to fill in the gaps in knowledge or to offer more precisely personalized guidance. For example:

A clinical researcher might be authorized to conducting statistical analysis on population scale data, and to drill down to de-identified patient records that have been 'scrubbed' to preserve privacy and to ensure that records cannot be re-identified via pattern matching or statistical inference attacks.

A physician could access personalized clinical decision support for patients she is treating, and drill down to see the patient's clinical records from different providers, unless restricted by the patient. This could include targeted requests to collect important information about the patient in order to fill in gaps in a their health records or to resolve inconsistencies between existing data sources.

A patient with cardiovascular disease, HIV and substance abuse issues that is undergoing an untested combination of treatments could receive a message sent on behalf of their doctor asking if they are experiencing specific symptoms that are early indicators of an adverse reaction. Because symptoms (e.g. nausea, blood-shot eyes) are not specific to privacy sensitive conditions, and the message doesn't specify why the questions were asked, this would neither risk patient privacy nor reveal proprietary data (lab results, etc.) used to identify potential risks or gaps in information.

All this creates a self-reinforcing feedback loop wherein new information about treatments, outcomes, user behaviors and costs are obfuscated and recycled back into the network. This supports a virtuous cycle whereby knowledge and capabilities are continuously improved, drawing in more data, more users, and more computational resources and analytic capabilities.

Global Scale Trust for Syndication of Proprietary Resources

Simply improving the ability to aggregate and share data is not sufficient to enable a learning healthcare system. The Privacy Network for Healthcare makes it possible to not just freely aggregate and share data, but also to allow anyone to interpret, combine, validate, replicate and otherwise transform data into actionable knowledge and user interaction. This involves iteratively processing it via diverse analytic algorithms and orchestration mechanisms, all of which involve usage of a distributed computational infrastructure for processing, storage, replication and discovery. Applying the resulting knowledge by personalizing and presenting it to patients, providers, payers and researchers across the healthcare ecosystem also requires significant background processing to ensure that security, privacy and rights management policies are properly administered and enforced.

This raises some key questions. How can it be verified that processing has been performed correctly, and that everyone's policy requirements have been satisfied? And, how will participants be motivated to contribute computational resources, data, algorithms and other resources, and how will they get appropriate credit for their contributions? And, why should the output of the network be trusted, given that the data, algorithms and other resources that inputs are diverse, created for different purposes, and 'dirty'—i.e. subject to error or unanticipated uses? In other words, why is the network trustworthy?

Complicating matters is the fact that it will often be inappropriate or impossible to reveal the specific resources that contribute to any given output. Revealing such relationships risks 'leaking' sensitive information that could be exploited to compromise privacy, security, licensing or payment terms.

It's important to recognize that the capabilities delivered by the Privacy Network for Healthcare emerge from many generations of comingling of data, data transformation services, computational infrastructure, analytic algorithms, policy enforcement, user interaction and other resources. Each 'syndicated' resource has a lineage—an ancestry—made up of a multi-level graph of all the successive generations of resources that contributed to its creation. These resources are diverse, published by different sources that don't directly know each other, are often proprietary and subject to diverse security, privacy and commercial terms. Also, many resources will require investments by publishers to cover development and provisioning costs, or will involve access to valuable proprietary assets that owners will not willingly give away. Thus, participants must trust that they will receive their fair share of benefits in exchange for their contributions. Thus, the trustworthiness of the network will depend upon establishing robust and efficient mechanisms to provide for the following:

- Trustworthy Execution: The metadata that defines each resource must be annotated with provenance and reputation metadata to verify that it was correctly generated using trusted metadata and software components, and to summarize the trustworthiness of its lineage.
- Trustworthy Identity: Given that disparate systems and organizations rely upon different identifiers for the same people, organizations, online services, devices, and records, then correct aggregation of longitudinal records and authorization of access depends upon the ability to correctly match and verify identities across disparate systems.
- Trustworthy Provenance: The effectiveness of big data analytics relies not just upon agreeing what source records mean, but also where they came from, why they were created, and how they have been transformed. Preserving this context dramatically improves the quality and precision of results, and enables reputations that enable trust among parties that don't know each other.
- Trustworthy Policy Enforcement: The security, privacy, and the payment policy requirements associated with all of the precedent resources that contributed directly or indirectly to the generation of a new syndicated resource must be carried forward. These policy requirements will be consolidated and included in the signed metadata that describes the syndicated resource.
- Trustworthy Credit Allocation: The contributions of various participants must be metered and logged so as to correctly account for the consumption and creation of resources, and to enforce syndication agreements about how payments and in-kind credits are allocated among participants.

The robustness of each of these mechanisms in turn depends upon two conditions being satisfied. First, robust security must be assured by guaranteeing that any metadata consumed or generated cannot contribute to a security or privacy breach. Second, robust computation must be assured by verifying that metadata in each resource record was correctly generated and hasn't been altered.

Robust Security: Robust privacy and security enforcement can be guaranteed by fully obfuscating all information involved via privacy algorithms, including data, schema definitions, provenance, algorithm definitions, policies, and the addresses and identities of all computational resources used. This will ensure that processing nodes won't understand anything about the metadata they are working on, which other resources are involved, who they are working for, and what policies were invoked. Since they understand nothing, they cannot leak anything.

Opaque syndicated outputs can be resolved into meaningful information by authorized parties, but only by using the privacy algorithm to reverse the obfuscation through a sequence of steps across multiple independent nodes of the Privacy Network. This requires satisfying all of the required security, privacy and payment policies using enforcement mechanisms specified by the privacy algorithm when the original inputs were first obfuscated.

This process is fail-safe, because any errors in storage or computation at any step will yield random and meaningless results, thereby assuring that the protected information is not improperly revealed.

Robust Execution: There are a number of ways that the Prust Network can assure that processing has been executed correctly and the results have not been tampered with. Some of these are somewhat reminiscent to the BitCoin 'blockchain', although its implementation is very different—making it vastly more flexible, more efficient computationally, and more robust from a privacy and security standpoint:

The Privacy Network can remotely verify the digital signatures of code and metadata used to implement and orchestrate the execution of algorithms. If tampering is detected in either, the algorithm can be re-routed to different nodes that have been properly verified.

Resource metadata (including provenance and reputation) can be digitally signed in various ways to verify that it was properly executed by trusted infrastructure and hasn't been tampered with. Collectively this forms an opaque and immutable log of the lineage of each resource.

Executing opaque algorithms with fully obfuscated metadata makes it impossible to 'spoof' the network by tampering with metadata to forge incorrect results. Any tampering would be blind, because an attacker couldn't know what they were attacking. Further, the impact of tampering would be random, and could be easily detected by checking digital signatures.

The execution of algorithms and storage of resulting metadata can be independently performed in parallel across an independent sequence of nodes, with the results compared for consistency.

It is important to recognize that healthcare information in today's world is not just fragmented—it is also incredibly 'dirty'. It has been collected by disparate systems from different people for different purposes using different terminologies. It is rife with errors and gaps, is often out of date, inconsistent, lacks provenance, and some records are flat out fraudulent. In short, it's a mess.

The Privacy Network for Healthcare can transform this messiness into trustworthy results by leveraging its unique ability to combine and systematically analyze many different sources of information in a common context, using machine intelligence to detect and compensate for hidden biases and inconsistencies. Further, it can trigger interactions with people to fill in gaps in knowledge or resolve any ambiguities or inconsistencies that emerge.

The network also supports continuously learning and evolution, allowing the performance of diverse analytic algorithms and syndication schemes to be systematically compared, with controlled experiments determining which works best in specific contexts. Even more importantly, by making it possible for patients, their clinicians, payers and others to apply the knowledge generated, there will be both a vast increase in the amount and quality of information created and shared, and real-time feedback on what works, and financial rewards for delivering it.

Global Scale Policy Compliance

An essential requirement for achieving low-friction sharing of healthcare data on a national scale is to assure organizations and individuals that their participation is fully compliant with HIPAA and other federal and state regulatory requirements, and that they will be protected from legal liability, that their commercial terms will be respected, and be comfortable that it will not damage their relationships with other stakeholders.

Furthermore, various participants (patients, providers, payers, researchers, etc.) with disparate objectives and policy preferences must be able to individually specify how and for what purposes their data is used, yet still support the ability for their data to be aggregated and analyzed on a global scale.

With this in mind, the Privacy Network for Healthcare will rely upon a Trust Model and the Privacy Network's ability to support authentication, identity and attribute verification and records matching on a national scale. This will simultaneously enable population-scale aggregation and analytics of sensitive healthcare records, as well as convenient on-demand access by patients, caregivers, clinicians, administrative staff members, or clinical researchers.

The Trust Model incorporates a flexible and extensible policy taxonomy that enables participants to independently specify and personalize their policy preferences from a range of flexible options pre-vetted for regulatory compliance and reasonableness. This will give participants fine-grained control over security and privacy enforcement and protect them from legal liability. It will offer control of how their data or the ability to interact with their networks of business associates and patients can be used by others, and to define the contractual and payment terms and conditions for such uses.

There are two distinct taxonomies of policies-one for the use of obfuscated data, and a second to authorize access of personally identifiable data or decision support. Generally speaking, full obfuscation of data by privacy algorithms will satisfy any and all regulatory requirements for privacy and security, since the resulting data will be provably opaque. Nevertheless, participants will have different preferences as to the purposes for which their data can be used, and the commercial terms for that use. Use of consistent policy taxonomies will give participants policy flexibility; yet facilitate the creation of large-scale value-added syndicates offering consistent commercial terms of use. Many syndicates can co-exist, and can be designed to support different purposes (e.g. patient safety, clinical research, care management), or compete by incorporating different licensing terms, analytic value-add, etc.

The Trust Model features neutral cloud-based governance and policy enforcement, independent attestation of regulatory compliance, and robust contractual protection against privacy liability for both patient and provider messaging and health information sharing. This will ensure that the policies selected by each information publisher are enforced by neutral network services, and not depend upon the security or privacy policies or practices of the requesting parties.

The end result is that access to sensitive resources can be enabled without requiring consensus on uniform policies, thereby removing a huge barrier that has been an obstacle to large-scale data sharing for clinical treatment, research and operations use. This will translate into widespread benefits for patients, providers and the healthcare system as a whole, including improved health outcomes, lower costs, better security, enhanced privacy, reduced fraud, improved reimbursement, and streamlined administrative processes.

The Trust Model has Number of Key Elements:

A Policy Definition Taxonomy made up of configurable reference policy profiles and options that accommodate the diverse real-world requirements and preferences of disparate providers, patients, care-delivery models, and usage scenarios—e.g. treatment, public health, clinical research, and provider operations. Policy options will be validated based on legal and regulatory requirements, and the input of domain experts and stakeholder working groups. They will be vetted to ensure that they are unambiguous, enforceable, interoperable, compliant from a legal and regulatory standpoint, and both understandable and reasonable to patients, clinicians, policy experts, and technical audiences.

Policy Enforcement Model that rigorously defines how compliance with various policy options selected from the Policy Taxonomy can be properly enforced on a national scale across disparate organizations, systems and technologies. The enforcement model is embodied in a variety of elements:

A standardized policy terminology that makes it possible to unambiguously specify in metadata the policy decisions, preferences and constraints specified by individuals, organizations, or neutral trust authorities;

A trust service taxonomy that classifies and rates various types of online services or mechanisms necessary to enforce policy compliance, including authentication, authorization, consent, identity/credential verification, identity/records matching, obfuscation/encryption, records retention, disclosure management, access audit and surveillance, and policy and systems administration;

A library of standardized business associate and other legal agreements and explanatory documentation that mirror the policy options incorporated in the Policy Taxonomy. These enable patients, clinicians, providers, business associates, vendors, other types of HIPAA covered entities to understand and electronically enter into valid, legally binding, agreements that obligates them to abide by specified policies;

A mapping from policy options specified within the Policy Taxonomy into corresponding requirements for enforcing compliance, including online trust services and associated legal agreements. Compliance criteria will be expressed in the vendor/technology neutral terminology used to define the trust service taxonomy, so they can be applied across diverse organizations and systems, and open the healthcare ecosystem up to continuous innovation and competition;

Policy Trust Authority is a Privacy Network-enabled online service that allows individuals and organizations to 'subscribe' to certified policies, and to dynamically translate them into cloud-based trust services as necessary to enforce compliance:

Non-technical administrators and end-users will be able to specify their policy preferences from options drawn from the Policy Taxonomy via simple web-based 'policy wizards';

Policy preferences will be dynamically mapped into approved trust services based upon the specific usage context in accordance with the Policy Enforcement Model;

Administrators for participating organizations and individuals will be able to remotely verify their identities and electronically enter into appropriate business associate or other agreements with as necessary to assure and document regulatory compliance.

Global Scale Identity Matching and Verification

A particularly challenging obstacle to enabling patient-centered analytics and policy enforcement on a global scale is that different organizations and systems cannot reliably know when they are talking about the same person, whether for online users or for the subjects of records.

The Privacy Network enables a new type of "identity syndicate" which is a collective of virtually combined, independent identity and attribute providers' databases that can be used for matching, verifying and searching identities. It works even if the providers' systems do not agree on how to identify people, and even if they are unwilling to disclose any identity attributes to each other.

The Privacy Network offers each provider in an identity syndicate complete control over how its information is used, using privacy algorithms to enable robust guarantees that it will not be leaked, co-mingled, or used for unauthorized purposes. This makes it possible to assemble identity syndicates that virtually combine existing national-scale identity repositories along with numerous proprietary data sources. These include security directories, EHR and Practice Management applications, HR and CRM databases, banking and financial records, DMV records, social networks, etc.

By cross-indexing and drawing inferences on identity graphs derived from disparate sources, vastly higher assurance matching, disambiguation, and verification is possible—especially if data sources have errors and inconsistencies, or change over time. Some highly authoritative databases—such as DMVs, passport databases, or professional licensing boards—include pictures and/or fingerprints in their records, and therefore can support biometric authentication via the Privacy Network. Such biometric methods are much more accurate and cheaper than humans performing in-person proofing, are available on-demand, and are less vulnerable to insider fraud, human error or negligence.

Identity syndicates can be used to generate opaque "discovery service" indices. These support efficient searching and matching of identities across thousands of disparate data sources. Generating or searching a discovery service does not require exposing which data sources hold records about which people, does not require that any identity data be revealed, and doesn't assume that searchers have consistent or even overlapping identity attributes with the records being searched.

One application of discovery services is obfuscated patient record locator services. These allow patient records that have inconsistent patient identifiers and are fragmented across many disparate sources—potentially anywhere in the country—to be searched and discovered in a fraction of second, without risking security or patient privacy.

Discovery services also support fast, efficient search for patient consent directives, authorization records, and access audit logs. These enable either cloud-based or federated services to empower network-centric enforcement of HIPAA compliant consent and authorization, disclosure management, and records retention services. Such compliance services can be protected via privacy algorithms so that no unauthorized parties (including administrators of the compliance services themselves) could breach a patient's privacy, even if the compliance systems themselves are breached.

Discovery services also enable a new type of identity provider. Rather than relying upon a single identity provider to grant a credential to a given user, a syndicated identity provider can require multiple, independent sources to verify claims about a person. A syndicated provider is based on a trust model that assigns weights to data sources that it trusts to support various types of claims, and an algorithm to determine what combination can achieve a sufficient 'trust rank'.

With a user's authorization, opaque audit trails can be maintained that record specifically how a user was verified in order to authorize access to sensitive information. Such audit records would be opaque and could not be tampered with or accessed by anyone including the administrators of the audit service that stores them, but could be resolved back into meaningful information by authorized parties to resolve disputes according to policies agreed to by all the parties involved.

The Privacy Network also enhances privacy because a user can prove who they are or facts about themselves to an organization or system without requiring that they reveal private or sensitive information in order to prove it. This means users need not be at risk of having their identities, money or private information stolen due to a malicious site, a "data-spill", or a phishing attack.

Syndicated identity has a number of compelling advantages over traditional methods:

- It enables higher assurance levels, and the verification of more attributes and relationships.
- It supports greater convenience by enabling on-demand national scale provisioning and multi-factor authentication, without requiring users to remember passwords or carry authentication tokens.
- It is much cheaper to administer and manage, and is much less vulnerable to insider attacks.
- It enables a global single sign-on capability where the network learns to recognize which user accounts and credentials go with a single person by drawing inferences based on which combinations of credentials are earned on the same machines during the same sessions.
- It eliminates the "key management" and single-point-of-failure vulnerabilities of PKI (Public Key Infrastructure) and federated identity models by syndicating verification, authentication and privilege management across multiple independent trust services for each request.
- Syndicated identity becomes stronger, more resilient, and more convenient as more identity providers are added, not weaker and more failure prone as with traditional systems.

It allows users to prove facts about themselves—such as clinical credentials and organizational affiliations—while remaining fully anonymous, using a pseudonym, or revealing their actual name.

Examples of required clauses for WebShield Trust Model Data Use, Security and Privacy Agreement between Attribute Requestor and Attribute Authority 1.1 Agreement Description (a) This Data Use, Security and Privacy Agreement ("Agreement") is the proprietary intellectual property of WebShield and is authorized for use solely by licensees of the WebShield Trust Model™

(b) The Agreement has been assigned TrustModel ID-xxxxxx. The authoritative source for obtaining valid and executed versions of the Agreement and any related Supporting Materials, Assessment Criteria, Assessment Methodologies, Attestations or Audit Materials, as well as any amendments thereof, is the Trust Graph™, at www.xxxx/trustgraph.

(c) As of execution, the Agreement has been assessed and verified to satisfy the Trust Model™ Assessment Criteria using the Trust Model Assessment Methodology as specified in the Trust Graph™ with reference Trust Model ID-XXXXXX.

2.1 Definition of the Parties (a) Attribute Authority. "Attribute Authority" or "CAA" shall have the meaning defined in "Trust Model™-Defined Terms" with Trust Model ID-xxxxxx, and in reference to the party to this agreement, shall mean LexisNexis Risk Solutions, an Ohio Corporation, with Trust Model ID-xxxxxx.
(b) Attribute Requestor. "Attribute Requestor" shall have the meaning defined in the "Trust Model™-Defined Terms" with Trust Model ID-xxxxxx, and in reference to the party to this agreement, shall mean the Aetna Inc., a Pennsylvania Corporation, with Trust Model ID-xxxxXX.

3.0 Definitions (a) Trust Graph™. "Trust Graph™" shall have the meaning defined in "Trust Model™—Defined Terms" with Trust Model ID-xxxxXX.
(b) Privacy Network. "Privacy Network" shall generally have the meaning defined in "Trust Model™-Defined Terms" with Trust Model ID-xxxxxx. For purposes of this agreement, the Privacy Network Syndicator shall be WebShield Inc., with Trust Model ID-xxxxxx
(c) Reference Source Proxy. "Reference Source Proxy" shall have the meaning defined in "Trust Model™ Defined Terms" with Trust Model ID-xxxxxx.
(d) Supporting Materials. "Supporting Materials" shall have shall have the meaning defined in "Trust Model I'M-Defined Terms" with Trust Model ID-xxxxxx.
(e) Obfuscated Information. "Obfuscated Information" shall have shall have the meaning defined in "Trust Model IM-Defined Terms" with Trust Model ID-xxxxxx.
(f) Non-Obfuscated Information. "Non-Obfuscated Information" shall have the meaning defined in "Trust Model™-Defined Terms" with Trust Model ID-xxxxxx."

4.0 Obligations and Activities of the Attribute Authority

For Purposes of this Agreement, Attribute Authority Agrees that:

(a) It will exchange information via the Privacy Network using a Reference Source Proxy that has been assessed and verified to properly implement the "Trust Model IM Privacy Model", as specified in the Trust Graph™ with reference Trust Model ID-xxxxxx, and summarized for information purposes herein as Addendum X.
(b) It will receive and send identity attributes in the terminologies and formats defined by "Trust Model™ Vocabulary Standard", as specified in the Trust Graph™ with reference Trust Model ID-xxxxxx, and summarized for information purposes herein as Addendum X.
(c) It will only return requested attributes that meet the Assurance Level requirements for each request as specified by the "Trust Model™ Identity Matching Assurance Standard", as specified in the Trust Graph™ with reference Trust Model ID-xxxxxx, and summarized for information purposes herein as Addendum X.
(d) It will ensure that any system that obtains, stores or processes information received from the Privacy Network meets or exceeds the "Trust Model IT Security Assurance Criteria", as specified in the Trust Graph™ with reference Trust Model ID-xxxxxx, and summarized for information purposes herein as Addendum X.
(e) It will not use or disclose information received from the Privacy Network for any purposes other than those specified by "Trust Model™ Authorize Uses", as specified in the Trust Graph™ with reference Trust Model ID-xxxxxx, and summarized for information purposes herein as Addendum X.
(f) It authorizes the purposes of use for information delivered to the Privacy Network specified by "Trust Model™ Authorized Uses", as specified in the Trust Graph™ with reference Trust Model ID-xxxxxx, and summarized for information purposes herein as Addendum X.
(g) It authorizes that Non-Obfuscated Information from CAA delivered to the Privacy Network may be released to recipients as specified by "Trust Model™ Authorized Recipients", as specified in the Trust Graph™ with reference Trust Model ID-xxxxxx, and summarized for information purposes herein as Addendum X.
(h) It authorizes delivery of requests for attributes via the Reference Source Proxy of the Privacy Network from authorized requestors specified by "Trust Model™ Authorized Requestors", as specified in the Trust Graph™ with reference Trust Model ID-xxxxxx, and summarized for information purposes herein as Addendum X.
(i) It accepts and will adhere to the payment and commercial terms for use of information and other services provided in response to requests received via the Privacy Network as specified by "Trust Model IM Payment and Commercial Terms", as specified in the Trust Graph™ with reference Trust Model ID-xxxxxx, and summarized for information purposes herein as Addendum X.
(j) It will report to the "Trust Graph™ Security Incident Report Service" any unauthorized use or disclosure of information received from the Privacy Network, as well as any security incident involving systems or processes that store or process information received from the Privacy Network. The reporting duties, criteria, processes, and formats are specified by "Trust Model™ Reportable Events" as contained in the Trust Graph™ with reference Trust Model ID-xxxxxx, and summarized for information purposes herein as Addendum X.

5.1 Obligations and Activities of the Attribute Requestor

For Purposes of this Agreement, Attribute Requestor Agrees that:

(a) It will exchange information via the Privacy Network using an Upload Proxy that has been assessed and verified to properly implement the "Trust Model™ Privacy Model", as specified in the Trust Graph™ with reference Trust Model ID-xxxxxx, and summarized for information purposes herein as Addendum X.
(b) It will receive and send identity attributes in the terminologies and formats defined by "Trust Model IM Vocabulary Standard", as specified in the Trust Graph™ with reference Trust Model ID-xxxxxx, and summarized for information purposes herein as Addendum X.

(c) It will ensure that any system that obtains, stores or processes information received from the Privacy Network meets or exceeds the "Trust Model IT Security Assurance Criteria" requirements specified for that information, as specified in the Trust Graph™ with reference Trust Model ID-xxxxxx, and summarized for information purposes herein as Addendum X.

(d) It will not use or disclose information received from the Privacy Network for any purposes other than those specified by "Trust Model™ Authorize Uses", as specified in the Trust Graph™ with reference Trust Model ID-xxxxxx, and summarized for information purposes herein as Addendum X.

(e) It authorizes the purposes of use for information delivered to the Privacy Network specified by "Trust Model™ Authorized Uses", as specified in the Trust Graph™ with reference Trust Model ID-xxxxxx, and summarized for information purposes herein as Addendum X.

(f) It authorizes that Non-Obfuscated Information from Attribute Requestor delivered to the Privacy Network may be released to recipients as specified by "Trust Model IM Authorized Recipients", as specified in the Trust Graph™ with reference Trust Model ID-xxxxxx, and summarized for information purposes herein as Addendum X.

(g) It authorizes delivery of requests for attributes from Attribute Requestor via the Privacy Network to Authorized Attribute Authorities authorized requestors specified by "Trust Model™ Authorized Attribute Authorities", as specified in the Trust Graph™ with reference Trust Model ID-xxxxxx, and summarized for information purposes herein as Addendum X.

(h) It accepts and will adhere to the payment and commercial terms for use of information and other services provided in response to requests received via the Privacy Network as specified by "Trust Model IM Payment and Commercial Terms", as specified in the Trust Graph™ with reference Trust Model ID-xxxxxx, and summarized for information purposes herein as Addendum X.

It will report to the "Trust Graph Security Incident Report Service" any unauthorized use or disclosure of information received from the Privacy Network, as well as any security incident involving systems or processes that store or process information received from the Privacy Network. The reporting duties, criteria, processes, and formats are specified by "Trust Model™ Reportable Events" as contained in the Trust Graph™ with reference Trust Model ID-xxxxxx, and summarized for information purposes herein as Addendum X.

6.1 Term and Termination (a) Term. The Term of this Agreement shall be effective as of [Insert effective date], and shall remain in effect until Notice of Termination by either Party.

(b) Notice of Termination.

(c) Obligations of Attribute Authority Upon Termination.

(d) Obligations of Attribute Requestor Upon Termination.

(e) Survival.

Examples of Required Clauses for Trust Model Bilateral Attribute
Requestor-Attribute Authority Agreement 3.0 Agreement Description (d) This Data Use, Security and Privacy Agreement ("Agreement") are the proprietary intellectual property of WebShield and are authorized for use solely by licensees of the WebShield Trust Model™

(e) The Agreement has been assigned Trust Model ID-xxxxxx. The authoritative source for obtaining valid and executed versions of the Agreement and any related Supporting Materials, Assessment Criteria, Assessment Methodologies, Attestations or Audit Materials, as well as any amendments thereof, is the Trust Graph™, at www.xxxx/trustgraph.

(f) As of execution, the Agreement has been assessed and verified to satisfy the Trust Model™ Assessment Criteria using the Trust Model Assessment Methodology as specified in the Trust Graph™ with reference Trust Model ID-xxxxxx.

4.0 Definition of the Parties (c) Attribute Authority. "Attribute Authority" shall have the meaning defined in "Trust Model™—Defined Terms" with Trust Model ID-xxxxxx, and in reference to the party to this agreement, shall mean LexisNexis Risk Solutions, a Ohio Corporation, with Trust Model ID-XXXXXX.

(d) Attribute Requestor. "Attribute Requestor" shall have the meaning defined in the "Trust Model™ Defined Terms" with Trust Model ID-xxxxxx, and in reference to the party to this agreement, shall mean the Aetna Inc., a Pennsylvania Corporation, with Trust Model ID-xxxxxx. 4.1 Definitions (a) Trust Graph™. "Trust Graph™" shall have the meaning defined in "Trust Model™—Defined Terms" with Trust Model ID-XXXXXX.

(b) Privacy Network. "Privacy Network" shall generally have the meaning defined in "Trust Model™—Defined Terms" with Trust Model ID-xxxxxx. For purposes of this agreement, the Privacy Network Syndicator shall be WebShield Inc., with Trust Model ID-XXXXXX (c) Reference Source Proxy. "Reference Source Proxy" shall have the meaning defined in "Trust Model™—Defined Terms" with Trust Model ID-xxxxxx.

(d) Supporting Materials. "Supporting Materials" shall have shall have the meaning defined in "Trust Model™—Defined Terms" with Trust Model ID-xxxxxx.

(e) Obfuscated Information. "Obfuscated Information" shall have shall have the meaning defined in "Trust Model™—Defined Terms" with Trust Model ID-xxxxxx.

(f) Non-Obfuscated Information. "Non-Obfuscated Information" shall have the meaning defined in "Trust Model™—Defined Terms" with Trust Model ID-xxxxxx."

5.0 Obligations and Activities of the Attribute Authority

For Purposes of this Agreement, Attribute Authority Agrees that:

(a) Validation of Privacy Network: It will exchange information via the Privacy Network using a Reference Source Proxy that has been assessed and verified to properly implement the "Trust Model IM Privacy Model", as specified in the Trust Graph™ with reference Trust Model ID-xxxxxx, and summarized for information purposes herein as Addendum X.

(b) IT Interoperability—Specification of Schema Standard: It will receive and send Information in the terminologies and formats defined by "Trust Model™ Vocabulary Standard", as specified in the Trust Graph™ with reference Trust Model ID-xxxxxx, and summarized for information purposes herein as Addendum X.

(c) Identity & Attribute Matching Assurance: It will only return requested attributes that meet the Assurance Level requirements for each request as specified by the "Trust Model™ Identity Matching Assurance Standard", as specified in the Trust Graph™ with reference Trust Model ID-xxxxxx, and summarized for information purposes herein as Addendum X.

(d) IT Security Assurance: It will ensure that any system that obtains, stores or processes information received from the Privacy Network meets or exceeds the "Trust Model IT Security Assurance Criteria", as specified in the Trust Graph™ with reference Trust Model ID-xxxxxx, and summarized for information purposes herein as Addendum X.

(f) Authorized Purposes of Use for Information Received: It will not use or disclose information received from the Privacy Network for any purposes other than those specified by "Trust Model™ Authorize Uses", as specified in the Trust Graph™ with reference Trust Model ID-xxxxxx, and summarized for information purposes herein as Addendum X.

(g) Authorized Purposes of Use for Information Delivered: It authorizes the purposes of use for information delivered to the Privacy Network specified by "Trust Model™ Authorized Uses", as specified in the Trust Graph™ with reference Trust Model ID-xxxxxx, and summarized for information purposes herein as Addendum X.

(h) Authorized Recipients: It authorizes that Non-Obfuscated Information from Attribute Authority delivered to the Privacy Network may be released to recipients as specified by "Trust Model™ Authorized Recipients", as specified in the Trust Graph™ with reference Trust Model ID-xxxxxx, and summarized for information purposes herein as Addendum X.

(i) Authorized Requestors: It authorizes delivery of requests for attributes via the Reference Source Proxy of the Privacy Network from authorized requestors specified by "Trust Model™ Authorized Requestors", as specified in the Trust Graph™ with reference Trust Model ID-xxxxxx, and summarized for information purposes herein as Addendum X.

(j) Payment and Commercial Terms: It accepts and will adhere to the payment and commercial terms for use of information and other services provided in response to requests received via the Privacy Network as specified by "Trust Model™ Payment and Commercial Terms", as specified in the Trust Graph™ with reference Trust Model ID-xxxxxx, and summarized for information purposes herein as Addendum X.

(k) Security Incident Report Service: It will report to the "Trust Graph™ Security Incident Report Service" any unauthorized use or disclosure of information received from the Privacy Network, as well as any security incident involving systems or processes that store or process information received from the Privacy Network. The reporting duties, criteria, processes, and formats are specified by "Trust Model™ Reportable Events" as contained in the Trust Graph™ with reference Trust Model ID-xxxxxx, and summarized for information purposes herein as Addendum X.

5.1 Obligations and Activities of the Attribute Requestor

For Purposes of this Agreement, Attribute Requestor Agrees that:

(i) Validation of Privacy Network: It will exchange information via the Privacy Network using an Upload Proxy that has been assessed and verified to properly implement the "Trust Model™ Privacy Model", as specified in the Trust Graph™ with reference Trust Model ID-xxxxxx, and summarized for information purposes herein as Addendum X.

(j) IT Interoperability—Specification of Schema Standard: It will receive and send Information in the terminologies and formats defined by "Trust Model™ Vocabulary Standard", as specified in the Trust Graph™ with reference Trust Model ID-xxxxxx, and summarized for information purposes herein as Addendum X.

(k) Identity & Attribute Matching Assurance Acceptance: It will review the standard practices for identity and attribute matching and validation assessment standards for Attribute Authorities as defined in "WebShield Trust Model Identity Matching Assurance Standard" with reference Trust Model ID-xxxxxx, and make a good faith determination that those practices meet it's criteria and are sufficiently robust given the intended "Purposes of Use" for any given request.

(l) IT Security Assurance: It will ensure that any system that obtains, stores or processes information received from the Privacy Network meets or exceeds the "Trust Model IT Security Assurance Criteria" requirements specified for that information, as specified in the Trust Graph™ with reference Trust Model ID-xxxxxx, and summarized for information purposes herein as Addendum X.

(m) Authorized Purposes of Use for Information Received: It will not use or disclose information received from the Privacy Network for any purposes other than those specified by "Trust Model™ Authorize Uses", as specified in the Trust Graph™ with reference Trust Model ID-xxxxxx, and summarized for information purposes herein as Addendum X.

(n) Authorized Purposes of Use for Information Delivered: It authorizes the purposes of use for information delivered to the Privacy Network specified by "Trust Model™ Authorized Uses", as specified in the Trust Graph™ with reference Trust Model ID-xxxxxx, and summarized for information purposes herein as Addendum X.

(o) Authorized Recipients: It authorizes that Non-Obfuscated Information from Attribute Requestor delivered to the Privacy Network may be released to recipients as specified by "Trust Model™ Authorized Recipients", as specified in the Trust Graph™ with reference Trust Model ID-xxxxxx, and summarized for information purposes herein as Addendum X.

(p) Payment and Commercial Terms: It accepts and will adhere to the payment and commercial terms for use of information and other services provided in response to requests received via the Privacy Network as specified by "Trust Model™ Payment and Commercial Terms", as specified in the Trust Graph™ with reference Trust Model ID-xxxxxx, and summarized for information purposes herein as Addendum X.

(q) Security Incident Report Service It will report to the "Trust Graph™ Security Incident Report Service" any unauthorized use or disclosure of information received from the Privacy Network, as well as any security incident involving systems or processes that store or process information received from the Privacy Network. The reporting duties, criteria, processes, and formats are specified by "Trust Model™ Reportable Events" as contained in the Trust Graph™ with reference Trust Model ID-xxxxxx, and summarized for information purposes herein as Addendum X.

6.0 Term and Termination (f) Term. The Term of this Agreement shall be effective as of [Insert effective date], and shall remain in effect until Notice of Termination by either Party.

(g) Notice of Termination.

(h) Obligations of Attribute Authority Upon Termination.

(i) Obligations of Attribute Requestor Upon Termination.

(j) Survival.

Summary of Trust Criteria for "Regulatory Reporting—IRS Section 6055 Reporting"

4.1 Summary of Trust Criteria for Attribute Authority (LexisNexis) in Support of Attribute Requestor's (Aetna) use of Information for "Regulatory Reporting—IRS Section 6055 Reporting"

a) Validation of Privacy Network

Attribute Authority (LexisNexis) agrees to ensure that it is connected with the correct Privacy Network Connector by at least two of the following mechanisms:

Connect via mutually authenticated TLS, and validate SAFE BioPharma-signed WebShield Privacy Network certificate.

Control access to Attribute Authority Online System (LexisNexis Accurint Account) with User Name-Password combination.

Restrict access to IP addresses on Attribute Authority's (LexisNexis) Privacy Network white-list for Attribute Requestor (Aetna)

Attribute Authority (LexisNexis) confirms that Attribute Authority Connection Parameters (URL, IP address, Certificates, etc.) stored in the WebShield Trust Graph (initially in GitHub repository) for the Attribute Authority's Online Systems are valid and correct.

b) IT Interoperability—Specification of Schema Standard

Attribute Authority (LexisNexis) agrees that interactions between its' online systems (LexisNexis's Accurint API) and the corresponding Privacy Network Connector (LexisNexis Accurint Connector) shall conform to the Interface Definition documented in the WebShield Trust Graph (initially in GitHub repository):

LexisNexis Accurint API doc/User Guide

Attribute Authority (LexisNexis) agrees that it will make a commercially reasonable effort to confirm that the Privacy Network Connector (LexisNexis Accurint Connector) correctly maps the Attribute Authority Online Interface (Accurint API/Schema) into the WebShield Trust Model Vocabulary Standard—Identity SIM", with reference Trust Model ID-xxxxxx.

Attribute Authority (LexisNexis) agrees to notify Attribute Requestor (Aetna) and its' designated Privacy Network Operators (WebShield) in advance of any changes to that schema and/or software interface that may impact the correct functioning of the Privacy Network Connector (LexisNexis Accurint Connector) or other related components, and coordinate with them to test the new configuration to confirm it functions properly.

c) Identity & Attribute Matching Assurance

Attribute Authority (LexisNexis) attests and agrees that it will make commercially reasonable efforts to adhere to its standard practices for identity and attribute matching and validation, and that those practices are consistent with the "WebShield Trust Model Identity Matching Assurance Standard—Level A Rating", with reference Trust Model ID-xxxxxx.

d) IT Security Assurance Criteria

Attribute Authority (LexisNexis) attests that the IT Systems and Security Practices relied upon to ensure the security and enforce access control rights in support of the terms of this Agreement have been assessed for compliance with commercially reasonable IT security requirements, and that such assessment is consistent with "Trust Model IT Security Assurance Criteria—Level A Rating", with reference Trust Model ID-xxxxxx.

Level A Rating is defined as consistent with being assessed for compliance with the relevant IT security control standards as defined in NIST SP-800-53, ISO 27001 or equivalent IT security audit frameworks by an accredited registrar or other comparable assessor.

Attribute Authority (LexisNexis) attests that the encryption/tokenization and key management infrastructure and practices relied upon to protect Information sent and received to the Privacy Network pursuant to this agreement satisfy "Trust Model IT Security Assurance Criteria—Level A Obfuscation" as specified in Trust Model ID-xxxxx.

Attribute Authority (LexisNexis) attests that the access control and authorization infrastructure and practices relied upon to ensure compliance with Authorized Purposes of Use criteria for Information sent and received to the Privacy Network pursuant to this agreement satisfy "Trust Model IT Security Assurance Criteria—Access Control" as specified in Trust Model ID-xxxxx.

Attribute Authority (LexisNexis) attests that it has followed its' normal and commercially reasonable practices in verifying the IT security robustness of the infrastructure and practices that ensure secure transmission of Information between the Privacy Network and its' Attribute Authority Request Interface, including an assessment of the LexisNexis Accurint Connector.

e) Authorized Purposes of Use of Attributes Received

Attribute Authority (LexisNexis) agrees that Information received from Attribute Requestor (Aetna) via Privacy Network will be used solely to support "Identity and Attribute Discovery and Validation" as defined in "Trust Model Authorized Uses" with reference Trust Model ID-xxxxx, and will not be used for any other purpose.

f) Authorized Purposes of Use for Attributes Delivered

Attribute Authority (LexisNexis) agrees that it authorizes the following Authorized Purposes of Use for Information delivered by it to the Privacy Network for Attribute Requestor (Aetna):

"Regulatory Reporting—IRS Section 6055 Reporting" as defined in "Trust Model Authorized Uses" with reference Trust Model ID-xxxxx.

Authorized Recipients for this Purpose of Use include:

"Reporting Entity" (Aetna)

"Privacy Network Operator" (WebShield, Amazon AWS)

"Report Recipient" (IRS)

"Identity and Attribute Discovery and Validation" as defined in "Trust Model Authorized Uses" with reference Trust Model ID-xxxxx.

Authorized Recipients for this Purpose of Use Include:

"Secondary Attribute Authority" (IRS, SSA)

g) Authorized Recipients

Attribute Authority (LexisNexis) agrees that it authorizes Information delivered by it to the Privacy Network may be routed to the following authorized entities, and that this Information may be used by them for the following Authorized Purposes:

Attribute Requestor (Aetna) is an Authorized Recipient as the "Reporting Entity" as defined in "Regulatory Reporting—IRS Section 6055 Reporting"

Privacy Network Operators (WebShield, Amazon, etc.) are Authorized Recipients as "Privacy Network Operators" as defined in "Regulatory Reporting—IRS Section 6055 Reporting".

Secondary Attribute Authorities (i.e. IRS, SSA) are Authorized Recipients as "Attribute Authorities" as defined in "Identity and Attribute Discovery and Validation"

IRS is an Authorized Recipient as "Report Recipient" as defined in "Regulatory Reporting—IRS Section 6055 Reporting"

h) Authorized Requestors

Attribute Authority (LexisNexis) agrees that Attribute Requestor (Aetna) is an Authorized Requestor as defined in "Regulatory Reporting—IRS Section 6055 Reporting", and shall be added to the "WebShield Privacy Network Authorized Requestor White-List".

i) Payment and Commercial Terms

Attribute Authority (LexisNexis) agrees and will adhere to the payment and commercial terms Trust Model™ Payment and Commercial Terms", with reference Trust Model ID-xxxxxx, and to the pricing and payment schedule specified in Addendum Y.

j) Security Incident Report Service

Attribute Authority (LexisNexis) agrees it will report to the "Security Incident Report Service" of the Attribute Requestor (Aetna) and the Privacy Network Operator (WebShield) any unauthorized use or disclosure of information received from Attribute Requestor via the Privacy Network, as well as any material security incident involving systems or processes that store or process information received from the Privacy Network.

The reporting duties, criteria, processes, and formats are specified by "Trust Model™ Reportable Events" with reference Trust Model ID-xxxxxx.

5.1 Summary of Trust Criteria for Attribute Requestor (Aetna) in Use of Attribute Authority's (LexisNexis) Information for "Regulatory Reporting—IRS Section 6055 Reporting"

a) Validation of Privacy Network

Attribute Requestor (Aetna) agrees to ensure that it is connected with the correct Privacy Network Connector by at least two of the following mechanisms:

Connect via mutually authenticated TLS, and validate SAFE BioPharma-signed WebShield Privacy Network certificate.

Control access to Attribute Requestor's Online Systems with UserName-Password combination.

Restrict access to IP addresses on Privacy Network white-list for Attribute Requestor (Aetna)

Attribute Requestor (Aetna) confirms that Attribute Requestor Connection Parameters (URL, IP address, Certificates, etc.) stored in the WebShield Trust Graph (initially in GitHub repository) for the Attribute Requestor's Online Systems are valid and correct.

b) IT Interoperability—Specification of Schema Standard

Attribute Requestor (Aetna) agrees that interactions between it's Online Systems and the corresponding Privacy Network Connector (TBD) shall conform to the Interface Definition documented in the WebShield Trust Graph (initially in GitHub repository):

Attribute Requestor (Aetna) agrees that it will make a commercially reasonable effort to confirm that the Privacy Network Connector correctly maps the Attribute Requestor Online Systems Interface (TBD) into the WebShield Trust Model Vocabulary Standard—Identity SIM", with reference Trust Model ID-xxxxxx.

Attribute Requestor (Aetna) agrees to notify its' designated Privacy Network Operators (WebShield) in advance of any changes to that schema and/or software interface that may impact the correct functioning of the Privacy Network Connector or other related components, and coordinate with them to test the new configuration to confirm it functions properly.

c) Identity & Attribute Matching Assurance Acceptance

Attribute Requestor (Aetna) agrees that it has reviewed the standard practices for identity and attribute matching and validation by Authorized Attribute Authorities as defined in WebShield Trust Model Identity Matching Assurance Standard—Level A Rating" with reference Trust Model ID-xxxxxx, and has made a good faith determination that those practices are sufficiently robust given the intended "Purposes of Use" for any given request.

d) IT Security Assurance Criteria

Attribute Requestor (Aetna) attests that the IT Systems and Security Practices relied upon to ensure the security and enforce access control rights in support of the terms of this Agreement have been assessed for compliance with commercially reasonable IT security requirements, and that such assessment is consistent with "Trust Model IT Security Assurance Criteria—Level A Rating", with reference Trust Model ID-xxxxxx.

Level A Rating is defined as consistent with being assessed for compliance with the relevant IT security control standards as defined in NIST SP-800-53, ISO 27001 or equivalent IT security audit frameworks by an accredited registrar or other comparable assessor.

Attribute Requestor (Aetna) attests that the encryption/tokenization and key management infrastructure and practices relied upon to protect Information sent and received to the Privacy Network pursuant to this agreement satisfy "Trust Model IT Security Assurance Criteria—Level A Obfuscation" as specified in Trust Model ID-xxxxx.

Attribute Requestor (Aetna) attests that the access control and authorization infrastructure and practices relied upon to ensure compliance with Authorized Purposes of Use criteria for Information sent and received to the Privacy Network pursuant to this agreement satisfy "WebShield Trust Model IT Security Assurance Criteria—Access Control" as specified in Trust Model ID-xxxxx.

Attribute Requestor (Aetna) attests that it has followed its' normal and commercially reasonable practices in verifying the IT security robustness of the infrastructure and practices that ensure secure transmission of Information between its Online Systems and their corresponding Privacy Network Connectors.

e) Authorized Purposes of Use for Information Received

Attribute Requestor (Aetna) agrees that Information received from Attribute Authority (LexisNexis) via Privacy Network will be used solely to support "Regulatory Reporting—IRS Section 6055 Reporting" as defined in "Trust Model Authorized Uses" with reference Trust Model ID-xxxxx, and will not be used for any other purpose.

Attribute Requestor (Aetna) agrees it will limit use of Regulated Data so as to comply with the applicable legal and regulatory constraints associated with the Data Source and Purpose of Use specified by each Attribute Authority. Such constraints are enumerated in "WebShield Trust Model—Regulatory Compliance Taxonomy" with reference Trust Model ID-xxxxx, and the necessary provisions are included in the following agreements:

LexisNexis Master Terms and Conditions LNMTC (GLB Financial Privacy Rule)

Non-FCRA Addendum to LNMTC (Fair Credit Reporting Act)

f) Authorized Purposes of Use for Attributes Delivered

Attribute Requestor (Aetna) agrees that it authorizes the following Authorized Purposes of Use for Information delivered by it to the Privacy Network:

"Identity and Attribute Discovery and Validation" as defined in "Trust Model Authorized Uses" with reference Trust Model ID-xxxxx.

Authorized Recipients for this Purpose of Use Include:

"Privacy Network Operator" (WebShield, Amazon AWS)

"Attribute Authority" (LexisNexis, IRS, SSA)

g) Authorized Recipients

Attribute Requestor (Aetna) agrees that it authorizes Information delivered by it to the Privacy Network may be routed to the following authorized entities, and that this Information may be used by them for the following Authorized Purposes:

Attribute Authorities (LexisNexis, IRS, SSA) are Authorized Recipients as "Attribute Authorities" as defined in "Identity and Attribute Discovery and Validation"

Privacy Network Operators (WebShield, Amazon, etc.) are Authorized Recipients as "Privacy Network Operators" as defined in "Regulatory Reporting—IRS Section 6055 Reporting".

h) Payment and Commercial Terms

Attribute Requestor (Aetna) agrees and will adhere to the payment and commercial terms Trust Model™ Payment and Commercial Terms", with reference Trust Model ID-xxxxxx, and to the pricing and payment schedule specified in Addendum Y.

i) Security Incident Report Service

Attribute Requestor (Aetna) agrees it will report to the "Security Incident Report Service" of the Attribute Authority (LexisNexis) and the Privacy Network Operator (WebShield) any unauthorized use or disclosure of information received from Attribute Authority via the Privacy Network, as well as any material security incident involving systems or processes that store or process information received from the Privacy Network. The reporting duties, criteria, processes, and formats are specified by "Trust Model™ Reportable Events" with reference Trust Model ID-xxxxxx.

Unified Trust Model for Healthcare Overview

The WebShield Unified Trust Network for Health Promises to Enable Unprecedented Capabilities, Including:

Convenient on-demand access by any patients, clinicians, provider organizations, payers, caregivers, and clinical researchers on a national scale.

Open, vendor and technology neutral Trust Network architecture that connects and interoperates with disparate health information and data systems, technologies, products, standards, and healthcare networks.

Flexible and extensible policy model that enables participants to independently specify and personalize their policy preferences from a range of flexible options pre-vetted for regulatory compliance and reasonableness. This will give participants fine-grained control over security and privacy enforcement, protect them from legal liability, offer control of how their data or the ability to interact with their networks of business associates and patients can be used by others, and to define the contractual and payment terms and conditions for such uses.

Neutral cloud-based governance and policy enforcement, independent certification of regulatory compliance, and robust contractual protection against privacy liability for both patient and provider messaging and health information sharing.

Self-funding business model supporting free adoption and use by any clinicians, staffs or patients via a wide array of value-added third party healthcare services and solutions, including e-referrals, coordination of care, medication therapy management, clinical trials recruitment, ACO administration, fraud prevention, etc.

The key to the Trust Network's ability to enable low-friction sharing and interoperability is the WebShield Unified Trust Model. The Trust Model is anchored by neutral "Trust Authorities", which are certified cloud services able to enforce access and privacy policies specified by users and organizations across the entire network.

Trust Authorities make it possible to for any Trust Network participant to confidently and conveniently access or share information with other participants, without forcing them to trust each other directly, fear compliance liability, agree on policies, assess each other's enforcement mechanisms, or even know each other. This in turn enables access to sensitive resources without requiring consensus on uniform policies, thereby removing a huge barrier that has been an obstacle to large-scale data sharing for clinical treatment, research and operations use.

This will translate into widespread benefits for patients, providers and the healthcare system as a whole, including improved health outcomes, lower costs, better security, enhanced privacy, reduced fraud, improved reimbursement, and streamlined administrative processes.

Healthcare Trust Authority—the "Root of Trust"

The development, deployment and operation of Trust Authorities as part of the Trust Network would be a collaborative ecosystem-wide initiative designed to be policy, technology and vendor neutral. A key design goal is to enable participating individuals and organizations to independently control their own policy choices, and to support decentralized evolution of policy definitions, technology and trust criteria. Enabling this degree of openness and diversity while still ensuring robust policy enforcement and interoperability requires that a widely accepted "root of trust" for governance and ecosystem development.

In order to support patient-centered care management on a national scale, the TrustNetwork must have an unprecedented ability to allow diverse people and organizations to independently specify their policy and technology choices, to share data with others that they don't know, while at the same time rigorously enforcing the diverse and changing policies and regulatory compliance and trust requirements of all participants. Moreover, given the privacy sensitivities in healthcare and the need to support changing practice patterns and technology, the implementation of the Trust Model and the Trust Network must be able to evolve over time without "breaking" the security and privacy of the people and organizations that rely upon it.

Unfortunately, these requirements are incompatible with traditional enterprise application architectures, and with traditional enterprise-centric approaches to verifying regulatory compliance. The problem is that enterprise application architectures assume consistency and centralized coordination of just about everything—data models, identity schemes, business practices, technology infrastructure, etc. Privacy and security policies are often poorly understood and ambiguous, and enforcement is implicitly embedded across fragmented software systems, legal agreements and user training.

Implementing robust enforcement with this approach is very difficult within single organizations. Attempting to impose centralized coordination, consensus and consistency across diverse organizations and people that don't know or trust each other or agree on technologies, practices or policies is far more difficult.

The Trust Network takes a fundamentally different approach that is perfectly suited to this challenge. It is architected like the Internet and the web, with inherent support for diversity, decentralization, personalization and change built in from the ground up.

The overall Trust Network is organized into layers with distinct roles, each with parallel taxonomies of different types, as follows:

- The Policy Definition Taxonomy describes in metadata and supporting documentation the high-level intent and enforcement requirements of policy profiles, along with configuration options they support, collectively referred to as artifacts. Instead of assuming consistency, it can accommodate an organically growing taxonomy of disparate policy profiles that supports the diverse and changing real-world requirements of the healthcare system and patient preferences.
- The Policy Enforcement Model consists of a metadata description that classifies and characterizes modular policy neutral Trust Network enforcement mechanisms—software services, legal agreement templates and user training content—that can be dynamically combined and configured via metadata to satisfy the enforcement requirements of any policy profiles and options defined in the Policy Definition Taxonomy. Since enforcement mechanisms are classified by their functions and capabilities as opposed to the details of their implementation and deployment, the Policy Enforcement Model enables consistent enforcement of policies across disparate organizations, vendors, technologies, trust authorities and practice patterns.
- The Trust Resource Model consists of software services, cloud hosting, legal agreements and trust authorities that actually enforce policies between specific organizations and people by authenticating users, verifying credentials and relationships, documenting consent or authorization, maintaining audit records, establishing enforceable legal agreements, educating users on appropriate usage, etc. This is where the policy rubber meets the road.
- The Trust Validation Model spans all of these layers, and consists of various trust rating schemes and assessment and certification methodologies. These provide a way to explicitly express trust criteria required by different stakeholders, and to verify that specific artifacts or collections of artifacts satisfy them. The Trust Validation Model, like the Policy Definition Taxonomy, imposes no constraints on what trust criteria or assessment methodologies can be applied. There is no need for organizations and individuals to uniformly agree on what is necessary to establish trust. Multiple trust frameworks sponsored by different organizations can co-exist and be relied upon by different stakeholders specifying disparate policies for the same resources, without any assumption of coordination or consensus.

Figure 14:
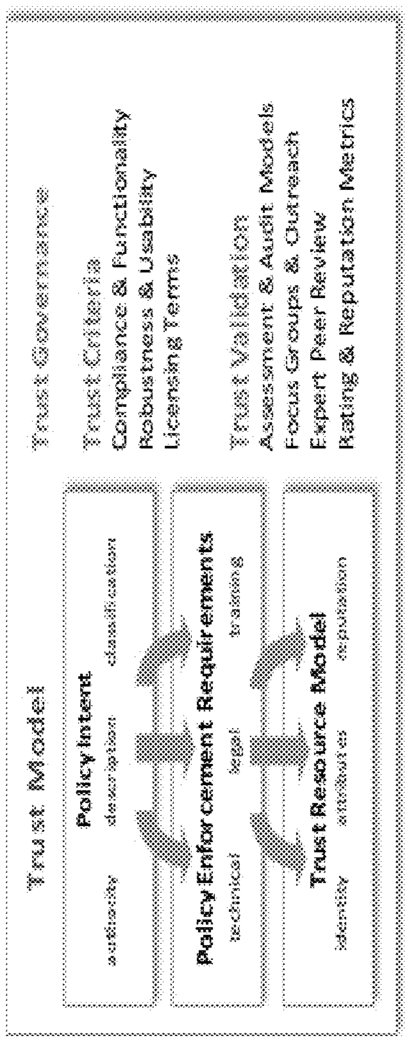
FIG. 14 illustrates a block diagram of an embodiment of a trust model.

With reference to FIG. 14, the Trust Model explicitly models relationships between and among the different layers, representing them as links or mapping criteria that connect nodes of the linked metadata that defines or annotates the taxonomies and artifacts. This metadata specification of relationships is an integral part of the definition of a policy profile, making it possible to trace the complete definition and implementation of a specific policy profile—e.g. "HIPAA compliant access for clinical treatment purpose"—from policy intent all the way to runtime execution, combined with the assessment and audit methodologies that required by the various stakeholders.

Thus, the Trust Network mirrors the architecture of the Internet and the web, in that each time a policy profile is relied upon to authorize access to information or application functionality, what is being trusted is a distributed network of diverse metadata, software services, hardware infrastructure, organizational authorities, legal agreements, trust rating assessments, and people. In addition, as with the web, the specific combination of artifacts relied upon will generally be different every time, varying based upon the interactions of the information, people, organizations and systems involved.

Taken together, Trust Model artifacts will be diverse, decentralized, developed by different vendors, interdependent, and with control and execution scattered across different organizations and trust authorities. Moreover, the specific end-to-end combination involved in enforcing any given invocation of a policy profile is discovered only at execution time. In addition, the policy requirements and preferences independently specified by multiple stakeholders (the user, the patient, regulators, administrators for the organizations that either release or receive information, vendors that provide enabling services, trust authorities defining and vetting policies and assessment methodologies, etc.) will have to be enforced simultaneously in order to authorize any given authorization request.

The Trust Model incorporates clean interoperability abstraction layer between the diverse and changing policy profiles defined in the Policy Definition Taxonomy, and the diverse and changing enforcement mechanisms in the overall Trust Network. This enables four compelling and unique capabilities:

Allows policy profiles to be properly enforced end-to-end across the Trust Network on a global scale, spanning disparate regulatory jurisdictions, organizations, systems, processes, activities and people.

Allows the implementation of a policy profile to be personalized for a specific user, purpose of use, and usage context (e.g. the device, location, and role or activity of the user) to conform to the diverse trust requirements and policy preferences of the various stakeholders, including the user, the subject of the record, and relevant organizations and regulatory authorities.

Allows diverse policy profiles specified by multiple stakeholders to be simultaneously enforced in a way that is simple and convenient for the end-user and manageable for organizations involved.

Allows policy definitions, technology implementations and contractual terms to evolve over time without "breaking" agreements or undermining the robustness of security and privacy protection.

Supports interoperation and connectivity with any legacy systems, infrastructure, or policies, and supports continuous decentralization innovation and diversity. The model is so open, fine grained and flexible, it can incorporate any trust framework, any infrastructure, or any resource or standard.

It's worth stating that it is not necessary to develop a Trust Network and Trust Model from scratch. Existing software products, technology standards, legal and regulatory compliance processes, legal agreements and compliance assessment methodologies drawn from the traditional enterprise-centric ecosystem can be repurposed, refactored or incorporated as is to populate much of the Trust Network and Trust Model.

The key is to re-organize and incorporate such artifacts into a unified model explicitly defined in metadata, and whose organizing principles assume decentralization, diversity, and individual control—essentially the opposite of the enterprise—centric paradigm. In many cases existing artifacts (e.g. software products, technology standards, identity matching services) can be assimilated as is, just by adding metadata to make explicit the function they play within policy profiles, how they relate to other artifacts, and trust validation and provenance information. In other cases these artifacts will need to be modified to support the decentralized paradigm, or have their interfaces "wrapped" to so that they can be dynamically connected and configured via the same configuration preferences model as other Trust Model artifacts.

A privacy network and unified trust model for privacy preserving computation and policy enforcement can be implemented described with reference to FIGS. 1-4. With reference to FIG. 1, a first time user must opt-in to privacy policies in order to unlock obfuscated data and allow access protected content (e.g. a football game). The user can accept a privacy protection policy by checking a user interface box. The user can click on the show policies button to display the privacy protection policies. Checking the box causes the user to authorizes the use of obfuscated data to: authenticate user and verify attributes and relationships, anonymously detect user devices, analyze activity to detect identity theft & cyber-security fraud, locate and authorize access to user's records, accounts and digital media, and enforce user-controlled security, privacy and personalization policies. In an embodiment, the user interface can include an "explain" button. By clicking the "explain" button, the user interface can display various security features including: robust identity theft protection with multi-factor authentication and identity proofing, user's identity, personal data and activity hidden so that no insider has access by the privacy network or anyone. The personal information is only revealed if access is authorized by the user. The privacy, security and personalization policies subject to control by user and subject of records.

Figure 2:
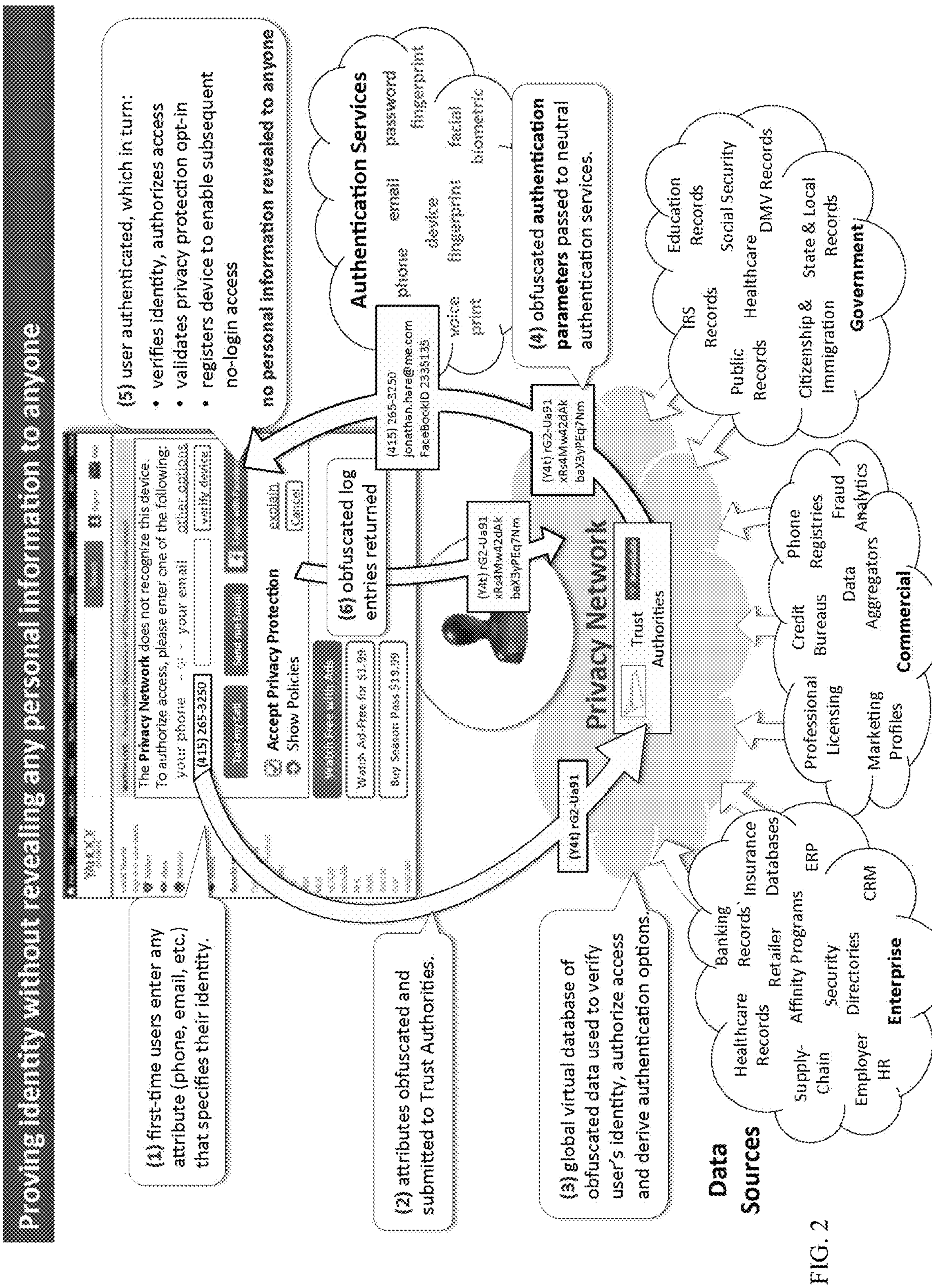
FIG. 2 illustrates an embodiment of an opt-in flow chart of service server and privacy network interaction.

When a user checks the "accept privacy protection" box, the user interface can ask a user for a phone number or email address. With reference to FIG. 2, an embodiment of a service server process for using privacy network and unified trust model for privacy preserving computation and policy enforcement is illustrated. In this example, the user has input a user phone number (415) 365-3250, which is the user attribute to a service server. The system can obfuscate the attribute, which is transmitted to the privacy network. In this example, the obfuscated phone number attribute is "(Y4t) rG2-Ua91" which is transmitted to trust authorities to a privacy network. A global virtual database of obfuscated data used to verify a user's identity, authorize access and derive authentication options. The obfuscated authentication parameters passed to neural authentication services. A user is authenticated which in turn verifies a user identity and authorizes access, validates privacy protection opt-in and registers device to enable subsequent no-login access to a service server. No personal information is revealed. Obfuscated log entries are returned to the privacy network.

Figure 3:
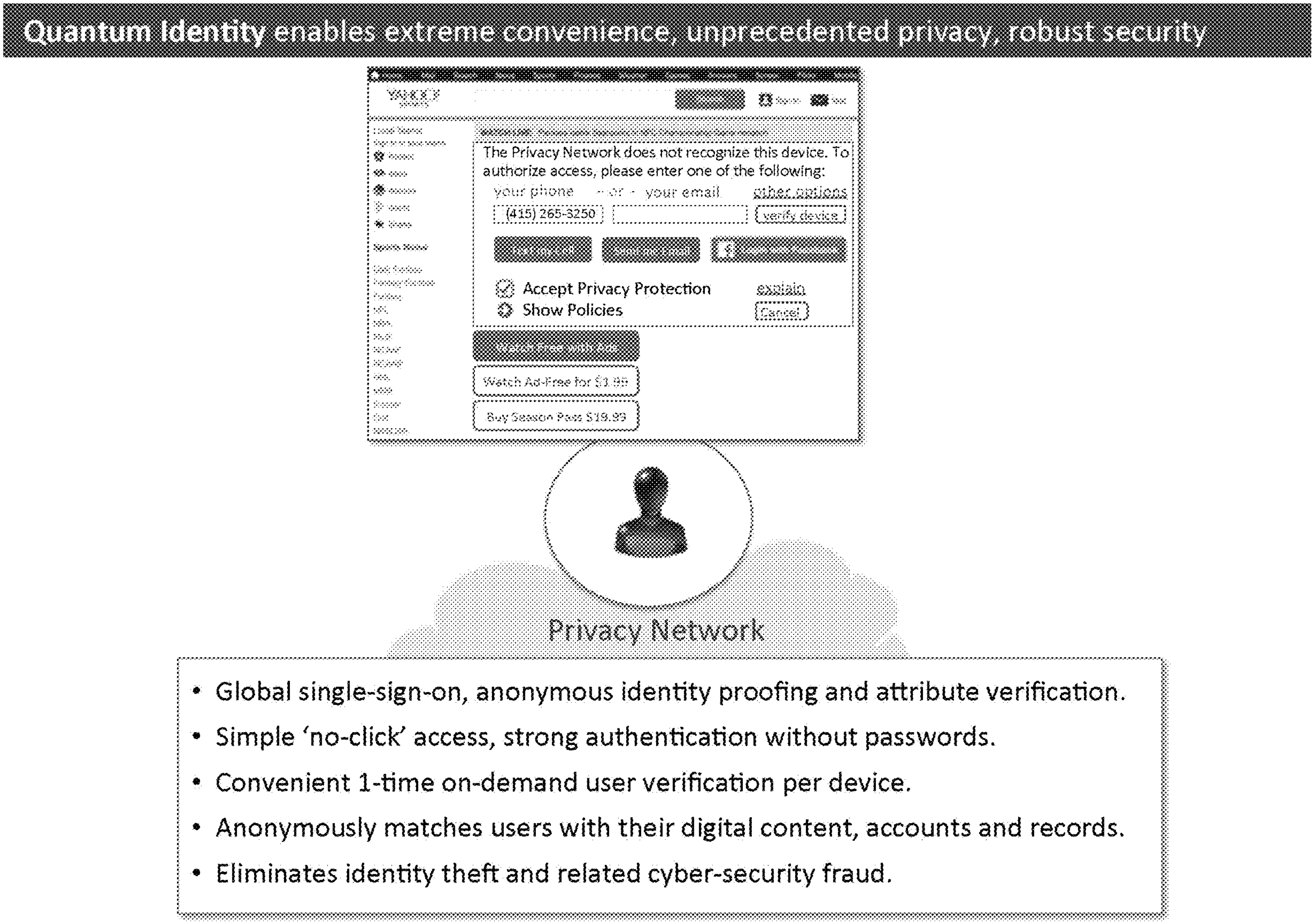
FIG. 3 illustrates a screen shot of an embodiment of a privacy network opt-in user interface.

With reference to FIG. 3, the privacy network provides a global single-sign-on, anonymous identity proofing and attribute verification, a simple 'no-click' access with strong authentication without passwords, convenient 1-time on-demand user verification per device. The privacy network anonymously matches users with their digital content, accounts and records. The privacy network also eliminates identity theft and related cyber-security fraud.

With reference to FIG. 4, the service provider user interface can display a message to users after he or she opts-in to the privacy network that they are being protected by the privacy network. The individuals can control their own personal policies that are enforced globally on records and accounts held by any participating publisher, organization or online service. The privacy network enables consumers to assert their legal rights to access and share their healthcare (HIPAA), education (FERPA), financial and government records. In this example the privacy network can have a user interface that allows users to edit their policies. In this example, the user interface allows a user to retrieve records from their personal health network. A user can allow the system to find and request copies of their health records and store them in a user selected electronic file. The user can configure the system to allow healthcare providers to access personal health network whenever they are treating the user as long as they agree to enforce HIPAA or only if they have the user's express consent. In an emergency, emergency room and ambulance staff may access the user's complete personal health record network, access only critical health information or not access the user's personal health vault even if the user's life is in jeopardy. The user can also configure the system to notify the user when anyone accesses the user's health records, when the user records are accessed by someone not on a user's list of authorized providers or not provide any notifications.

Figure 5:
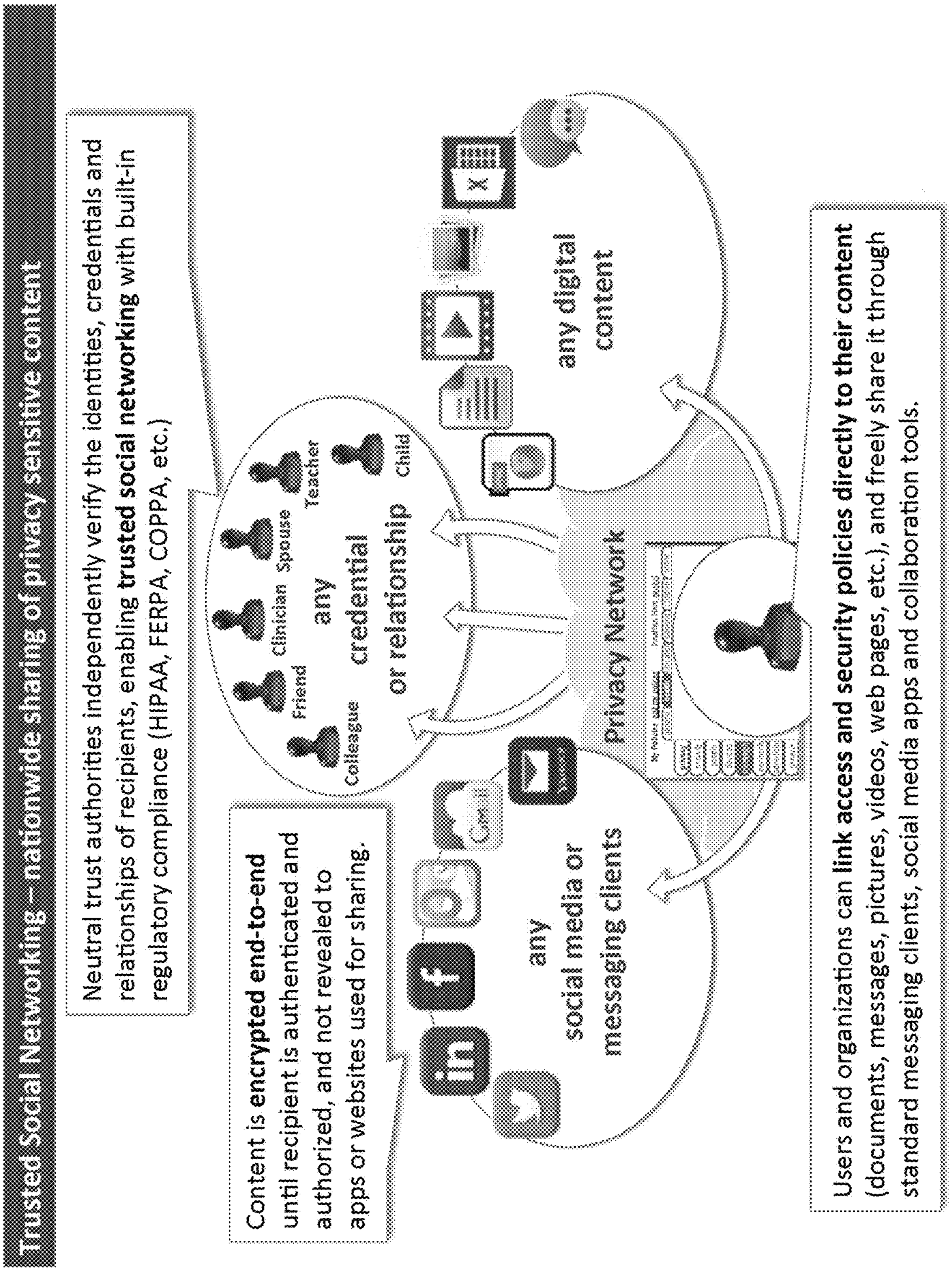
FIG. 5 illustrates a block diagram of privacy network sharing of private sensitive content with service servers.

FIG. 5 illustrates a block diagram of a trust social network system. A privacy network system users can link access and security policies directly to their content which can include documents, messages, pictures, videos, web pages, etc. and freely share this content through standard messaging clients, social media apps and collaboration tools. For any social media or messaging clients, the user content can be encrypted end-to-end until the recipient is authenticated and authorized. The content is not revealed (decrypted) to the apps or websites used for the content sharing. For any credential or relationship communication the neutral trust authorities can independently verify the identities, credentials and relationships of recipients, enabling trusted social networking with built-in regulatory compliance such as HIPAA, FERPA, COPPA, etc. The privacy network can also be used with any digital content access.

Figure 6:
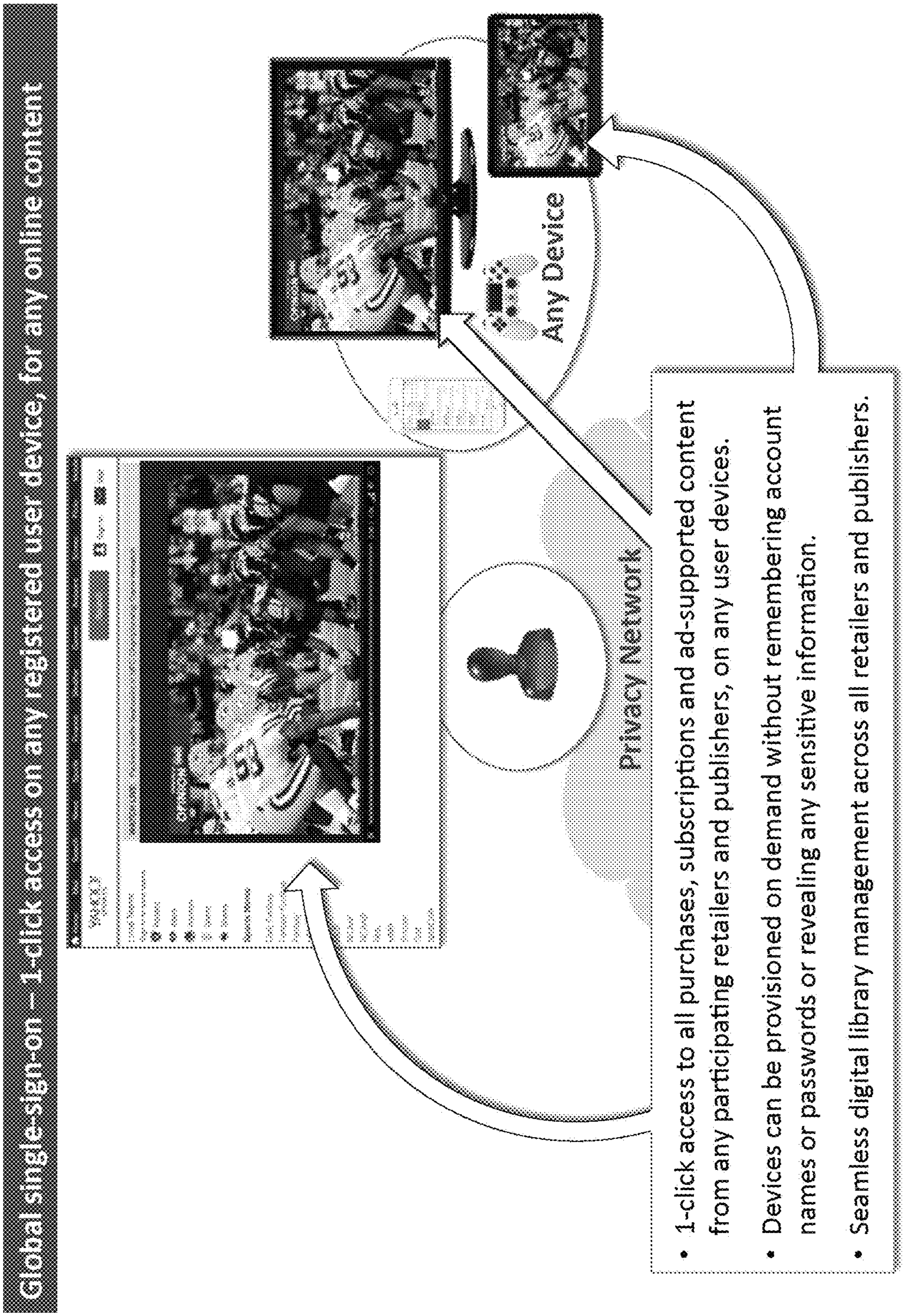
FIG. 6 illustrates a block diagram of an embodiment privacy network having 1-click access to registered user devices.

FIG. 6 illustrates a global single sign-on 1-click access on any registered user device for accessing any online media content. 1-click access to all purchases, subscriptions and advertising supported content from any participating retailers and publishers, on any user devices. Devices can be provisioned on demand without remembering account names or passwords or revealing any sensitive information. The privacy network can provide seamless digital library management across all retailers and publishers.

Figure 7:
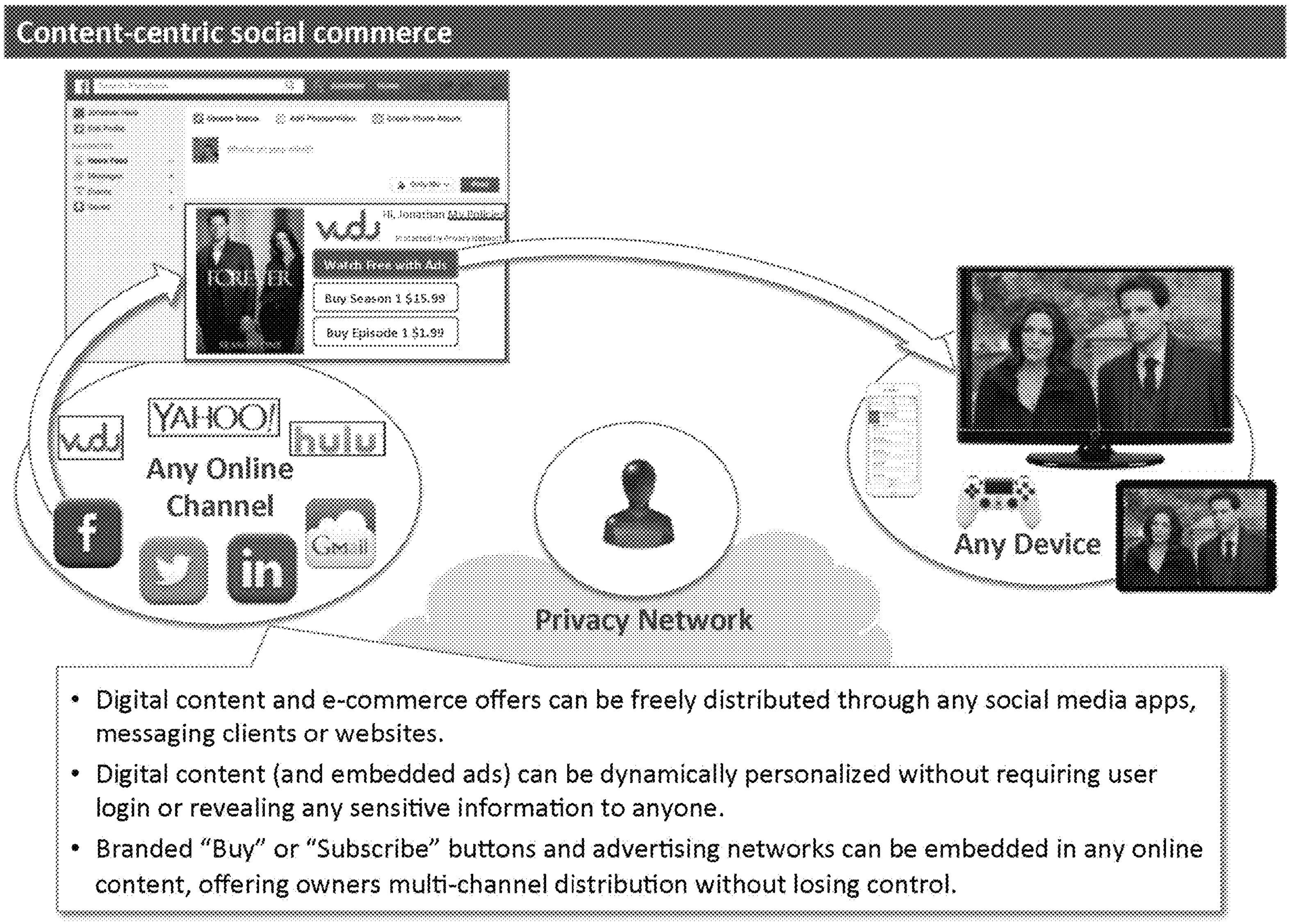
FIG. 7 illustrates a block diagram of an embodiment of a privacy network with content provider servers and registered user devices.

FIG. 7 illustrates a block diagram of an embodiment of a privacy network with content provider servers and registered user devices. In an embodiment, digital content and e-commerce offers can be freely distributed through any social media apps, messaging clients or websites. The digital content and embedded ads can be dynamically personalized without requiring user login or revealing any sensitive information to anyone. The system can display branded "buy" or "subscribe" buttons in the displayed content user interface and the advertising networks can be embedded in any online content, offering owners multi-channel distribution without losing control.

Figure 8:
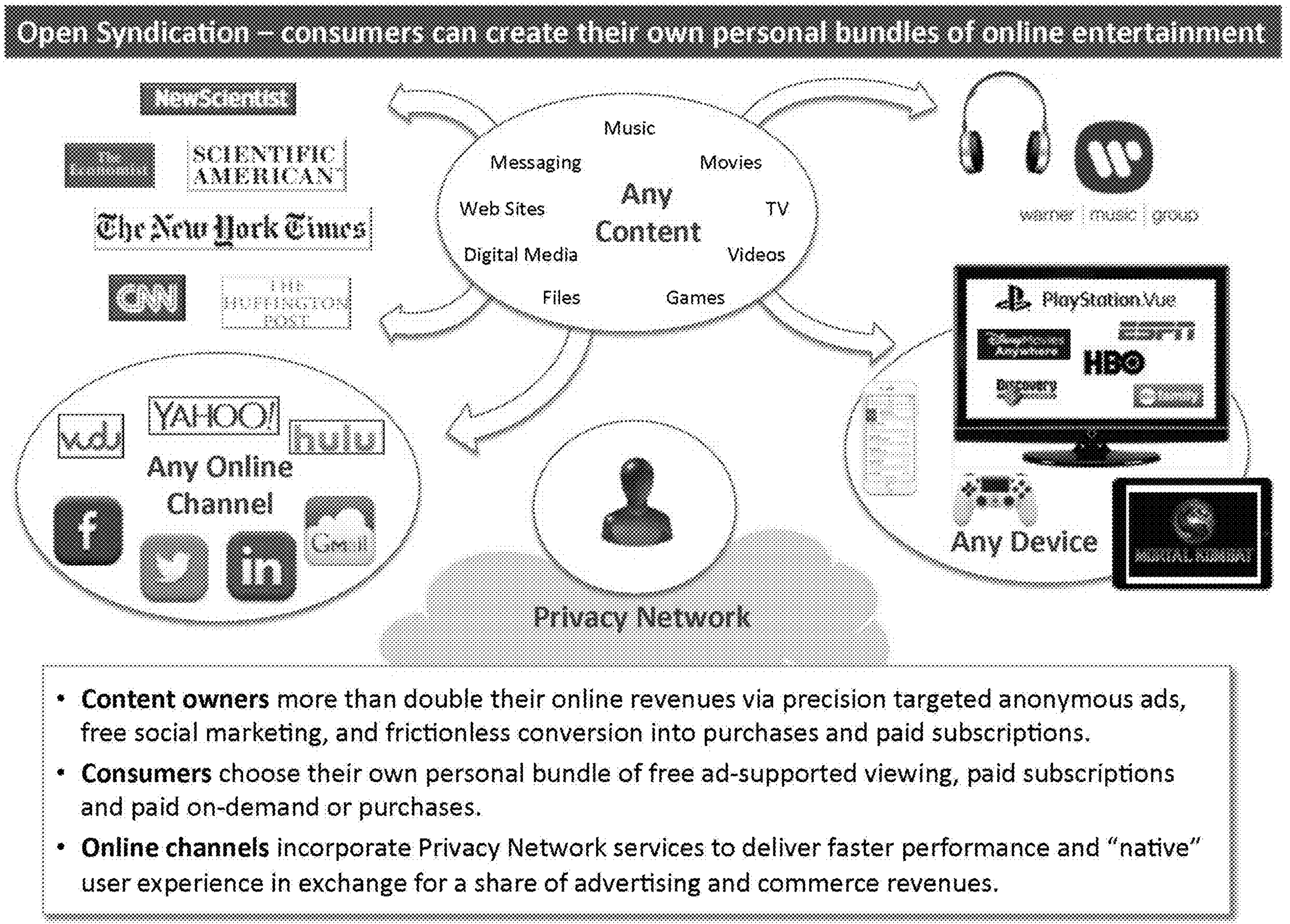
FIG. 8 illustrates a block diagram of an embodiment of a privacy network that allows users to create personalized bundles of content with content provider servers and registered user devices.

FIG. 8 illustrates a block diagram of an embodiment of a privacy network for "open syndication" that allows users to create personalized bundles of content with content provider servers and registered user devices. Content owners can increase their online revenues by precisely targeting anonymous ads, free social marketing and frictionless conversion into purchased and paid subscriptions. Consumers can choose their own personal bundles of free ad-supported viewing, paid subscriptions and paid media on-demand or purchases. The online media channels can incorporate the privacy network services to deliver faster performance and "native" user experience in exchange for a share of advertising and commerce revenues.

FIG. 9 illustrates a block diagram of an embodiment of a privacy network that includes a syndication marketplace that can pool resources to create value-added services. The syndication marketplace can include a payment syndicate, an identity syndicate and a trust syndicate. These syndicates can enable an open marketplace that can bootstrap to a self-funding ecosystem of value-added syndicates and networks. The trust syndicates can enable neutral cloud-based policy enforcement and eliminates the need for consensus on policies, regulations, practices and technology. The identity syndicates enable record linking, authentication, proofing and authorization or people, organizations and devices on a global basis. The payment syndicates can anonymously meter activities, enforce payment and syndication terms, settle transactions and allow users to make payments.

Figure 10:
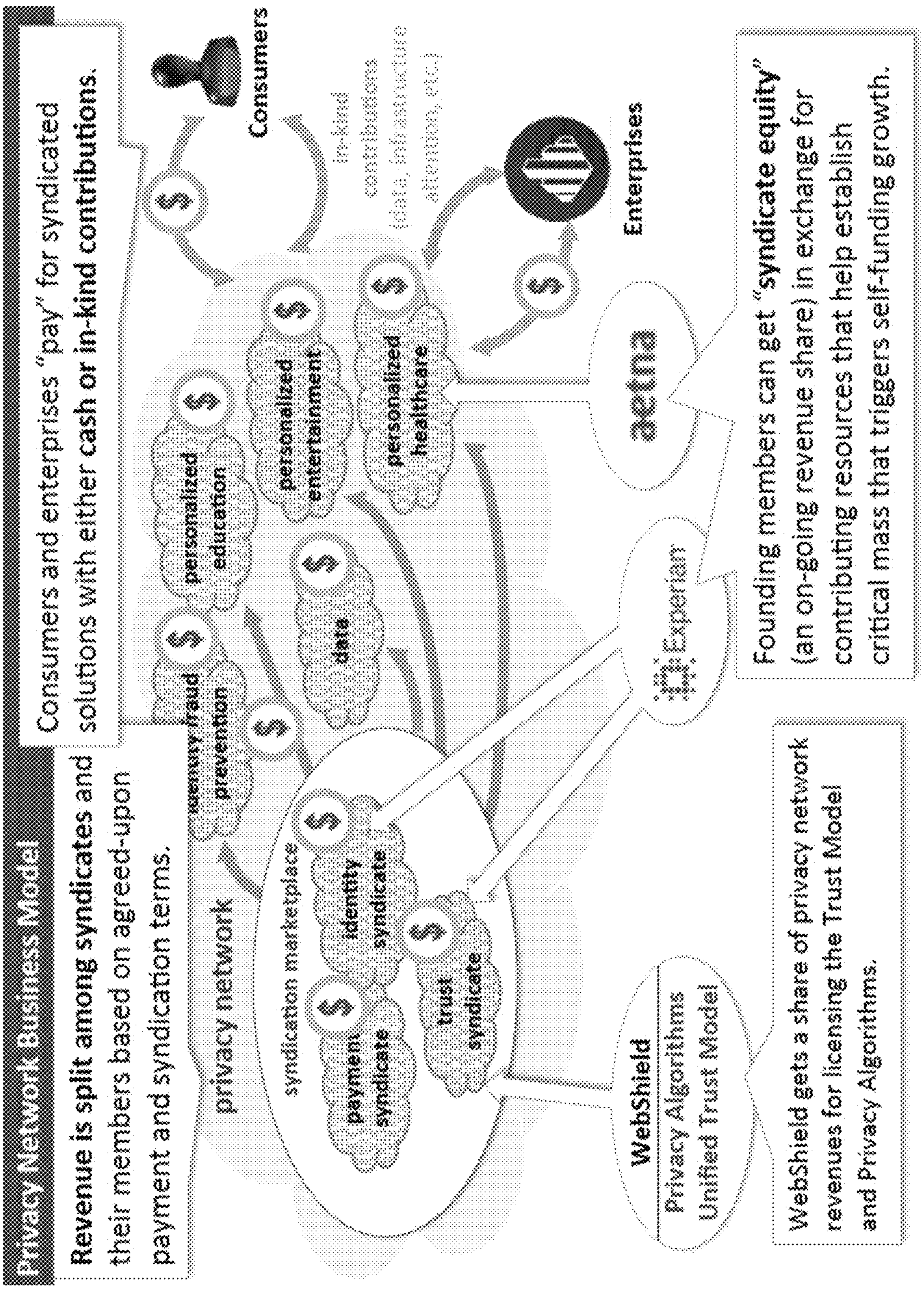
FIGS. 10 and 11 illustrate block diagrams of embodiments of privacy network business models.

FIG. 10 illustrates a block diagram of an embodiment of a privacy network business model. For example, the privacy network provider, the payment syndicate, the identity syndicate and the trust syndicate can each share in the revenues obtained from members. In an embodiment, the privacy network can allow revenue splitting among syndicates and their members based upon agreed-upon payment and syndication terms. The privacy network provider can receive a share of the privacy network revenues for licensing the trust model and privacy algorithms. Founding members can receive "syndicate equity" which can be an on-going revenue sharing plan in exchange for contributing resources that help establish critical mass that can trigger self-funding growth. The consumers of the services and enterprises can pay for syndicated solutions with cash payments or in-kind contributions to the privacy network members.

Figure 11:
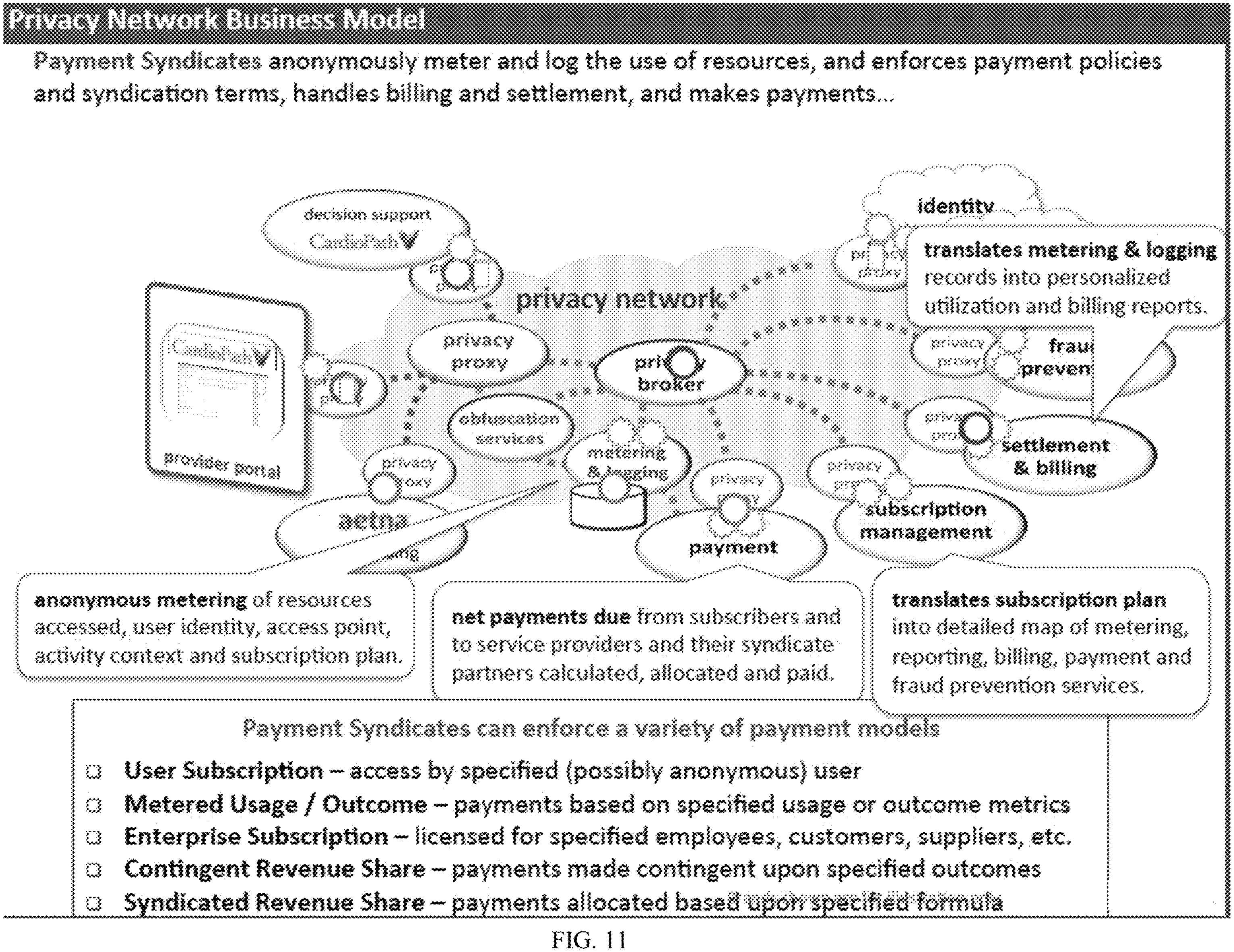

FIG. 11 illustrates a block diagram of an embodiment of another privacy network business model. The payment syndicates can anonymously meter and log the use of resources, and enforces payment policies and syndication terms, handles billing and settlement, and makes payments. The privacy network can include various modules including: a privacy broker, obfuscation services, a metering and logging module and privacy proxies. The privacy proxies provide interfaces between the privacy network with other system modules such as decision support, service provider portals, service providers, payment modules, subscription management modules, settlement and billing modules, fraud prevention modules, identity modules, and other modules. In this embodiment the payment syndicates can anonymously meter and log the use of server resources and log the user of these resources. The privacy network can enforce the payment policies and syndication terms, handling of the billings and settlements and making payments for the system services. A metering and logging module of the privacy network can anonymous meter the resources that can be accessed based upon the user identities, the access points, the activity contexts and the subscription plans. A payment module of the privacy network can determine the net payments due from the subscribes to the service providers and their syndicate partners can be calculated, allocated and paid by a payment module of the privacy network. The subscription management module of the privacy network can translate the subscription plan into detailed map of metering, reporting, billing, payment and fraud prevention services. The settlement and billing module of the privacy network can translate the metering and logging records. The payment syndicates can enforce a variety of payment models including: user subscription for access by specified, possibly anonymous users, metered usage and outcome by payments based on specified usage or outcome metrics, enterprise subscriptions for licensed for specified employees, customers, suppliers, etc., contingent revenue share for payment based contingent upon specified outcomes and syndicated review share for payments allocated based upon a specific formula.

Figure 12:
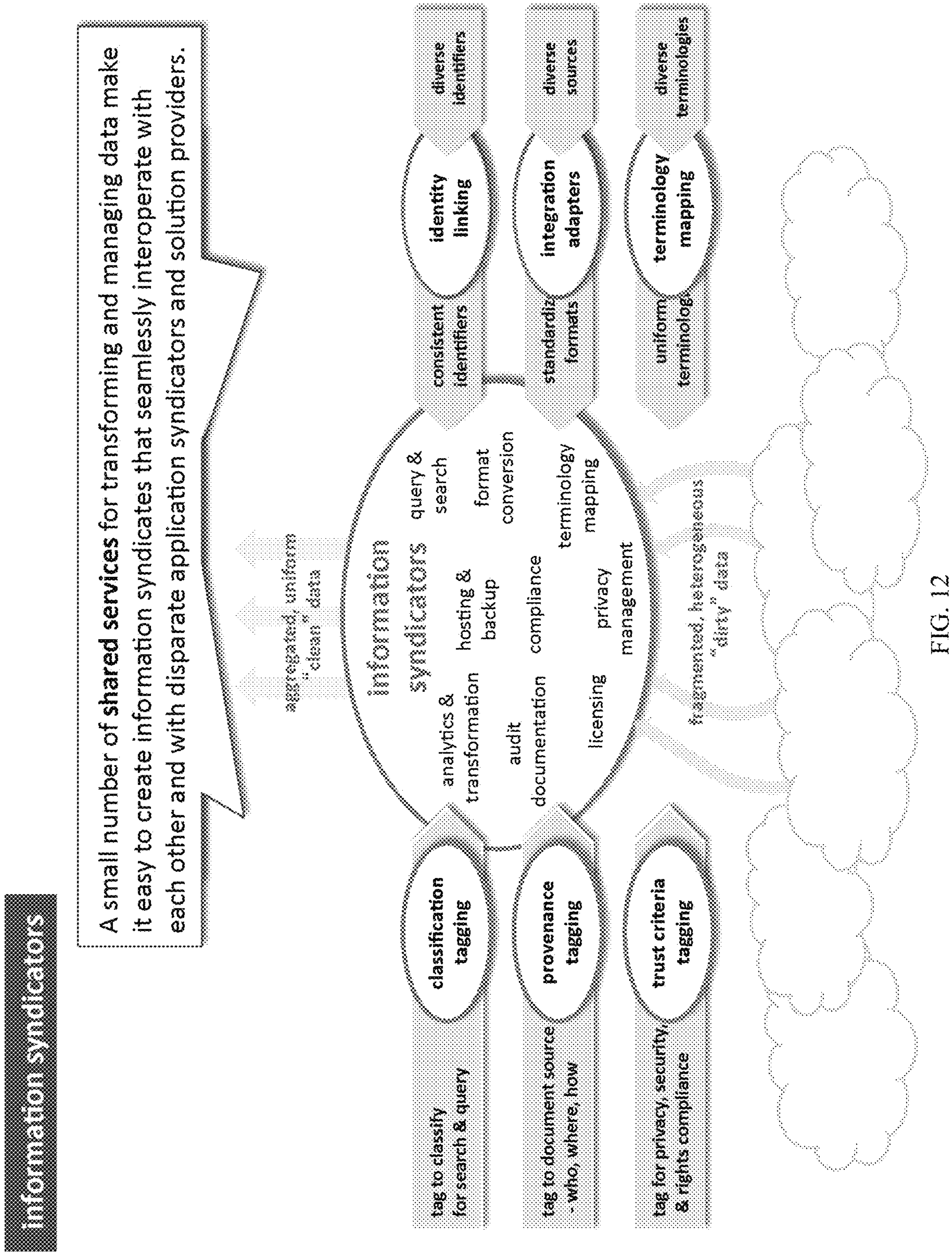
FIG. 12 illustrates a block diagram of an embodiment of a privacy network that includes information syndicators.

FIG. 12 illustrates a block diagram of an embodiment of a privacy network that includes information syndicators. A number of shared services for transforming and managing data can create information syndicates that interoperate with each other and with disparate application syndicators and solution providers. The information syndicators can include various modules including: analytics and transformation, hosting and backup, query and search, audit documentation, compliance, format conversion, licensing, privacy management and terminology mapping. The information syndicators can receive fragmented heterogeneous "dirty" data from information sources through the internet and the information syndicators can product aggregated uniform "clean" data. The system can perform classification tagging. Data can be tagged to classify for the search and query processing. Provenance tagging can be performed were data can be tagged to identify the document source which can identify who, where and how the data was being processed. The system can perform trust criteria tagging by tagging the data for privacy, security and rights compliance. The system can perform identity linking where diverse identities can be converted into consistent identifiers that are received by the information syndicators. The system can perform integration adapters which can receive data from diverse sources and convert this information to standardized formats before being processed by information syndicators. The system can perform terminology mapping where diverse terminologies can be converted into uniform terminologies before being processed by the information syndicators.

With reference to FIG. 13, the privacy network can be used for monitoring patient medication adherence applications while insuring the privacy of patient data. The system can monitor prescription histories to detect prescriptions due but unfilled, or personalized care management analytics. Adherence eligibility models can determine whether intervention is authorized based upon the patient history and payer policies. The adherence selection model can choose interventions based upon the patient profile and sponsor (payer or pharma) policies. The system can engage with patients, providers, pharmacists, and caregivers to implement adherence interventions. The system can include monitoring systems that can be used to detect when prescriptions have been filed. The system can calculate the payments due based upon the subscription terms, allocated to suppliers based upon neural metering services. The system can include a server that analyzes the patient's medication needs, which can access the patient's claim history, and pharmacy records. The system server can communicate with a serer that can select adherence interventions and a patient messaging server which can communicate with client computer devices associated with: clinicians, pharmacists, caregivers and the patient.

FIG. 14 illustrates a block diagram of an embodiment of a trust model. The policy intent can include authority, description and classification information, which is transmitted to the policy enforcement requirements which can include technical, legal and training information. The trust resource model can include a trust governance that include trust criteria including compliance and functionality, robustness and usability and licensing terms. The trust governance can also include a trust validation that includes assessment and audit models, focus groups and outreach, expert peer review and rating and reputation metrics.

Figure 15:
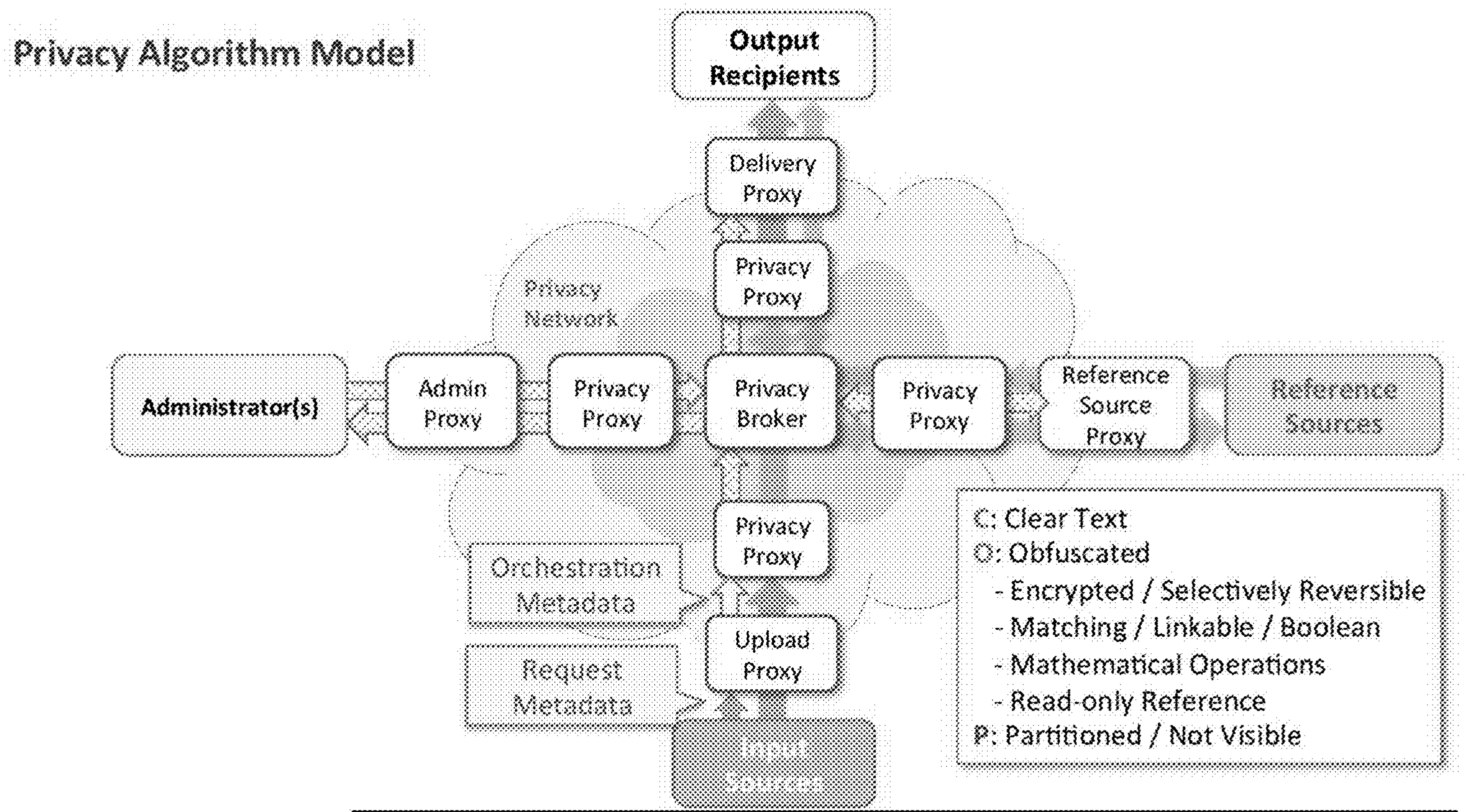
FIG. 15 illustrates a block diagram of an embodiment of a privacy algorithm model.

FIG. 15 illustrates a block diagram of an embodiment of a privacy algorithm model that describes how the privacy network interacts with input sources, administrators, reference sources and output recipients using privacy proxies, and interface proxies. FIG. 15 includes a privacy matrix chart describing the status of information as clear, obfuscated and partitioned and not visible based upon the location and type of data.

Figure 16:
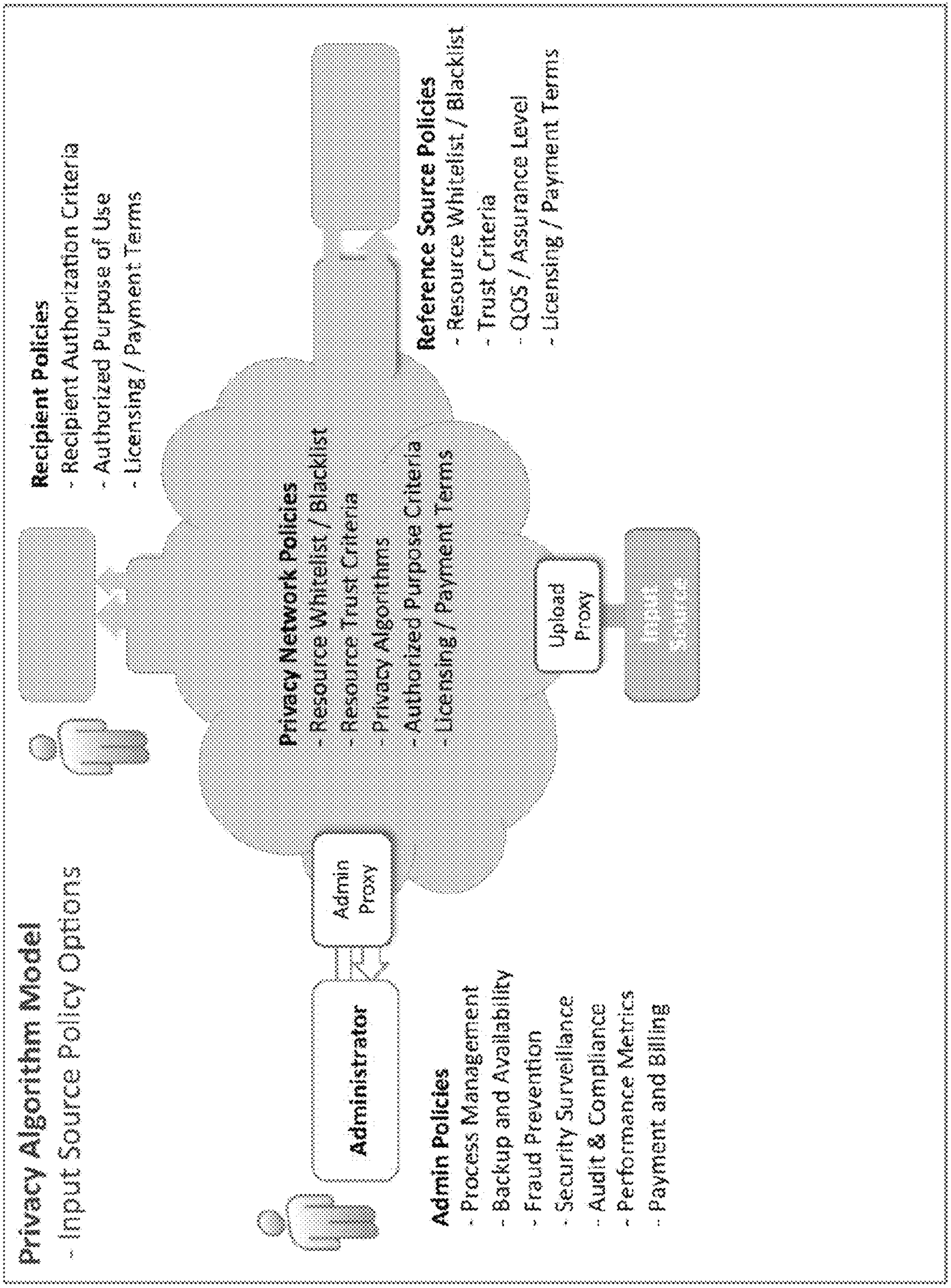
FIG. 16 illustrates a block diagram of an embodiment of a privacy algorithm model with input source policy options.

FIG. 16 illustrates a block diagram of an embodiment of a privacy algorithm model with input source policy options that includes a privacy network with privacy network policies, a administrative proxy for communications with an administrator, an upload proxy for interaction with the input source, recipient policies for recipient data and reference source policies for reference source inputs.

Figure 17:
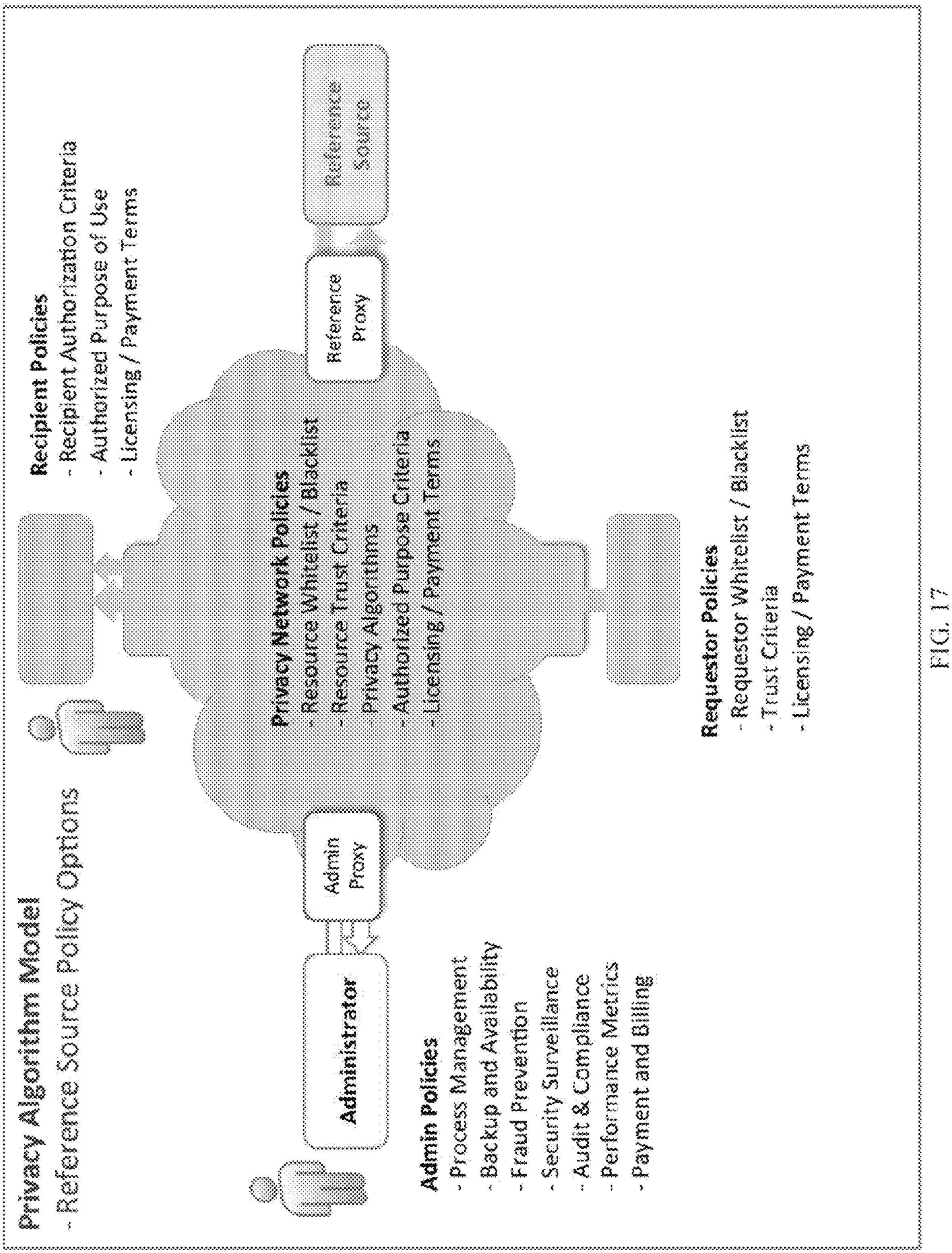
FIG. 17 illustrates a block diagram of an embodiment of a privacy algorithm model with reference source policy options.

FIG. 17 illustrates a block diagram of an embodiment of a privacy algorithm model with reference source policy options that can include a reference proxy for communications between the privacy network and the reference source.

Figure 18:
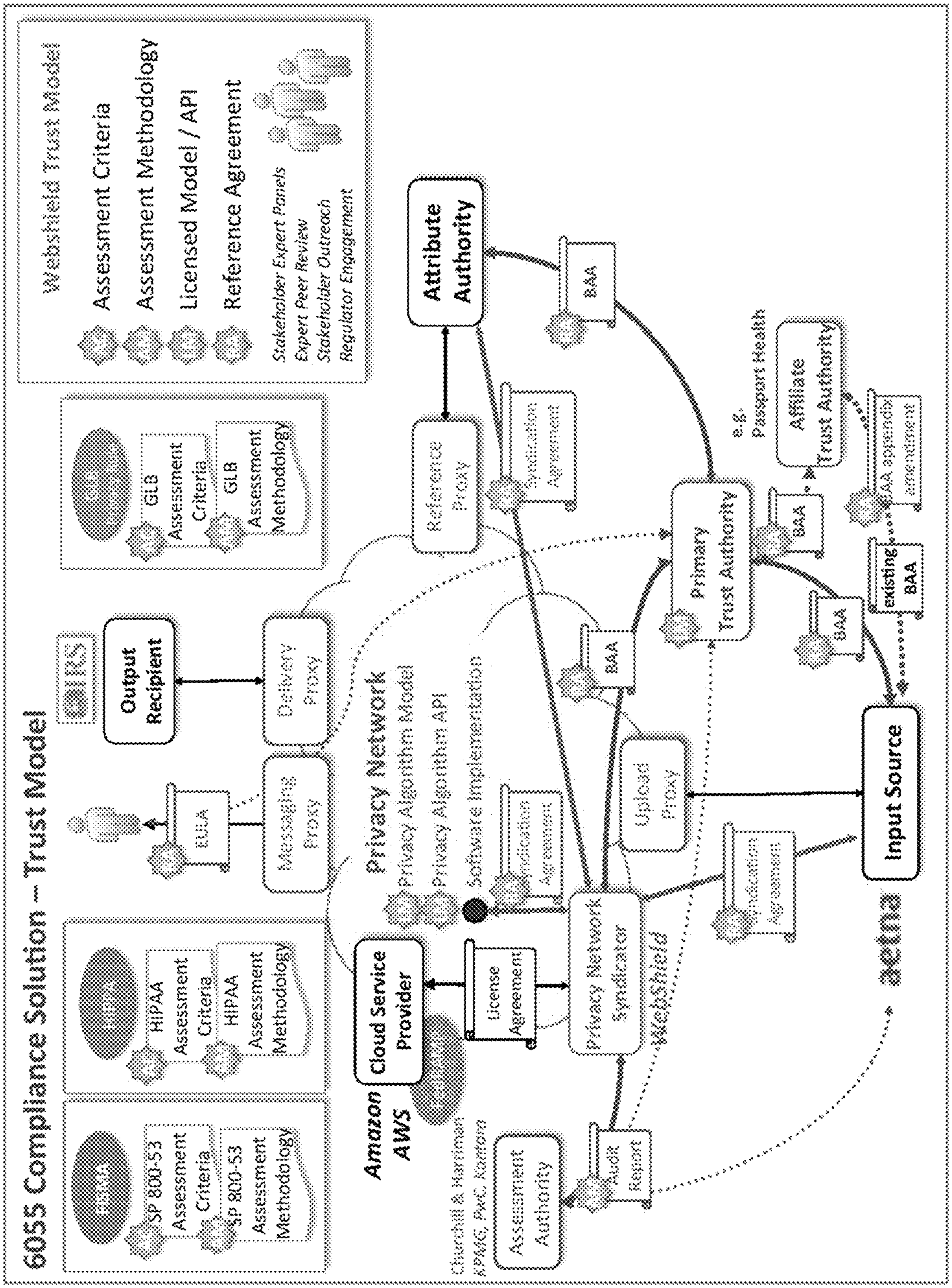
FIG. 18 illustrates an embodiment of an embodiment of a privacy network and trust model used with a compliance solution.

FIG. 18 illustrates an embodiment of an embodiment of a privacy network and trust model used with a compliance solution. In this examples, the privacy network is in compliance with FISMA, HIPPA and GLB. The privacy network can provide compliance with the assessment criteria and the assessment methodology for each of these regulatory agencies. The privacy network can also provide licensed model API and reference agreements.

Figure 19:
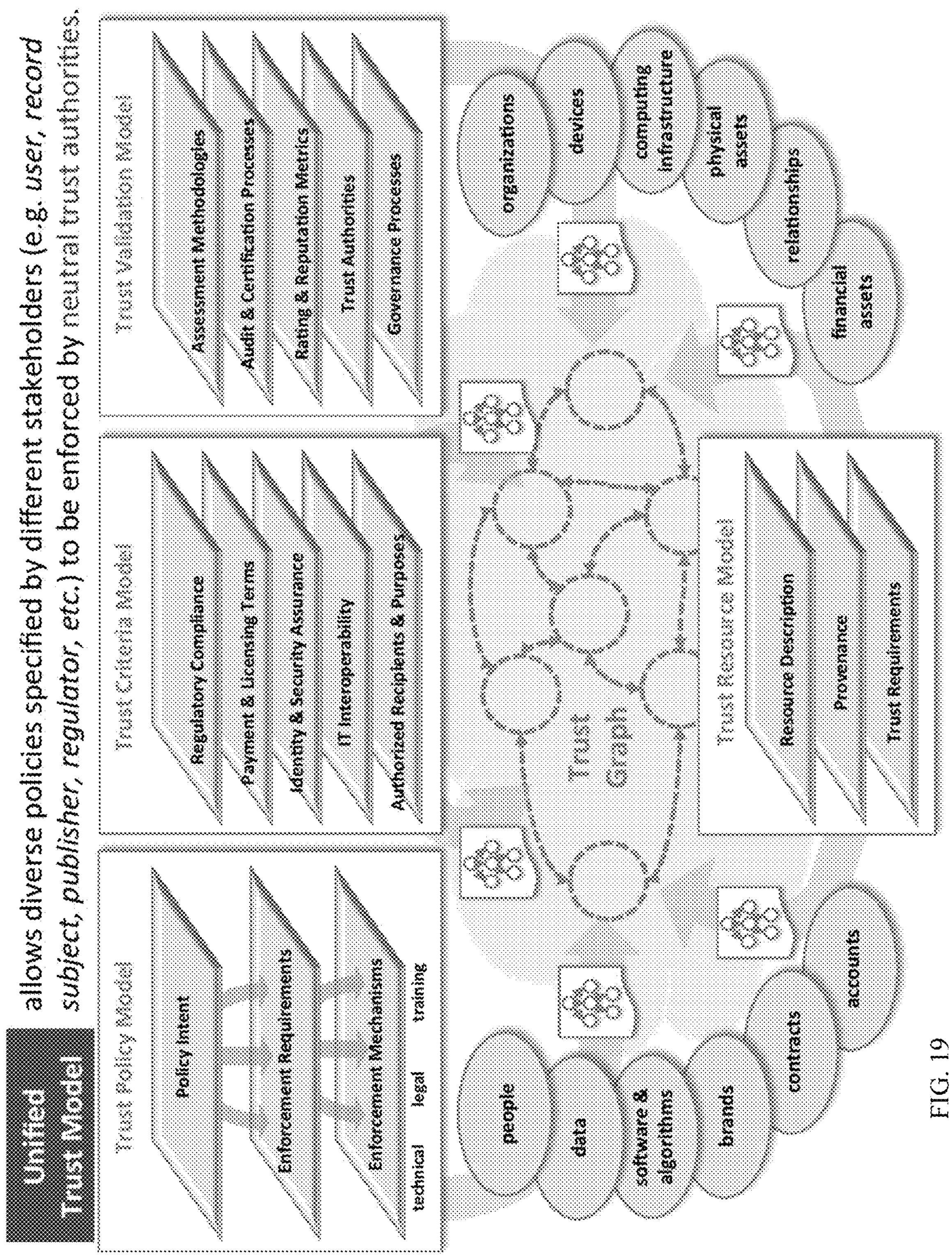
FIG. 19 illustrates an embodiment of a unified trust model.

FIG. 19 illustrates an embodiment of a unified trust model that allows diverse policies specified by different stakeholders to be enforced by neutral trust authorities. The stake holders can include users, record subjects, publishers, regulators, etc. The unified trust model can include a trust policy model, a trust criteria model, a trust validation model and a trust resource model.

Figure 20:
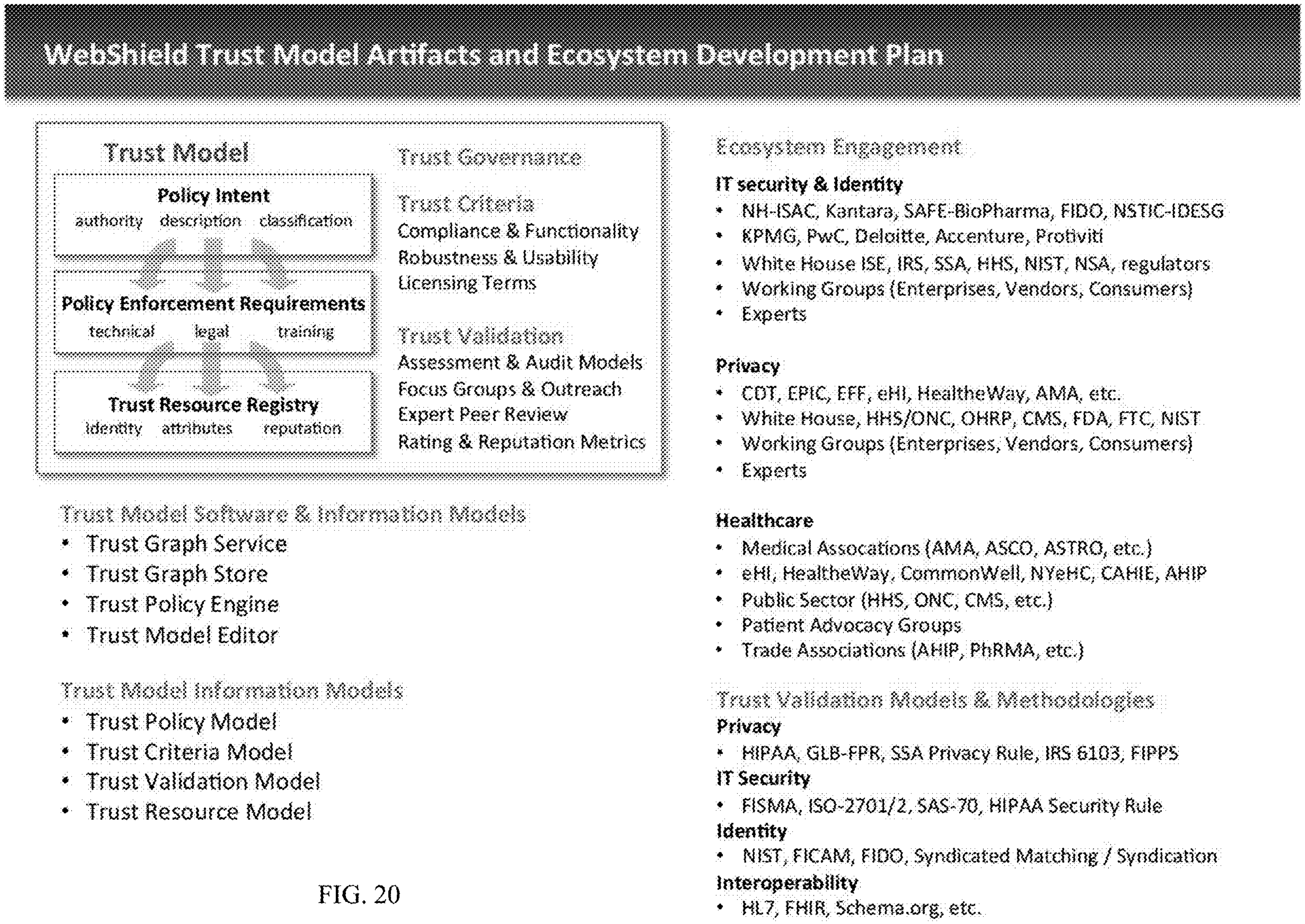
FIG. 20 illustrates an embodiment of trust model artifacts and ecosystem development plan.

FIG. 20 illustrates an embodiment of trust model artifacts and ecosystem development plan. The trust model can include policy intent, policy enforcement requirements, and a trust resource registry. The trust resource model can include a trust governance that include trust criteria including compliance and functionality, robustness and usability and licensing terms.

The trust governance can also include a trust validation that includes assessment and audit models, focus groups and outreach, expert peer review and rating and reputation metrics.

FIG. 21 illustrates an embodiment of a bill of materials for a unified trust model. The trust model information model can include: a policy enforcement model, a trust criteria model, a trust validation model, a resource registry model, a domain model, a trust model integrated development environment component, trust authority services, and metadata models.

Figure 22:
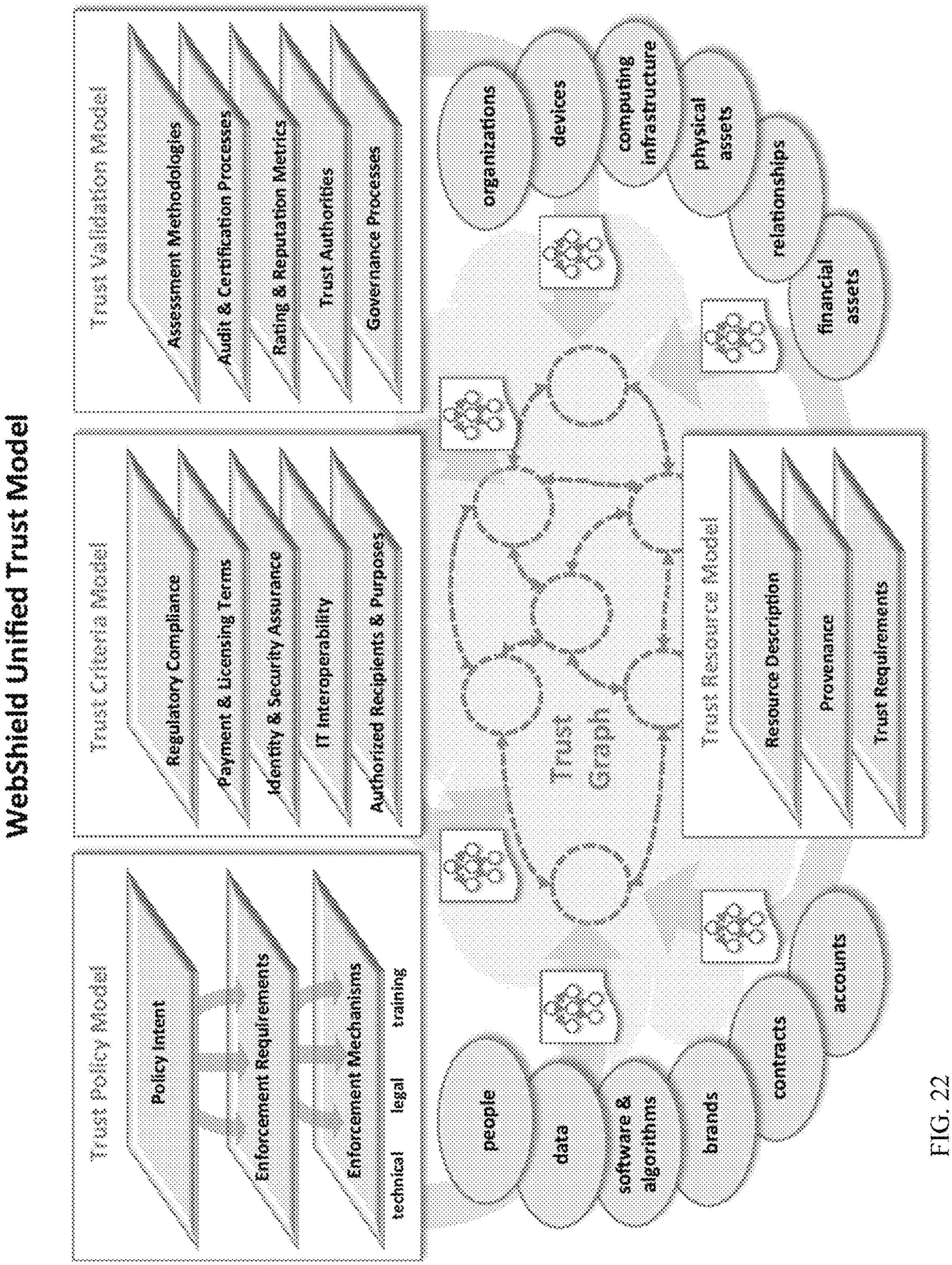
FIG. 22 illustrates an embodiment of a unified trust model.

FIG. 22 illustrates an embodiment of a unified trust model. The unified trust model can include a trust policy model, a trust criteria model, a trust validation model and a trust resource model. A trust graph can receive information from the trust policy model, the trust criteria model, the trust validation model and the trust resource model.

Figure 23:
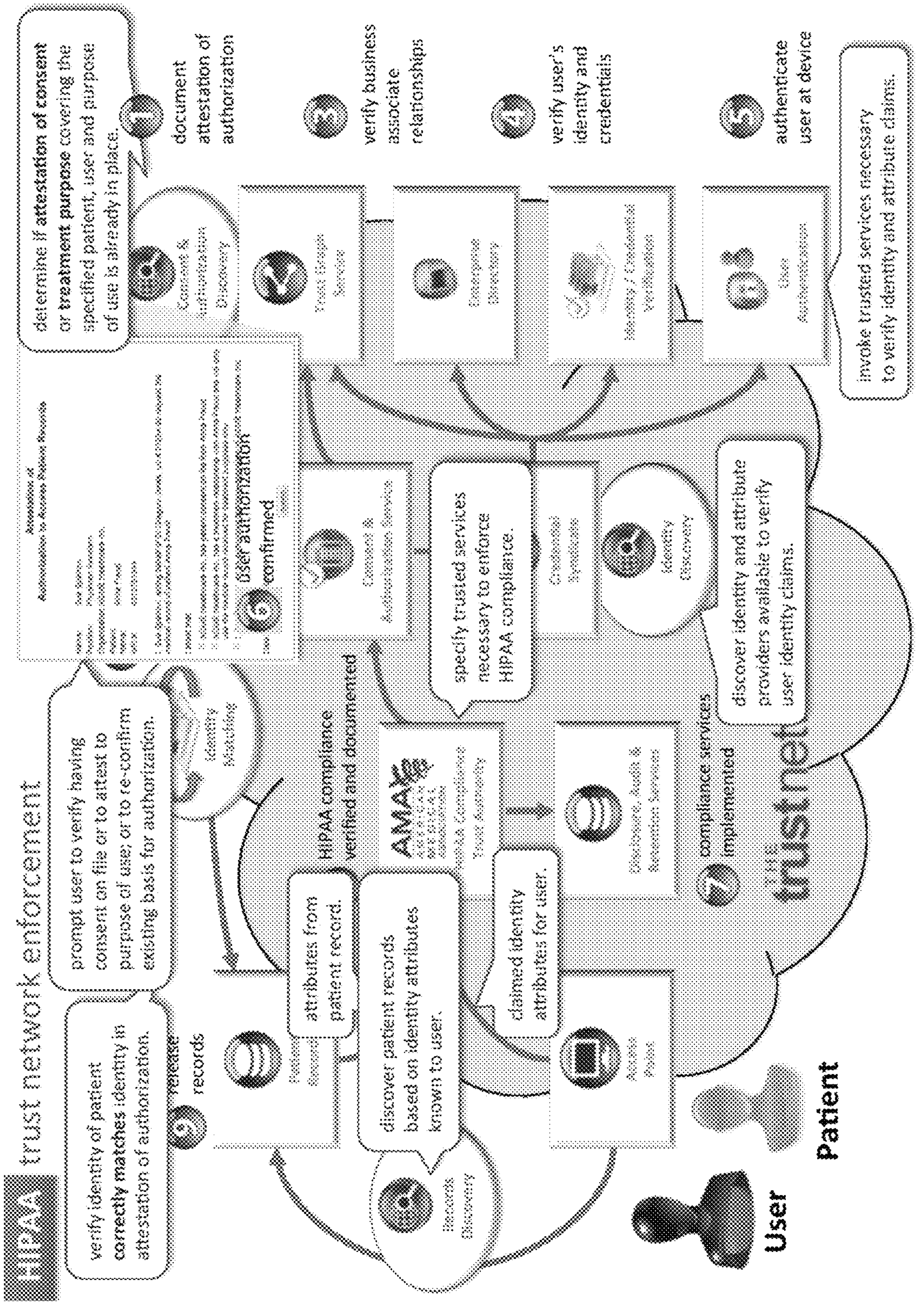
FIG. 23 illustrates an embodiment of a trust network for enforcement for HIPAA.

FIG. 23 illustrates an embodiment of a trust network for enforcement for HIPAA. In this example, the patient information is processed through the trust network while maintaining the patient.

Figure 24:
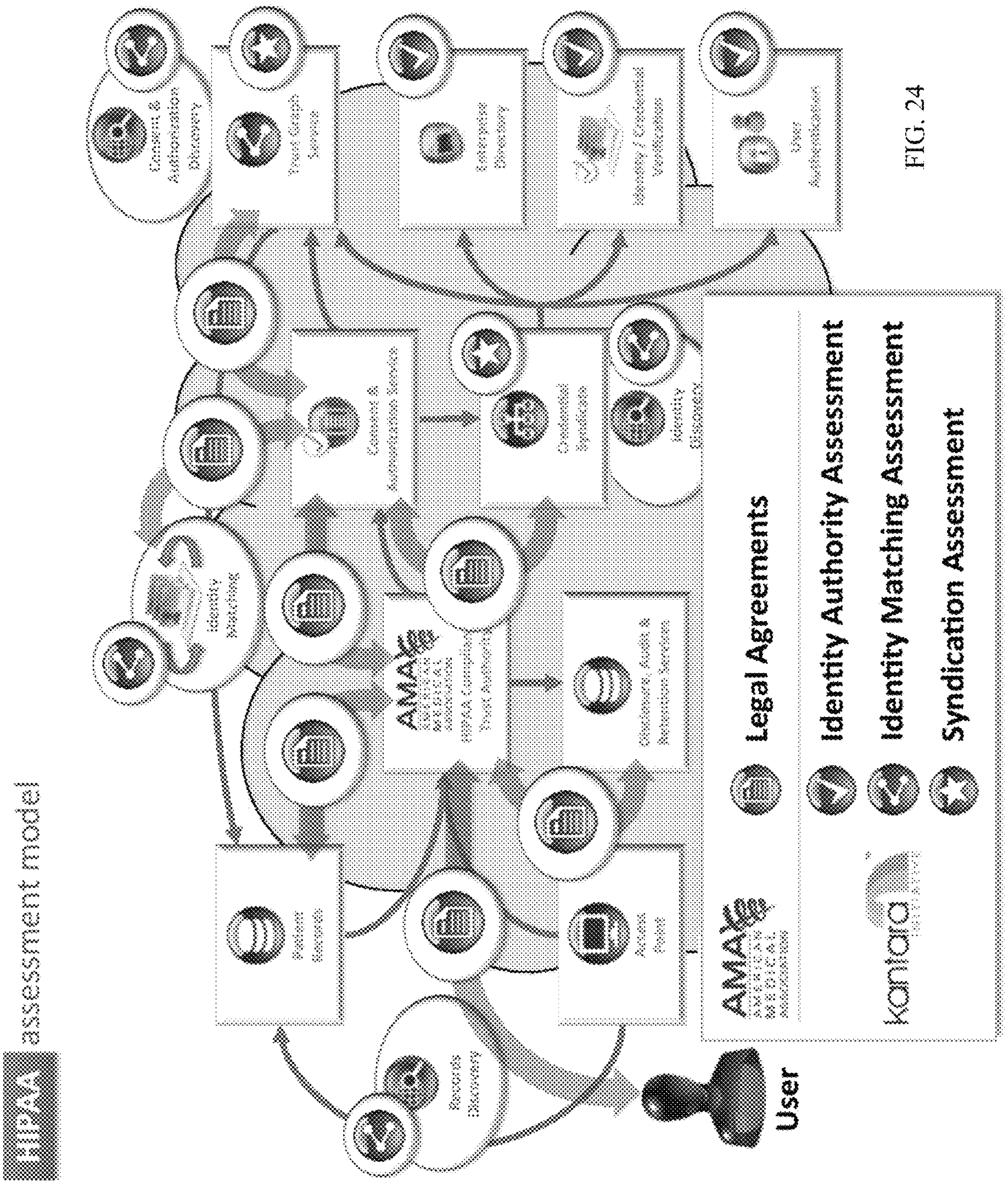
FIG. 24 illustrates an embodiment of a HIPAA assessment model.

FIG. 24 illustrates an embodiment of a HIPAA assessment model. In this example, the patient information is processed through the trust network while complying with American Medical Association legal agreements, identity authority assessments, identity matching assessments and syndication assessments.

FIG. 25 illustrates a listing of HIPAA enforcement requirements for clinical treatment purposes. The user identity FIG. 26 illustrates an embodiment of a user interface for inputting patient privacy preferences.

Figure 27:
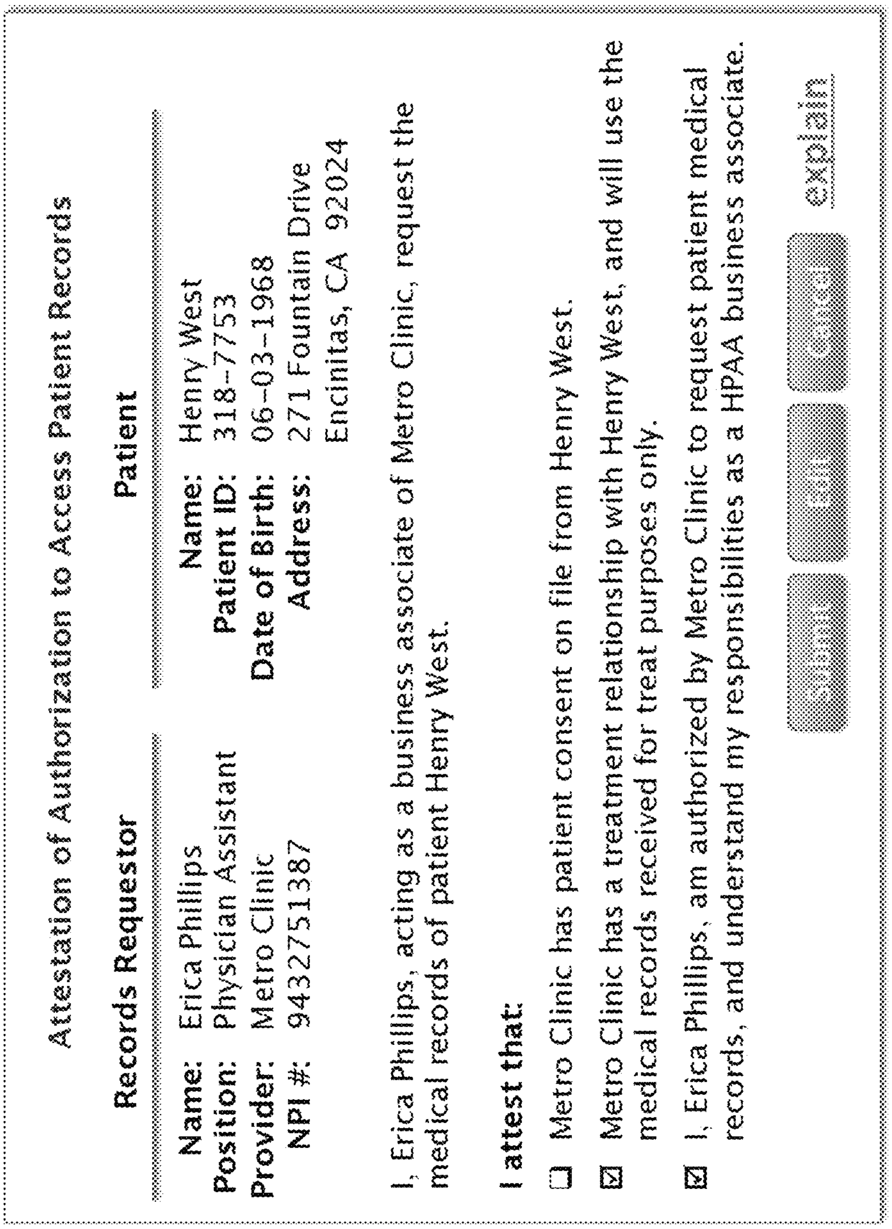
FIG. 27 illustrates an embodiment of a user interface for attestation of authorization to access patient records.

FIG. 27 illustrates an embodiment of a user interface for attestation of authorization to access patient records.

Figure 28:
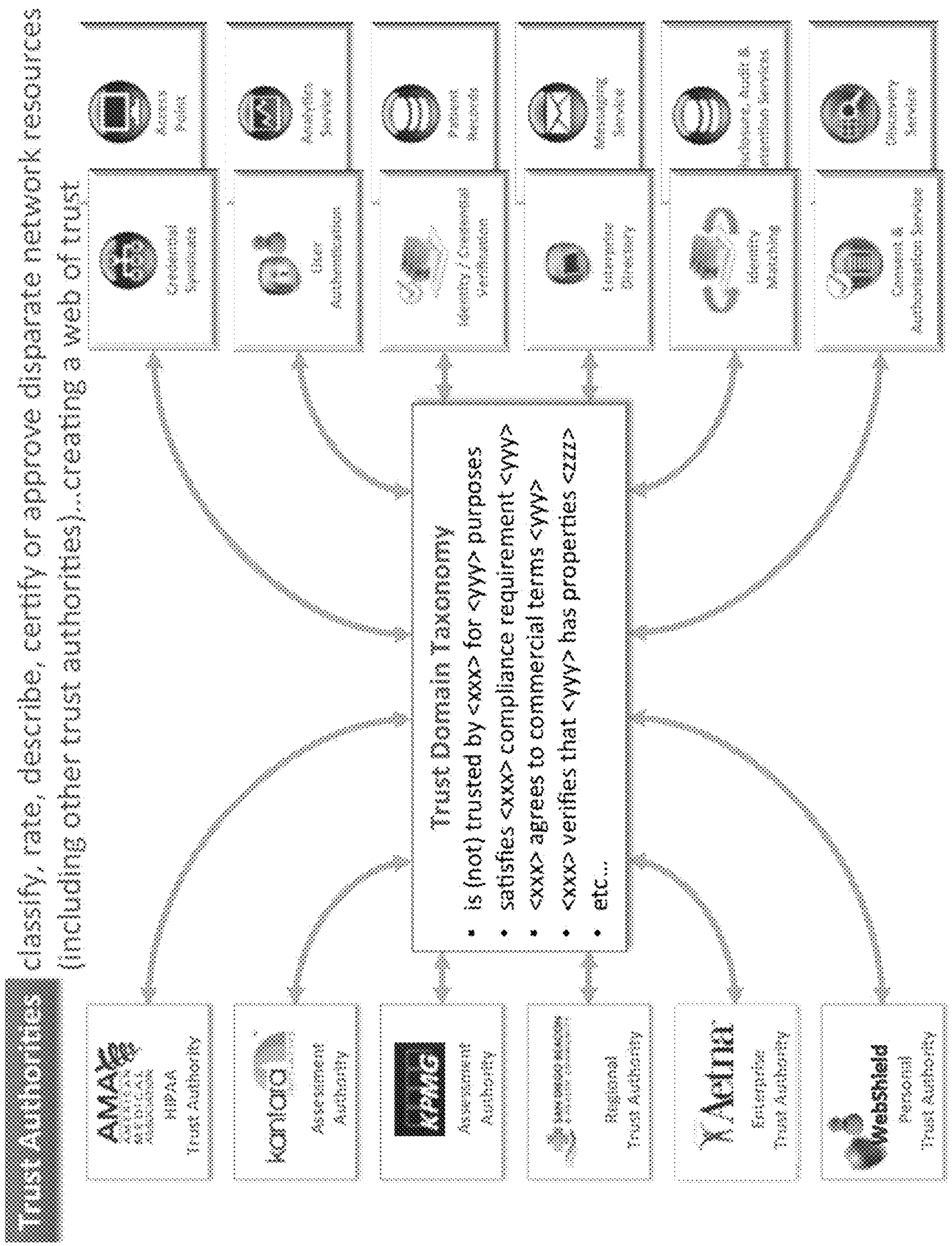
FIG. 28 illustrates an embodiment of trust authorities used with the trust model.

FIG. 28 illustrates an embodiment of trust authorities used with the trust model.

Figure 29:
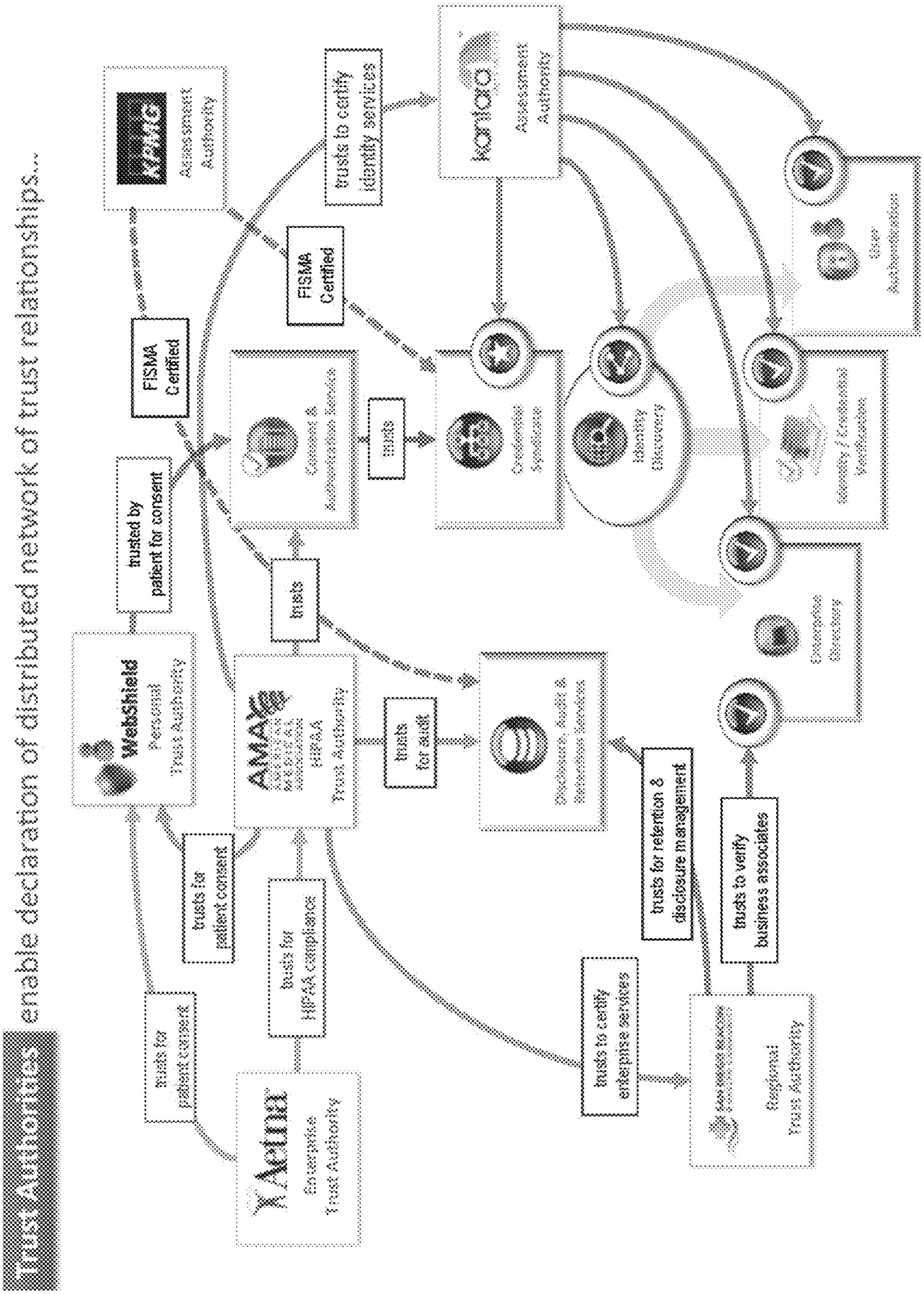
FIG. 29 illustrates an embodiment of trust authorities used to enable declarations of distributed network of trust relationships.

FIG. 29 illustrates an embodiment of trust authorities used to enable declarations of distributed network of trust relationships.

Figure 30:
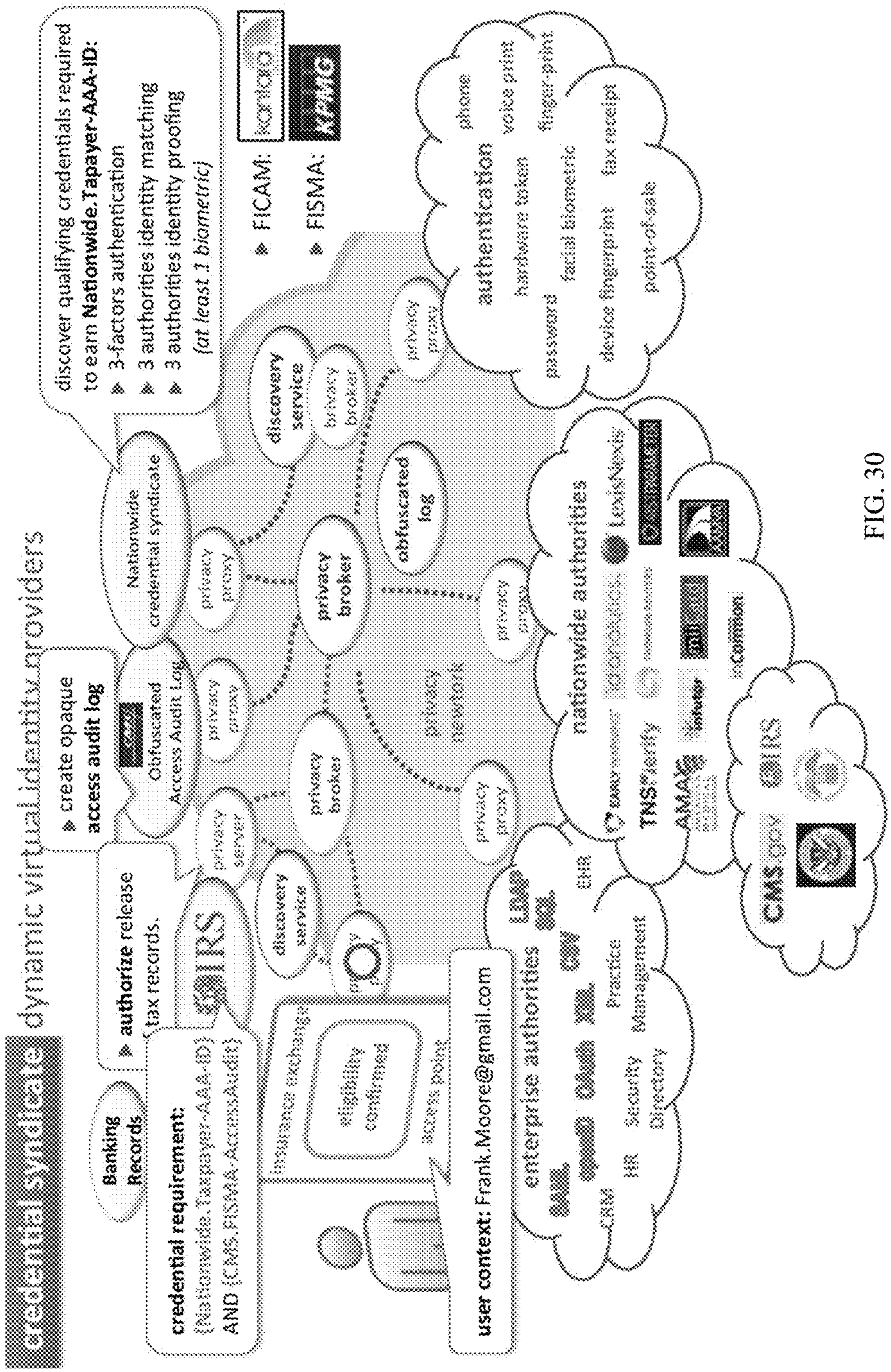
FIG. 30 illustrates an embodiment of a credential syndicate for dynamic virtual identity providers.

FIG. 30 illustrates an embodiment of a credential syndicate for dynamic virtual identity providers.

Figure 31:
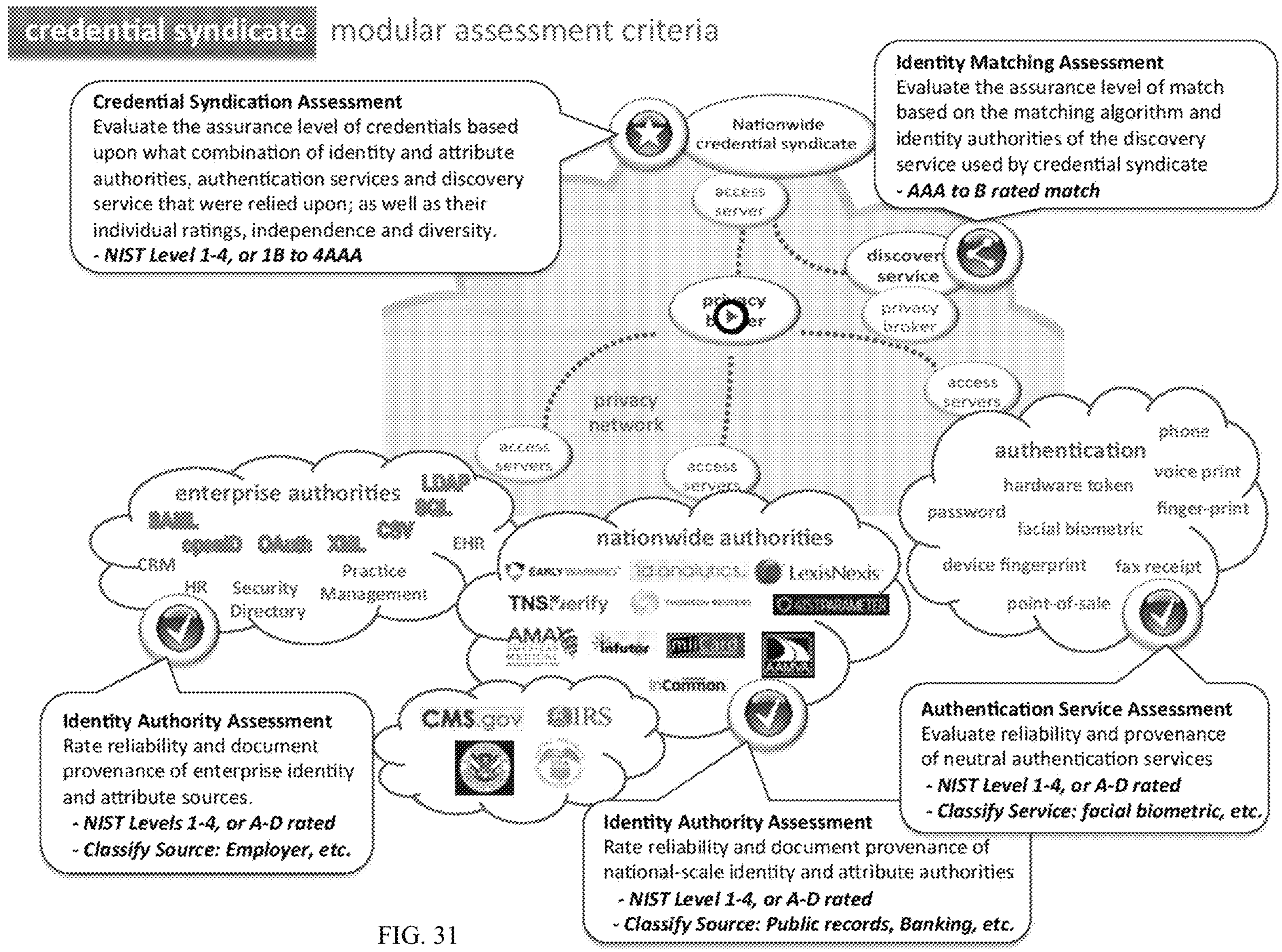
FIG. 31 illustrates an embodiment of a credential syndicate for modular assessment criteria.

FIG. 31 illustrates an embodiment of a credential syndicate for modular assessment criteria.

FIG. 32 illustrates a listing of HIPAA enforcement requirements for clinical research and analysis purposes.

FIG. 33 illustrates a listing of policy enforcement requirements for enabling software infrastructure and services.

Figure 34:
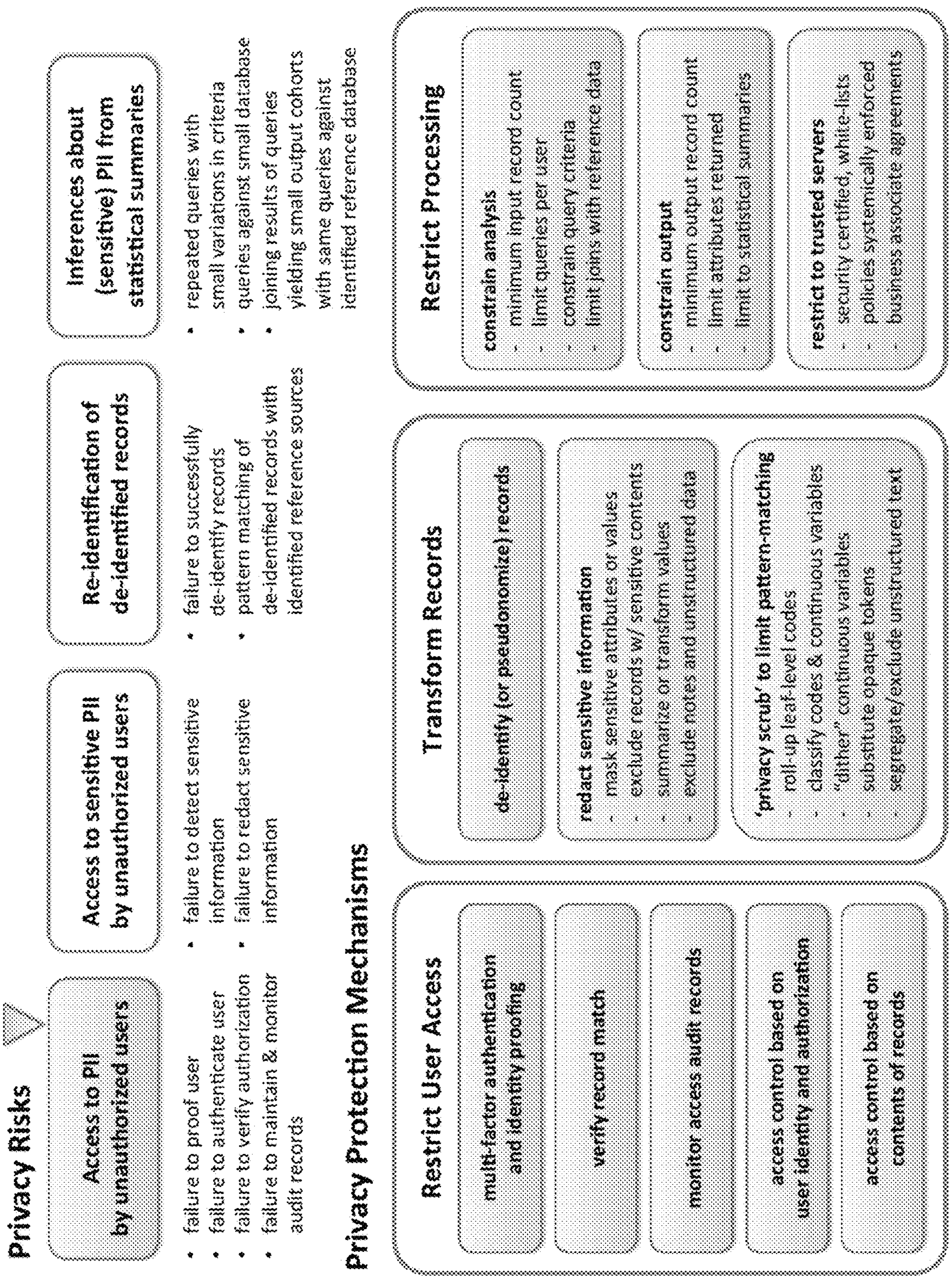
FIG. 34 illustrates a listing of privacy risks and privacy protection mechanisms.

FIG. 34 illustrates a listing of privacy risks and privacy protection mechanisms.

FIG. 35 illustrates a listing of redaction of sensitive information in transform records.

FIG. 36 illustrates a listing of privacy scrubbing of information to limit pattern matching in transform records.

FIG. 37 illustrates a listing of constraint analysis for restriction processing.

FIGS. 38 and 39 illustrate assessment information for privacy protocols for research and analysis purposes.

Figure 40:
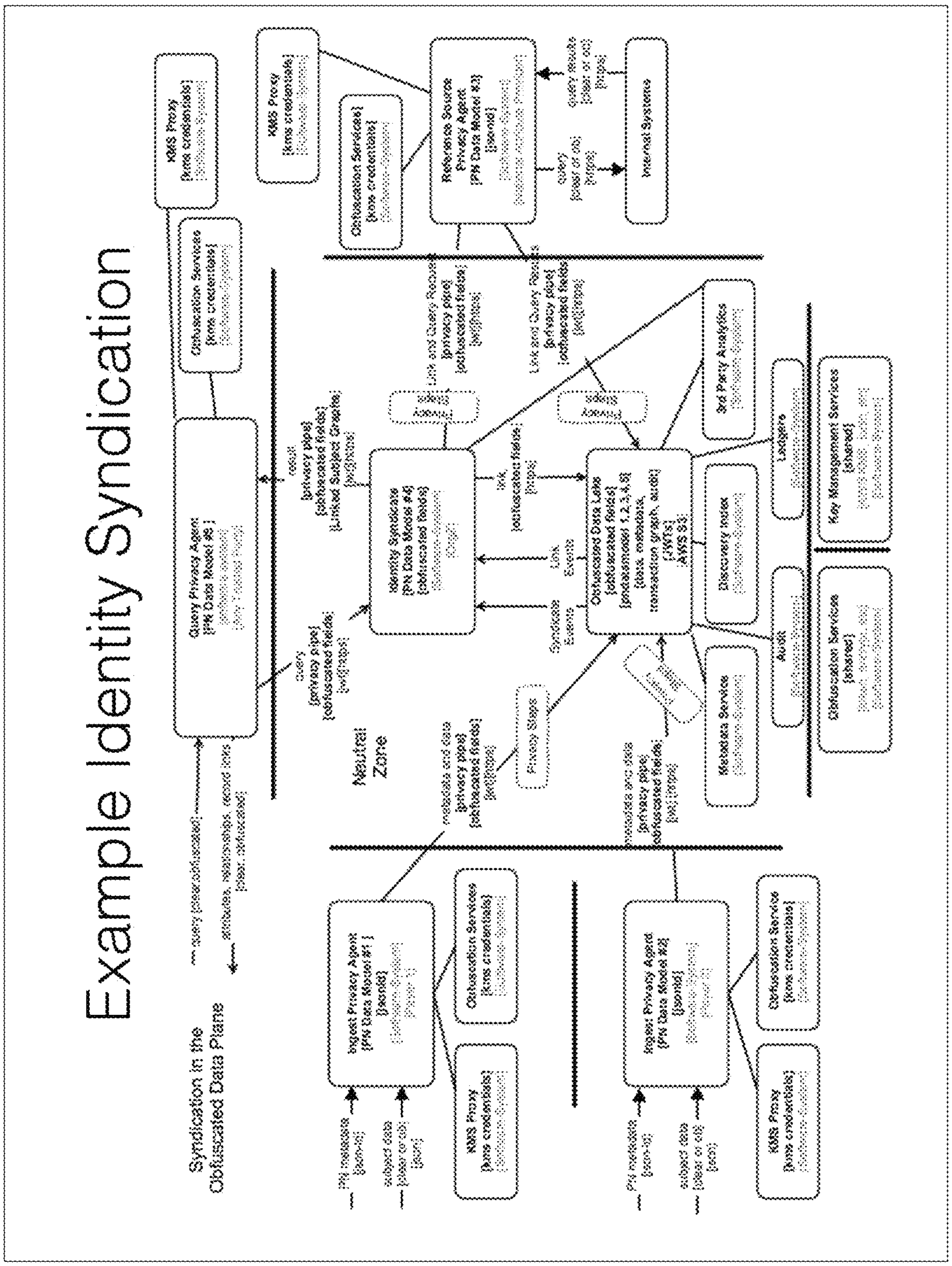
FIG. 40 illustrates an example of an identity syndication system.

FIG. 40 illustrates an example of an identity syndication system.

Figure 41:
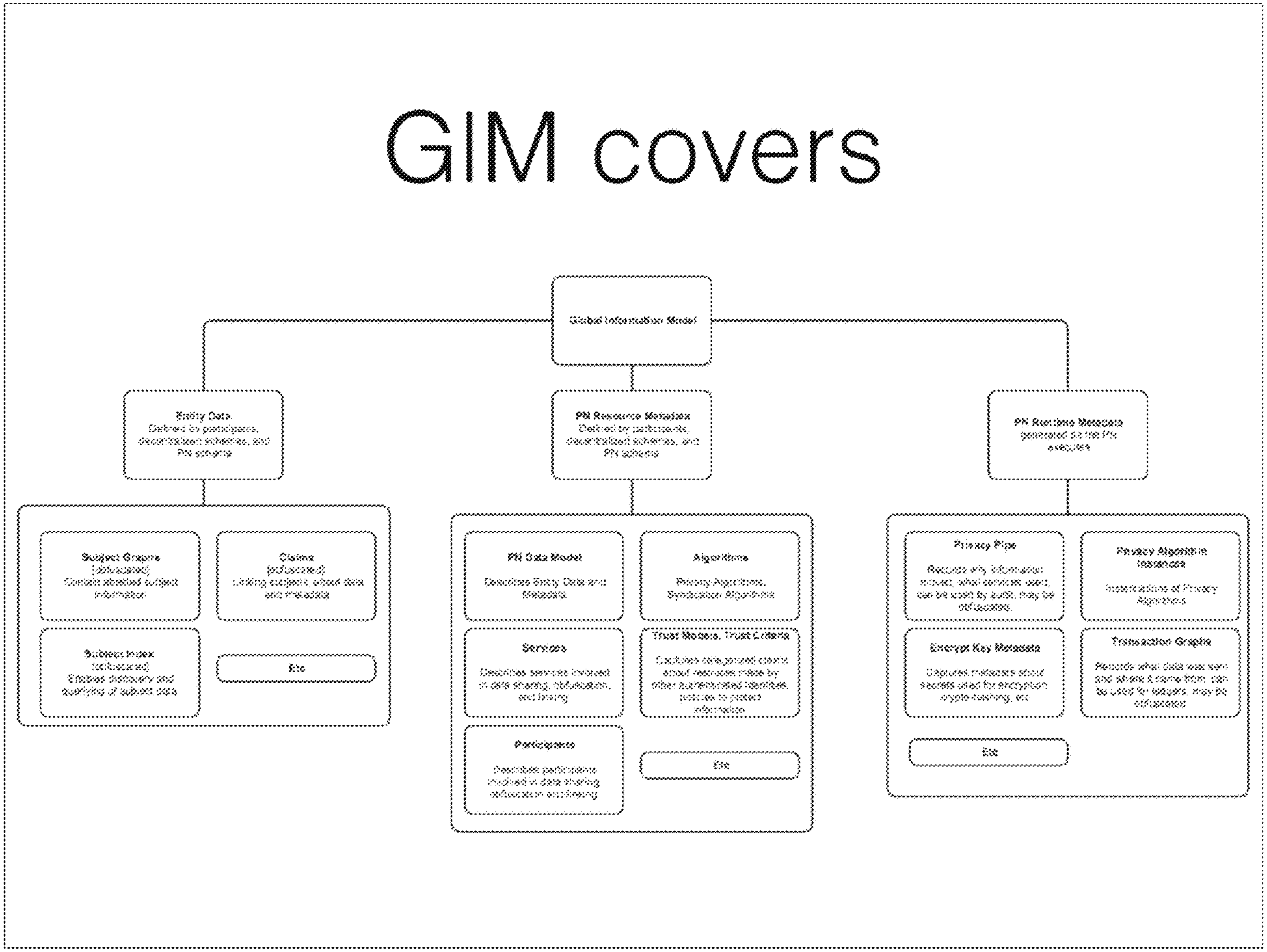
FIG. 41 illustrates an embodiment of an embodiment of global information model covers.

FIG. 41 illustrates an embodiment of an embodiment of global information model covers.

Figure 42:
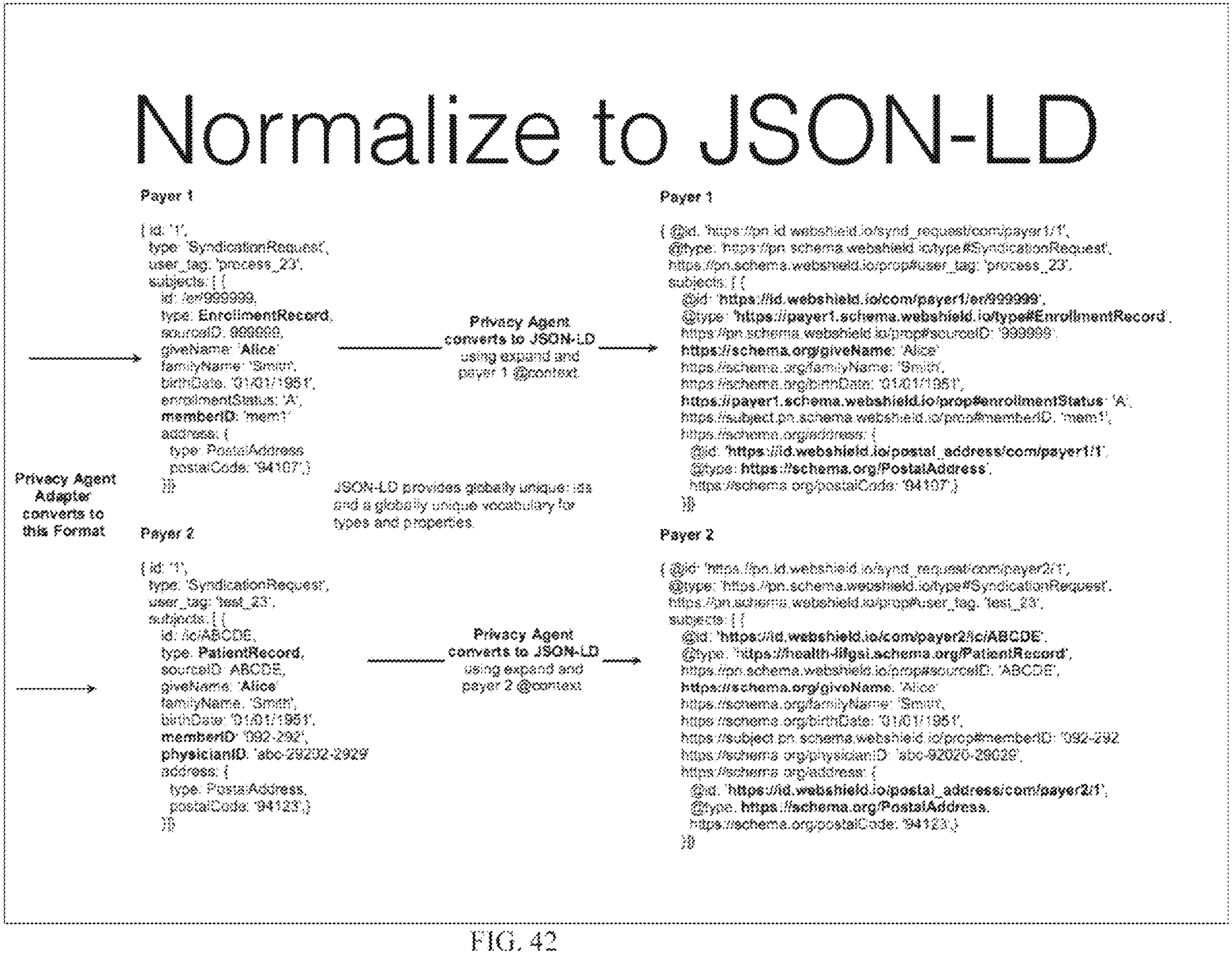
FIG. 42 illustrates an embodiment of payer normalize information being converted to JSON-LD format.

FIG. 42 illustrates an embodiment of payer normalize information being converted to JSON-LD format.

Figure 43:
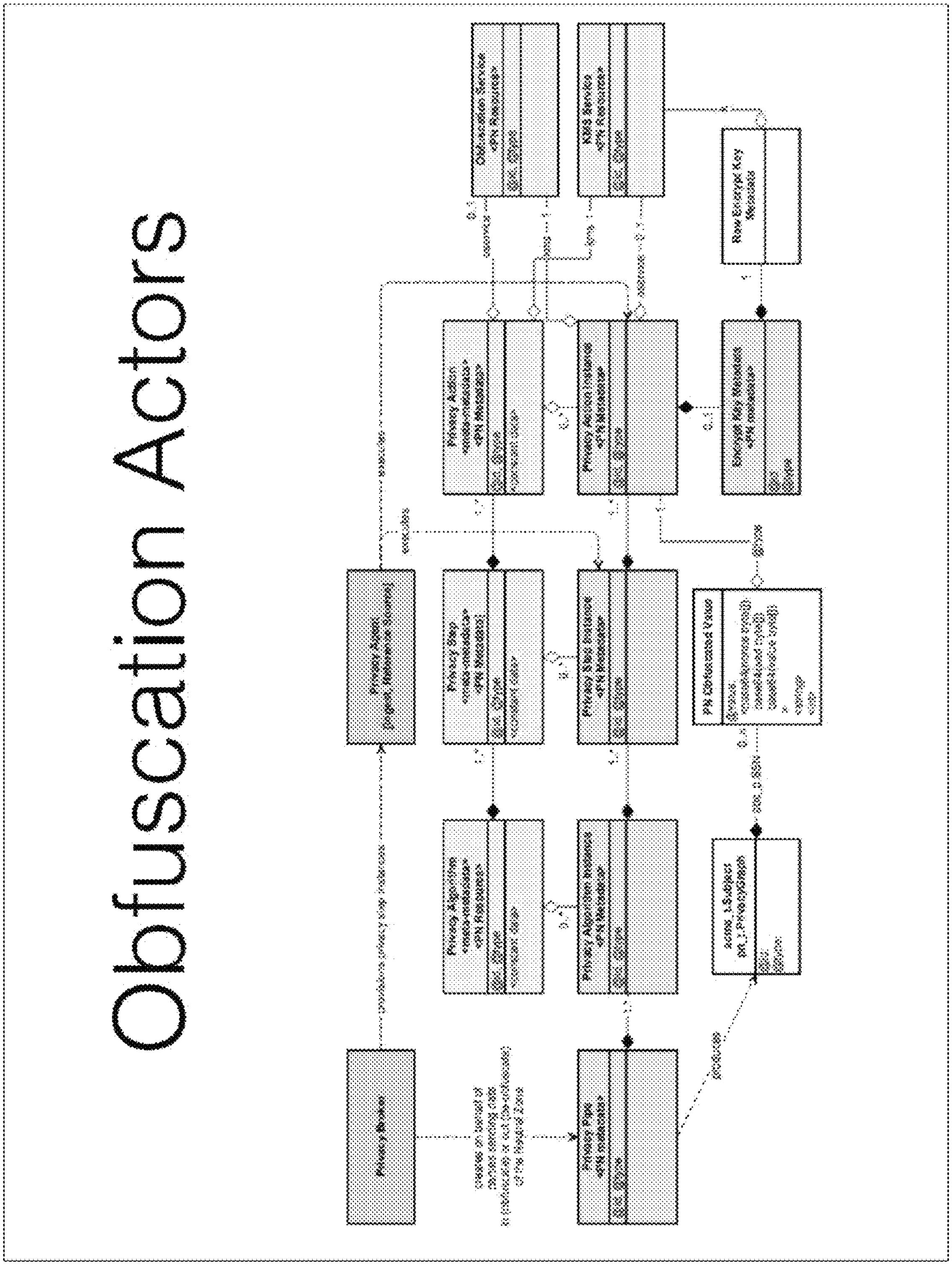
FIG. 43 illustrates an embodiment of obfuscation actors used with the privacy network and trust model.

FIG. 43 illustrates an embodiment of obfuscation actors used with the privacy network and trust model.

Figure 44:
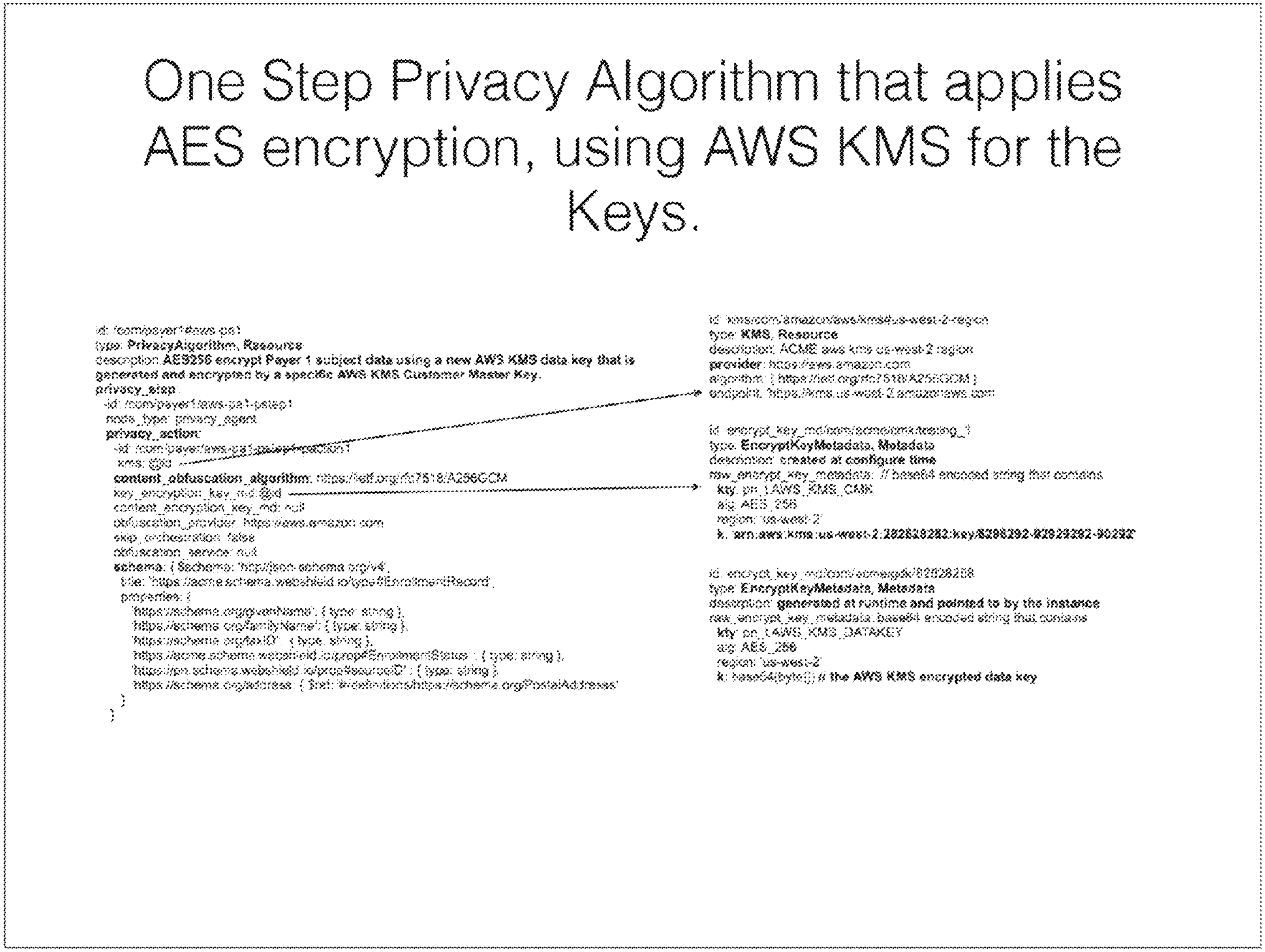
FIG. 44 illustrates an embodiment of code used with a one step privacy algorithm that applies AES encryption using AWS KMS for the keys.

FIG. 44 illustrates an embodiment of code used with a one step privacy algorithm that applies AES encryption using AWS KMS for the keys.

Figure 45:
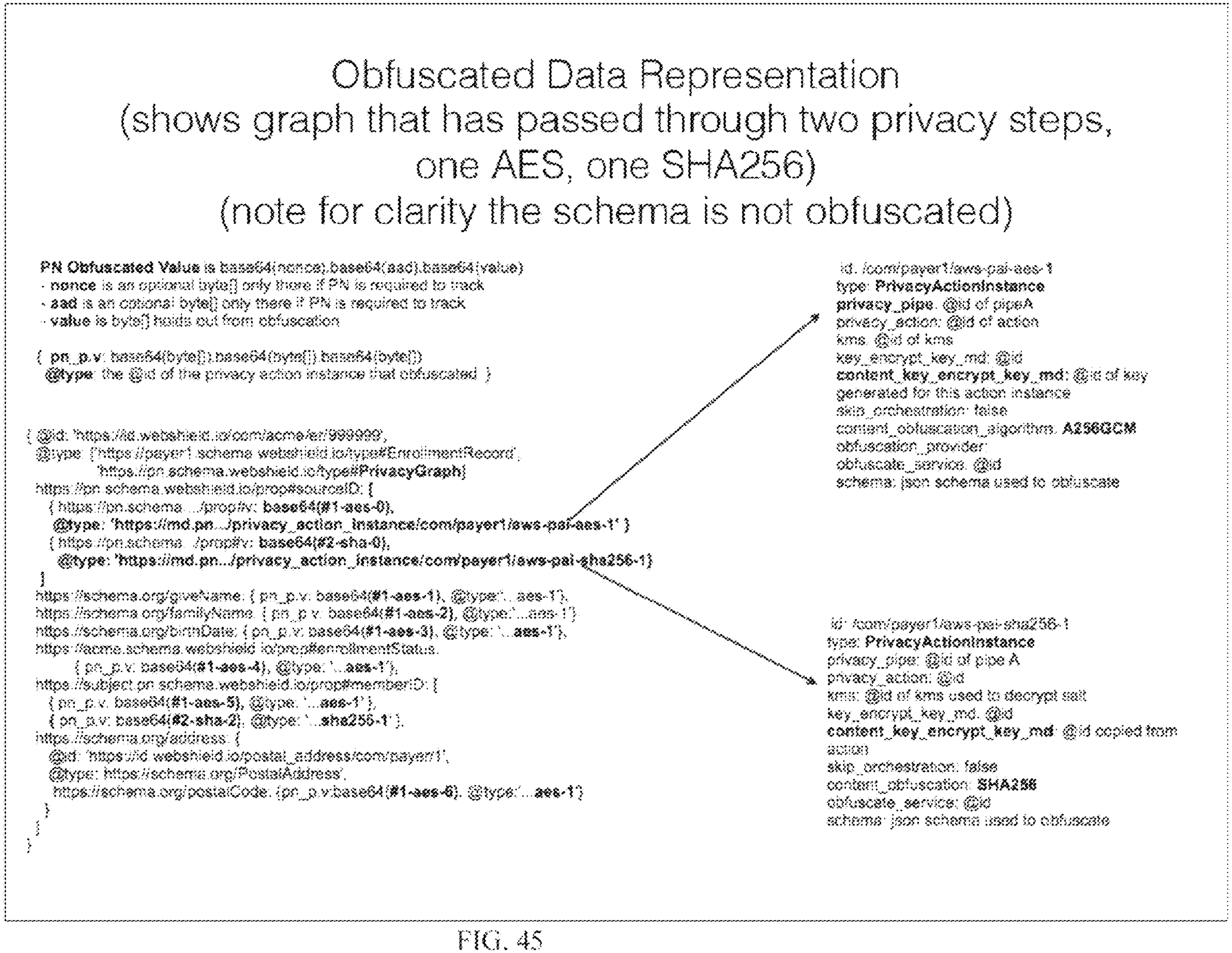
FIG. 45 illustrates an embodiment of obfuscated data representations.

FIG. 45 illustrates an embodiment of obfuscated data representations.

Figure 46:
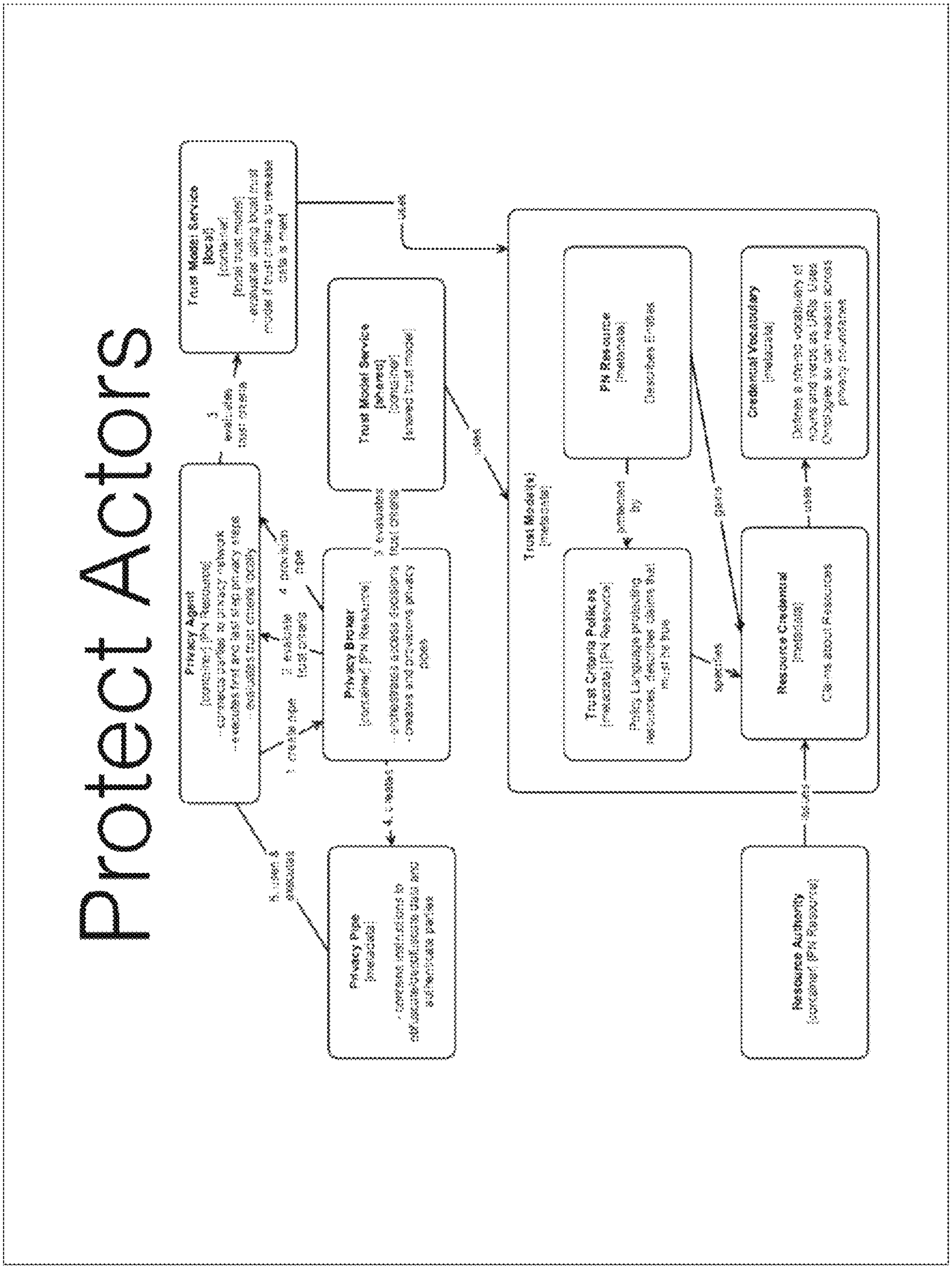
FIG. 46 illustrates an embodiment of protect actors used with the privacy network and trust model.

FIG. 46 illustrates an embodiment of protect actors used with the privacy network and trust model.

FIG. 47 illustrates an embodiment of code used with trust criteria are art of the signed JWT containing the data cryptographically bound.

FIG. 48 illustrates an embodiment of code used with the privacy network and trust model for protecting the payer enrollment records.

Figure 49:
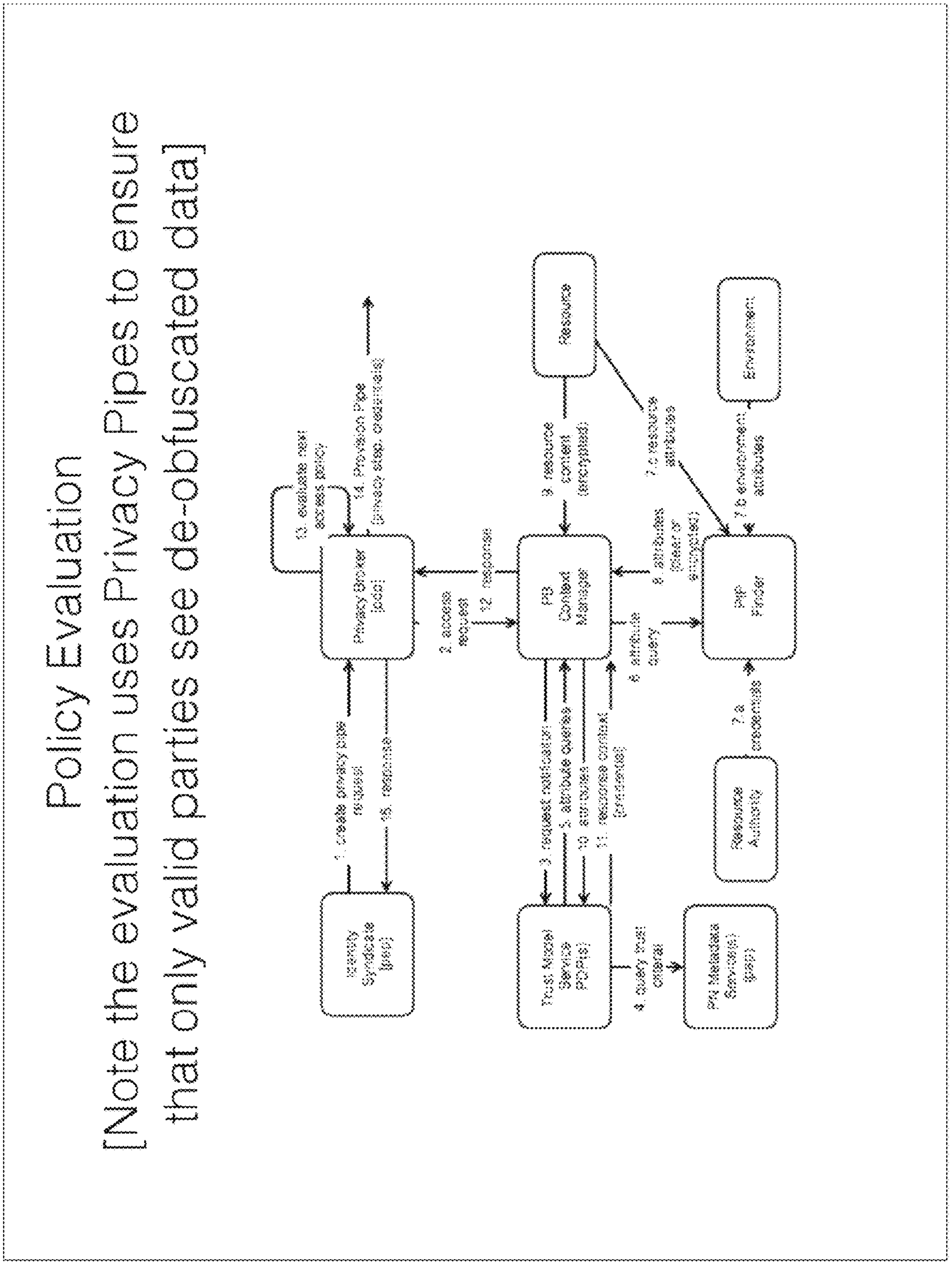
FIG. 49 illustrates an embodiment of a policy evaluation process that is used with the privacy network and trust model.

FIG. 49 illustrates an embodiment of a policy evaluation process that is used with the privacy network and trust model.

Figure 50:
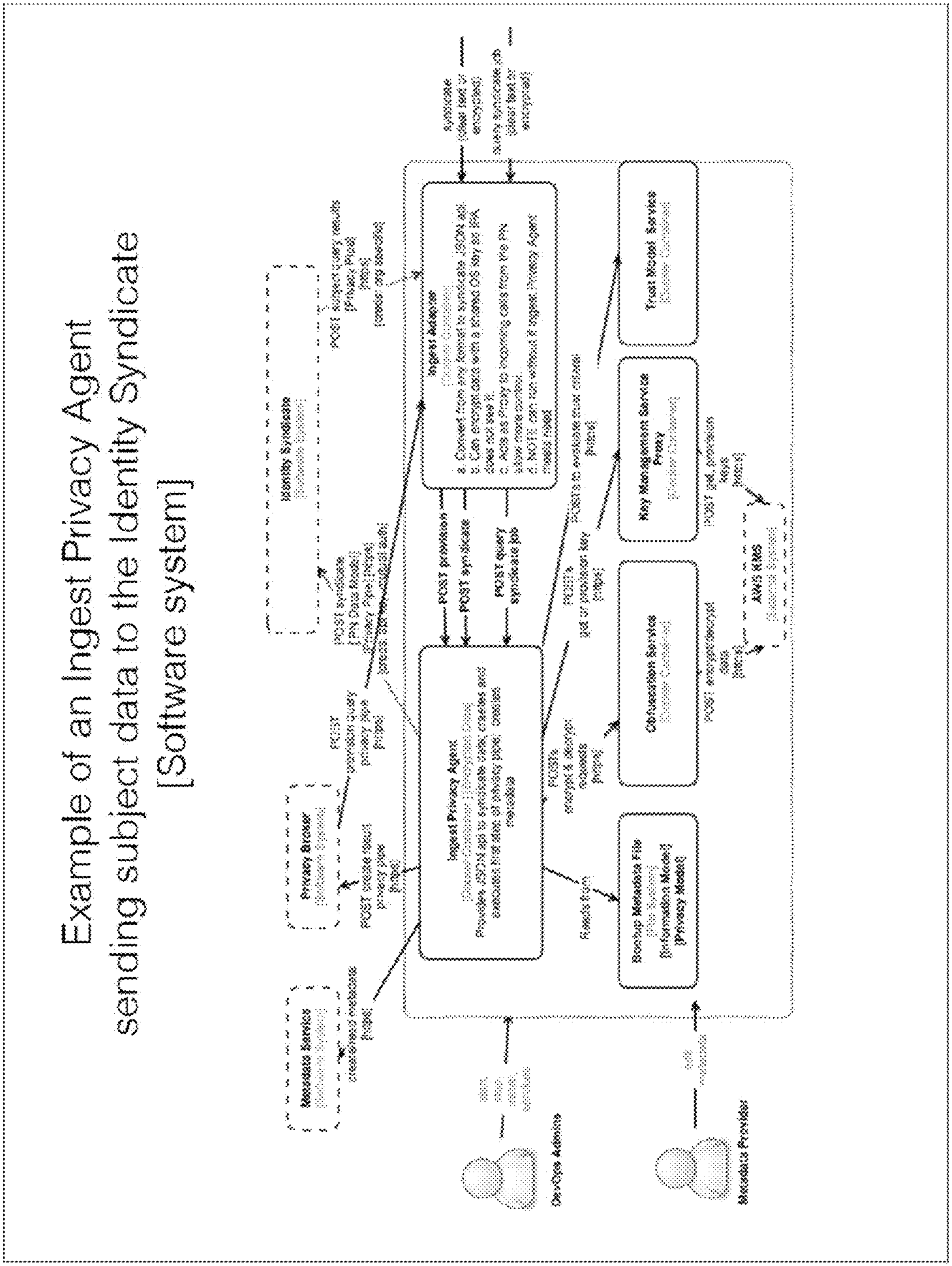
FIG. 50 illustrates an embodiment an ingress privacy agent sending subject data to the identity syndicate.

FIG. 50 illustrates an embodiment an ingress privacy agent sending subject data to the identity syndicate.

FIG. 51 illustrates an embodiment of code used with the privacy network and trust model for global identity graphs created from link credentials issued by trusted parties.

FIG. 52 illustrates an embodiment of code used with the privacy network and trust model for query examples using GraphQL.

Figure 53:
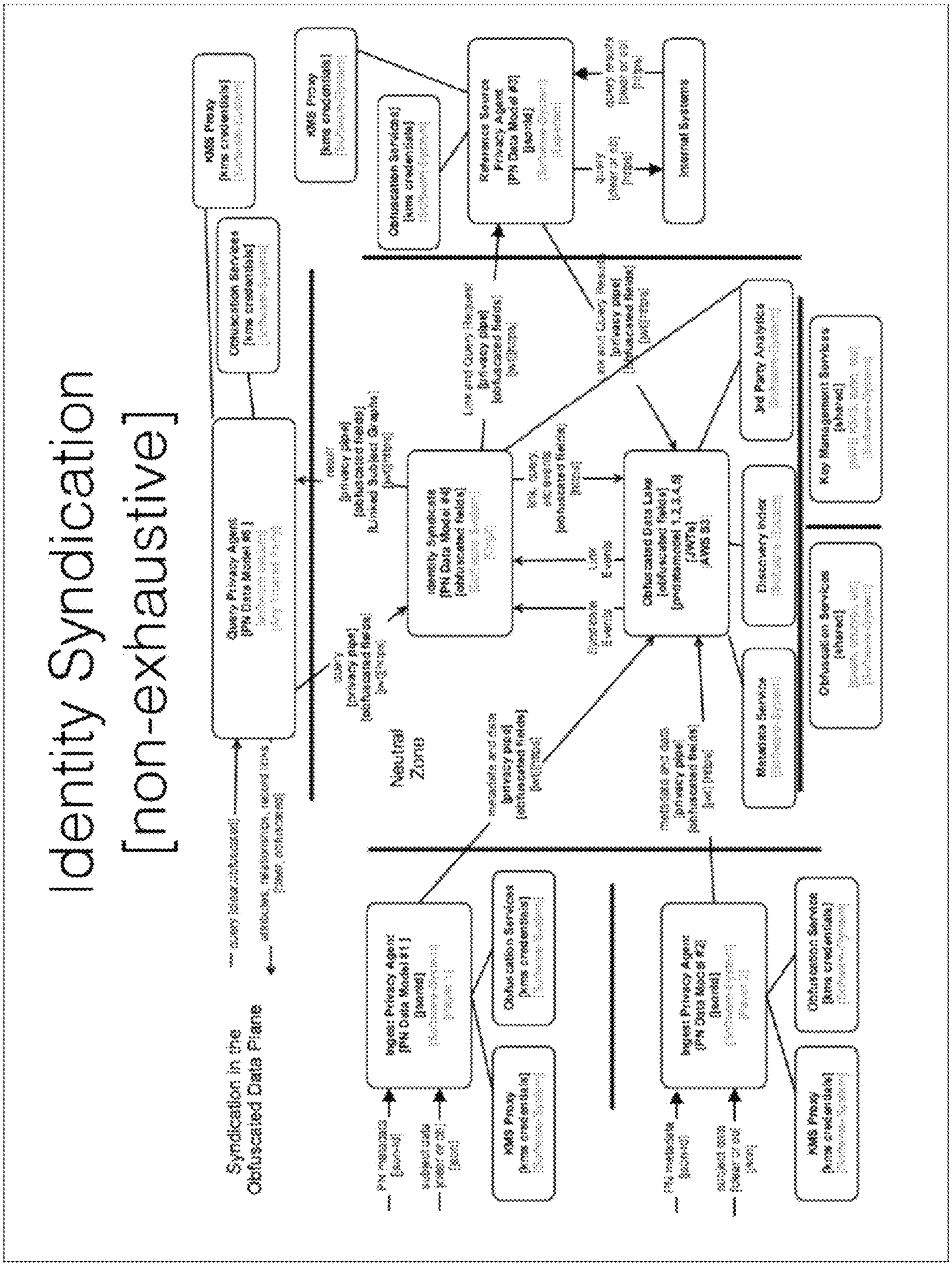
FIG. 53 illustrates a block diagram of an identity syndication used with the privacy network and trust model.

FIG. 53 illustrates a block diagram of an identity syndication used with the privacy network and trust model.

Figure 54:
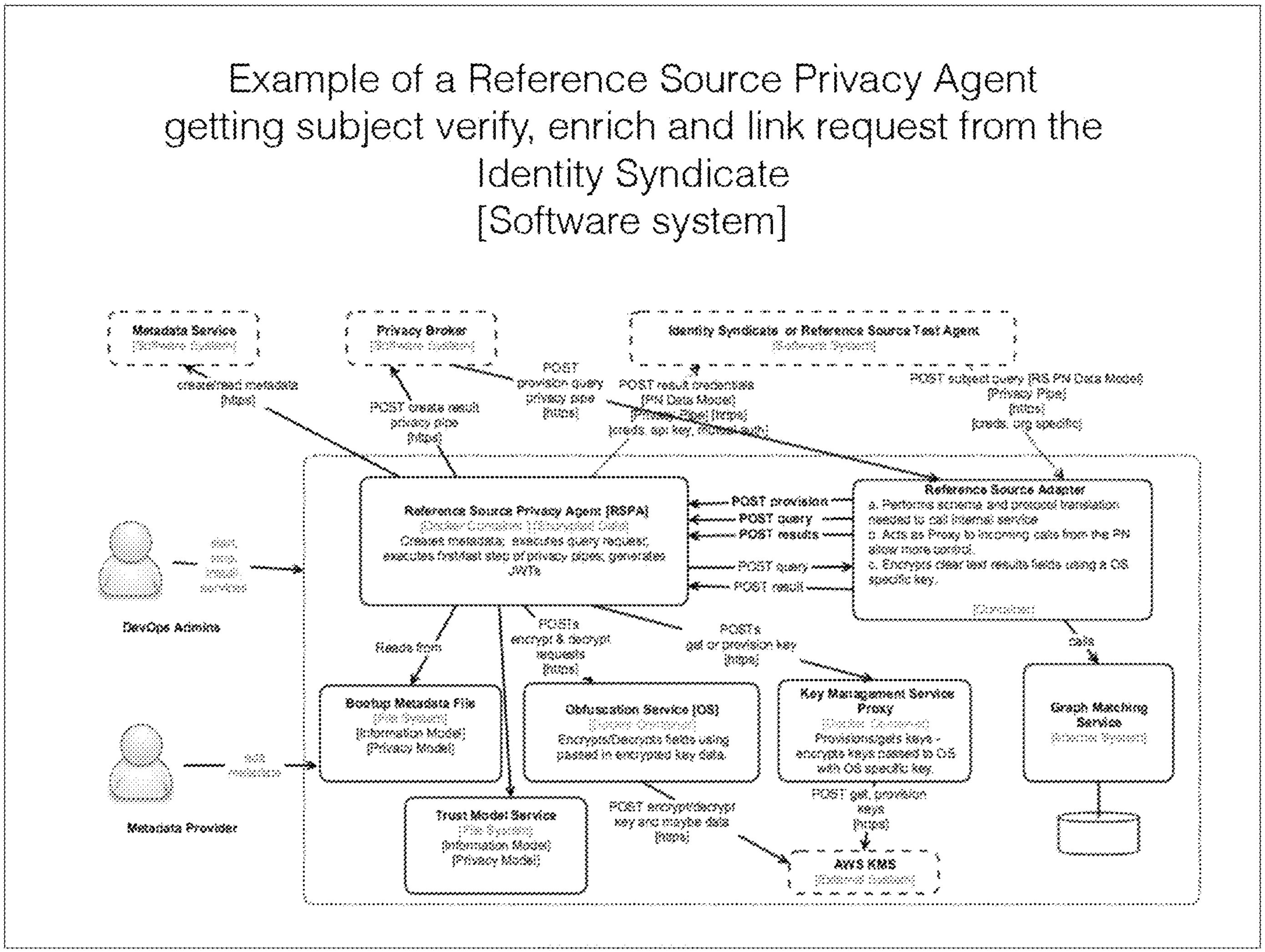
FIG. 54 illustrates a block diagram embodiment of a reference source privacy agent used with the privacy network and trust model.

FIG. 54 illustrates a block diagram embodiment of a reference source privacy agent used with the privacy network and trust model.

Figure 55:
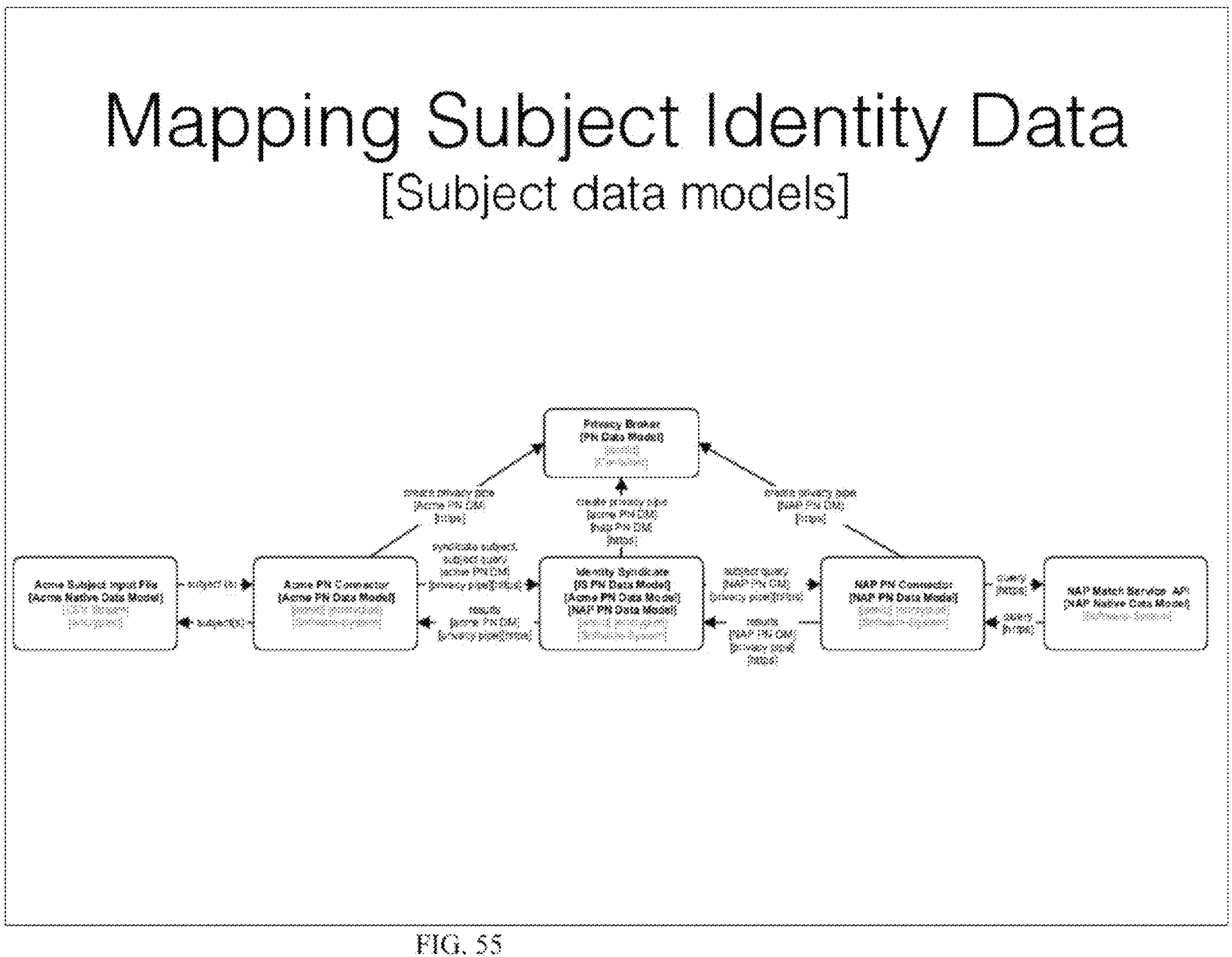
FIG. 55 illustrates a block diagram of a process for mapping subject identity data used with the privacy network and trust model.

FIG. 55 illustrates a block diagram of a process for mapping subject identity data used with the privacy network and trust model.

Figure 56:
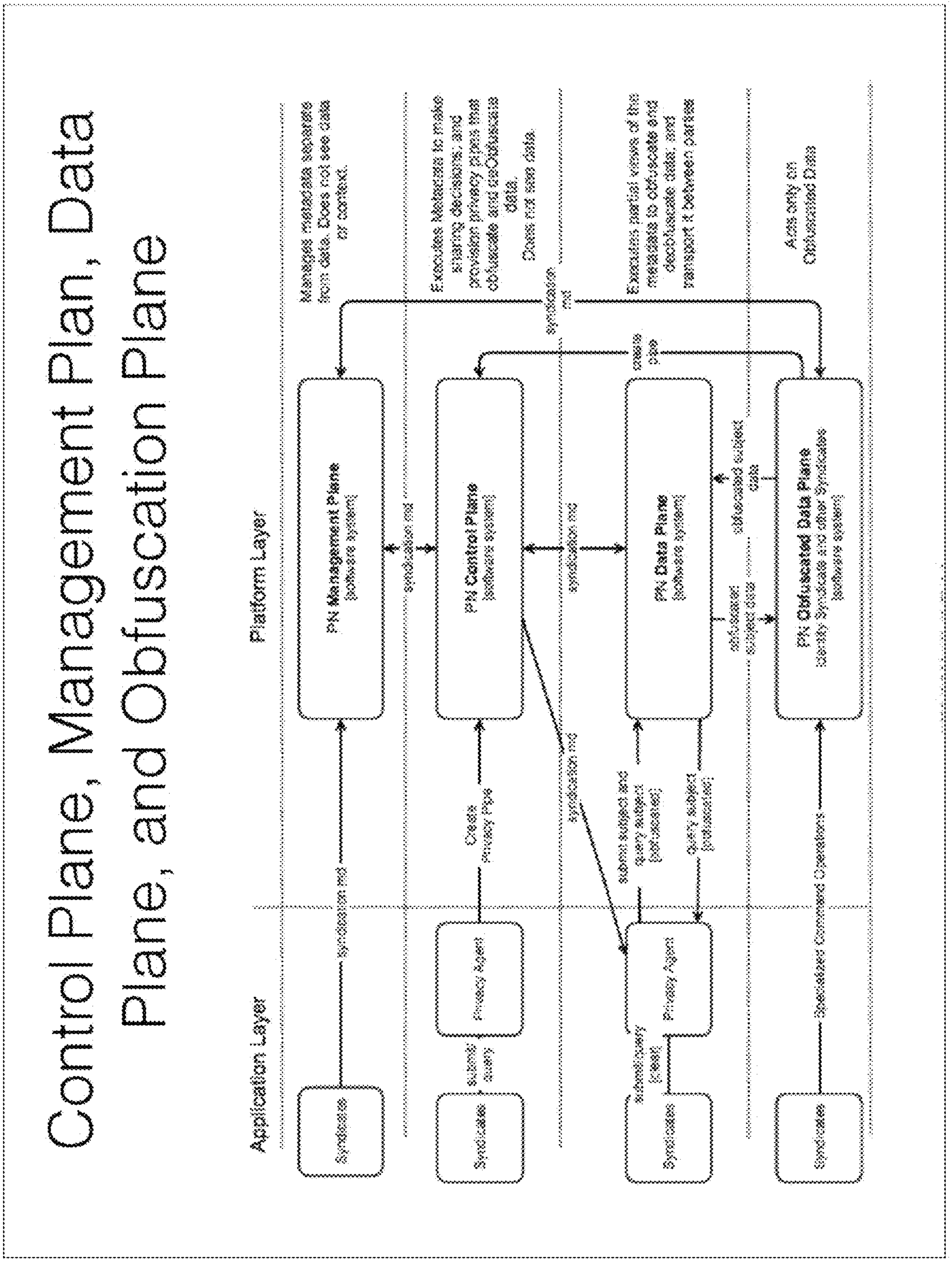
FIG. 56 illustrates an embodiment of an application layer and platform layer for a control plane, management plane, data plane and an obfuscation plane.

FIG. 56 illustrates an embodiment of an application layer and platform layer for a control plane, management plane, data plane and an obfuscation plane.

Figure 57:
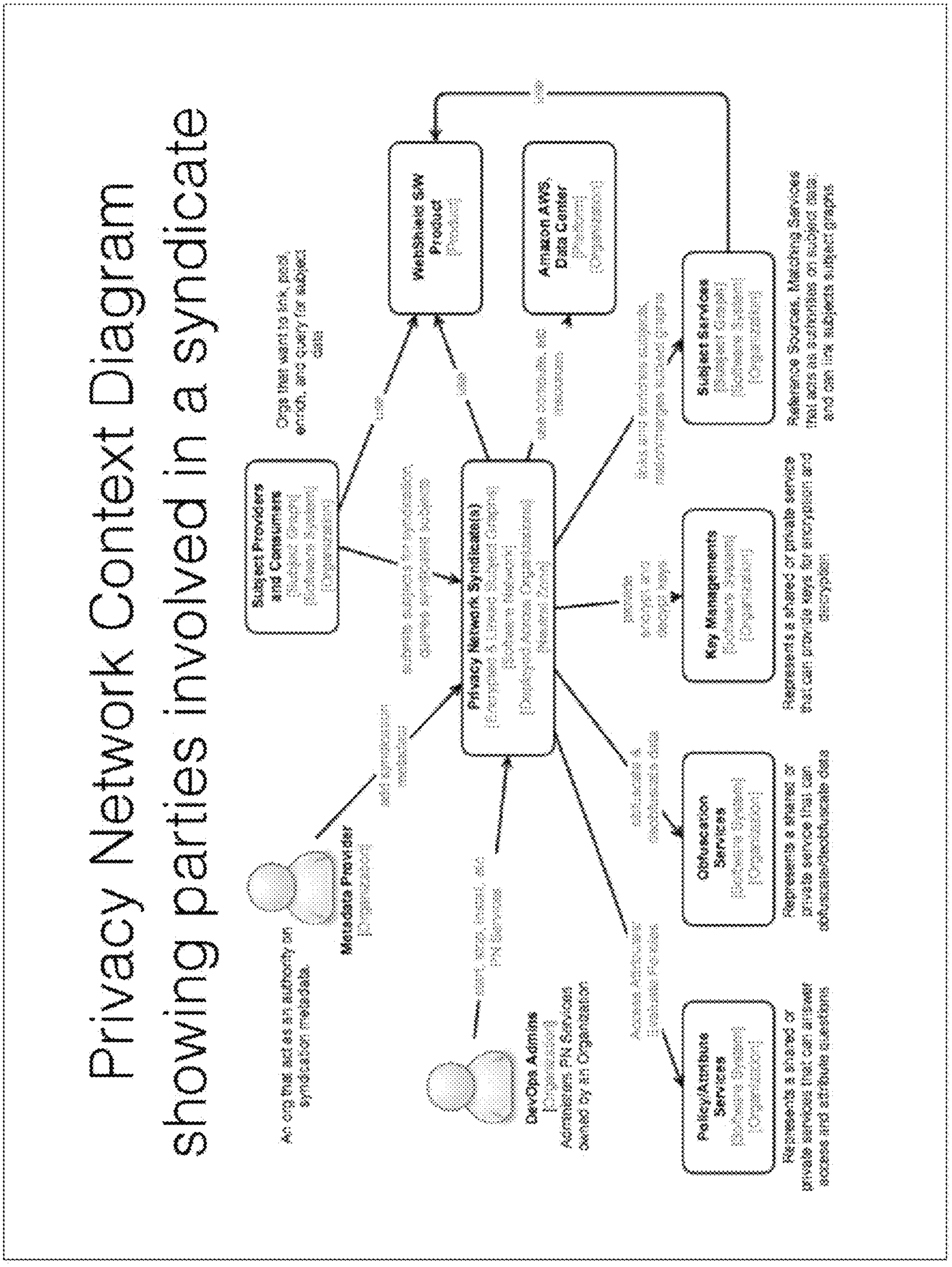
FIG. 57 illustrates a diagram of an embodiment of a privacy network showing parties involved in a syndicate.

FIG. 57 illustrates a diagram of an embodiment of a privacy network showing parties involved in a syndicate.

There is a need for organizations to share, pool and discover subject information for purposes such as: Care Coordination; Fraud Prevention; Medical Research; eGovernment; Personalization; Authentication, etc. The problem is that when operating across organizations, there is no easy way for organizations to: agree that they are talking about the same person trust each other to enforce polices on sensitive data share, analyze, or use data without decrypting it somewhere enforce security, or other polices, or enable personalization without undermining privacy.

Example Use Cases Syndicating Health Information. Health Care payers have member data spread across many internal and external systems. To enable more informed health care, and support functions such authentication, Payers wants to verify, link and pool this data such that it can be access by any trusted party that meets the relevant privacy and compliance requirements. National Attribute Providers have both extensive subject data, and sophisticated subject linking algorithms. They want to provide services that allow trusted parties to send subject data that can be verified, linked and enriched. Both parties require that the relevant privacy and compliance policies are enforced, and that they are not dis-intermediated from their data by any middle party.

Privacy Network Overview

The Privacy Network allows the above parties to verify, enrich and link their data in a manner the meets each parties privacy and compliance requirements. Privacy Networks allow decentralizes parties to conditional share information such that it can linked, analyzed, discovered and transacted on without having to be revealed, it ensure that it is only revealed if the necessary privacy, compliance and commercial policies are met.

The Privacy Network supports the conditional sharing of data by first obfuscating the data so that it can be shared without revealing, the Obfuscation Plane. This is performed by Privacy Pipes and Privacy Algorithms that provide a de-centralized process for obfuscating JSON graphs while ensuring end to end obfuscation. The obfuscation can be encryption, crypto-hash, tokens, etc. The Privacy Network supports the revealing of data only if meets the required privacy, compliance and commercial terms that are captured by de-centralized Trust Models. A Trust Model defines access criteria, and captures statements about entities and participants. To better support cross organizational sharing Trust Models use ontologies, and can be organized into a Unified Trust Model. As Trust Models are JSON graphs they can be obfuscated using Privacy Algorithms. The Privacy Network provides a de-centralized Identity Syndicate that lives in the obfuscation plane and is responsible for orchestrating the searching, verifying, enrichment, linking of identities into global identity graphs. The Privacy Network supports payment and compliance by producing obfuscated transaction graphs, and obfuscated audit records that can be written to centralized or de-centralized ledgers and logs.

Privacy Network Core Functionalities

The ability to integrate and process subject data and metadata from any source. This is achieved through a Global Information Model that is based on linked data principles, standards and technologies allowing the capturing of participants data models without information loss. This is achieved through PN Data Models, and the Unified Trust Model. The ability to mix field level subject data from many different sources whilst ensuring data owners maintain control, and their privacy, compliance and commercial requirements are meet. This is achieved through field level obfuscation polices, field level access control polices and the Unified Trust Model. The ability to share and link obfuscated subject data from many sources into obfuscated global subject graphs that can be used to discover and analyze attributes, relationships and records. This is achieved through the Identity Syndication Service, and link credentials issued by trusted sources.

Product Principles

Privacy by Architecture minimizes the collection or inference of sensitive information by unintended parties through the careful partitioning, decentralizing and obfuscation of information and process. Privacy by Policy Declarative policies capture privacy requirements and business needs, these are verifiable for compliance and correctness, are machine readable so can be enforced by software, and can be organized in a manner that supports differences across organizations. Privacy by interaction let data owners understand both what sharing means, and how their data is being shared. Global Information Model must support metadata and data from any authenticated party. Secure must use secure transport of data between authenticated parties; must secure all information at rest, and keep services simple.

Integrity must be able to verify the integrity of all metadata, data and PN services. Provenance must be able to verify the provenance of all metadata, data and PN services. Verifiable be able to understand and verify that policies, metadata and services are acting as expected Standard Based must utilize applicable standards to better ensure correctness and security. Integration must be able to easily connect existing clients and services.

Figure 58:
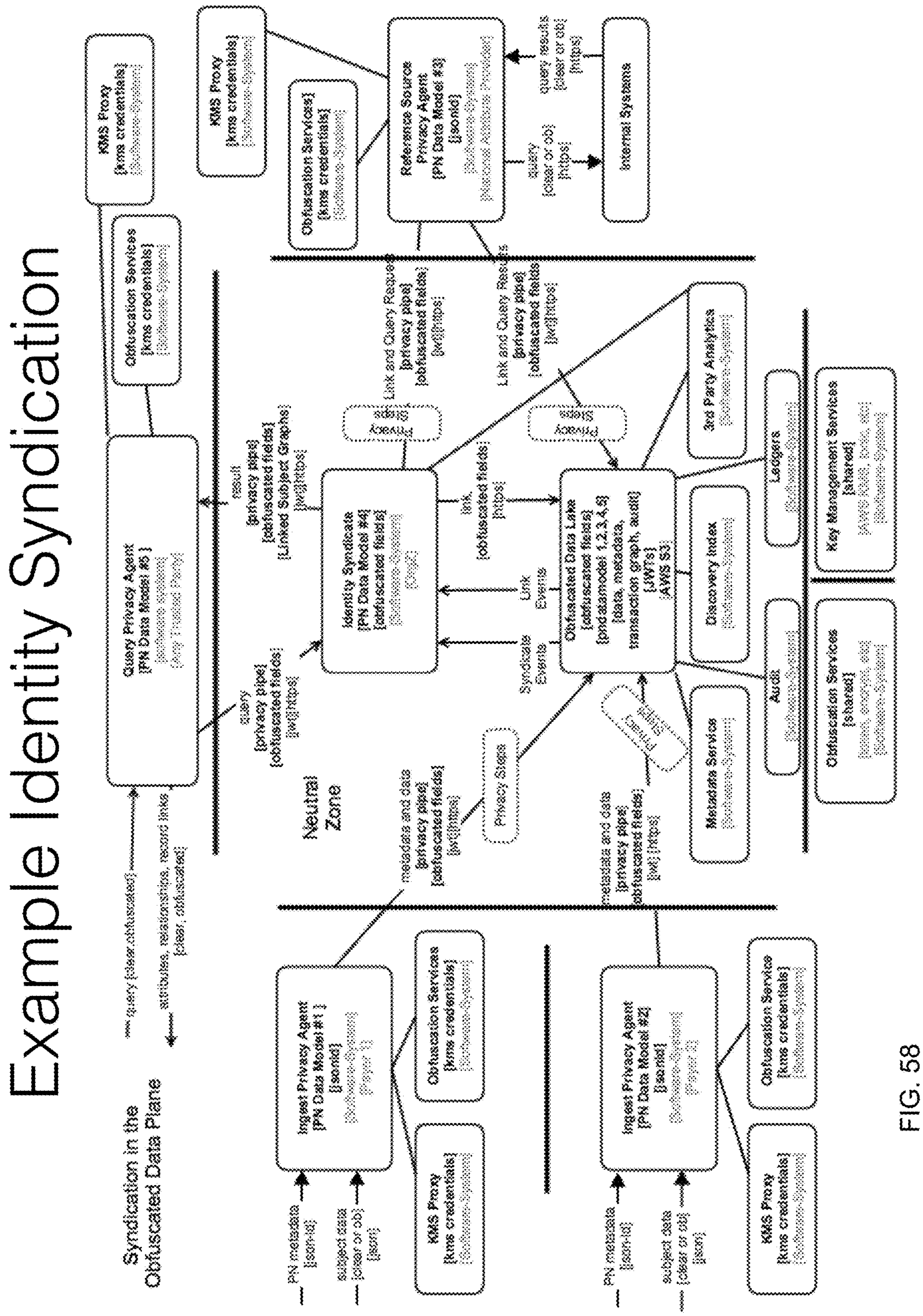
FIG. 58 illustrates a diagram showing an example of identity syndication.

FIG. 58 illustrates a diagram showing an example of identity syndication.

Figure 59:
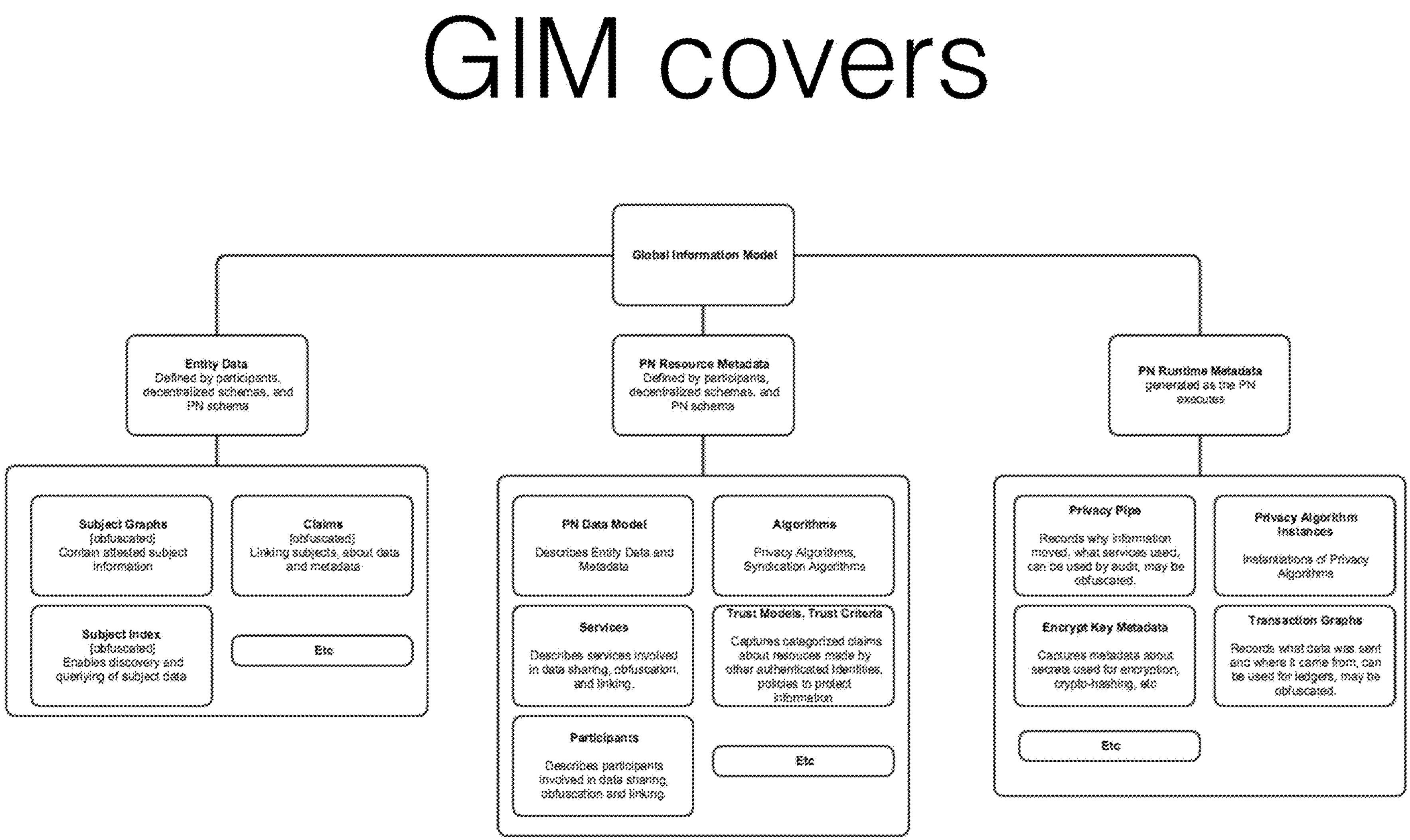
FIG. 59 illustrates a block diagram of a Global Information Model.

FIG. 59 illustrates a block diagram of a Global Information Model (GIM) or Global Information Model. The Global Information Model is a decentralzied JSON-LD schema that describes data, policies, credentials, descriptive metadata, algorithmic metadata, runtime metadata, etc.

Cross Organizational—Supports the mixing of data and metadata from any source into Global Data Graphs. This is achieved by normalizing all data into JSON Linked Data (JSON-LD) data models called PN Data Models. These may uses standard schemas or propriety schemas.

Obfuscated—As data and metadata are represented as JSON they can be Obfuscated by Privacy Pipes and Privacy Algorithms. The Privacy Algorithms are defined over the PN Data Models, and the necessary metadata is tracked at the field level.

Protected—As data and metadata are represented as JSON they can be protected by Trust Models, this is achieved by defining policies over the JSON-LD data models and capturing information about resources, participants, services, algorithms, and data.

Verifiable—Provides Provenance and Integrity using JSON Web Tokens and RS256 signatures, this can be augmented by any provenance model that can be represented as JSON-LD.

Global Data Graphs—This supports the creation of graphs that have: globally unique property names and node types from standard or propriety vocabularies; and globally unique IDs for the nodes. These graphs can be then be linking and merging into Global Graphs using standard graph processing algorithms and recorded using link Credentials.

Data Representation [PN Data Models]

Participants have a native data model, for example the Acme Enrollment Records, or NAP match service subject schema. To simplify PN metadata definition and processin; and better support cross organizational sharing participants are assigned their own JSON-LD complaint PN Data Model. The native model is mapped to it inside the clients "Privacy Agent". JSON-LD is used as it supports the creation and processing of graphs of subject data at both the organizational and cross organization levels. See linked data.

If the participants native data model is already JSON-LD compliant then it can be used as is, for example schema.org. All subjects are allocated a globally unique id that is a URL containing the domain name of the data owner. FIG. 60 illustrates an example of processing for normalization of data to JavaScript Object Notation for Lined Data (JSON-LD).

Obfuscation Requirements [Non Exhaustive]

Parties require the end-2-end obfuscation and de-obfuscation of field and/or object level of both data and metadata by trusted algorithms and services that meet the required privacy, compliance and business needs. Parties require support for: symmetric encryption; asymmetric encryption; crypto hash; tokenization; randomization; etc. Parties may want to envelope obfuscate the information by routing it through multiple obfuscation services. Parties require the use of shared Key Management Systems, and private or shared Obfuscation Services.

Output subject graphs may include field level data from many Parties, the Privacy Agents need to be able to orchestrate the decryption of the data. The client and destinations may have different obfuscation needs, for example the client requires AES encryption of all fields, the Identity Syndicate requires SHA2 encryption of just the key fields. Parties want to use certified algorithms to obfuscate their sensitive data.

Obfuscation Functionalities

The Privacy Network allows the conditional sharing of data by first obfuscating the data so that it can be shared with revealing it. This is called the obfuscation plane. Privacy Algorithms describe how to obfuscate an input JSON-LD graph at the property, object or graph level, producing an output obfuscated JSON-LD graph, called a Privacy Graph. Some Privacy Algorithms can be reversed to support the de-obfuscation. A Privacy Algorithm describes a multi-step (Privacy Step) and decentralized process that uses trusted Obfuscation Services and Key Management Services. It can support any obfuscation mechanism, such as AES, SHA2, Token, etc. It can use any COTS KMS, Encryption Services, Etc.

Figure 61:
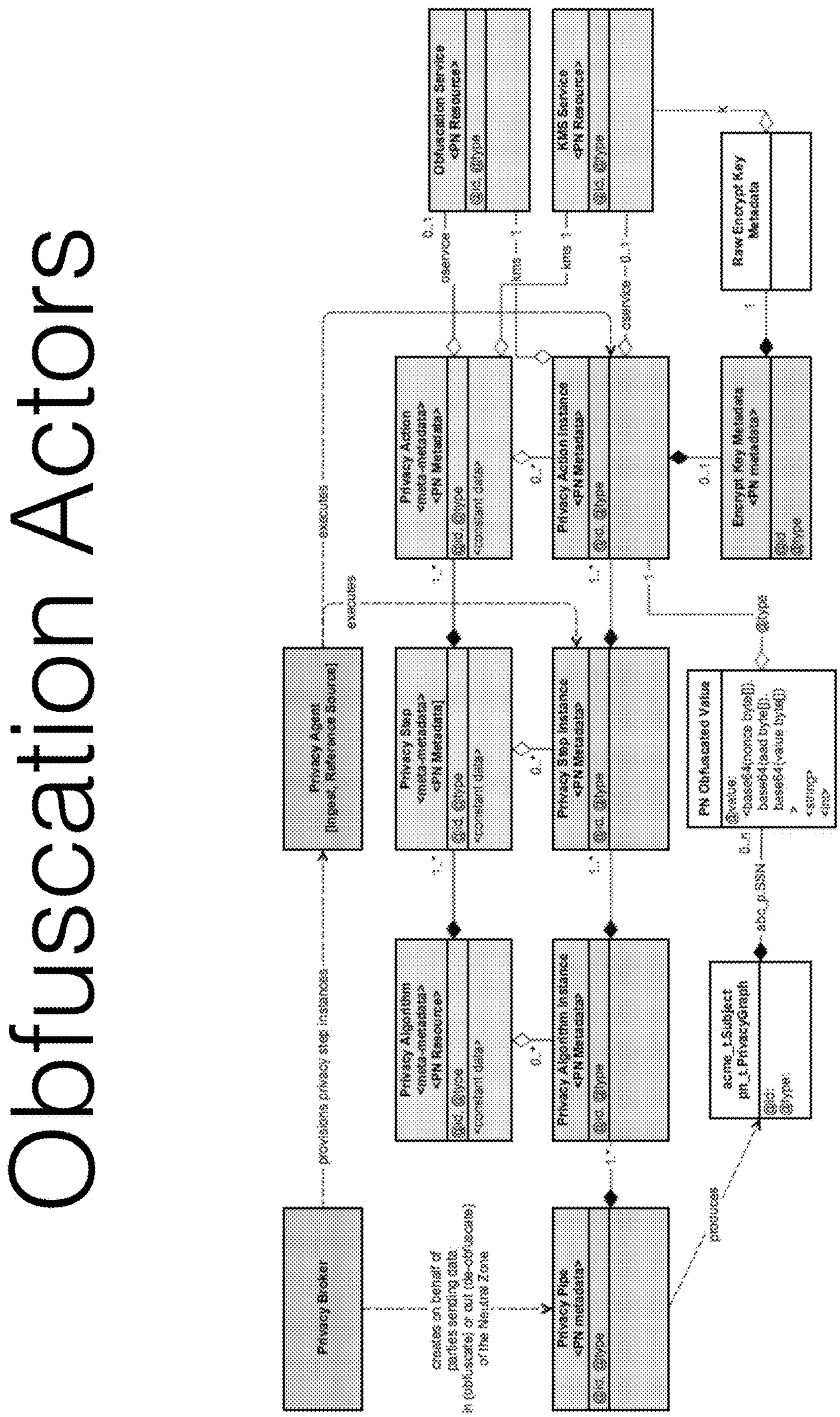
FIG. 61 illustrates a flow chart for obfuscation of system actors.

An Input Graph can be broken down and sent to multiple Privacy Steps, each step is responsible for obfuscating some part of graph and passing the results onto the next step using a HTTP(s) protocol. The final step is responsible for reforming the now obfuscated graph. Any intermediate step may be enveloping and already obfuscated piece of data. The obfuscation may occur at the field, column, object or graph level. It can occur to data or metadata. The Privacy Network tracks the necessary metadata needed to support de-obfuscation. To support end to end obfuscation the first obfuscation step and the last de-obfuscation step are executed by Privacy Agent(s) running in a domain trusted by the data owner and data consumer. Privacy Pipes are responsible for moving data into and out of the obfuscation plane, i.e. between parties, they instantiating Privacy Algorithms using trusted services. The final Privacy Graph may have both the schema and data obfuscated, and may have multiple dimensions of obfuscation per field, e.g. AES, SHA2, Token, etc. A Privacy Algorithm is metadata that other parties can describe, for example parties can state that Privacy Algorithm fooBar is a HIPAA compliant Algorithm, and other parties can choose to obfuscate their data with it. FIG. 61 illustrates a flow chart for obfuscation of system actors.

FIG. 62 illustrates an example of data processing with a one step privacy algorithm that applies advanced encryption standard (AES) encryption using Amazon web services (AWS) key management service (KMS) for the keys. FIG. 63 illustrates an example of data processing for obfuscation of data representation.

Protect Functionalities protect de-centralized information and requires: A Distributed Information Model that both describes and captures claims about data, metadata, participants, services, etc.; that can be used to evaluate trust and quality. This is achieved through Trust Models that use ontologies to describe entities, and capture claims about them. The claims allow parties to assign attributes/tags to entities. The tags describe privacy, compliance, business requirement and quality requirements. The tags are associated with trusted bodies, for example the acme level 3 link credential, and are issued by credential authorities using x509 style certs.

A Policy Language that allows parties to describe privacy, compliance and business requirements of data consumers, and allows data consumers to describe quality needs. This is achieved by using a combination of information flow control by the tagging of information and consumers, and a more fine grained control using a JSON Format XACML style language that describes subject specific attributes that the subject accessing the resource must gain, for example must be a doctor of data subject.

Figure 64:
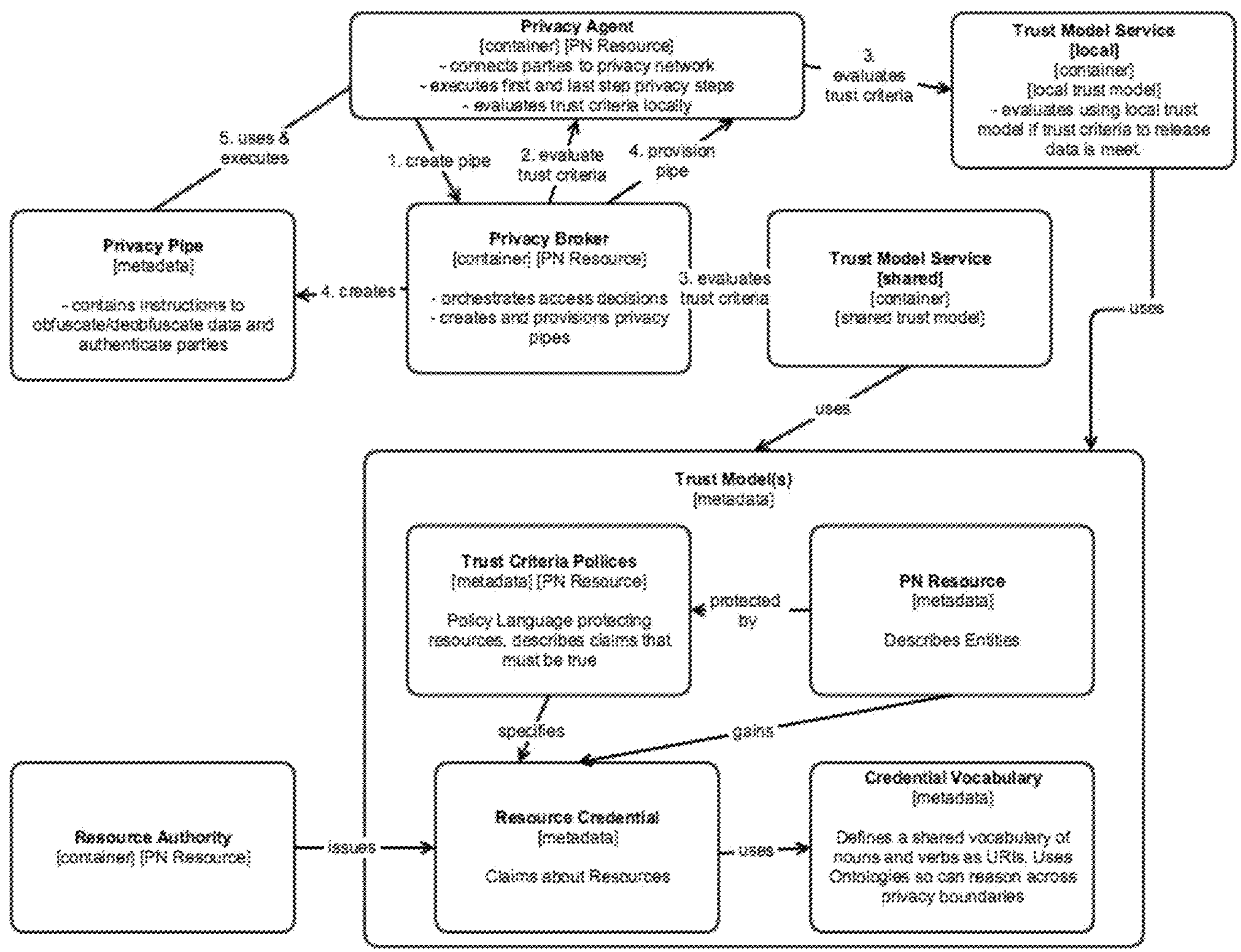
FIG. 64 illustrates a flow chart showing how system actors are protected by the system.

A Distributed Policy Management and Evaluation Architecture that allows access decisions to be made at the edges which enhances privacy and enables scale. This is achieved through the Privacy Broker and Trust Model Services. To support cross organizational sharing the metadata and polices should be Privacy Preserving and allow any sensitive information to be obfuscated. For example policies may contain PN Obfuscated values, and the polices and tags themselves JSON-LD that can be obfuscated by a Privacy Algorithm. FIG. 64 illustrates a flow chart showing how system actors are protected by the system.

Resources, Tags, Trust Criteria, Trust Models; and Protect and Integrity.

Privacy Network Resources are JSON-LD metadata describing resources, participant profiles, services, algorithms, etc. Examples of resources are PN Data Models, Privacy Algorithms, Organizations, Privacy Agents, etc. Parties can make signed claims about PN Resources that assign attributes/tags to the resource. These tags can be ontology based URLs that are backed by issuing authorities. Examples are: a HIPAA compliant privacy algorithm, or a National Attribute Provider, or an Authorized Recipient. This is analogous to X509v3 credential polices, and credential practices. These claims can be viewed as a JSON-LD graphs called a Trust Graph that can be obfuscated by Privacy Algorithms and Linked using the Identity Services.

Tags can be used to protect resources, for example only consumers with tags that match the consumed resource can access the resource; or more detailed polices that define what tags a consuming resource must have and are associated with a resource. These are called Trust Criteria, that are in JSON-LD format. Tags can be used to define quality attributes about resources so that consumers can decide if they want the resource, for example the taxID data must come from a National Attribute provider as attested by foobar. These are called Trust Criteria. To better support cross organization sharing the above information can be organized and categorized by ontology based Trust Models, that may be local or shared, and aggregated into Unified Trust Models. FIG. 65 illustrates an example of code for resource credentials.

Trust Vocabularies describe the terms used in Trust Criteria Policies and Resource Credentials including:

- "http://trusted_credential_party/Authorized Recipient"
- "http://payer1.schema.webshield.io/type #Authorized_Purpose_of_Use"
- "http:// . . . /type #Commercial_Terms"
- "http:// . . . /type #HIPAA_Authorized_Basis"
- "http:// . . . /type #HIPAA_Business_Associate_Agreement"
- "http:// . . . /type #IT_Security_Assurance_Level_Medium"
- "http://pn.schema.webshield.io/type #Purpose_of_Use"—subclasses of
- "http://pn.schema.webshield.io/type #Identity Verification"
- "http:// . . . /Security_Practices"

Trust Criteria Polices [Protecting Payer 1 Enrollment Record]

A Privacy Pipe to send Payer 1 subject data to ABC.com needs to evaluate the Trust Relationships. Is ABC.com trusted with Payer 1 Enrollment Records? Do ABC.com Enrollment records meet ABC.com quality level, note this can cover can they use service? Is Payer 1 trusted with ABC.com subject data?

Example Payer 1 Policy Stating the Trust Criteria that ABC.com Must Meet to Read Payer 1 Records:

- "Purpose of Use" supported by "HIPAA Authorized Basis"<plan administrator> AND
- "Purpose of Use" is "Payer 1 Authorized Purpose of Use" AND
- "Payer 1" has executed "HIPAA Business Associate Agreement" with <recipient org> AND
- "Payer 1" has agreed to "Commercial Terms" with <recipient org> AND
- "Payer 1" trusts "IT Security Practices" of <recipient org> AND
- <recipient org> is "Payer 1 Authorized Recipient" AND
- <recipient org> has "IT Security Assurance Level Medium" as attested by 'abc.com'

FIG. 66 illustrates an example of code for trust criteria as part of the signed JSON Web Token (JWT) containing the data so cryptographically bound.

FIG. 67 illustrates an example of code for trust criteria protecting payer enrollment records.

Figure 68:
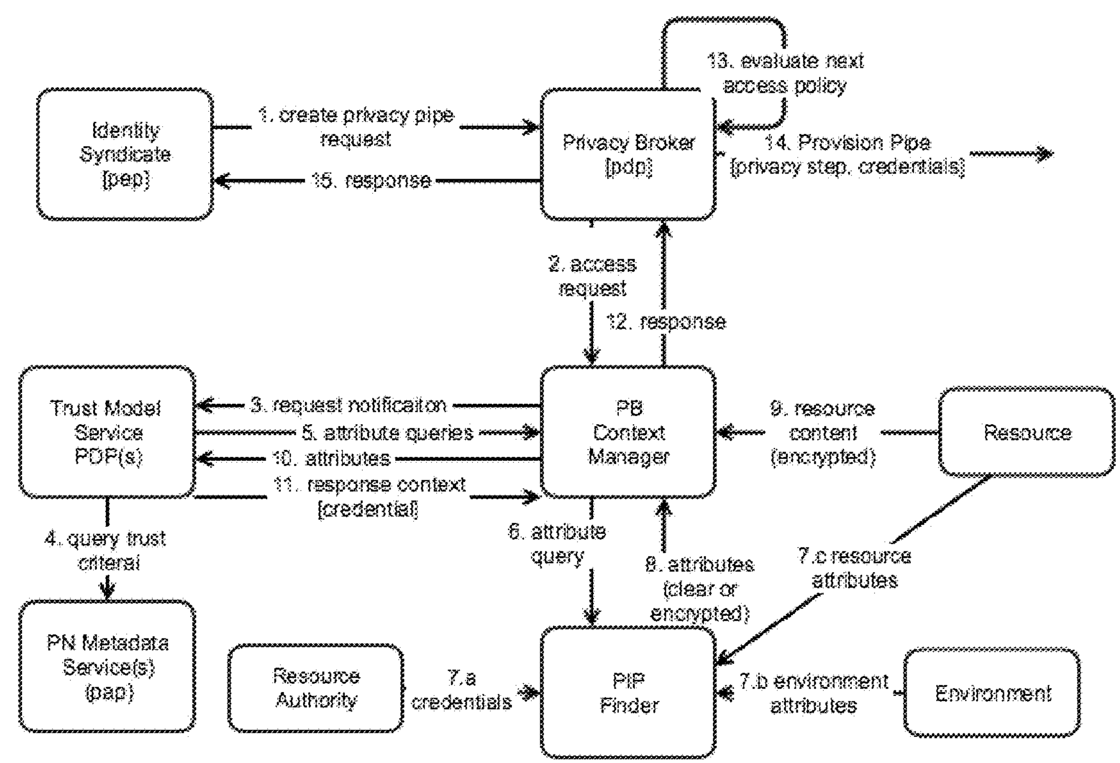
FIG. 68 illustrates a block flow chart for policy evaluation that uses privacy pipes to ensure that only valid parties see de-obfuscated data.

FIG. 68 illustrates a block flow chart for policy evaluation that uses privacy pipes to ensure that only valid parties see de-obfuscated data.

Attribution and Audit/Compliance—Transaction Graph

The identity syndicate provides a query interface that returns a result graph containing information from multiple sources. For attribution/payment purposes this is associated with a Transaction Graph, A Transaction Graph is a JSON LD structure that contains the information listed below. It is a JWT issued by the Identity Syndicate.

- The client
- The Privacy Pipe that was used
- For each subject what subject link credentials were used to create the global subject
- For each subject property what was the source of that property, for example the hash of the JWT that sources the property
- For each calculated subject property who generated the calculated subject, and what source properties were used in the calculation.

As it is a JSON-LD structure is can be obfuscated and written to a public or shared ledger such as blockchain. It can also be written to a private ledger without obfuscation.

Audit/Compliance

Data is moved between parties using Privacy Pipes, for example the query result graph is sent to the consumer using a Privacy Pipe. A Privacy Pipe is a JSON LD structure that contains the information listed below. It is a JWT issued by a Privacy Broker. The client, destination and all intermediate steps. What metadata was used to obfuscate or de-obfuscate the data What metadata was used to evaluate privacy and compliance. As it is a JSON-LD structure is can be obfuscated and written to a public or shared audit. It can also be written to a private audit without obfuscation.

Privacy Agents

Privacy Agents connect parties that want to share data and are responsible for protecting the parties data. They provide the following:

Protocols to get and send data to/from external parties:

A protocol to HTTPs POST data to another party using a Privacy Pipe

A protocol to HTTPs POST a query for data to another party using a Privacy Pipe

Figure 69:
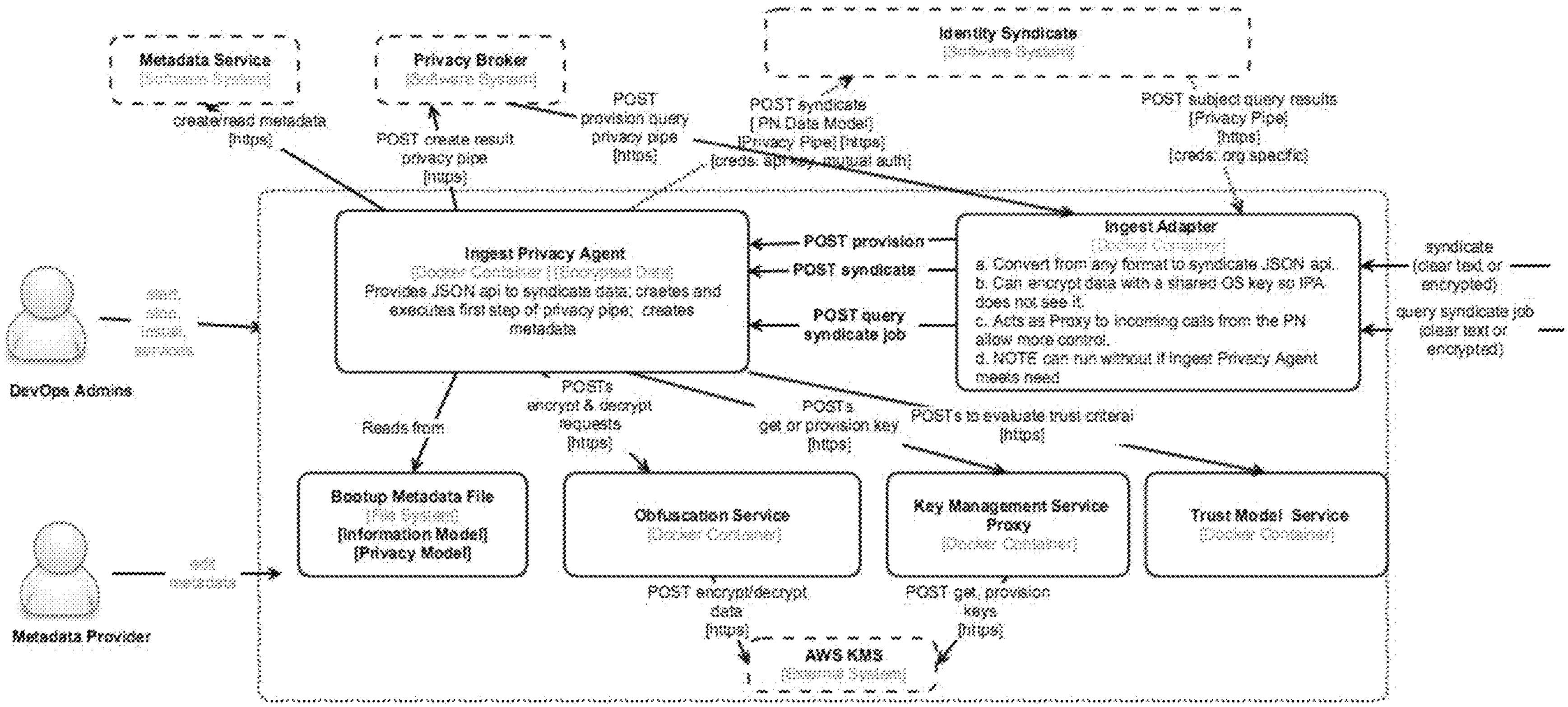
FIG. 69 illustrates an example of data ingest privacy agent sending subject data to the identity syndicate in a software system.

A protocol to accept a HTTPs POST of data from another party down a Privacy Pipe A protocol to accept a HTTPs POST of a Query from another party down a Privacy Pipe, and then POST the results down another Privacy Pipe A protocol to accept a HTTP(s) POST to evaluate Trust Criteria protecting participants data A protocol to accept the HTTP(s) POST of Privacy Pipe Provisioning requests from trusted Privacy Brokers They run in a trusted domain, for example the data owners AWS environment. As part of Privacy Pipe processing they enable end-2-end encryption as they. Execute first step in an outbound Privacy Pipe, in which they obfuscate the data using a trusted Obfuscation Service and Trusted KMS proxy, before the data is sent out of the trusted domain. Execute the last step in an inbound Privacy Pipe, in which they de-obfuscate encrypted data and ensure last step trust criteria. They are responsible for packing metadata and data in a JWT that is signed using the participants private key. They are responsible for loading the participants syndication metadata to a private or shared metadata service. FIG. 69 illustrates an example of data ingest privacy agent sending subject data to the identity syndicate in a software system.

Identity Syndicate and Subject Linking Identity Syndication Overview

The Identity Syndicate is a software system that lives in the Obfuscation Plane (Neutral Zone) and enables parties to pool and link subject information into Privacy Preserving Global Subject Graphs that can be queried by trusted parties. It orchestrates the following services. The querying for subject data from trusted authorities using Privacy Pipes The verification of subject data by trusted authorities using Privacy Pipes The enrichment of subject data by trusted authorities using Privacy Pipes. The production of Subject Link Claims that link subject information from different organizations to some level of confidence, using privacy Pipes It produces Obfuscated Global Subject Graphs that can be queried by trusted parties. An Obfuscated Discovery Index that can be used to query for global subject data using obfuscated values Obfuscated Subject and Subject Link Credentials that are wrapped in signed JWTs, and can optionally by stored in an Obfuscated Data Lake Query Result Graphs that contains information from multiple parties and the associated transactions graphs.

Identity Syndication [Consists Of]

The Identity Syndicate is a software system that consists of:

A common Identity Schema that is used to map between participants identity attributes, note to avoid information loss subject data is alway sent and stored in its original PN Data Model format. The mapping between a parties PN Data Model and the common Identity Schema is held in the PN Data Models.

A set of protocols and schema to syndicate, verify, enrich, link and query for syndicated subject data usage Privacy Pipes, supporting the production of Obfuscated Global Subject Graphs.

A configurable Syndication Algorithm that allows data owners to describe what parties that trust to produce link claims, this is executed by the service.

A Privacy Algorithm that defines a consistent crypto-hashing of key information.

The ability to add trusted authorities outside the Obfuscation Plane that can verify, enrich and link subject data.

The ability to add trusted authorities inside the Obfuscation Plane that can link subject data.

Linking Subjects—The Identity Syndicate Service orchestrates the production of Subject Link Claims that link subject information from different organizations to some level of confidence. These are added to the Obfuscated Data Lake. The claims are produced by trusted authorities running either on obfuscated or clear text data. In the latter case the Identity Syndicate asks the Privacy Broker to create a Privacy Pipe to send the data to the authority.

The Identity Syndicate provides A JSON-LD schema that is used to map between organizations. Note information is not stored in this schema format, it is only used for mapping. A Privacy Algorithm that defines a consistent crypto-hashing of key information. This is added to the Obfuscated Data Lake. A configurable Syndication Algorithm that allows data owners to describe what parties that trust to produce link claims, this is executed by the service. A query interface for returning syndicated subject data. This requires the Identity Syndication Service to create a privacy pipe to send back the results. FIG. 70 illustrates an example of code for global identity graphs created from link credentials issued by trusted parties.

FIG. 71 illustrates an example of code for a query using GraphQL.

Figure 72:
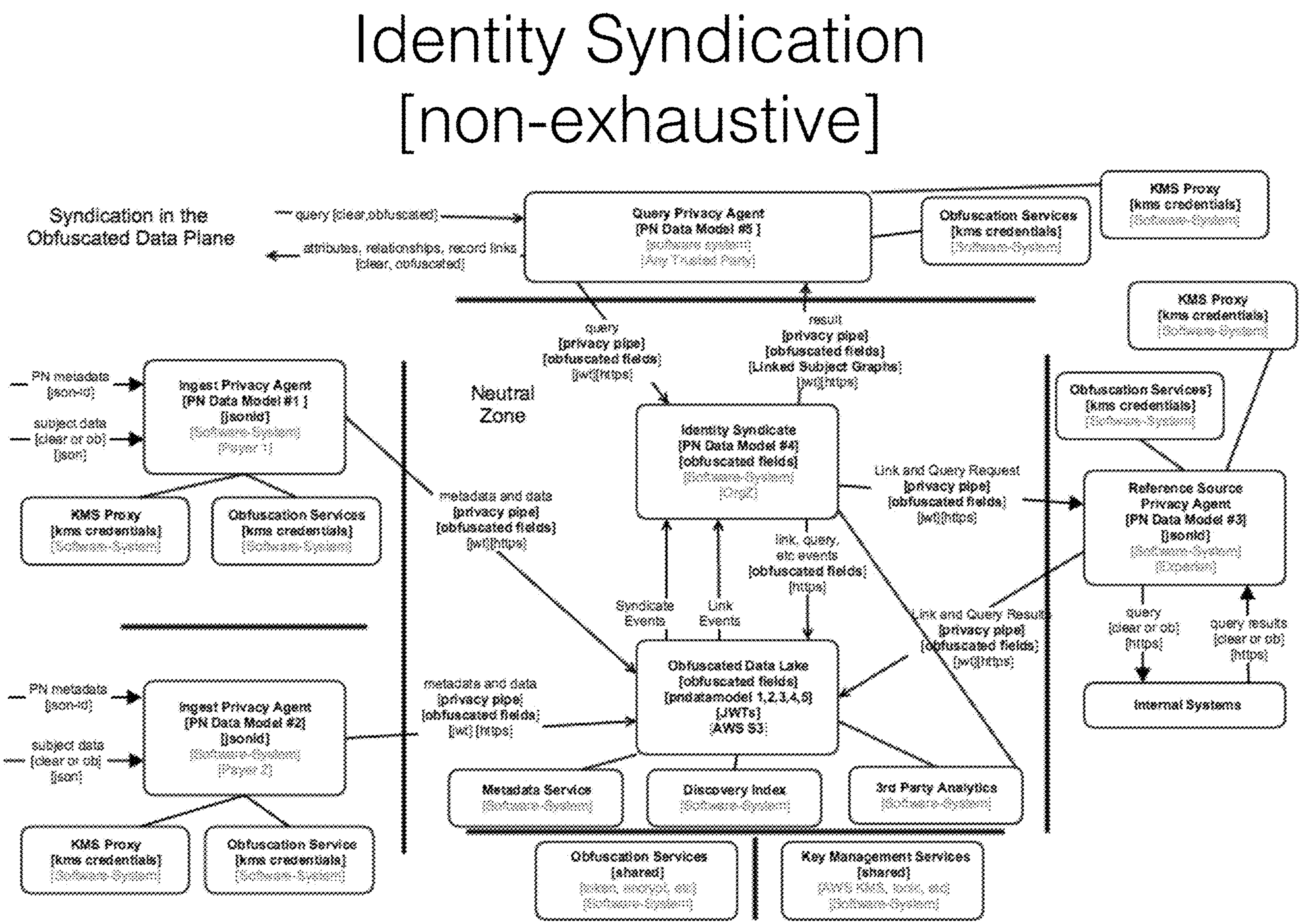
FIG. 72 illustrates a block flow chart for identity syndication and an obfuscated data lake.

FIG. 72 illustrates a block flow chart for identity syndication that interacts with an obfuscated data lake.

Figure 73:
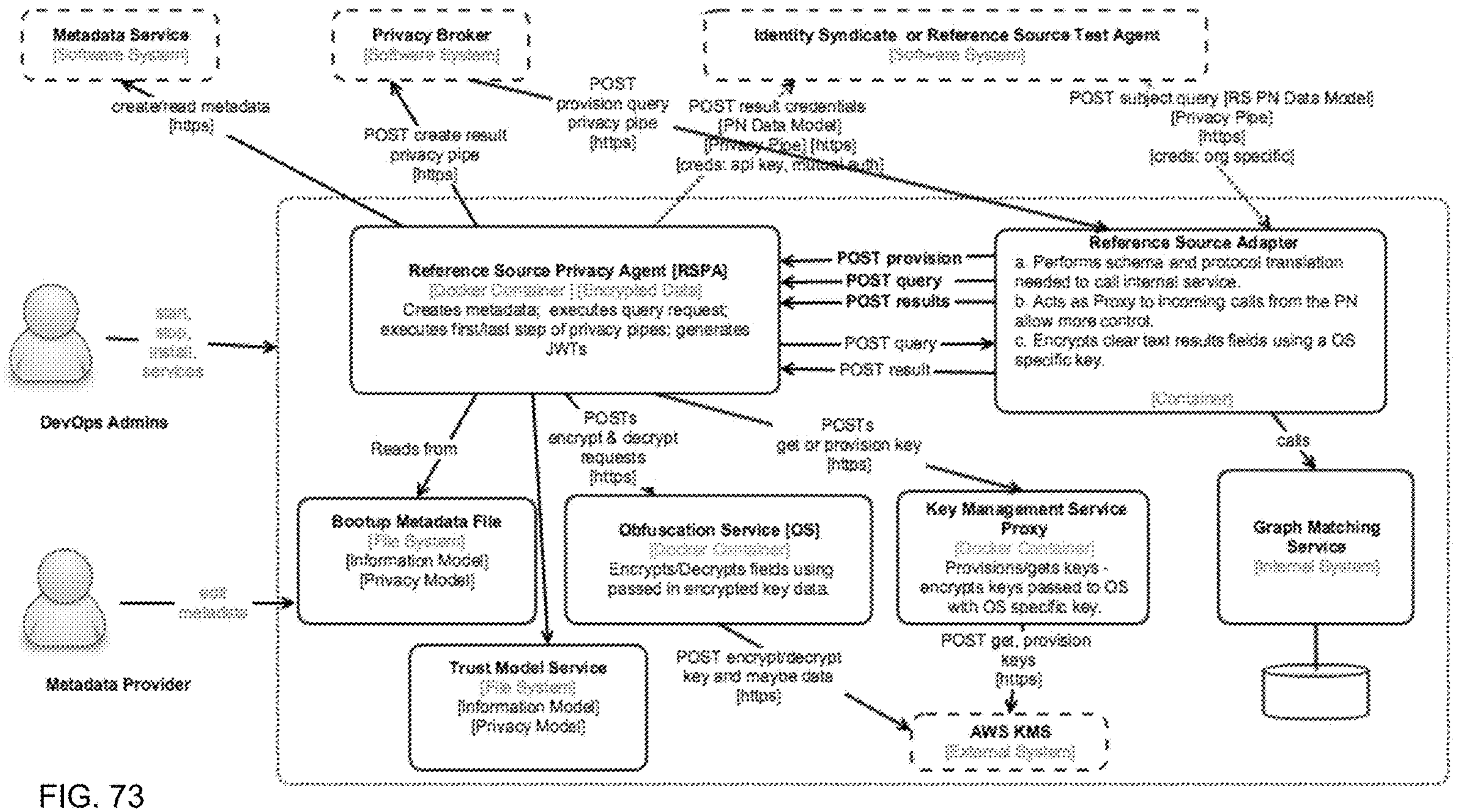
FIG. 73 illustrates an example of a block diagram showing a reference source privacy agent.

FIG. 73 illustrates an example of a block diagram showing a reference source privacy agent getting subject verify, enrich and link request from the identity syndicate software system.

Figure 74:
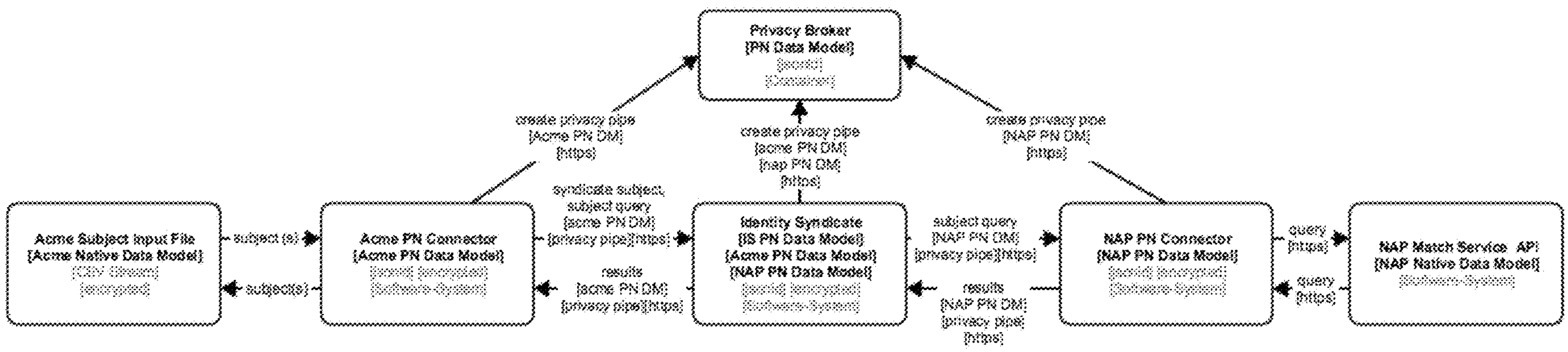
FIG. 74 illustrates an example of a block diagram showing mapping of subject identity data.

FIG. 74 illustrates an example of a block diagram showing mapping of subject identity data.

Figure 75:
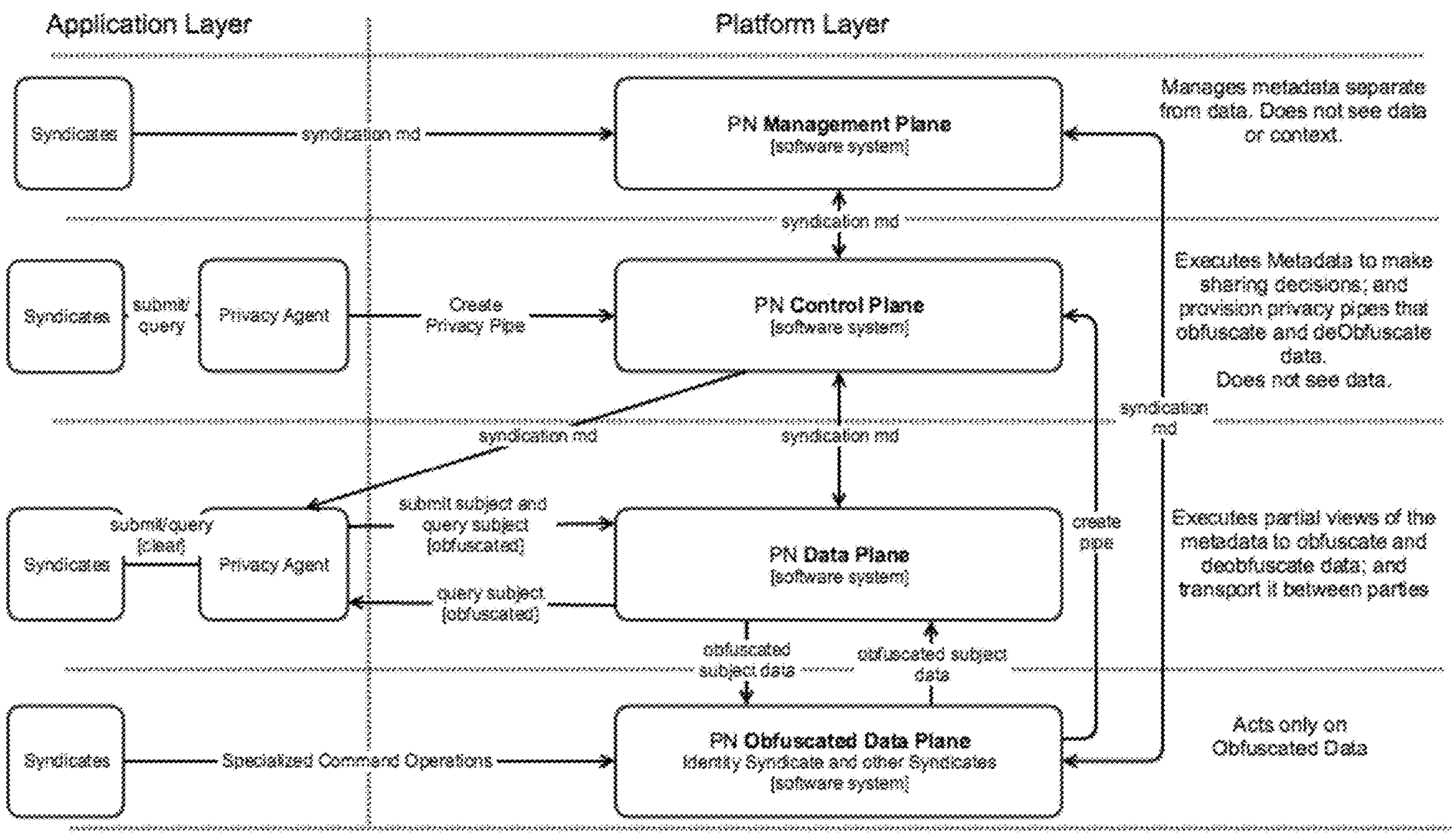
FIG. 75 illustrates an example of a block diagram showing interaction of data between the application and the platform layers.

FIG. 75 illustrates an example of a block diagram showing interaction of data between the application and the platform layers between the control plane, management plan, data plane, and obfuscation plane.

Figure 76:
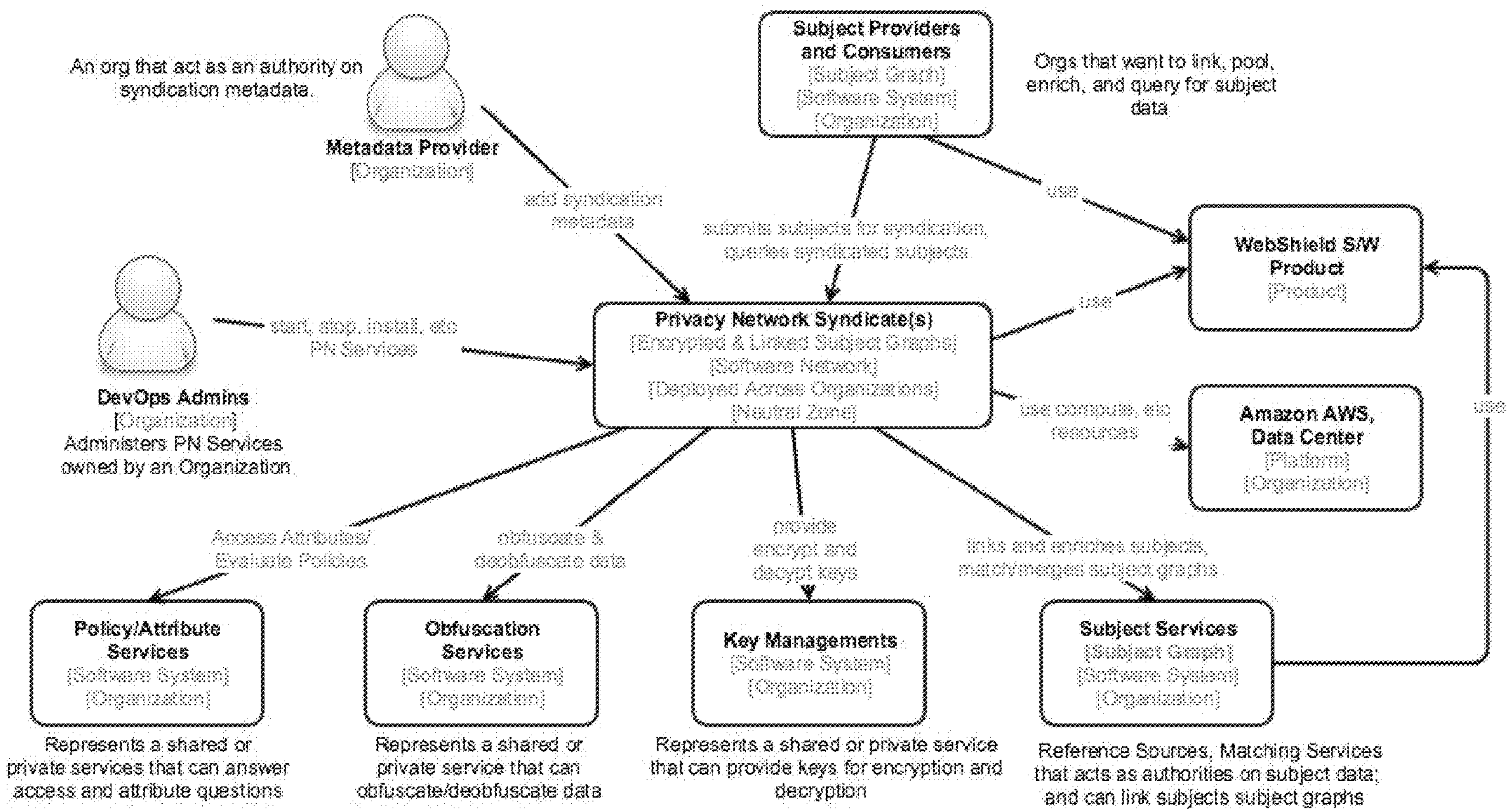
FIG. 76 illustrates an example of a block diagram showing interaction of parties involved in a syndicate through the privacy network.

FIG. 76 illustrates an example of a block diagram showing interaction of parties involved in a syndicate through the privacy network.

Technology Overview

All services packed as Trusted Docker Containers, so provenance and integrity can be verified. Services present HTTP(s) REST APIs, that can be secured using Mutual Authentication, or API Keys. Services are developed in NodeJS of Go-Lang JSON-LD used to represent all information JSON Web Tokens used to sign all information using public/privacy keys. Key Management Services—support AWS KMS, can be extended to others by external parties. Obfuscation Services—support AWS KMS, Native using go-lang crypto libraries, can be extended to support other parties. Query is based on GraphQL but can extended to support others Databases can be any, currently support DynamoDB.

Unified Trust Model Development Methodology. The system can evaluate and document solution requirements, design and deployment context in order to identify: relevant resources (technology, data sources, organizations, org structure/roles/users, compliance practices, etc.), relevant commercial policies and legal/regulatory compliance requirements. The system can specify resource descriptions of relevant resources, resource description, provenance, narrative description, supporting documentation. The system can specify trust criteria that must be satisfied in order to authorize access to a specified resource, trust criteria metadata, provenance, narrative description, supporting documentation. The system can specify assessment credentials that must be satisfied in order for a resource credentials to be trusted, assessment credential metadata, provenance, narrative description, supporting documentation, specify assessment methodologies that can verify whether a resource should be issued a credential. The system can specify assessment methodology metadata, provenance, narrative description, methodology documentation. The system can specify validation credentials that verify that a resource's credentials satisfy specified trust criteria, validation metadata, provenance, narrative description, mechanisms description. The system can specify audit & certification process criteria for performing and reviewing assessments and documenting attestations, audit & certification metadata, provenance, narrative description, staff credentials, administrative controls. The system can authorize staff implement assessment process: perform assessments, document results, record attestations, upload documentation and attestations into document repository, and load trust model metadata into metadata repositories.

Figure 77:
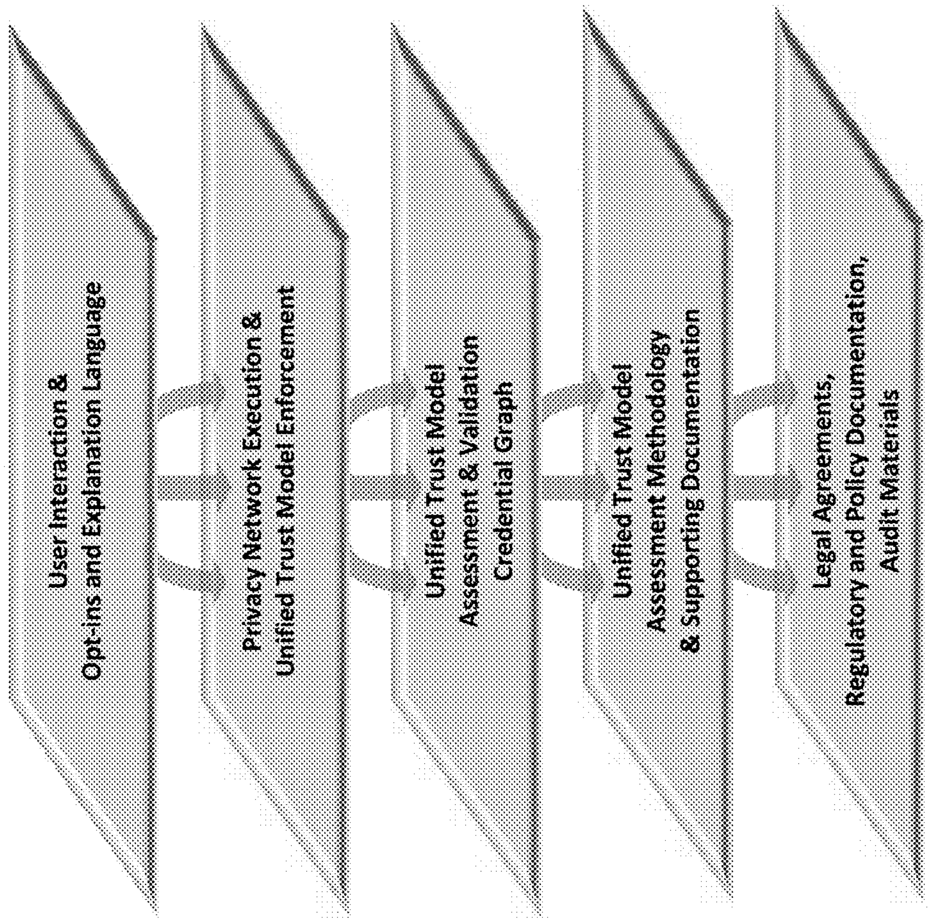
FIG. 77 illustrates a diagram of the unified trust model layers.

FIG. 77 illustrates a diagram of the unified trust model layers.

Figure 78:
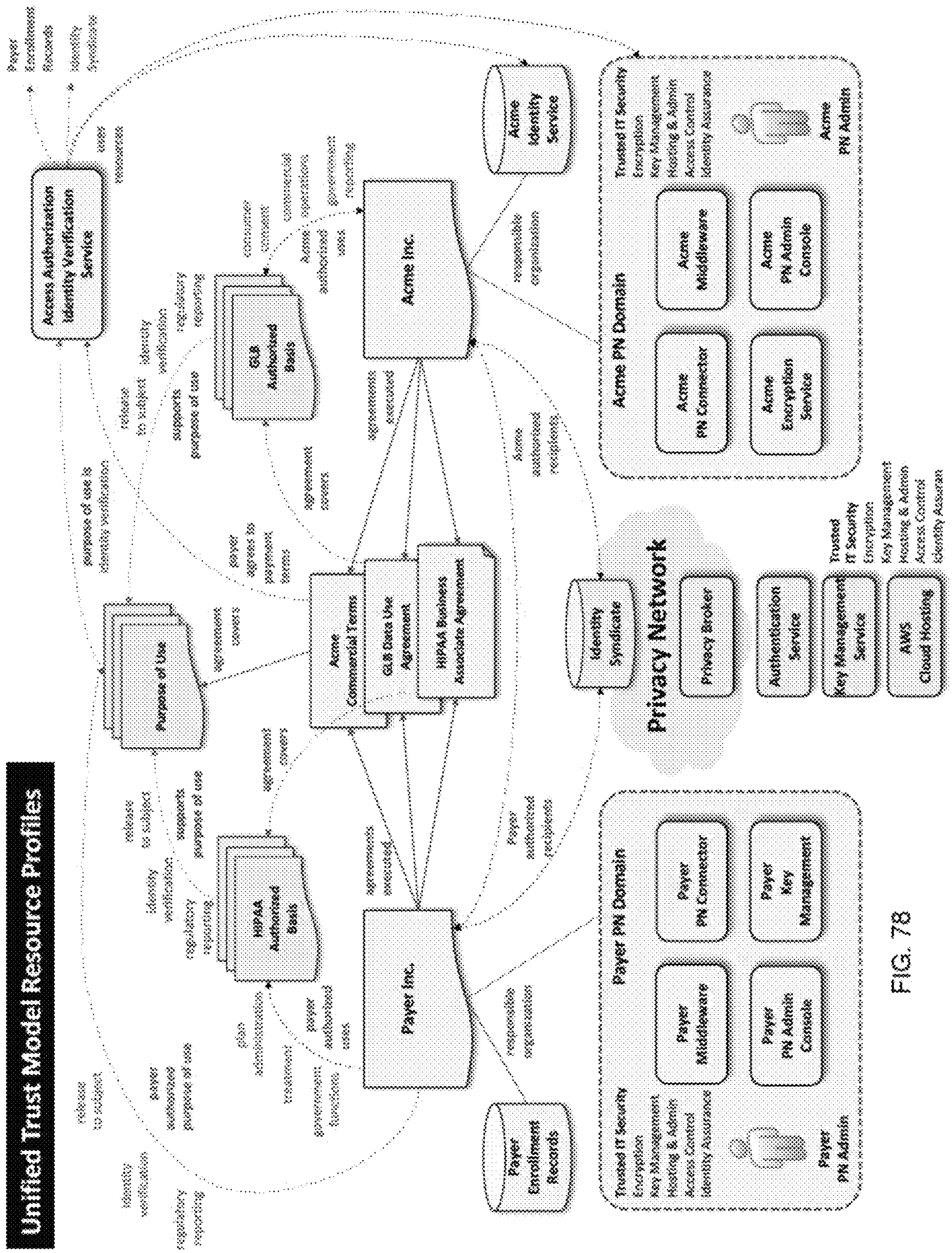
FIG. 78 illustrates an example of a block diagram showing unified trust model resource profiles.

FIG. 78 illustrates an example of a block diagram showing unified trust model resource profiles.

Figure 79:
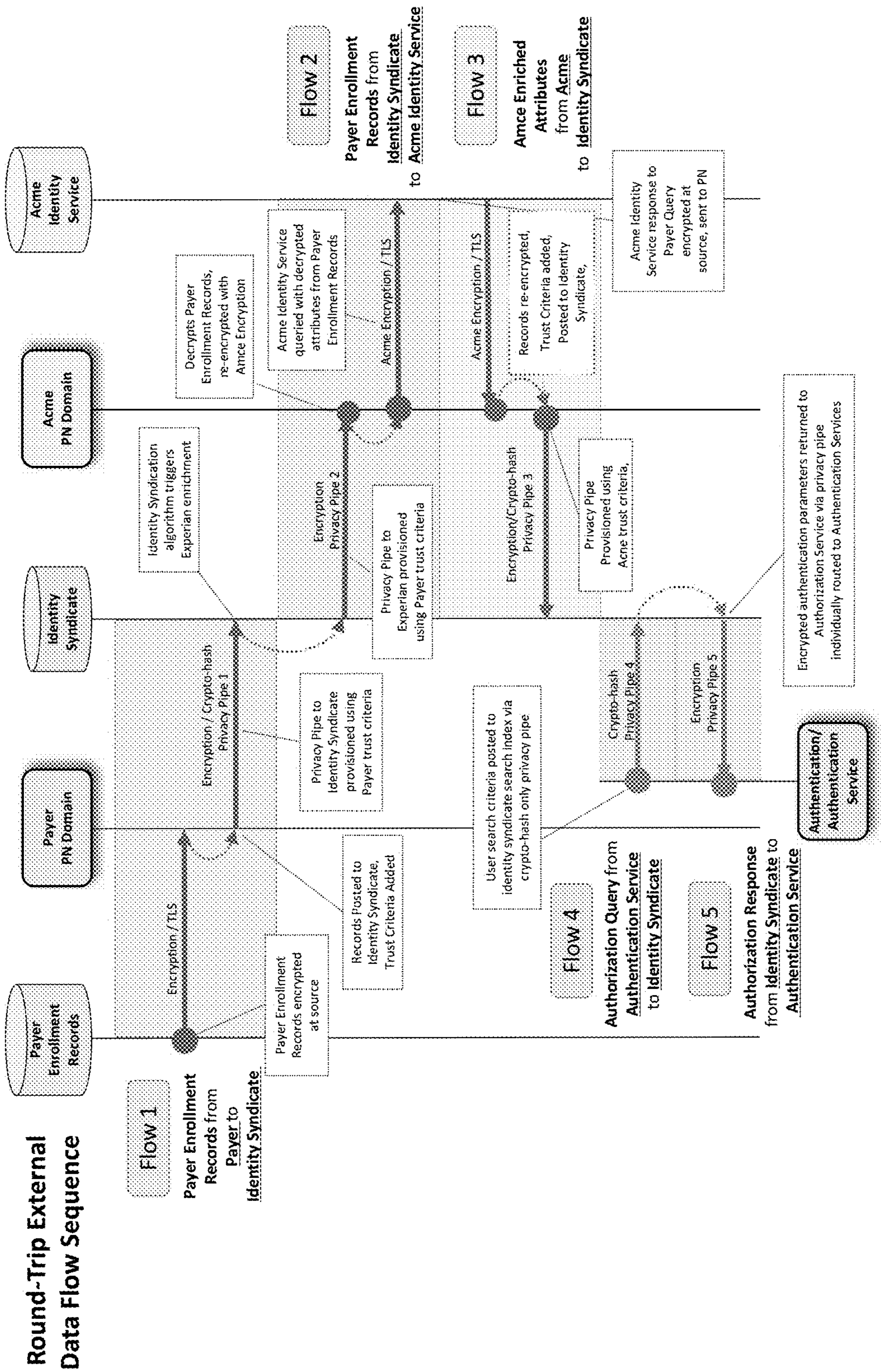
FIG. 79 illustrates an example of a block diagram flow chart showing a round-trip data flow sequence.

FIG. 79 illustrates an example of a block diagram flow chart showing a round-trip data flow sequence.

Figure 80:
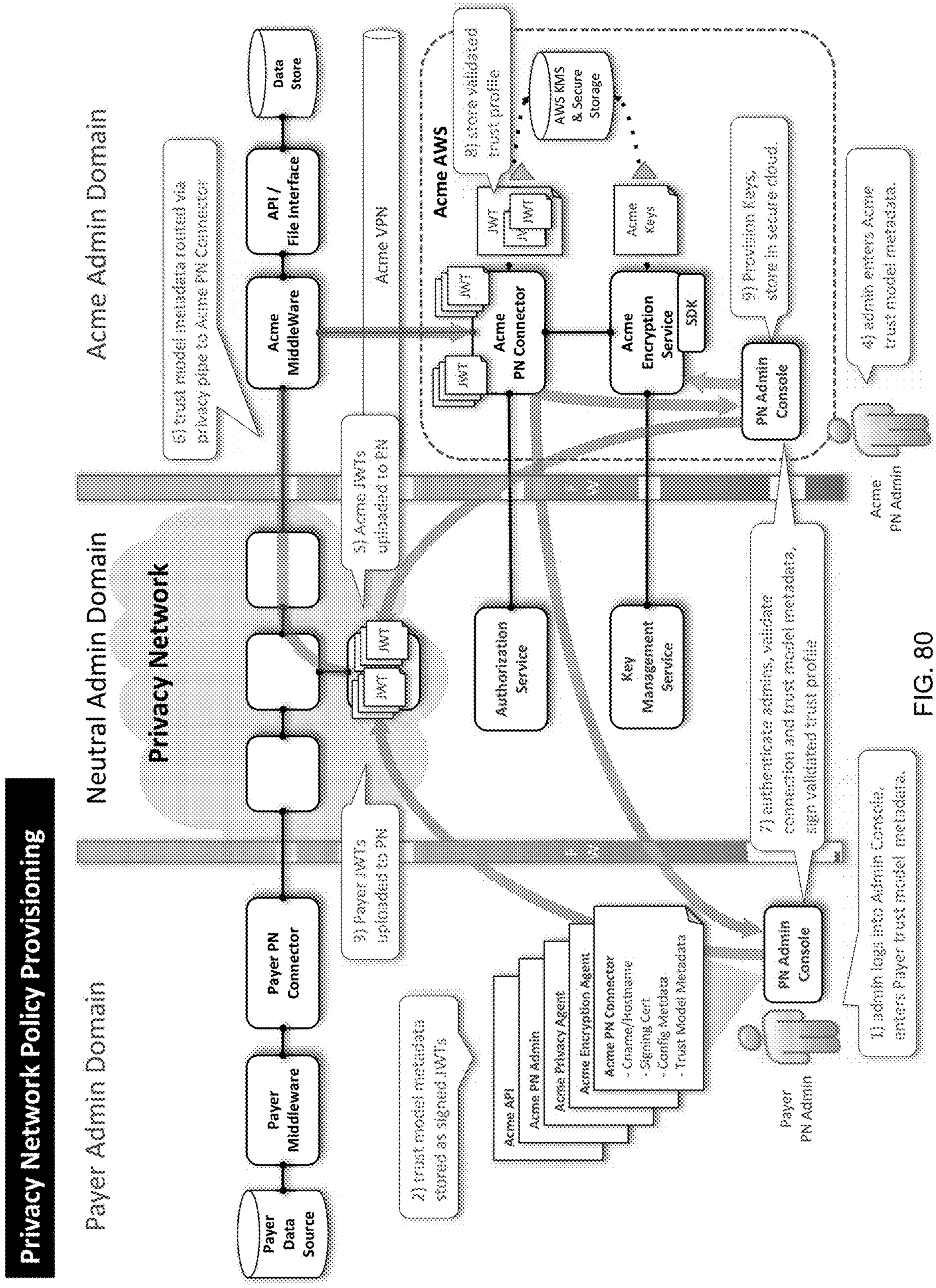
FIGS. 80 and 81 illustrate an example of a block diagram flow chart showing a data flow sequence between administrative domains.
Figure 81:
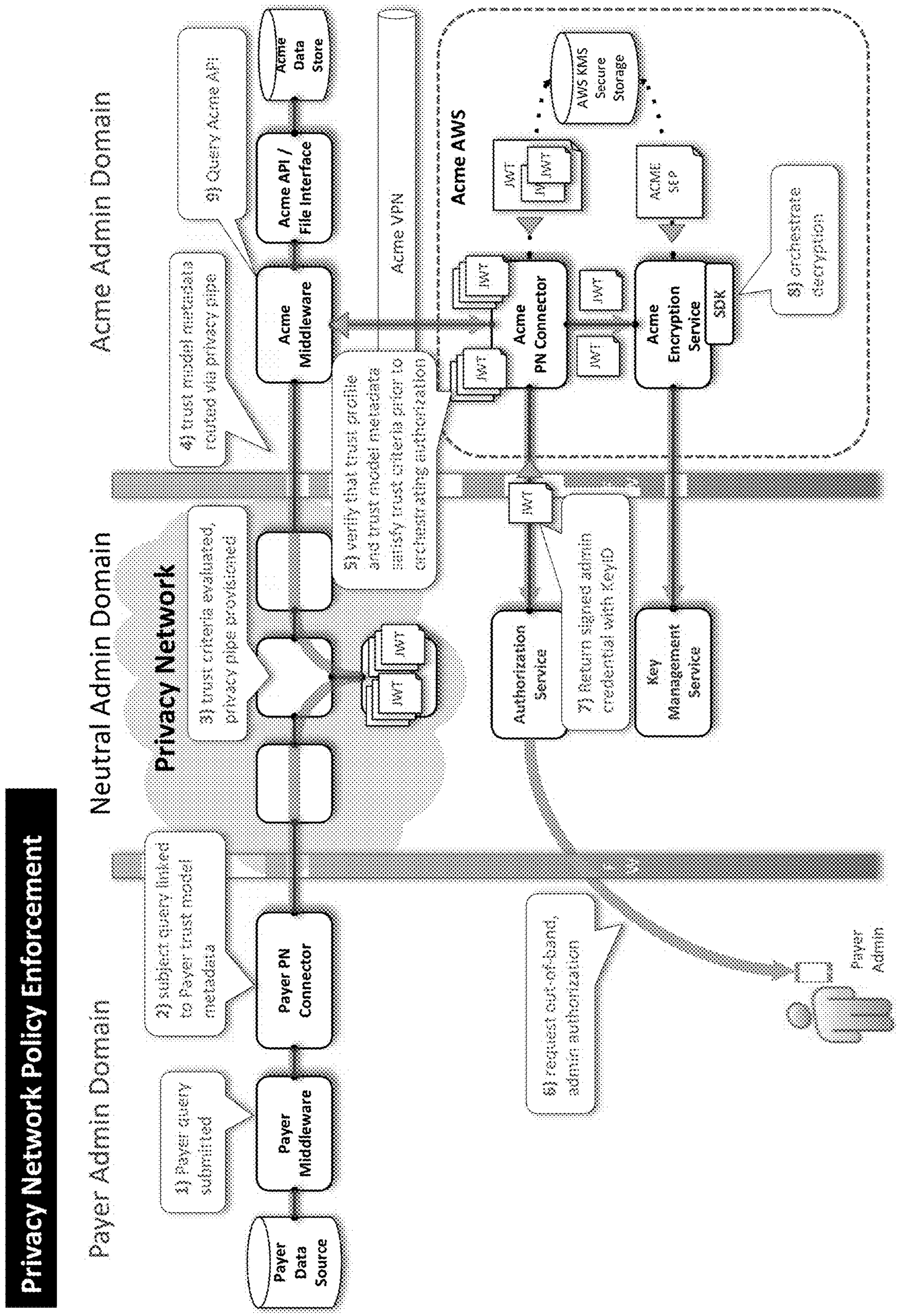
Figure 82:
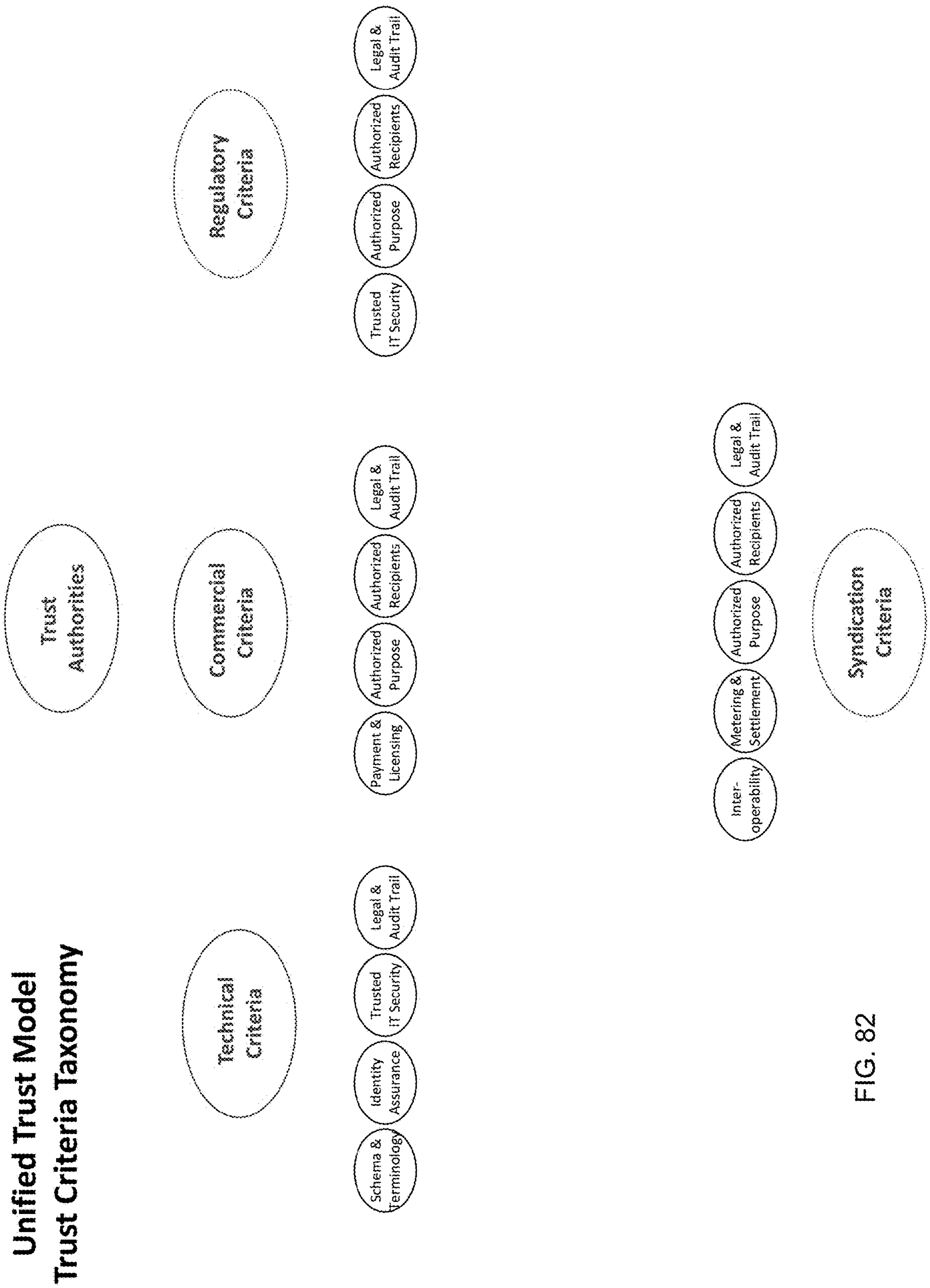
Figure 83:
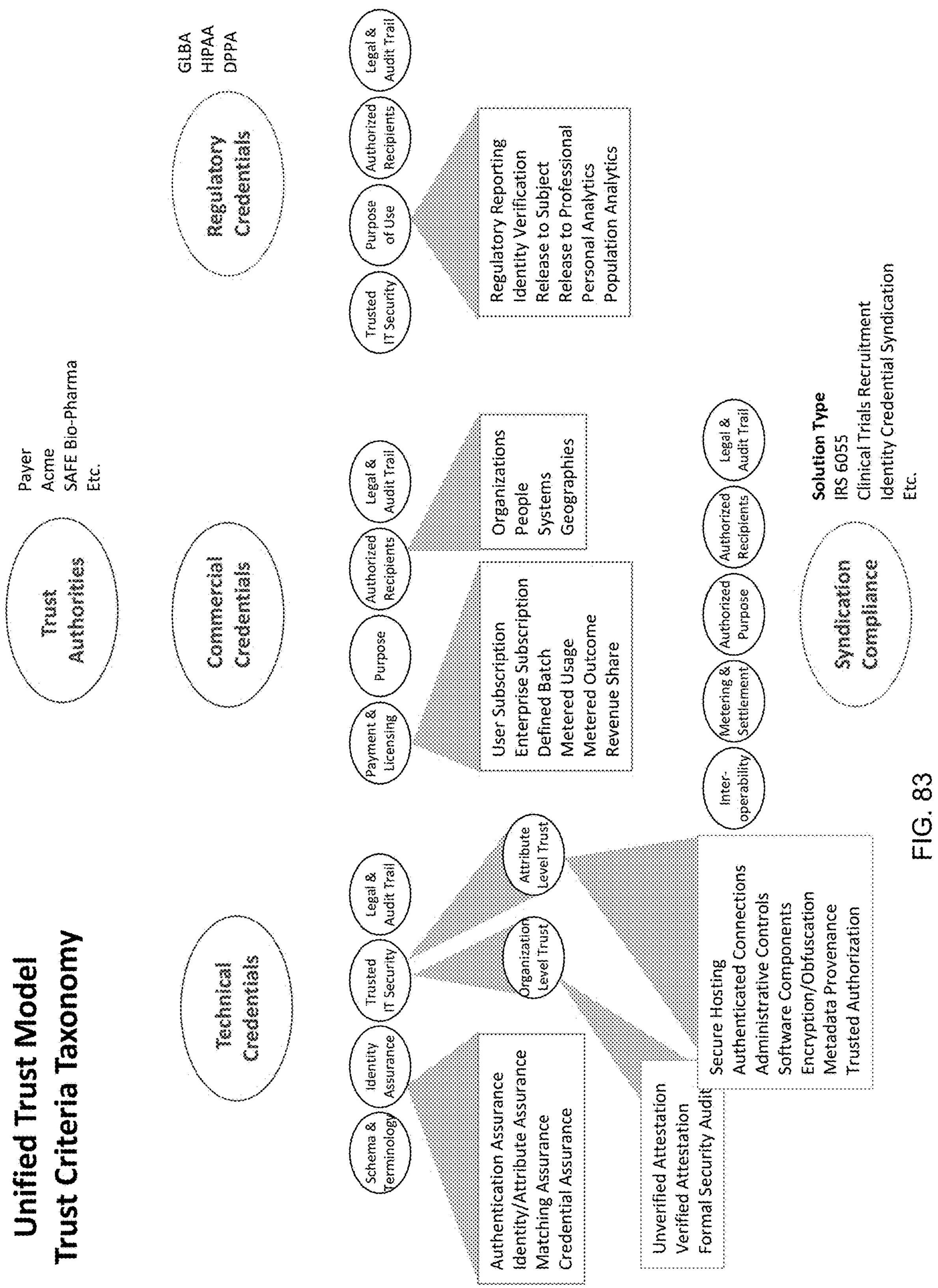
Figure 84:
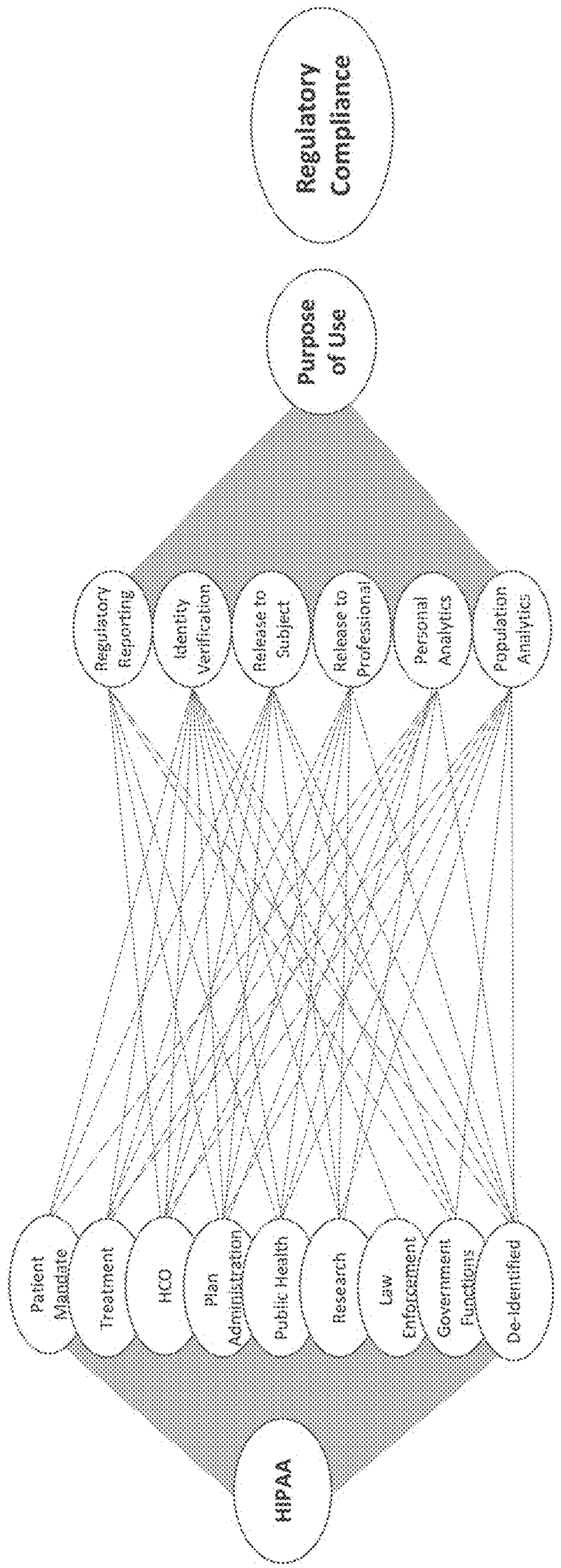
Figure 85:
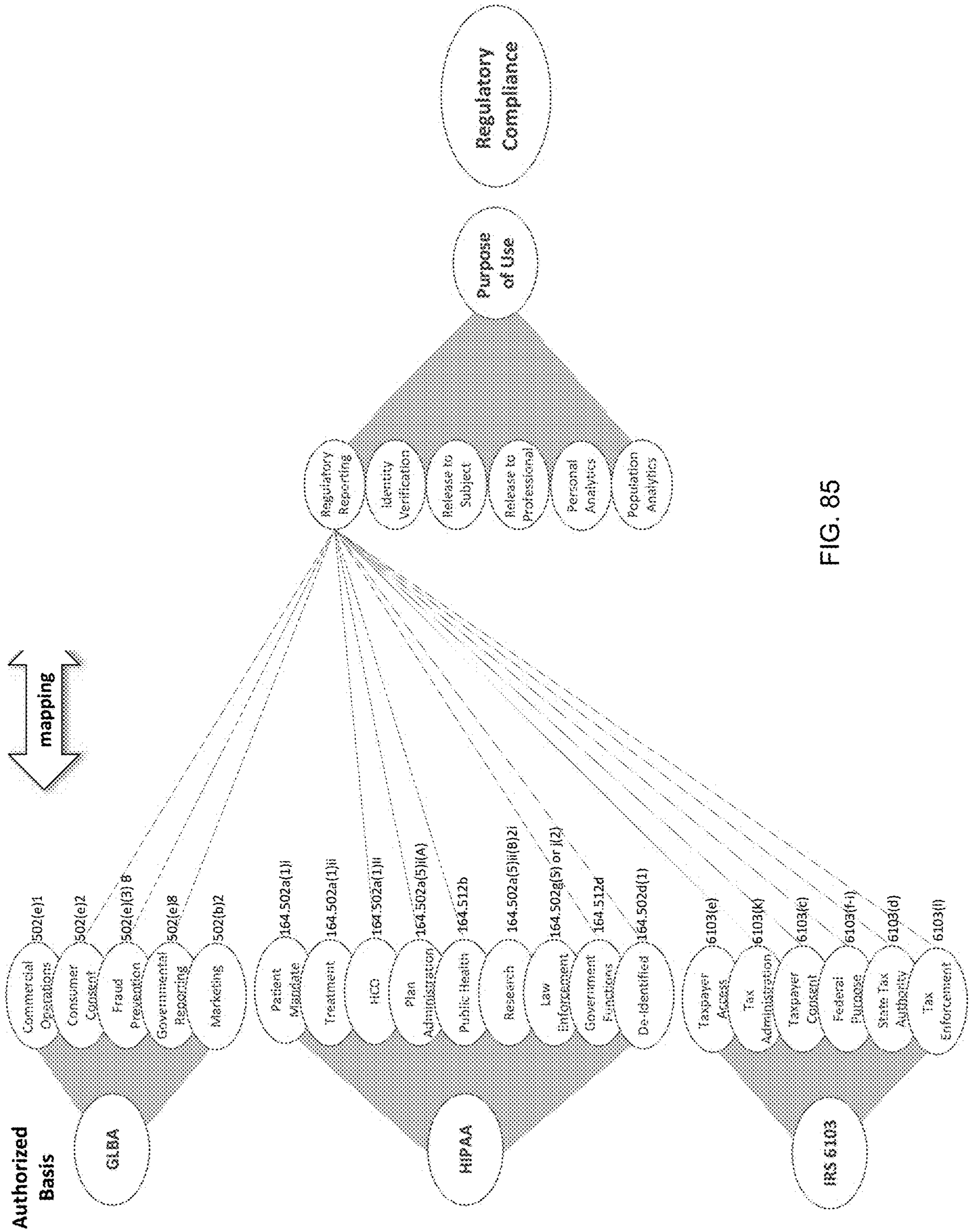
Figure 87:
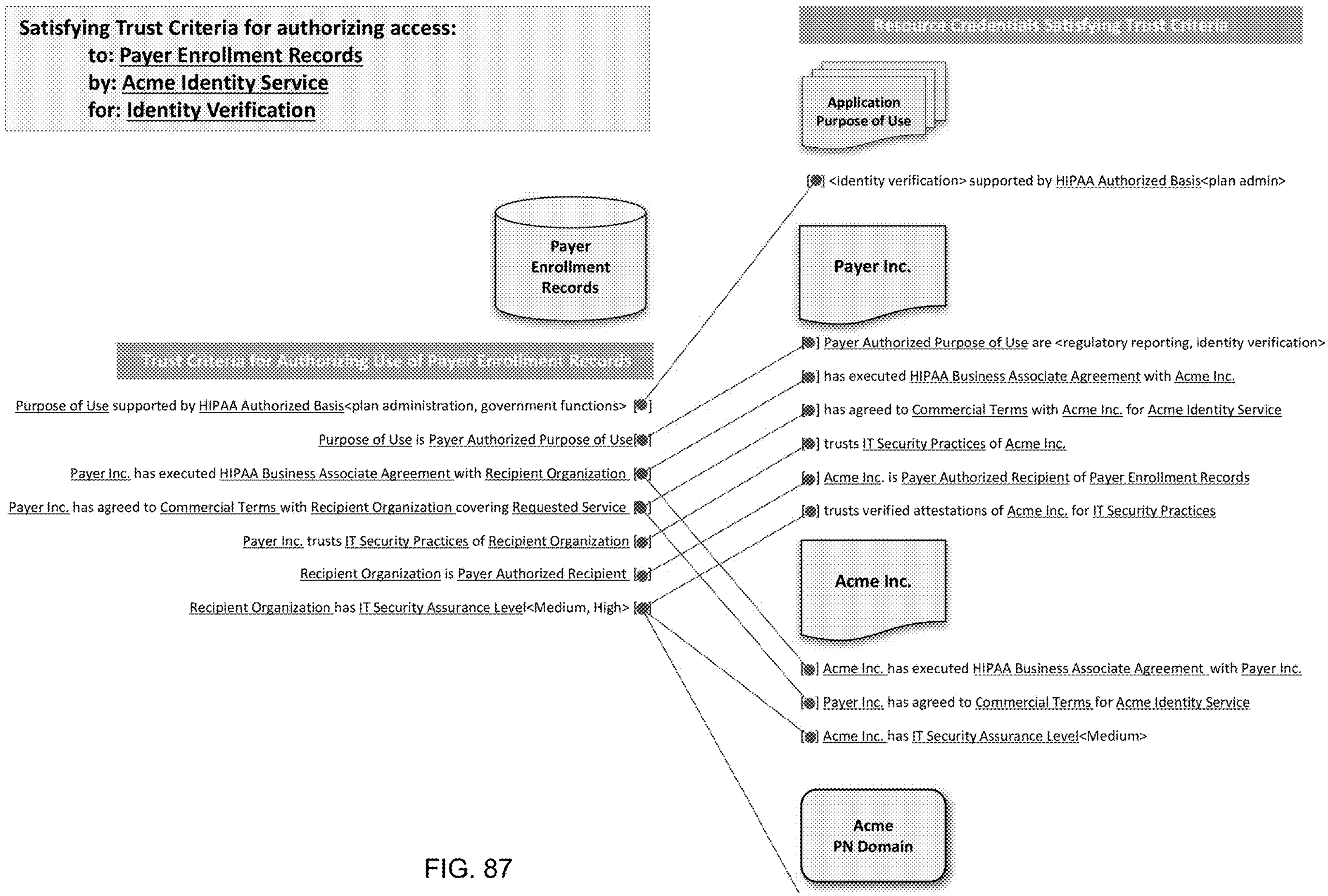

FIGS. 80 and 81 illustrate an example of a block diagram flow chart showing a data flow sequence between administrative domains.

FIGS. 82-87 illustrate examples of the unified trust model trust criteria for multiple system applications.

Figure 88:
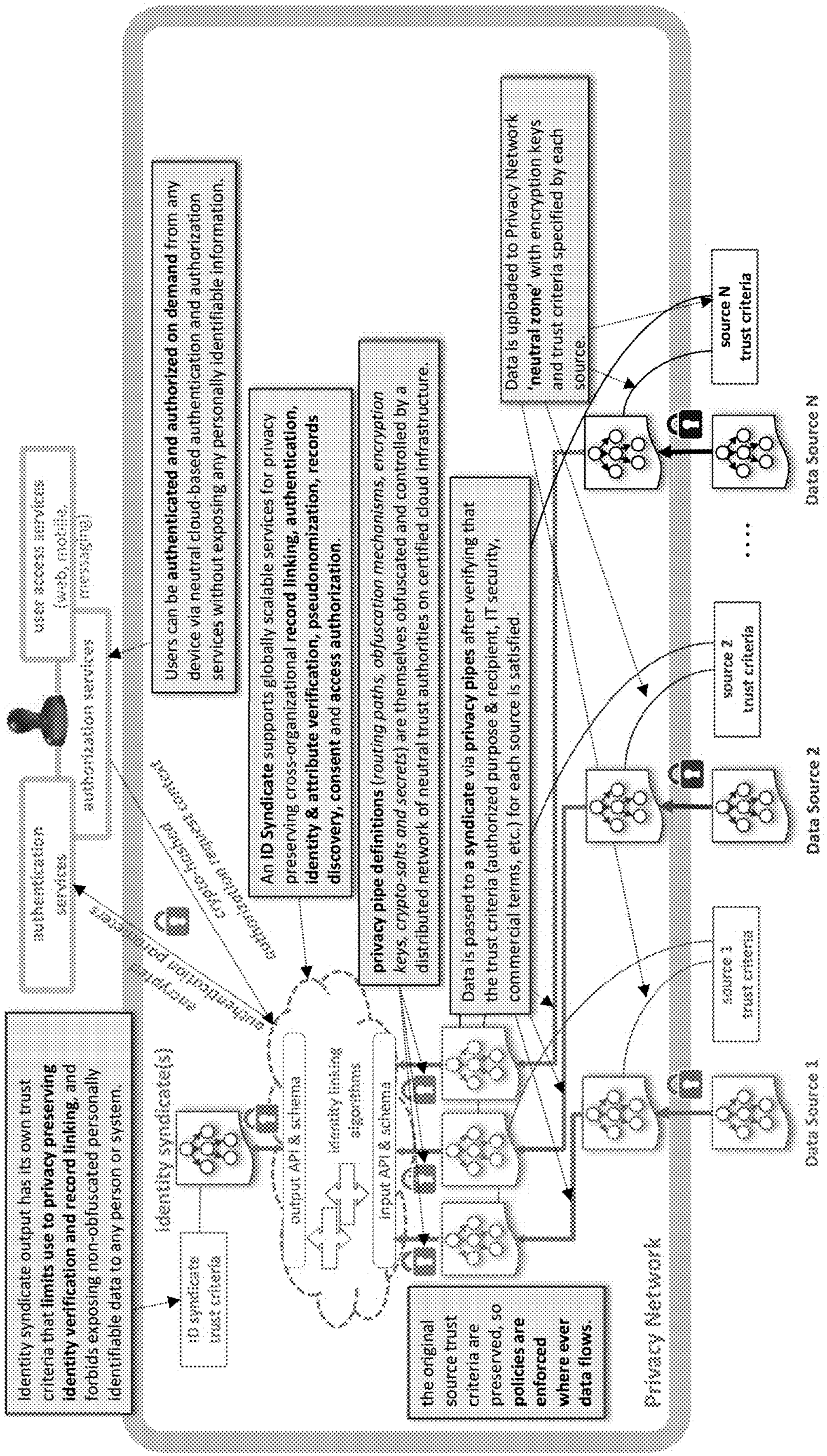
FIGS. 88-90 illustrate examples of block diagram flow charts showing data flow sequences through a privacy network, users and data sources
Figure 89:
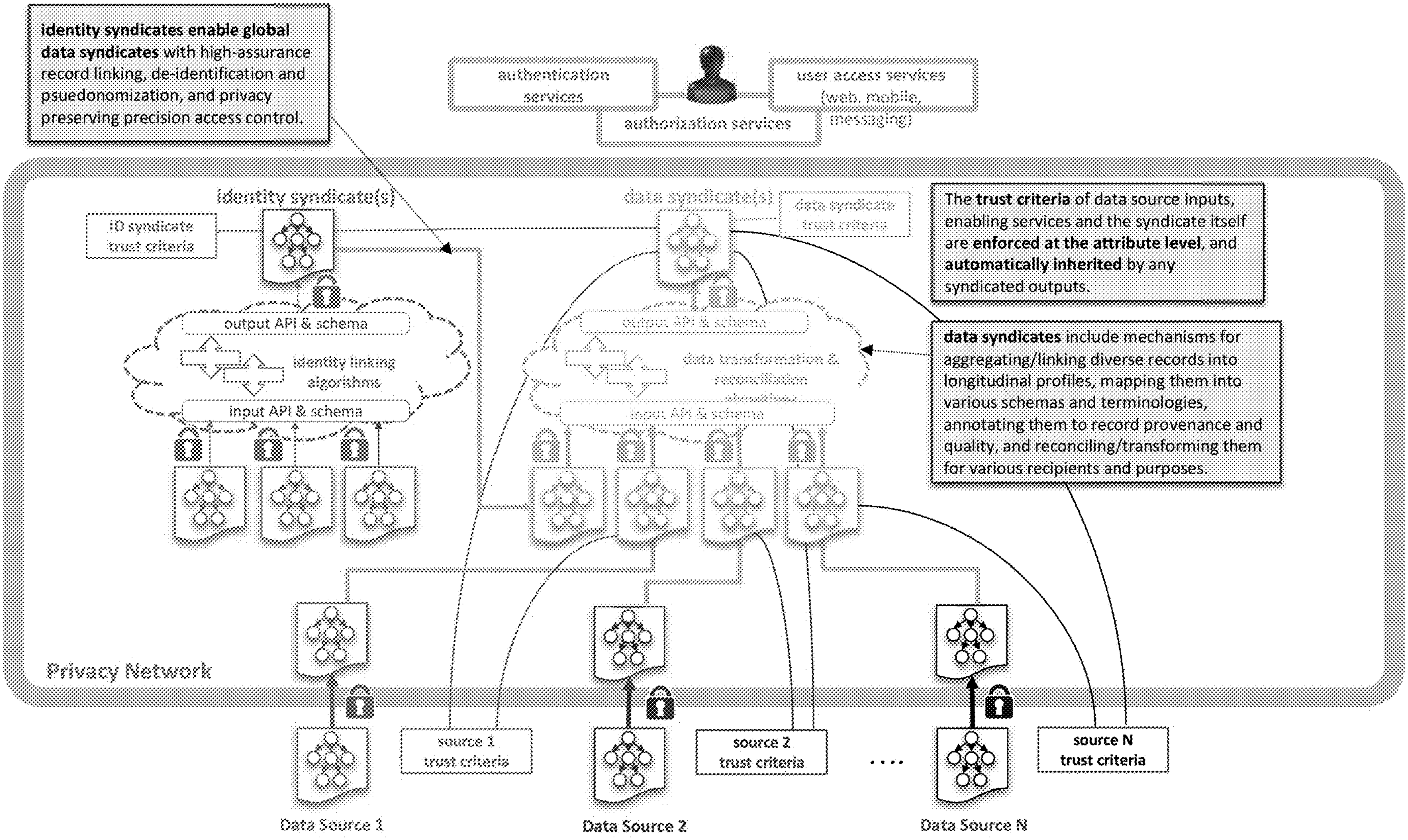
Figure 90:
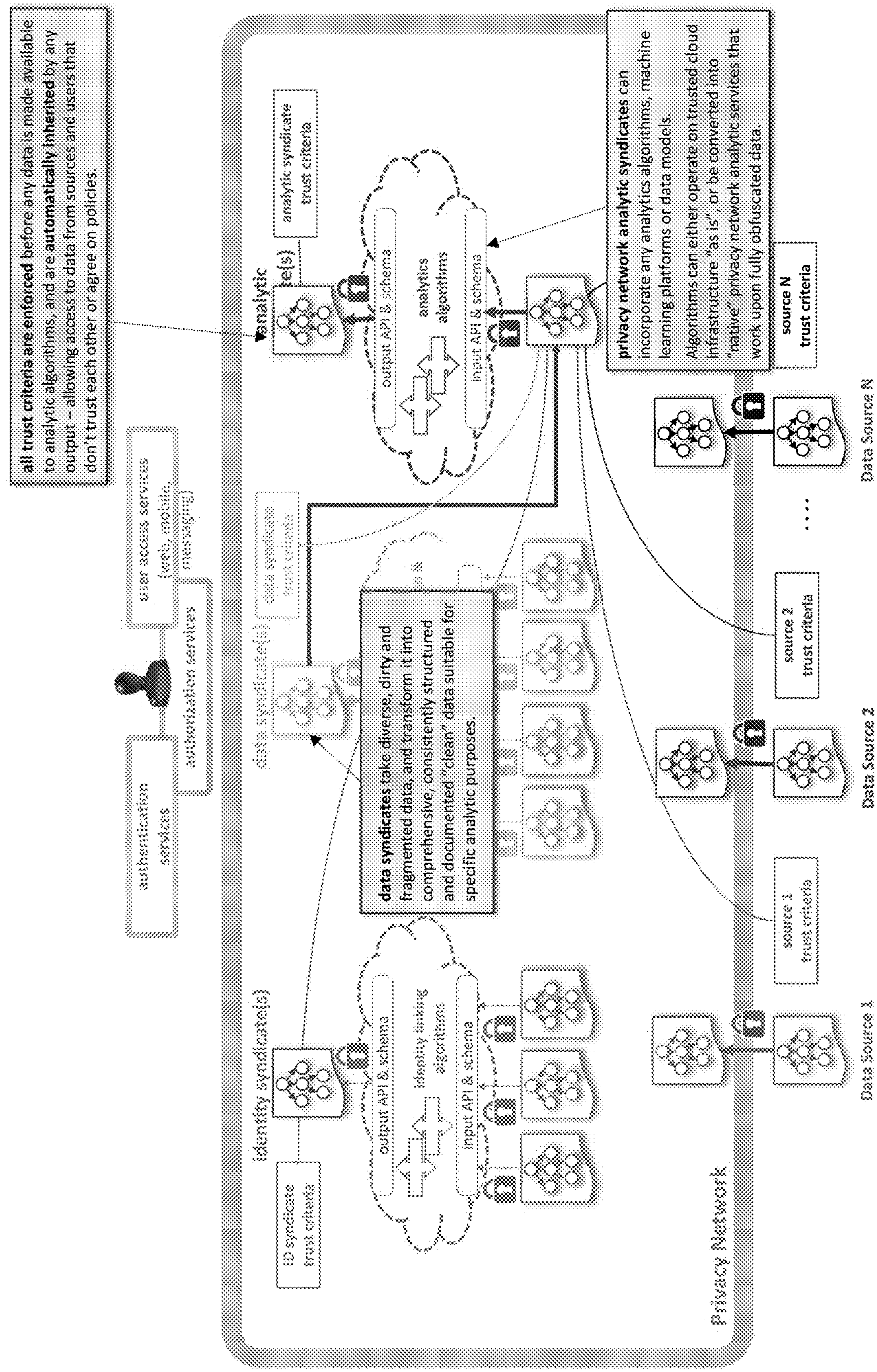
Figure 91:
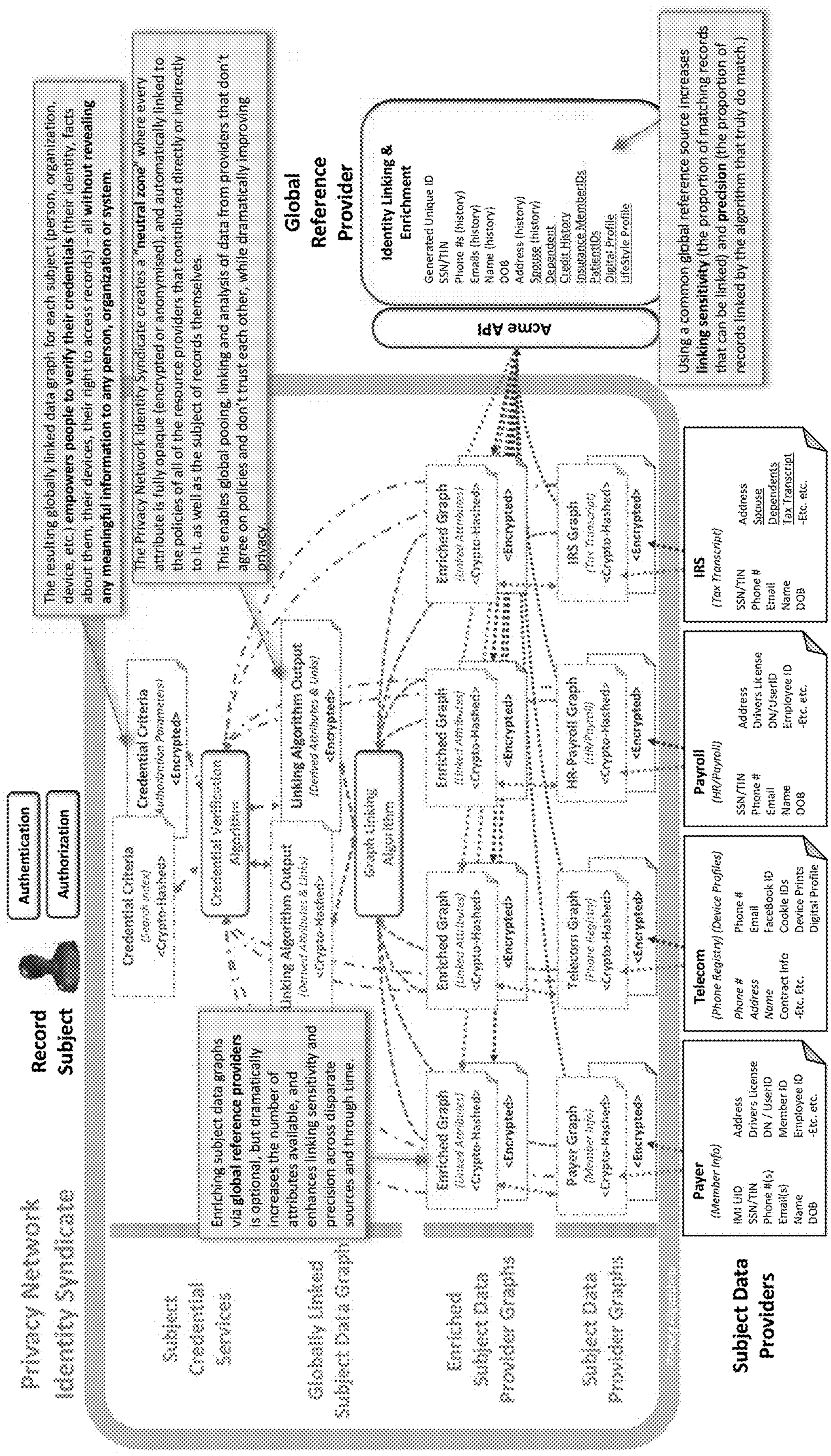
FIGS. 91-92 illustrate examples of block diagram flow charts showing data flow sequences through a privacy network identity syndicate.
Figure 92:
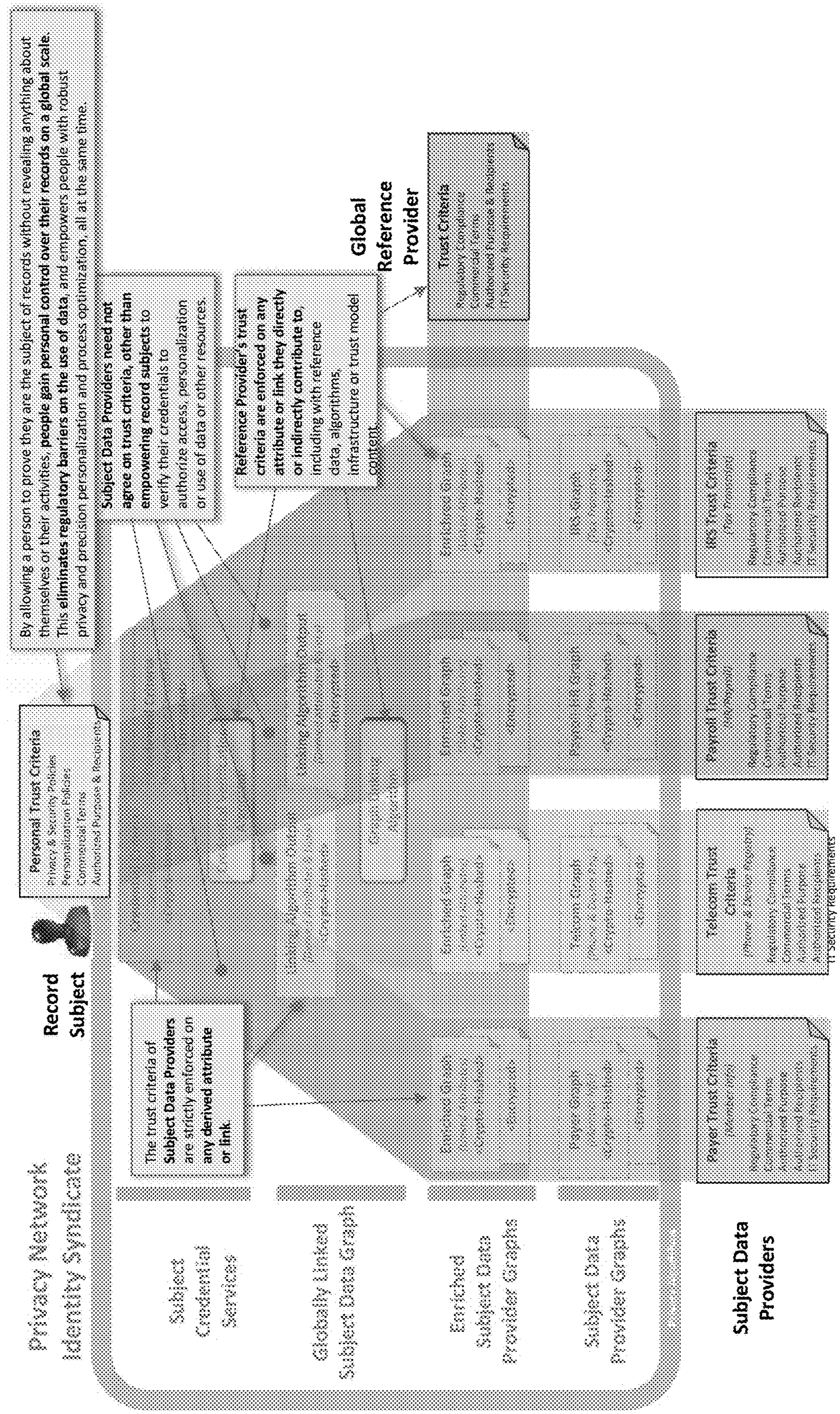

FIGS. 88-90 illustrate examples of block diagram flow charts showing data flow sequences through a privacy network, users and data sources FIGS. 91-92 illustrate examples of block diagram flow charts showing data flow sequences through a privacy network identity syndicate.

Figure 93:
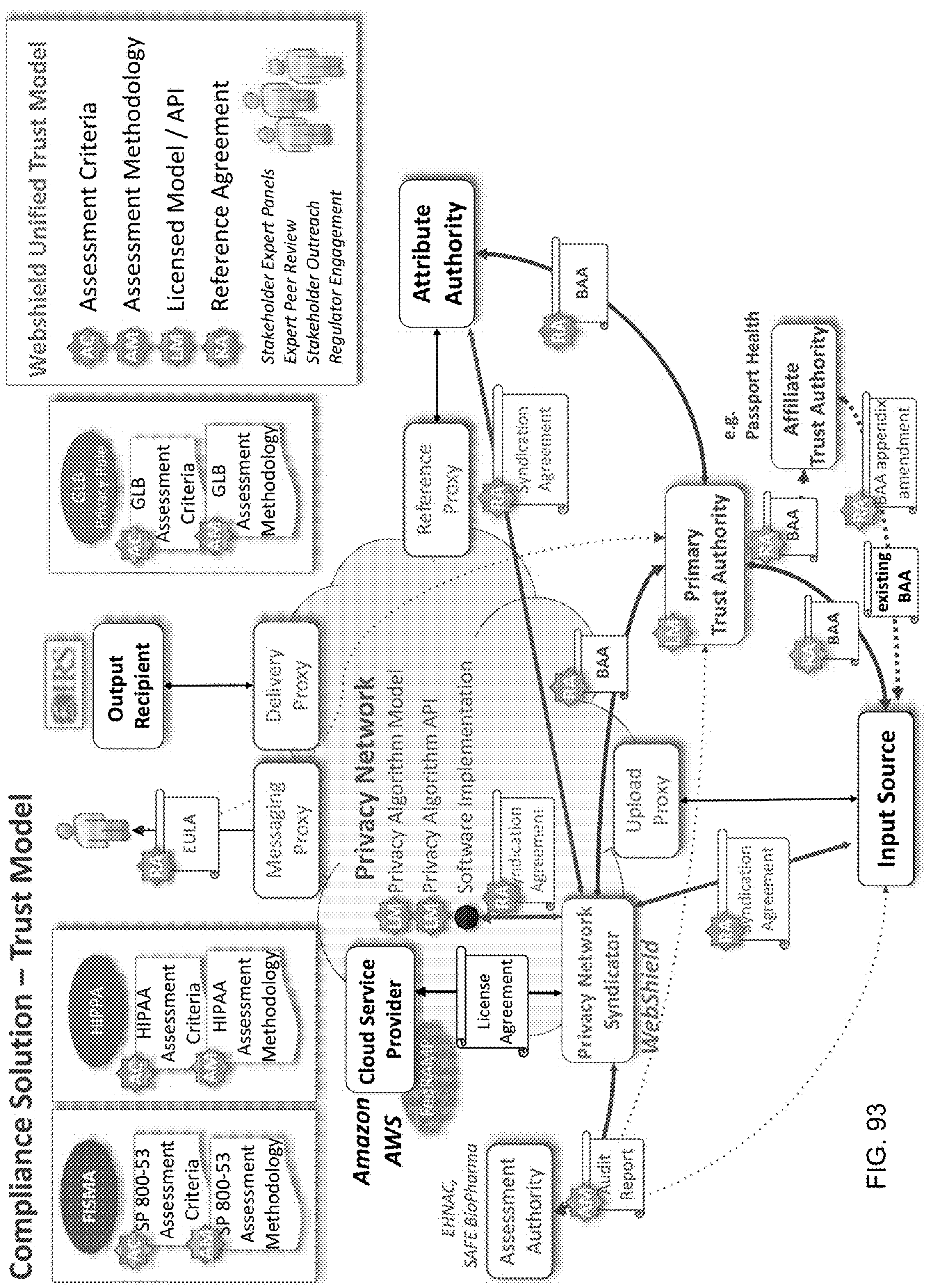
FIG. 93 illustrates an example of compliance solution trust model.

FIG. 93 illustrates an example of compliance solution trust model.

Figure 94:
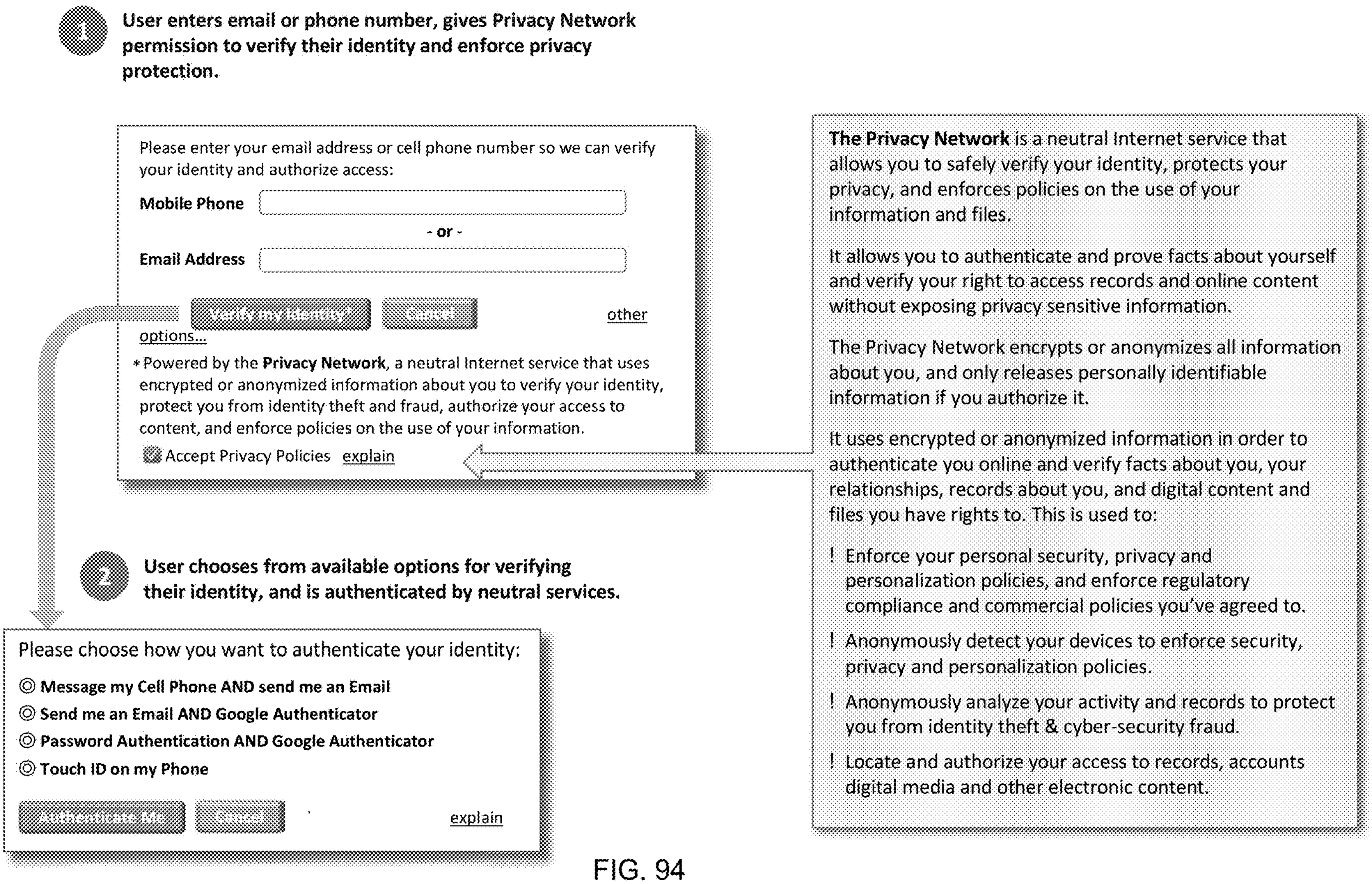
FIGS. 94 and 95 illustrate an example of user interface for users of a privacy network.
Figure 95:
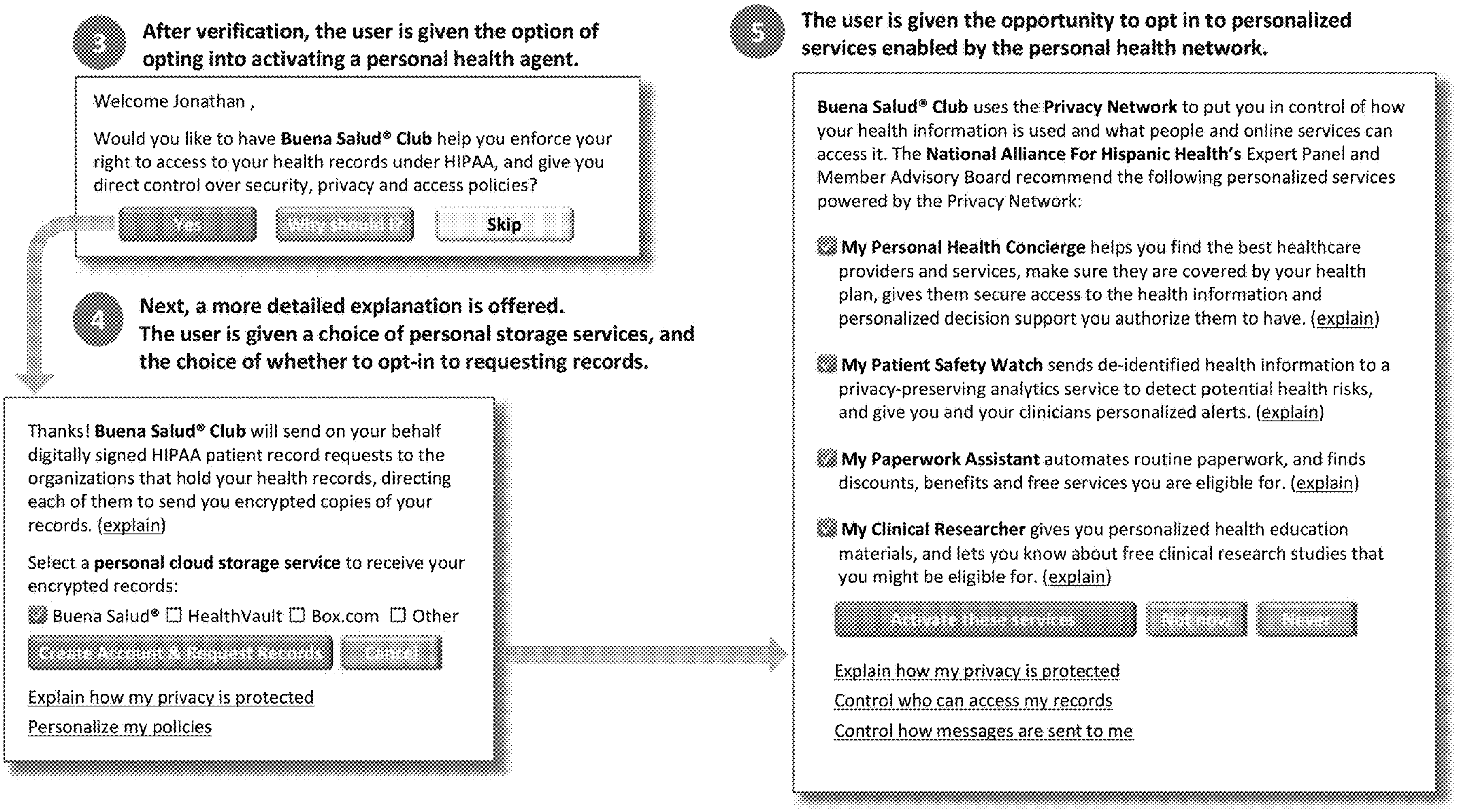

FIGS. 94 and 95 illustrate an example of user interface for users of a privacy network.

Figure 96:
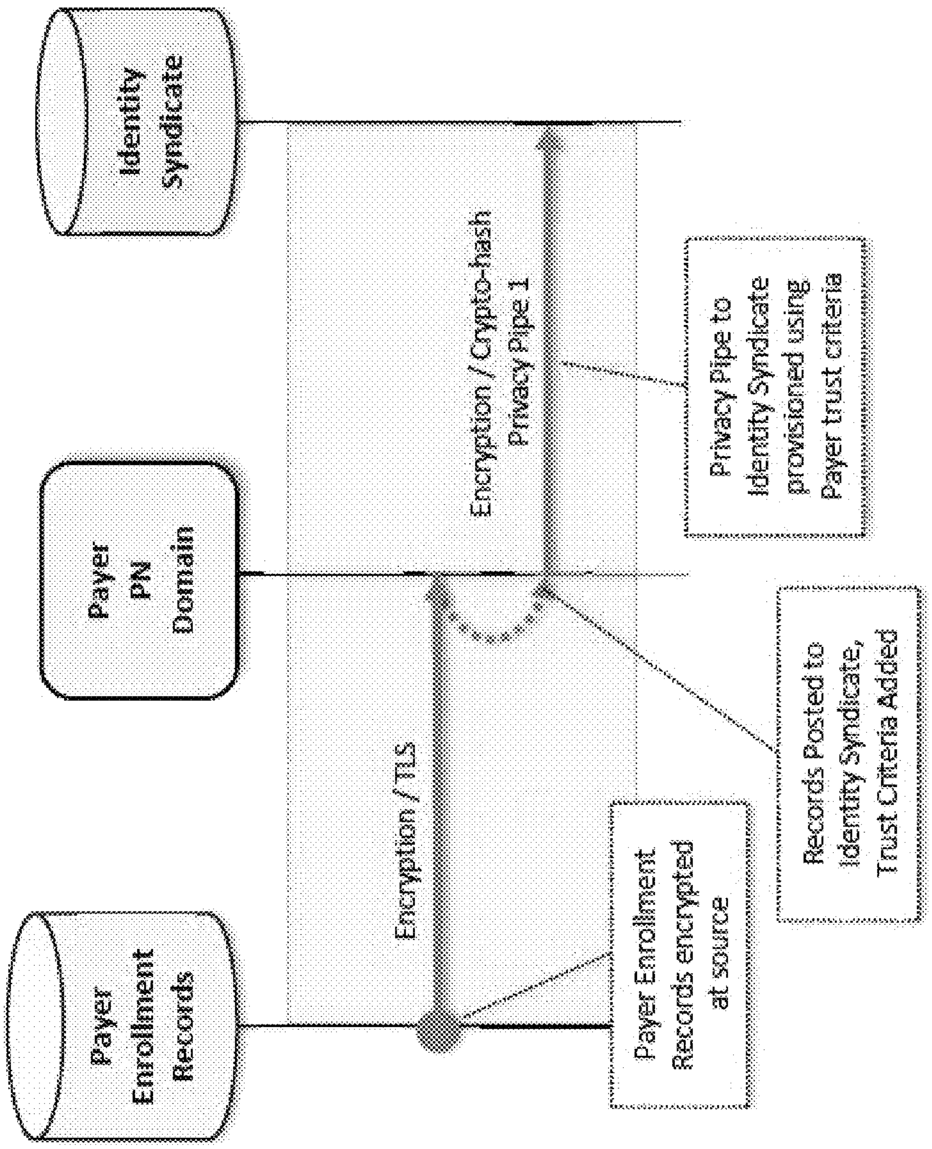
FIG. 96 illustrates an example of block diagram flow chart showing data flow sequence from payer enrollment records to a payer privacy network domain to an identity syndicate.

FIG. 96 illustrates an example of block diagram flow chart showing data flow sequence from payer enrollment records to a payer privacy network domain to an identity syndicate. A diagram showing Compliance Assessment of Identity Syndicate Data Flows (Payer Enrollment Records and Identity Enrichment) is illustrated where a Payer Enrollment Records from Payer to Identity Syndicate. In this illustration, the payer is sharing enrollment records, which are covered under HIPAA. Payer currently maintains these records in systems that meet the IT Security Assurance Level<Medium> requirements, which is sufficient to meet HIPAA security rule requirements. The Payer has established a Privacy Network Domain (Payer PN Domain) which enables them to post data to the Privacy Network's "neutral zone" without relinquishing control of the data. Data is first transferred from the Payer Enrollment Records database to the Payer Middleware, which encrypts attributes using the Payer Key Management and Encryption SDK, and then forwards attributes to the Payer PN Connector via a TLS connection. Thus, the Payer PN Connector does not have access to clear-text Payer enrollment records, and attributes from those records can only be decrypted after satisfying policy criteria maintained by the Payer Key Management System via an SDK.

The Payer PN Connector and Payer PN Domain has been assessed (by Payer, Acme, and/or a trusted assessor) and granted a Resource Credential that verifies that they meet the requirements for IT Security Assurance Level<Medium> based on trusted encryption and key management mechanisms, secure hosting, and trusted administrative practices. The Payer PN Connector transforms the encrypted Payer enrollment records into graph form, adds Payer's trust criteria (summarized in FIG. 1), and provisions a privacy pipe to post the attributes in the graph to the Identity Syndicate. The Payer trust criteria specify the regulatory compliance, IT security and commercial policies Payer has established for authorizing access to or use of Payer enrollment records.

Both the encryption and the crypto-hashing mechanisms used by the privacy algorithm meet the requirements of the HIPAA encryption standards. Attributes cryptohashed by the privacy algorithm meet the criteria for HIPAA de-identification. Any data posted to the Identity Syndicate from any source (Payer, Acme, etc.) is encrypted and/or cryptohashed by the same privacy algorithm, and therefore is in a "neutral zone" established by the Privacy Network. Thus, posting Payer enrollment records to the Identity Syndicate and performing computation on cryptohashed attributes within the Identity Syndicate does not release any PHI.

FIG. 97 illustrates an embodiment of a payer trust criteria for payer enrollment records.

Figure 98:
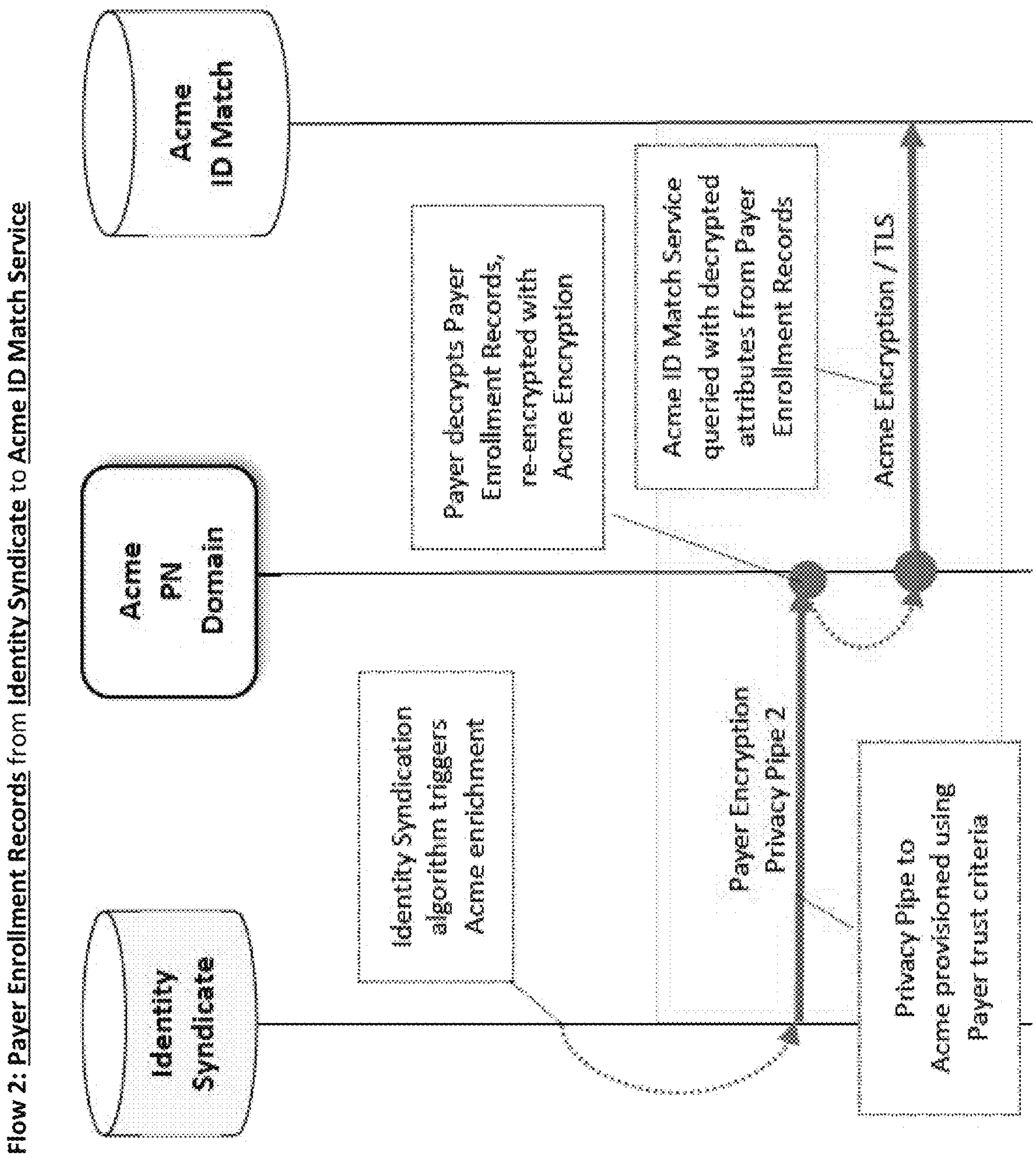

FIGS. 98 and 99 illustrate a block diagram of the Payer Enrollment Records transmitted from Identity Syndicate to an ID Match Service.

With reference to FIGS. 98 and 99, the Payer Enrollment Records from Identity Syndicate are transmitted to the Acme ID Match Service. Payer has licensed use of Acme ID Match Service to enrich Payer enrollment records in order to increase the assurance level and success rate for identity verification. This requires delivering a subset of the Payer enrollment record attributes to the Acme ID Match Service API as clear-text. (Editor's note: Acme ID Match Service may submit queries as cryptohashed values generated using Acme managed cryptosalts. Since cryptohashed values are de-identified and would not reveal Payer PHI to Acme, this could potentially eliminate the need for a HIPAA business associate agreement between Acme and Payer. Before provisioning a privacy pipe from the Identity Syndicate to the Acme PN Domain which is capable of authorizing decryption of and access to the necessary attributes from Payer enrollment records, the PN first evaluates the associated trust criteria (summarized in FIG. 2, below) to verify that the Acme and its' resources have the required resource credentials. If the resource credentials for the Acme PN Domain and Acme ID Match Service satisfy the trust criteria for Payer's enrollment records, the PN provisions a privacy pipe connecting the Identity Syndicate to the Acme PN Domain. The privacy pipe sends references to encrypted Payer enrollment record attributes to the Acme PN Domain, routing it via the Acme Middleware (called the Acme Privacy Agent) to the Acme PN Connector, and then on to the Acme Encryption Service. The privacy pipe only carries references to the encrypted Payer enrollment record attributes that are necessary to query the ID Match Service API. The Acme Encryption Service requests decryption of individual Payer enrollment record attributes by its' embedded SDK. It first verifies that decryption is authorized by policies specified by Payer's Key Management System, and if so decrypts the value and returns it as cleartext to the Acme Encryption Service. Next, the Acme Encryption Service encrypts the attribute with an Acme encryption key, using encryption and key management mechanisms that meet HIPAA encryption standards and satisfies the requirements for IT Security Assurance Level<Medium>.

Next, the Payer enrollment record attributes (now encrypted by an Acme key) are returned to the Acme PN Connector, combined into a complete subject query, and then routed to the Acme Middleware (Acme Privacy Agent). Finally, the Acme Privacy Agent decrypts the query attributes using the Acme key and then queries the Acme ID Match Service.

Payer enrollment record attributes remain encrypted (using Payer's Key Management System) from the point they were originally posted to the Payer PN Connector all the way to the Acme Encryption Service. They are then immediately re-encrypted with Acme encryption keys before being routed via the Acme PN Connector to the Acme Privacy Agent, which in turn calls Acme ID Match Service via a TLS secure connection. Thus, the Payer enrollment record attributes were encrypted end-to-end throughout the path between the Payer Middleware and the Acme Middleware, and could not be decrypted or accessed as cleartext by any component of the Privacy Network. There is no way that any non-Acme developed and managed component could possibly cause a security breach that could reveal cleartext Payer enrollment record attributes to unauthorized parties.

Both the Acme Encryption Service and Acme Privacy Agent software components are developed by Acme staff and hosted on Acme managed infrastructure. The Acme Encryption Services embeds an encryption SDK that has been provisioned a SEP (Security Policy Enrollment Profile) by Payer's Key Management System, and enforces access policies approved by Payer and Acme. The Key Management System and Encryption SDK has been assessed to verify compliance with the relevant encryption and key management standards (FIPS 140-2, NIST SP 800-56/57, etc.)

Acme IT infrastructure and security practices have been assessed and verified to satisfy IT Security Assurance Level<Medium>, and have been issued a resource credential by Payer (or other resource authority tusted by Payer) indicating that Payer trusts IT Security Practices of Acme, and that Acme is an authorized recipient of Payer enrollment records.

Figure 100:
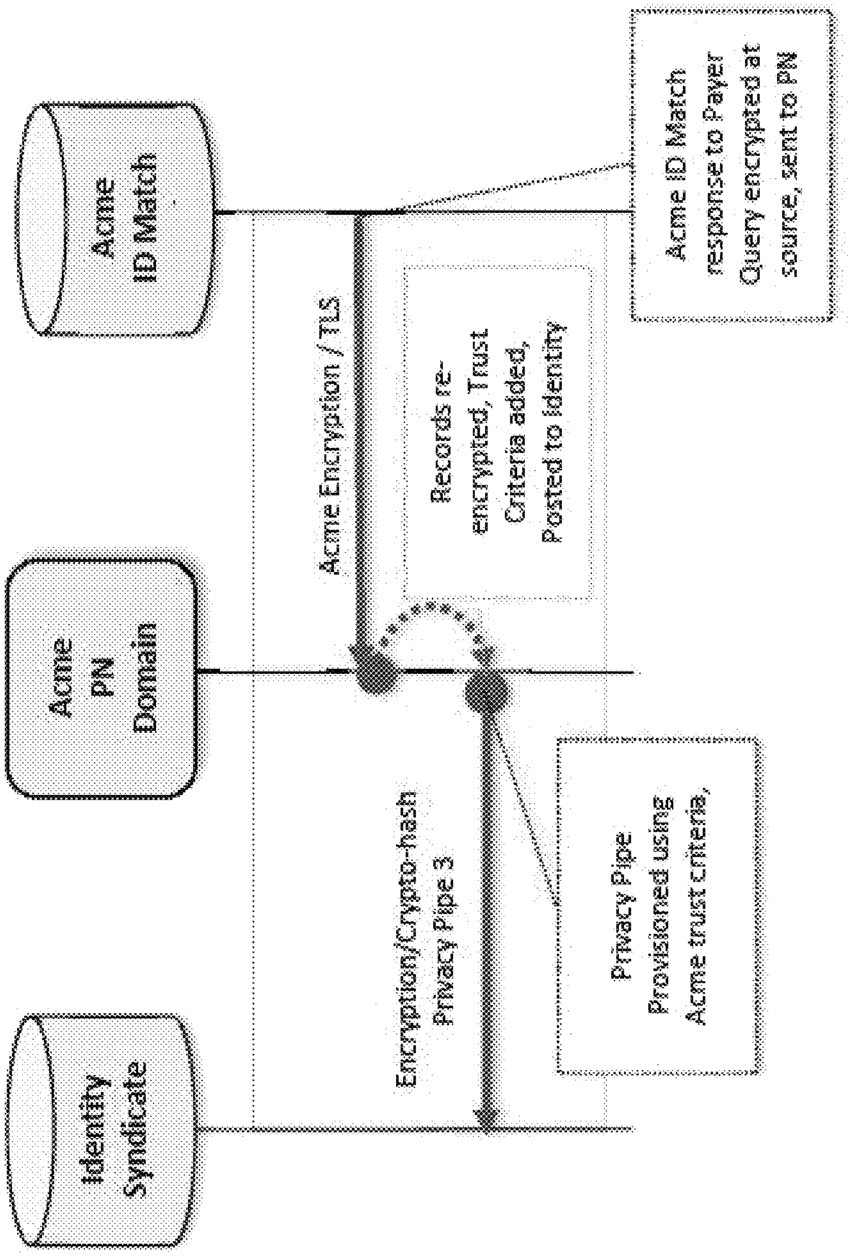
FIG. 100 illustrates a flow chart of Enrichment Attributes to an Identity Syndicate.

FIG. 100 illustrates a flow chart for Acme Enrichment Attributes from Acme to Identity Syndicate. In this flow chart, the Acme enrichment attributes returned in response to the Payer query of Acme ID Match Service must be sent to the Identity Syndicate in the Privacy Network neutral zone. To support the identity verification purpose of use, the enrichment attributes must be protected by a privacy algorithm that includes both cryptohashing (using the same cryptosalt that was used to cryptohash the Payer enrollment records) and encryption. Cryptohashing with a shared cryptosalt supports privacy preserving matching algorithms across multiple data sources.

Encryption supports user authentication via authorized privacy preserving authentication services. (See Flow 5, summarized below.) First, the Acme enrichment attributes returned by Acme ID Match Service are sent via a TLS secure connection to the Acme Privacy Agent, where they are encrypted using an Acme managed key. The encrypted Acme enrichment attributes are then sent to the Acme PN Connector, which transforms them into graph form, and adds Acme's trust criteria (summarized in FIG. 3, below) along with any Payer trust criteria that are required to be "inherited" by responses to Payer queries.

Next, the Acme PN Connector provisions a privacy pipe to the Identity Syndicate. As the first step of this privacy pipe the encrypted Acme enrichment attributes are routed to the Acme Encryption Service within the Acme PN Domain. There, the Acme enrichment attributes are decrypted using the Acme key, and then both (1) re-encrypted via the Encryption SDK (or other encryption mechanisms trusted by Acme that satisfy the requirements for IT Security Assurance Level<medium>) according to policy criteria specified in the Acme trust criteria, and (2) cryptohashed using the cryptosalt managed by the privacy algorithm to support privacy preserving matching within the Identity. Both the encrypted and cryptohashed Acme enrichment values are then posted to the Identity Syndicate by the privacy pipe.

Both the encryption and the cryptohashing mechanisms used by the privacy algorithm meet the requirements of the GLBA encryption standards. Performing computation on cryptohashed attributes within the Identity Syndicate "neutral zone" does not release any PHI or PII. Thus, Flow 3 does not constitute a release of information under GLBA, since the information only flows to the "neutral zone", is not decrypted and remains under the control of Acme administered IT infrastructure and does not expose any PII.

FIG. 101 illustrates an example of trust criteria for enrichment records.

Figure 102:
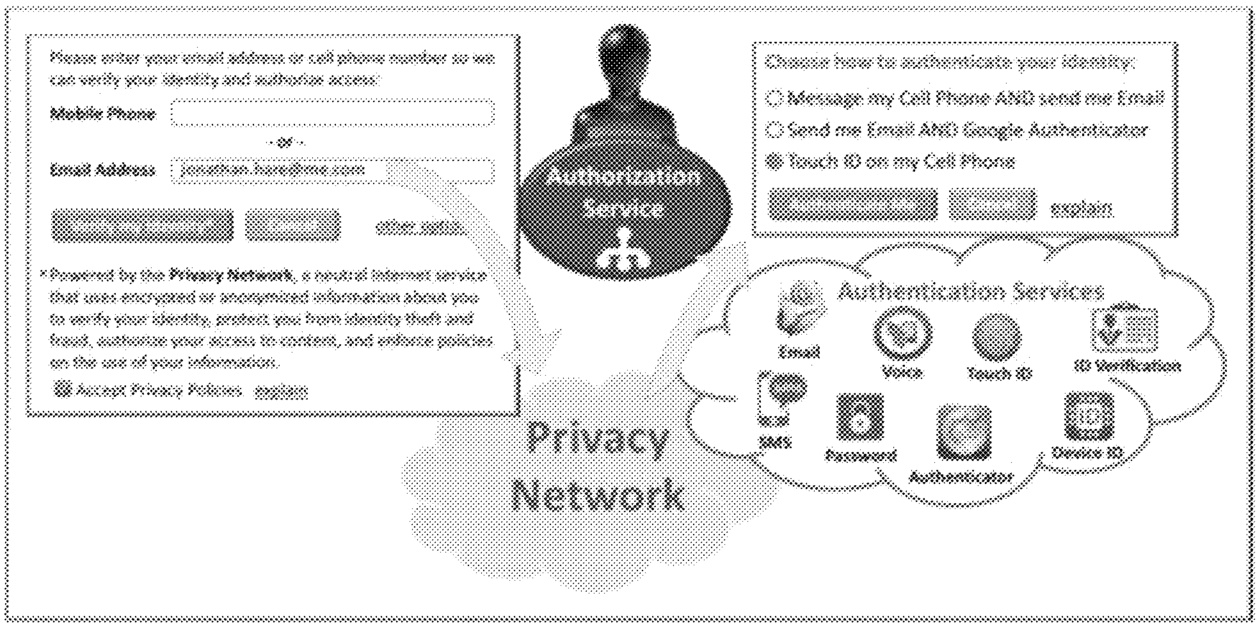
FIG. 102 illustrates a process for Authorization Query from an Authorization Service to an Identity Syndicate.

With reference to FIG. 102, a process for Authorization Query from Authorization Service to Identity Syndicate is illustrated. In this flow, a consumer attempts to access a protected resource, and requests identity verification from an authorization service (e.g. Resilient's Trust Network as a Service/Adaptive Authorization Service). The consumer enters (or the application they are using provides, if available) their email address, mobile phone or other identity information as necessary to disambiguate their claimed identity. The user interface includes an button to opt-in to submitting a query to the privacy network (or whatever the preferred brand is), labelled "Verify my Identity" or something similar. Optionally, the user interface can include an opt-in for privacy policies that authorizes various uses of the consumer's data, and the right to interact with the user to support privacy and streamlined personalization in subsequent interactions over time, and on other devices. Summary privacy policy opt-in explanation is shown below the "Verify my Identity" button, with more detail shown if user clicks "explain" link—shown at right.

Strictly speaking, no policy opt-in at this stage is required, because none of the interactions in this flow reveal any PII, and GLBA, HIPAA and other relevant regulations allow data to be used for verifying a subject's identity and to prevent identity fraud, as long as it isn't revealed to unauthorized parties. The privacy network allows the user to verify their identity without revealing their PII to any person or system, so no opt-in is required. However, if user input is required to specify their claimed identity (e.g. by providing their email address), the user must click some sort of button (e.g. "next") to submit the query. Thus, a "Verify my Identity" opt-in fits naturally here and including it removes any potential question relating to the need for consumer consent.

Alternatively, if information about the user's probable/assumed/inferred identity can be provided without user input (e.g. from an application or device that knows the user's identity attributes, or inferred from cookies or device fingerprints), then there is no need to interrupt the flow of the user experience with an opt-in request.

Once attributes indicating the claimed identity of the user and the credentials the user needs to verify in order to authorize access or perform an action are known by the Authorization Service, it submits an authorization query to the Identity Syndicate via a PN Connector, which initiates Flow 4. The PN Connector converts the authorization query into a graph form, adds the standard trust criteria for privacy preserving authorization queries, and provisions a crypto-hash-only privacy pipe to the authorization query interface of the Identity Syndicate. Since Flow 4 sends cryptohashed data only, and it is sent only to the Identity Syndicate in the privacy network's "neutral zone", no PII is revealed. The information comes directly from the user via an Authorization Service, so the responsibility for privacy compliance falls on the operator of the Authorization Service or application that captured the user identity attributes and requested identity verification, not on other participants in the Identity Syndicate.

The Privacy Network is a neutral Internet service that allows you to safely verify users to identity, protects your privacy, and enforces policies on the use of your information and files. It allows users to authenticate and prove facts about yourself and verify users' right to access records and online content without exposing privacy sensitive information. The Privacy Network encrypts or anonymizes all information about users, and only releases personally identifiable information if you authorize it. The Privacy Network uses encrypted or anonymized information in order to authenticate users online and verify facts about users, user relationships, records about users, and digital content and files you have rights to. This is used to: Enforce users' personal security, privacy and personalization policies, and enforce regulatory compliance and commercial policies you've agreed to. Anonymously detect user devices to enforce security, privacy and personalization policies. Anonymously analyze user activity and records to protect users from identity theft & cyber-security fraud. Locate and authorize users' access to records, accounts digital media and other electronic content.

Figure 103:
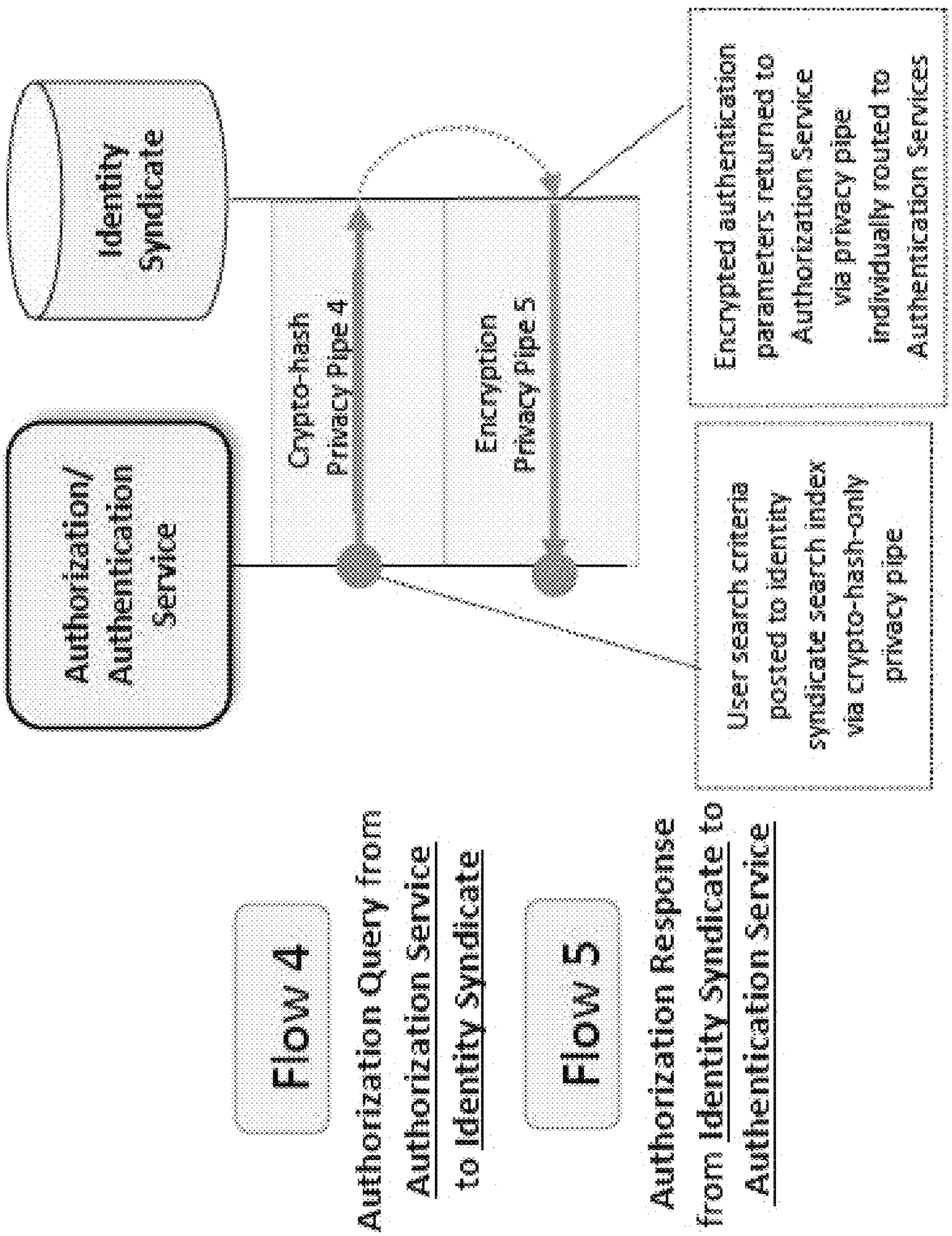
FIG. 103 illustrates a flowchart for an Authorization Response from an Identity Syndicate to an Authentication Service.

With reference to FIG. 103, Flow 5: Authorization Response from Identity Syndicate to Authentication Service. The Identity Syndicate authorization query service takes the cryptohashed authorization query, and returns a graph that includes a set of authentication options that can satisfy the requirements to earn the necessary user access authorization credentials. Each authentication option includes one or more authentication service types (email, phone, Touch ID, SMS, device ID, voice, etc.) that achieve the required authentication assurance level, and the corresponding encrypted authentication parameters for each authentication service type (e.g. email address, phone number, cookies/device fingerprints, etc.) This information is used by the Authorization Service to allow the user to select their preferred authentication services from the available options, and orchestrate the user interaction to complete the authentication and earn the credential. (See illustration below.)

Figure 104:
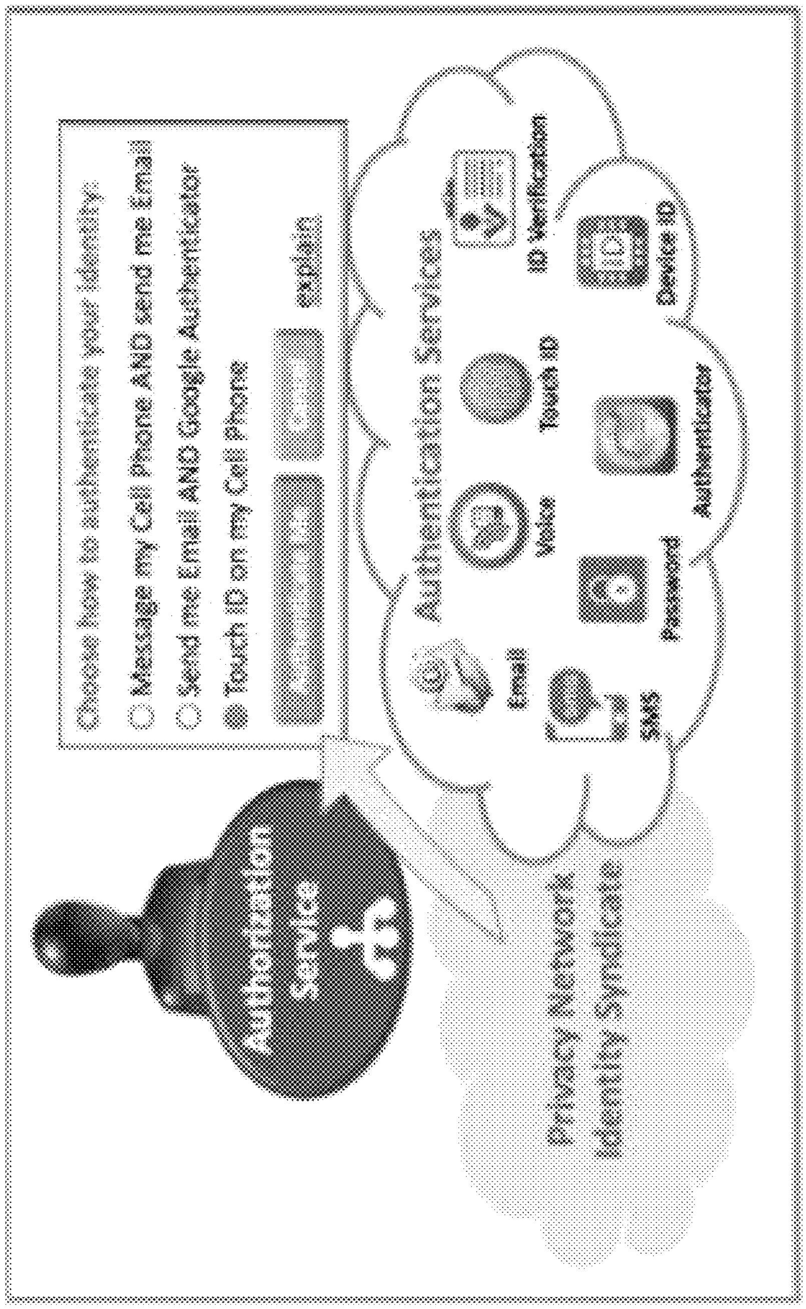
FIG. 104 illustrates a user interface for choosing how a user can authenticate identity.

Personal information can be displayed to the user in the authentication options dialog are minimized to the extent that they are no longer sensitive data. This avoids revealing PII (specifically, authentication coordinates such as phone numbers and email addresses) to the user, who may not be the person they claim to be. With reference to FIG. 104, in some cases incomplete information may be displayed to the user so it is clear to a user what the authentication options are, and to make sure the consumer chooses one that they have access to. For example, if a user has multiple phone numbers, the authentication option selection dialog might show a masked phone number, such as "Message you at (4)*-**50". Such partial releases of information are authorized if they are sufficiently masked that they don't qualify as PII, and because this information can be provided to the consumer due to the authority for the subject of the record to authorize its use (HIPAA, 164.502 a(1)I; GLBA, 6802(e)1(A); IRS 6103,(c) and (j)4). Note that this approach reveals less sensitive PII than knowledge-based authentication and is less vulnerable to identity theft and fraud, but would be authorized on the same basis from a regulatory perspective.)

Once the consumer has chosen an authentication option, the authorization service will orchestrate the invocation of the specified types of authentication services, and send the encrypted authentication parameter necessary for each service (e.g. phone number, email address, facebook ID, etc.) For example, an SMS service would receive the user's cell phone, and would send a five digit code to the user's phone via SMS. The user will be told to type the code into a separate user interface component, which will then be sent to the SMS service (or a neutral proxy) to verify whether the user was able to receive the correct code. The authorization service will only learn whether the user succeeded or failed in proving possession of their phone, but without needing to know the user's phone number.

The privacy pipe will ensure that only trusted authentication services are able to decrypt these authentication parameters, on the condition that they never be allowed to understand anything else about the context—the user's claimed identity, what resource they are trying to access. Conversely, the authorization service may understand something about the context (possibly the attribute the user submitted to indicate their identity, the resource being protected, the credential requirements being requested, etc.) but won't see the authentication parameters used to verify their identity. Thus, neither Flow 4 or Flow 5 involve any release of PII, yet support the user proving their identity and attributes, and verifying their authorization to access or request resources.

With reference to FIG. 105 a table containing examples of trust criteria, assessment credentials and validation credentials is illustrated. With reference to FIGS. 106-111, tables with examples of resource credentials are illustrated.

Figure 112:
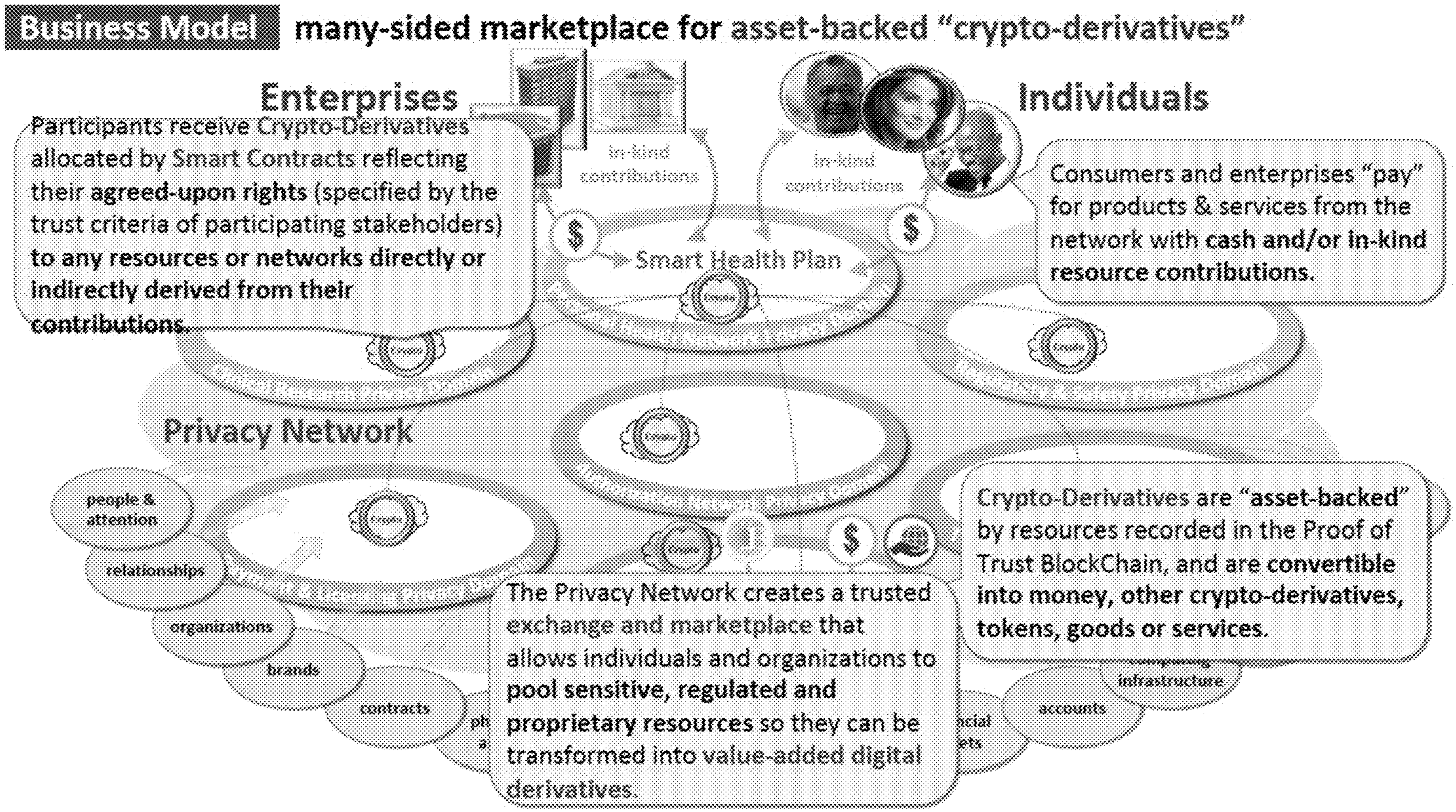
FIGS. 112-113 illustrate an embodiment of a privacy network that includes crypto-derivatives allocated by smart contracts.
Figure 113:
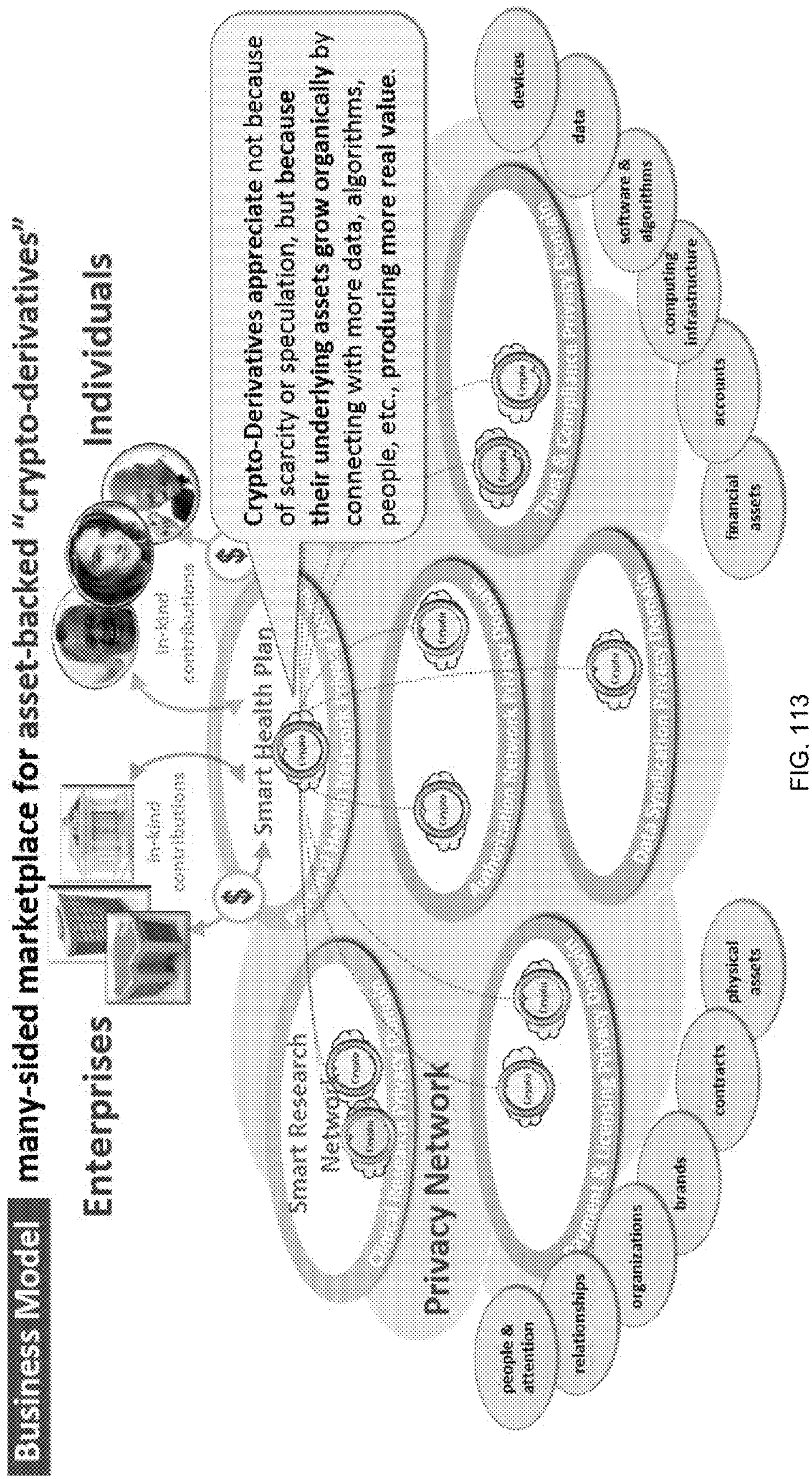

With reference to FIGS. 112-113 illustrate an embodiment of a privacy network that includes crypto-derivatives allocated by smart contracts.

Figure 114:
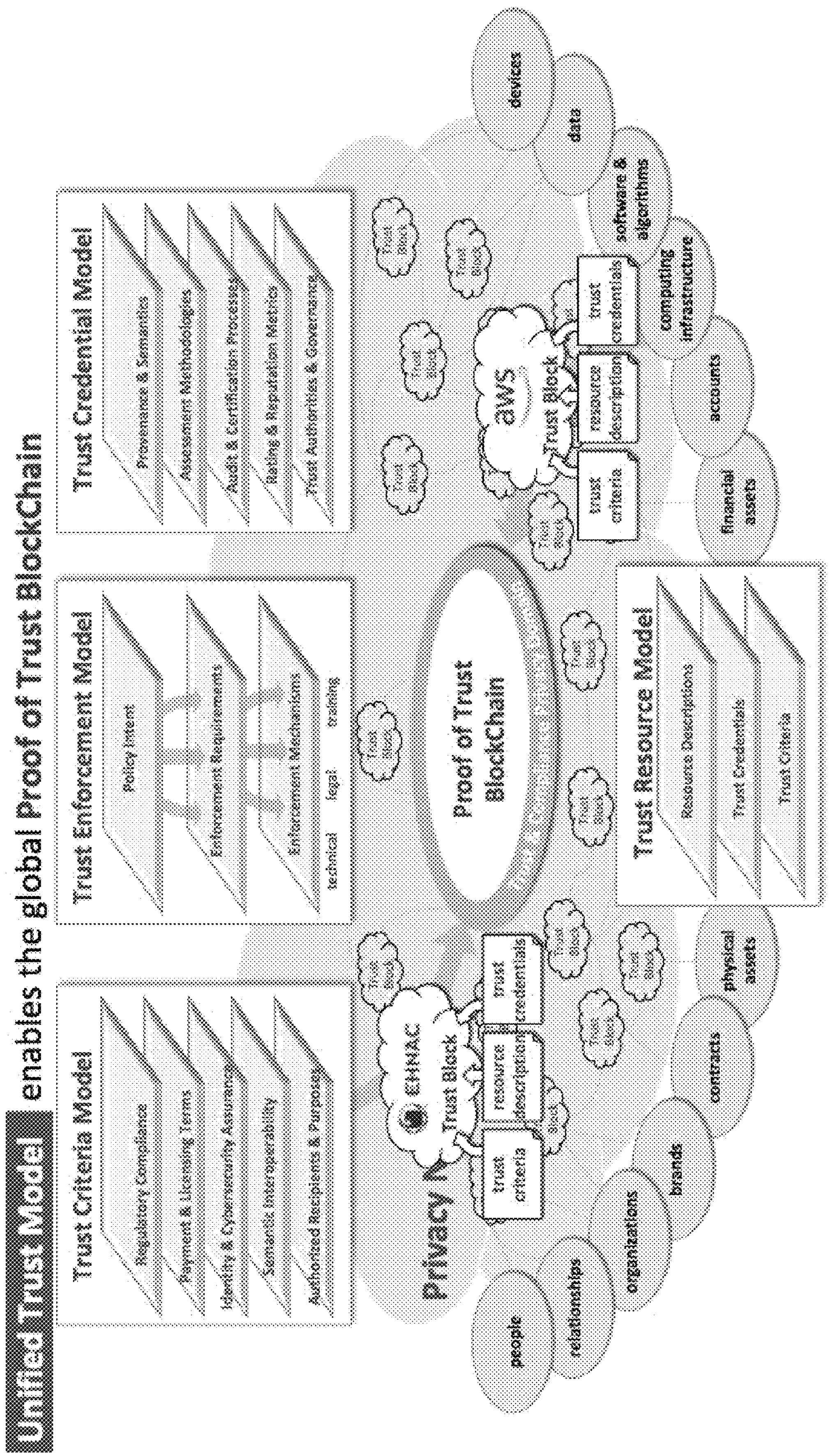
FIG. 114 illustrates a unified trust model that includes a privacy network that enable the global proof of trust blockchain.

FIG. 114 illustrates a unified trust model that includes a privacy network that enable the global proof of trust blockchain for a trust and compliance privacy domain. The privacy network can include a trust criteria model, a trust enforcement model, a trust credential model and a trust resource model. The trust criteria model can provide requirement criteria for different types of data including regulatory compliance, payment & licensing terms, identity & cybersecurity assurance, sematic interoperability, and authorized recipient & purposes. The trust enforcement model can include a policy intent, enforcement requirements and enforcement mechanisms. The trust credential model can include provenance & semantics, assessment methodologies, audit & certification processes, rating & reputation metrics and trust authorities & governance. The trust resource model can include resource descriptions, trust credentials and trust criteria.

In an embodiment, the blockchain mechanism can produce trust blocks on a block chain by processing trust criteria, resource descriptions and trust credentials to create the trust block.

In an embodiment, the privacy network can be used with a blockchain mechanism. A blockchain can include a history of data, messages, or transactions in a series of blocks where each block contains a mathematical summary, called a hash, of the previous block. This creates a blockchain where any changes made to a block will change that block's hash, which must be recomputed and stored in the next block. This changes the hash of the next block, which must also be recomputed and so on until the end of the chain. In the illustrated example, Block 0 has a hash "0x3a34ad . . . 55." The next Block 1 includes the hash "0xf6e1da2 . . . deb" and the previous (Block 0) hash "0x3a34ad . . . 55." The following Block 2 includes the hash "0x9327eb1b . . . 36a21" and the previous block's hash "0xf6e1da2 . . . deb."

The hash is based on a mathematical function that is not reversible and system users cannot predict what input can be used to produce the desired output. A valid hash can be found by repeatedly adjusting a changeable value in the block, which is known as a "nonce." The nonce can be adjusted and the hash can be recalculated until a valid hash is found that meets the validity requirements. The unpredictable nature of the hash considerably increases the difficulty of finding a nonce that produces a valid hash of the block. Typically, trillions of different nonces may be tried before a valid hash is found. Therefore, changing the value of previously stored data in the blockchain can require a substantial amount of computational effort, although not impossible. The security of the blockchain is further enhanced by storing the blockchain data on a distributed network. A large number of users can have access to the blockchain network and miner nodes can be continuously attempting to add blocks to the end of the blockchain by finding a nonce that produces a valid hash for a given block of data.

Blockchains can be used with various types of transactions. For example, a transaction can use identity tokens for physical or digital assets. The identity tokens can be generated using a cryptographic hash of information that uniquely identifies the asset. The tokens can also have an owner that uses an additional public/private key pair. The owner of a public key can be set as the token owner identity and when performing actions against tokens, ownership proof can be established by providing a signature generated by the owner private key and validated against the public key listed as the owner of the token. The identity token for an entity may be the public key of a public/private key pair, where the private key is held by the entity. The creation of an identity token for an asset in a blockchain can establish a provenance of the asset, and the identity token can be used in transactions of the asset stored in a blockchain, creating a full audit trail of the transactions.

To record a simple transaction in a blockchain, each party and asset involved with the transaction needs an account that is identified by a digital token. For example, when one person wants to transfer an asset to another person, the current owner and next owner create accounts, and the current owner also creates an account that is uniquely identified by an asset identification number. The account for the asset identifies the current owner. The current asset owner creates a transaction against the account for the asset that indicates: 1. the transaction is a transfer of ownership, 2. the public keys (i.e., identity tokens) of the current owner and the next owner, 3. the identity token of the physical asset, and 4. the transaction is signed by the private key of the current owner. The current owner of the asset can create a transaction request that includes the transaction information on a user interface of a computing device. The transaction request can be broadcast to the blockchain network. If the blockchain network of nodes does not validate the transaction, the transaction is stopped and the transfer of ownership is not recorded. If the blockchain network of nodes validates and verifies the transaction, the transaction is combined with other transactions occurring at the same time to form data for a new block and the new block is added to the blockchain. The recorded transaction in the blockchain is evidence that the next owner identified in the transaction request is now the current owner.

To enable more complex transactions, a blockchain system can use "smart contracts" which is computer code that implements transactions of a contract. The computer code may be executed in a secure platform that supports recording transactions in blockchains. In addition, the smart contract itself can be recorded as a transaction in the blockchain using an identity token that is a hash of the computer code so that the computer code that is executed can be authenticated. When deployed, a constructor of the smart contract executes initializing the smart contract and its state. The state of a smart contract is stored persistently in the blockchain. When a transaction is recorded against a smart contract, a message is sent to the smart contract and the computer code of the smart contract executes to implement the transaction. The computer code ensures that all the terms of the contract are complied with before the transaction is recorded in the blockchain. For example, a smart contract may support the sale of an asset. The inputs to a smart contract to sell the asset may be the identity tokens of the seller, the buyer, and the asset and the sale price. The computer code ensures that the seller is the current owner of the asset and that the buyer has sufficient funds in their account. The computer code then records a transaction that transfers the ownership of the asset to the buyer and a transaction that transfers the sale price from the buyer's account to the seller's account. If either transaction is not successful, neither transaction is recorded in the blockchain.

When a message is sent to a smart contract to record a transaction, the message is sent to each node that maintains a replica of the blockchain. Each node can execute the computer code of the smart contract to implement the transaction. For example, if all nodes each maintain a replica of a blockchain, then the computer code is executed at each of the nodes. When a node completes the execution of the computer code, the results of the transaction are recorded in the blockchain. The nodes can employ a consensus algorithm to decide on which transactions to record and which transactions to discard. A majority of the nodes must verify the transaction, in order for the transaction to be recorded on the blockchain. The execution of the computer code at each node helps ensure the authenticity of the blockchain.

Figure 115:
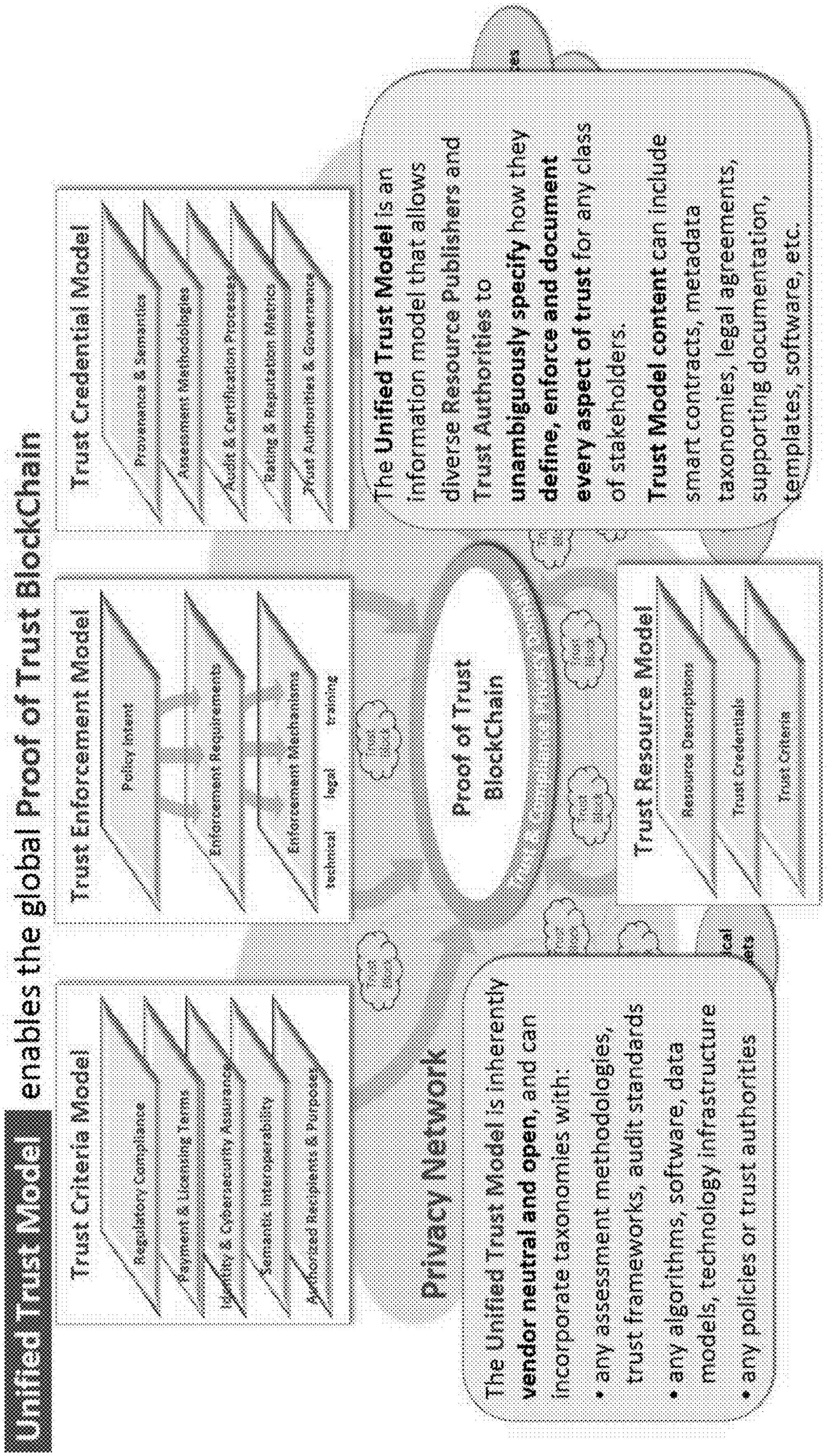
FIGS. 115-116 illustrate a unified trust model that enables a proof of trust blockchain.
Figure 116:
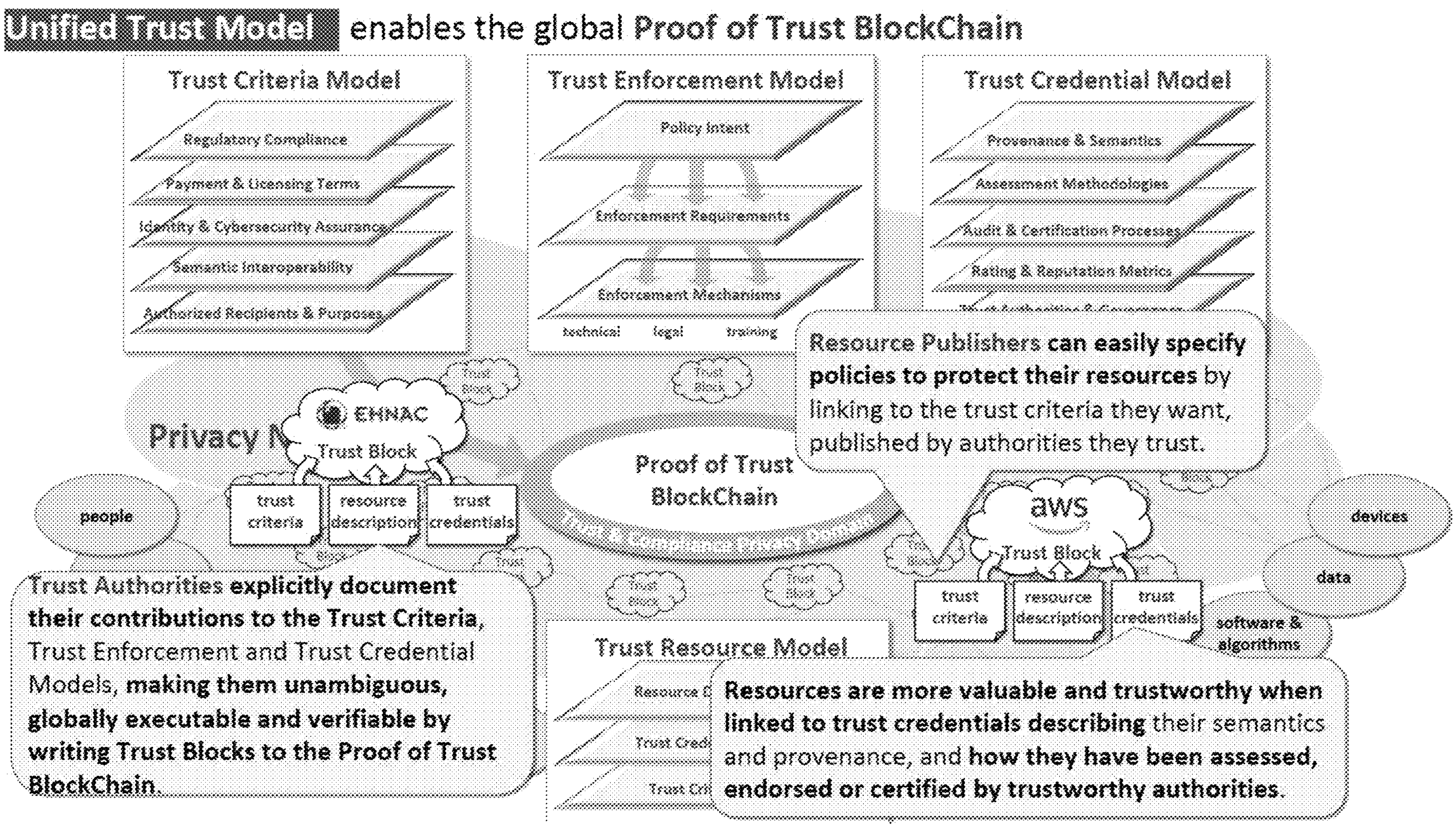

FIGS. 115-116 illustrate a unified trust model that enables a proof of trust blockchain.

Figure 117:
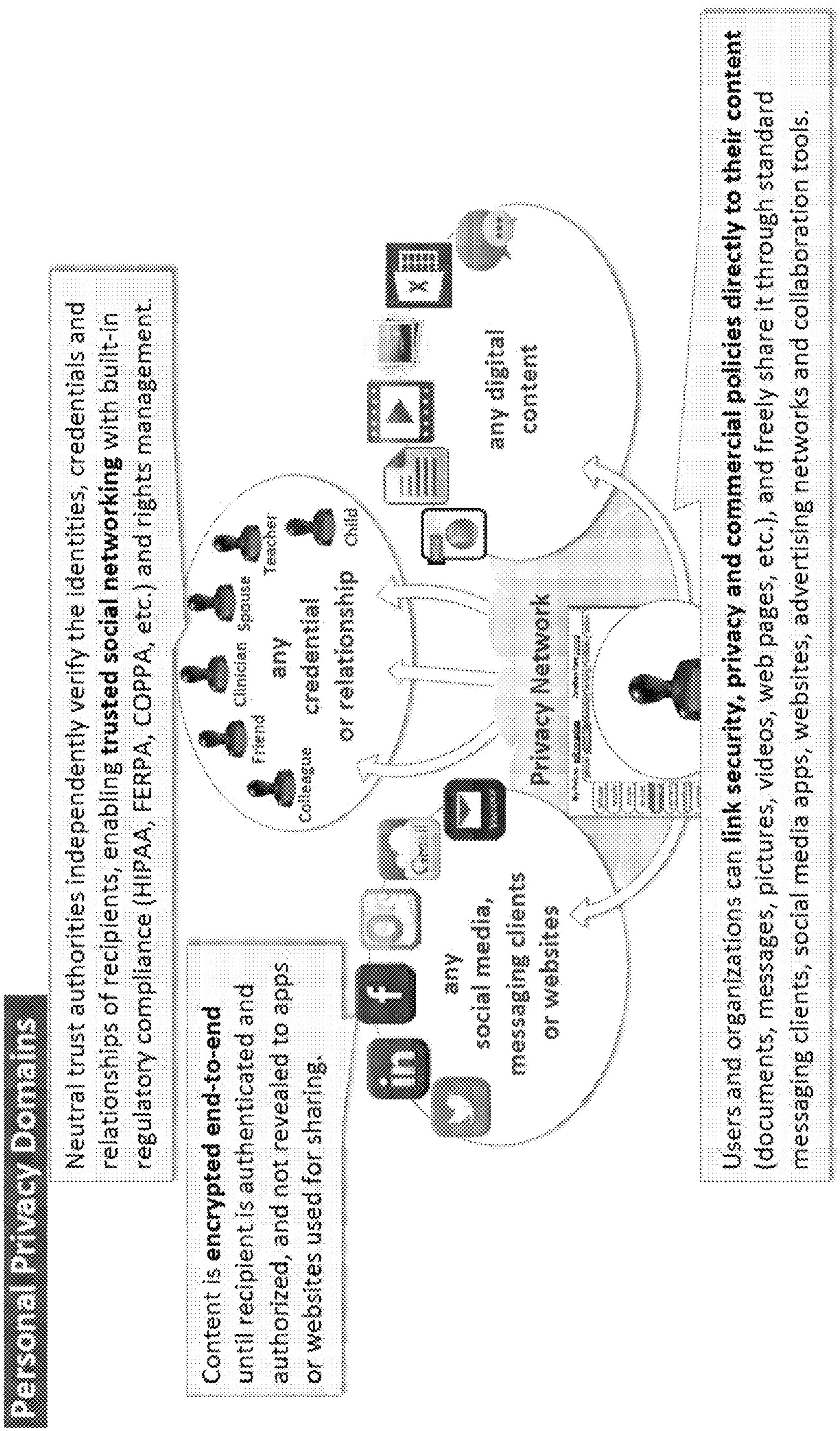
FIG. 117 illustrates personal privacy domains used with the privacy network.

FIG. 117 illustrates personal privacy domains used with the privacy network.

Figure 118:
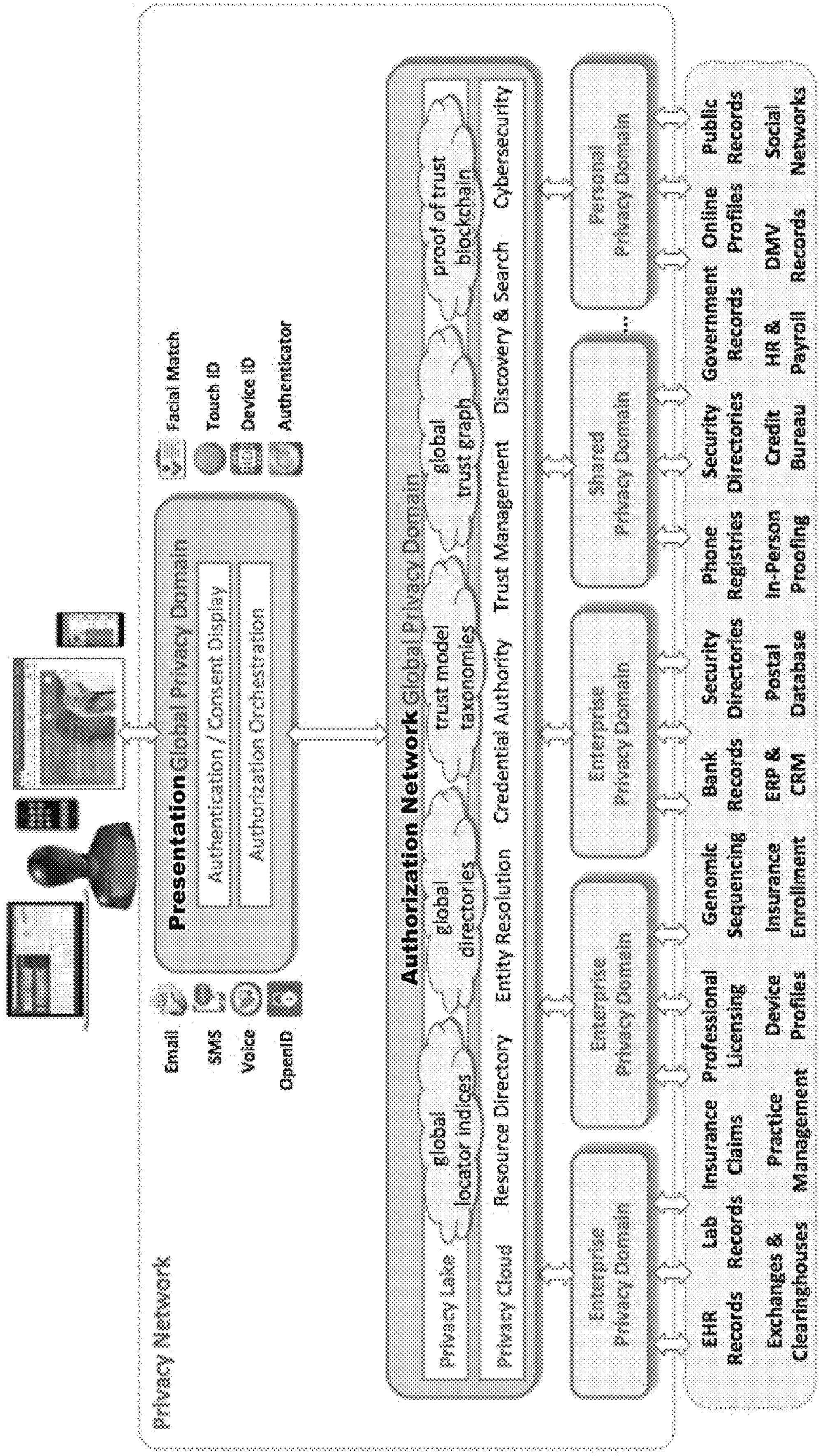
FIG. 118 illustrates a block diagram of an embodiment of a privacy network.

FIG. 118 illustrates a block diagram of a privacy network having a presentation global privacy domain and an authorization network global privacy domain and a plurality of privacy domain portals which can include enterprise privacy domains and shared privacy domains and personal privacy domains. The presentation global privacy domain can include an authentication/consent display and an authorization orchestration module. The presentation global privacy domain can provide: email, sms, voice, open ID, facial match, touch ID, device ID and authenticator services to computing devices used to system users. The authorization network global privacy domain can include a privacy lake and a privacy cloud. The privacy lake can include: global locator indicies, global directories, trust model taxonomies, global trust graph and a proof of trust blockchain. The privacy cloud can include: a resource directory, entity resolution, credential authority, trust management, discovery & search, and cyber security features. The privacy domains can interact with various types of data including: HER records, lab records, insurance claims, professional licensing, genomic sequencing, bank records, security directories, phone registries, security directories, government records, online profiles, public records, exchanges & clearing houses, practice management, device profiles, insurance enrollment, ERP & CRM, portal database, in-person proofing, credit bureau, HR & payroll, DMV records, and social networks.

Figure 119:
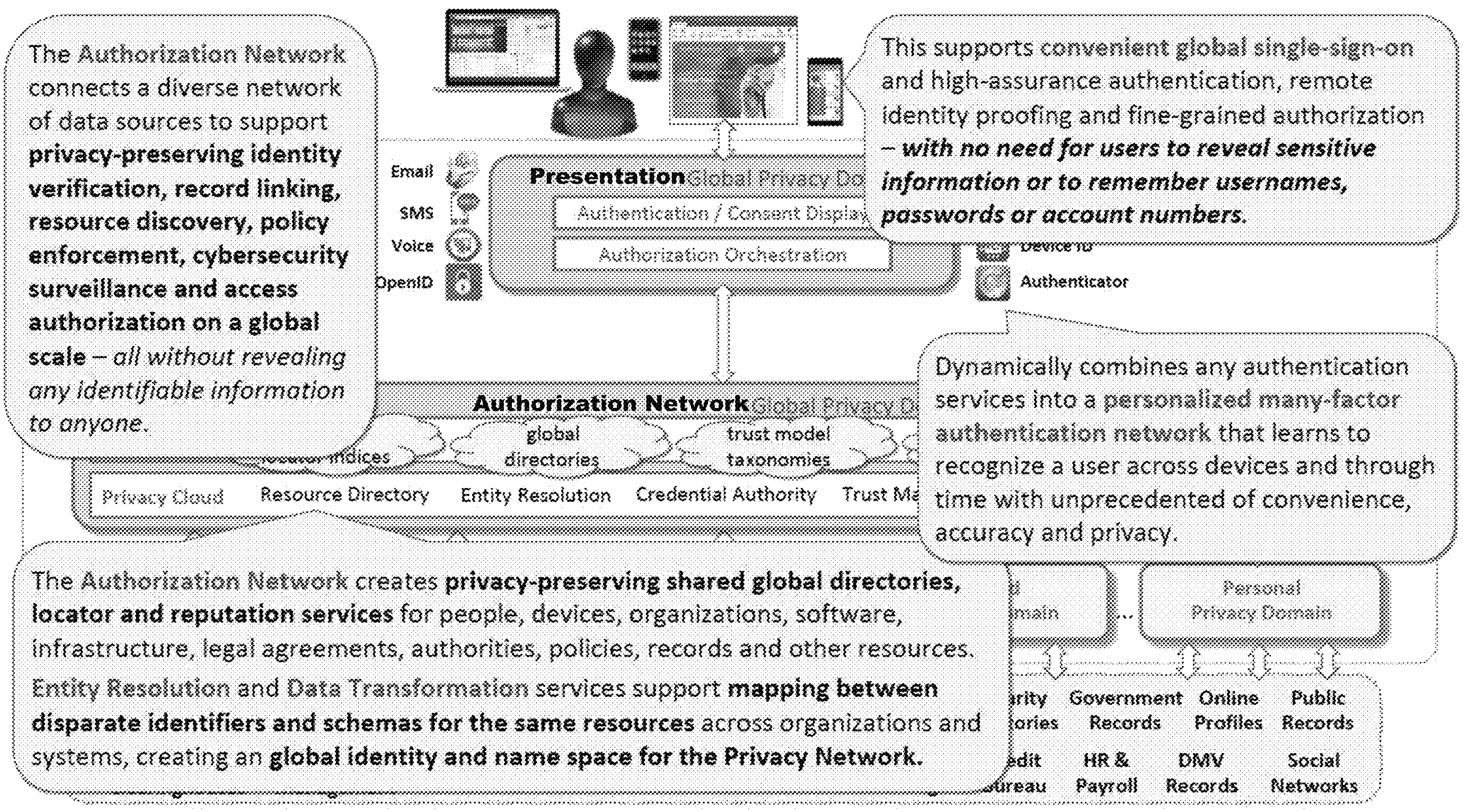
FIG. 119 illustrates personal privacy domains used with the privacy network.

FIG. 119 illustrates an embodiment of an authorization network that can connect a diverse network of data sources. The Authorization Network connects a diverse network of data sources to support privacy-preserving identity verification, record linking, resource discovery, policy enforcement, cybersecurity surveillance and access authorization on a global scale—all without revealing any identifiable information to anyone. The Authorization Network creates privacy-preserving shared global directories, locator and reputation services for people, devices, organizations, software, infrastructure, legal agreements, authorities, policies, records and other resources. Entity Resolution and Data Transformation services support mapping between disparate identifiers and schemas for the same resources across organizations and systems, creating an global identity and name space for the Privacy Network. The privacy network supports convenient global single-sign-on and high-assurance authentication, remote identity proofing and fine-grained authorization—with no need for users to reveal sensitive information or to remember usernames, passwords or account numbers. An authenticator can dynamically combine any authentication services into a personalized many-factor authentication network that learns to recognize a user across devices and through time with unprecedented of convenience, accuracy and privacy.

Certified/Accredited Authorization Credentials

Figure 120:
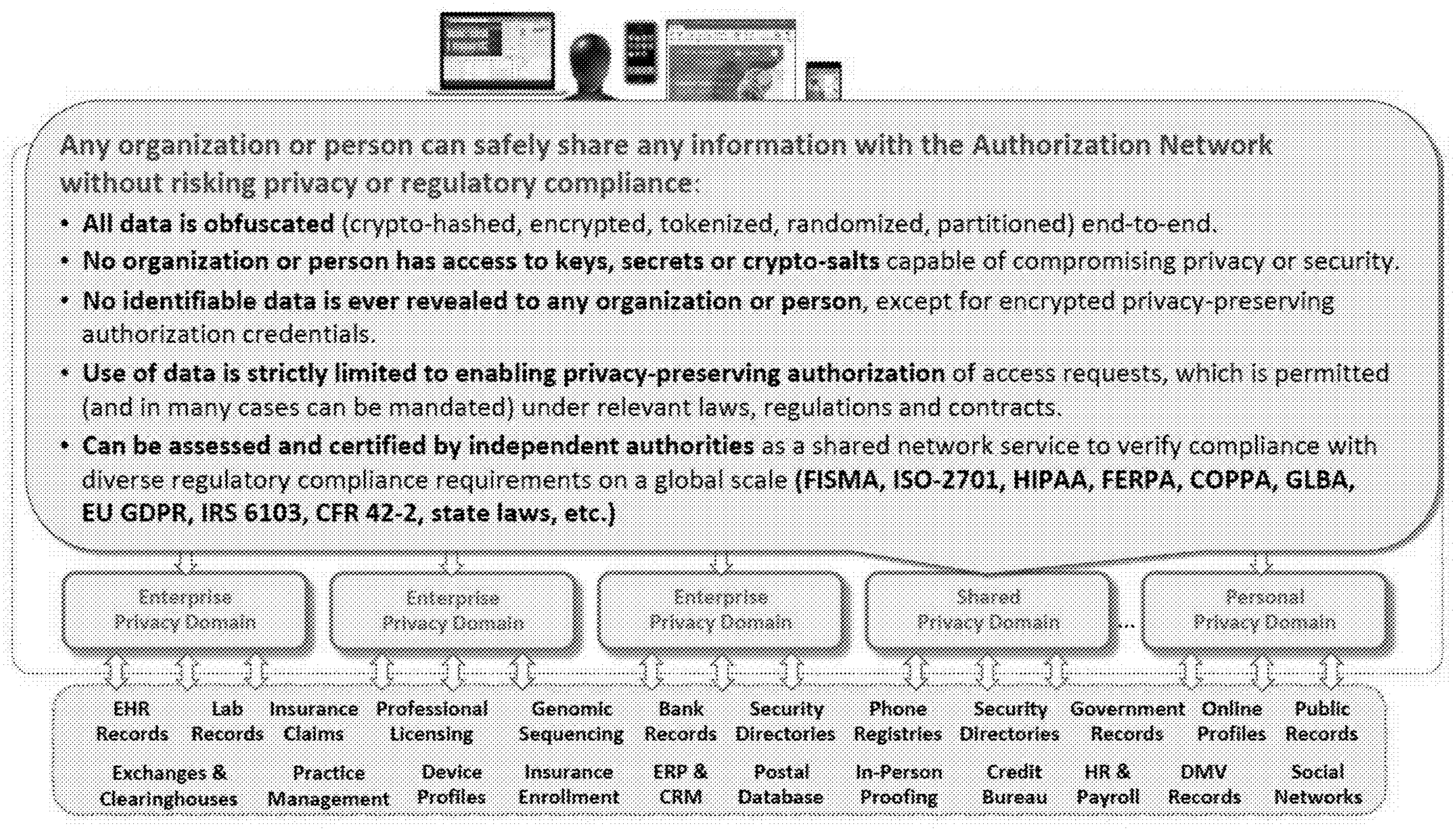
FIGS. 120-121 illustrate an embodiment of an authorization network that can connect a diverse network of data sources.
Figure 121:
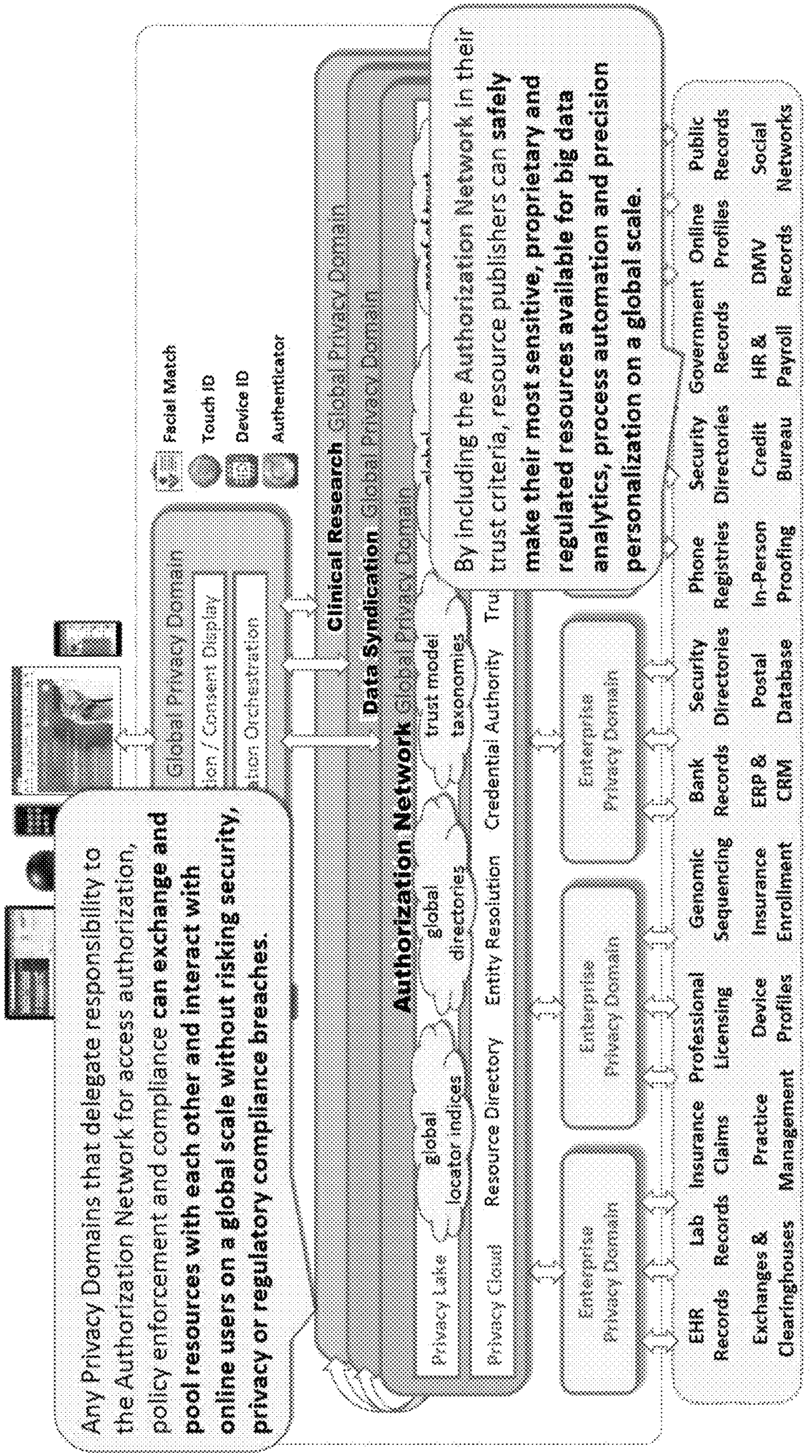
Figure 122:
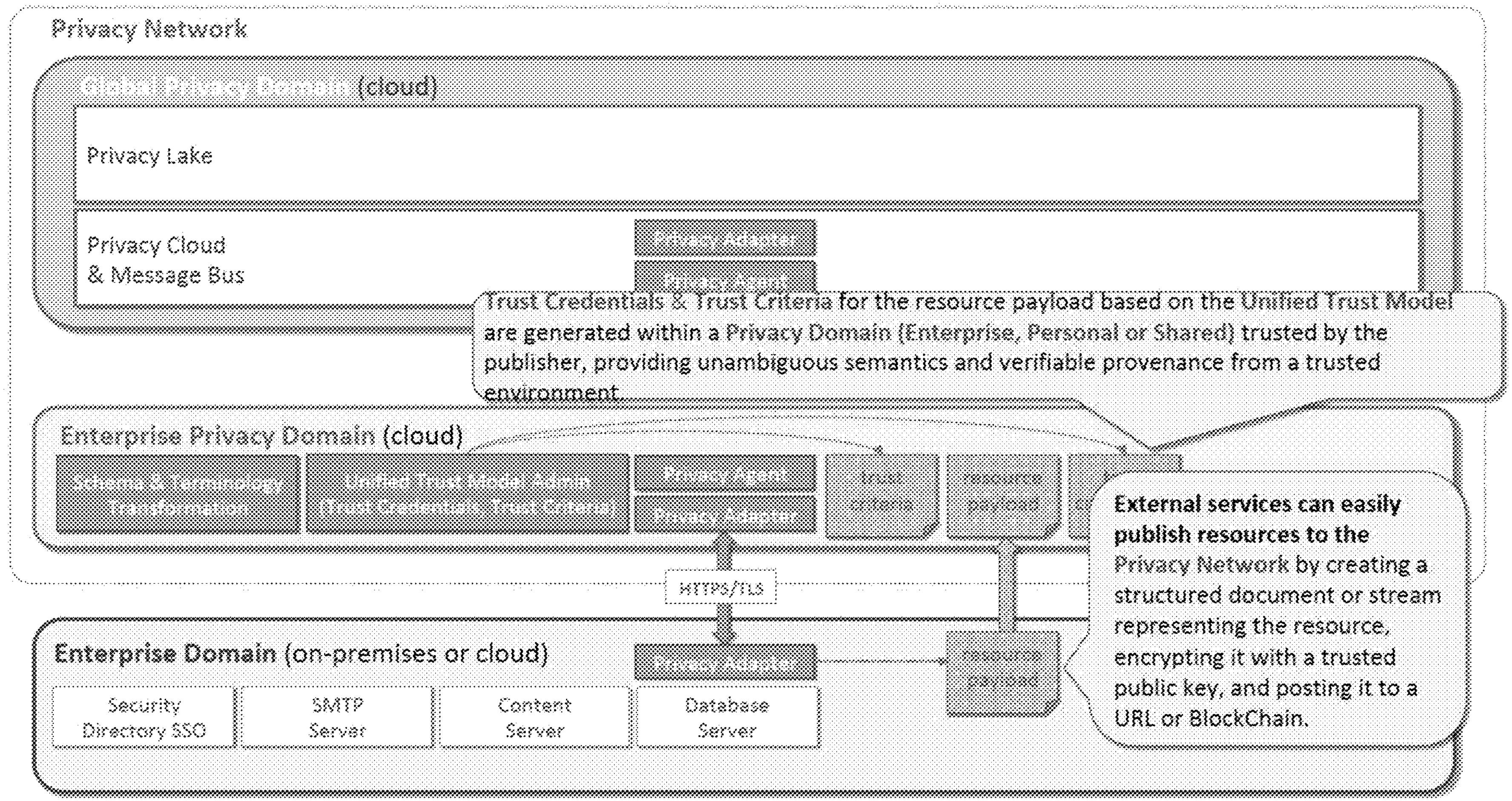
FIGS. 122-129 illustrate an example of a privacy network in data communication with an enterprise domain.
Figure 123:
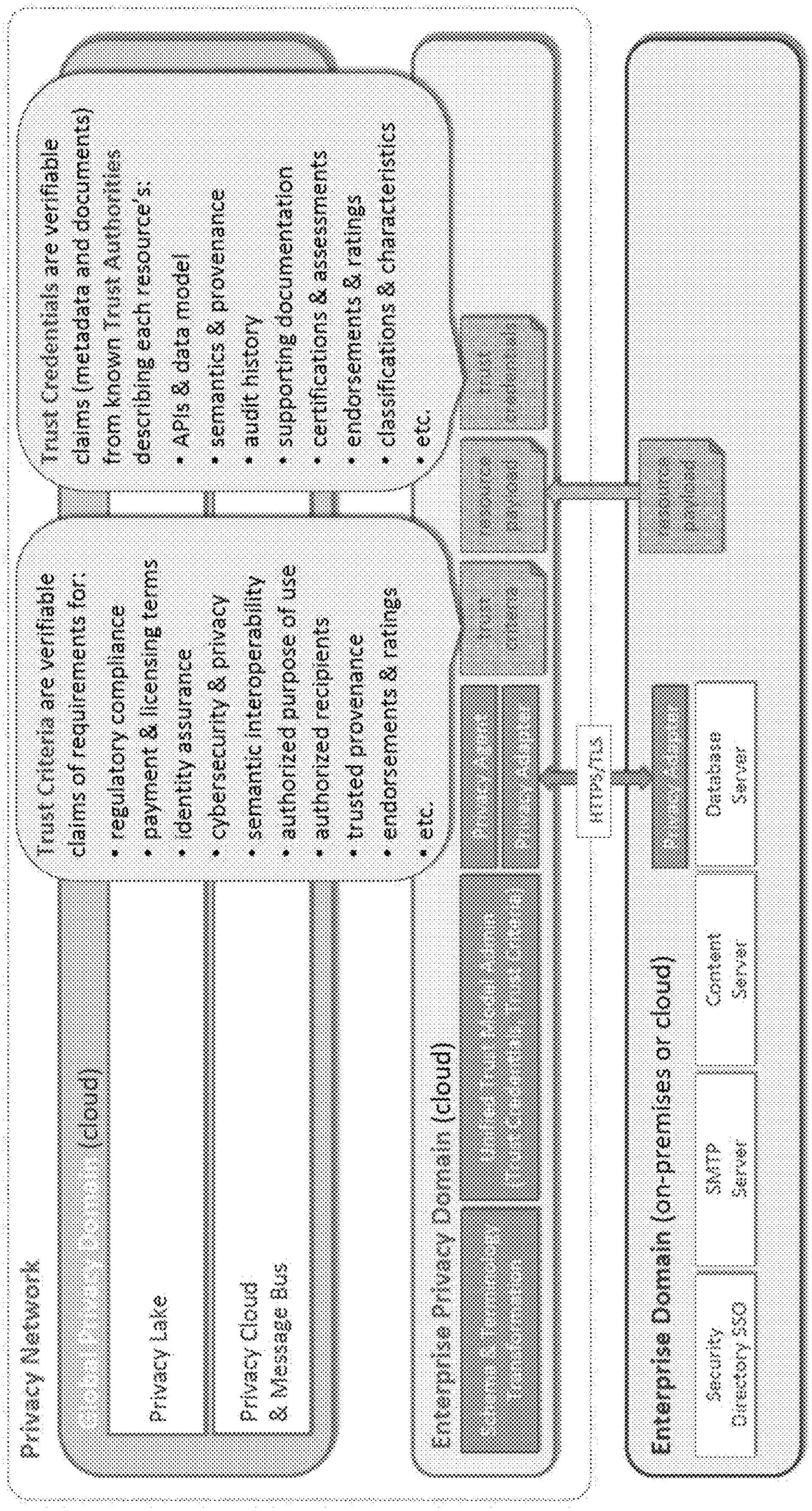
Figure 124:
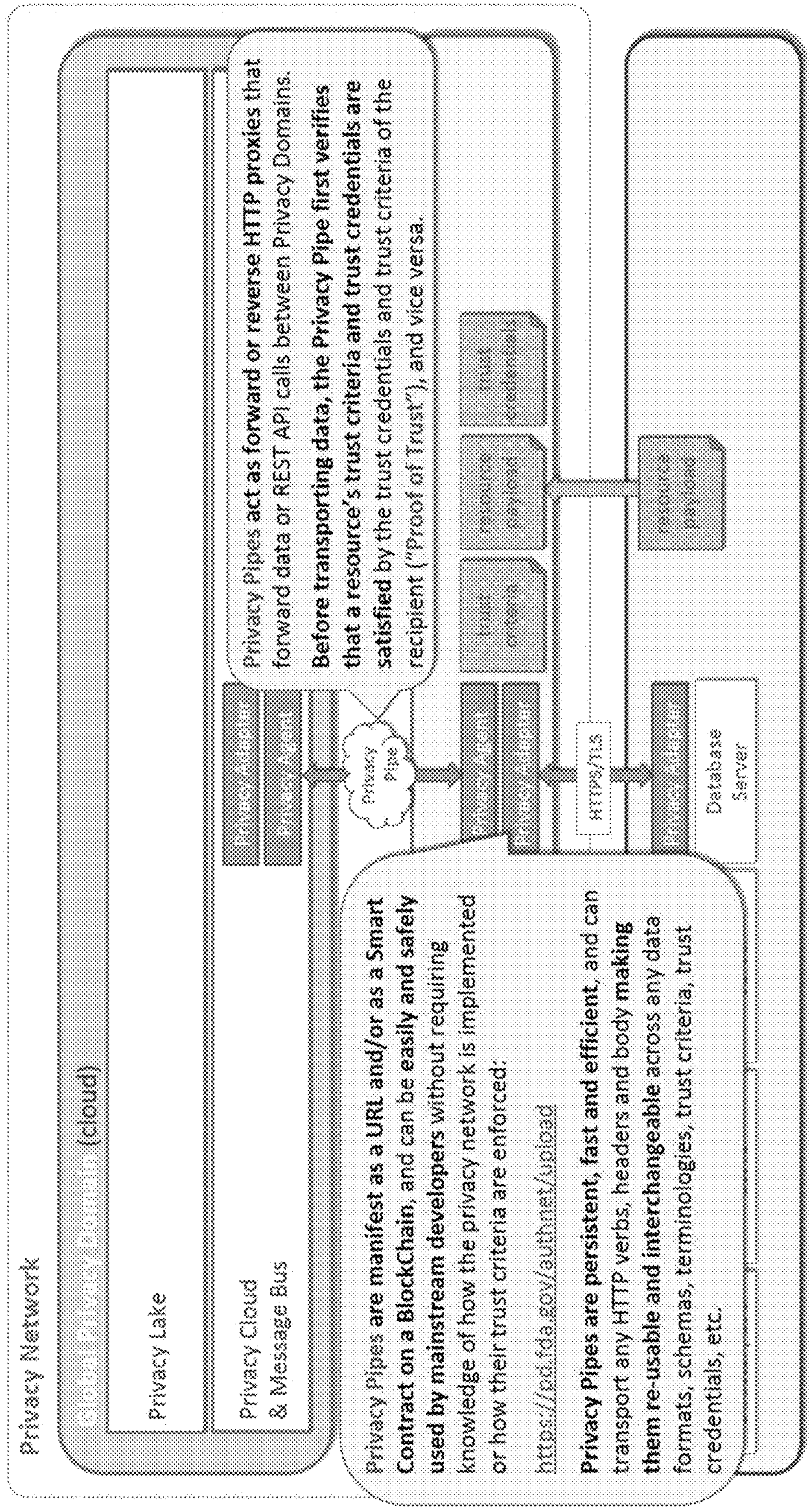
Figure 125:
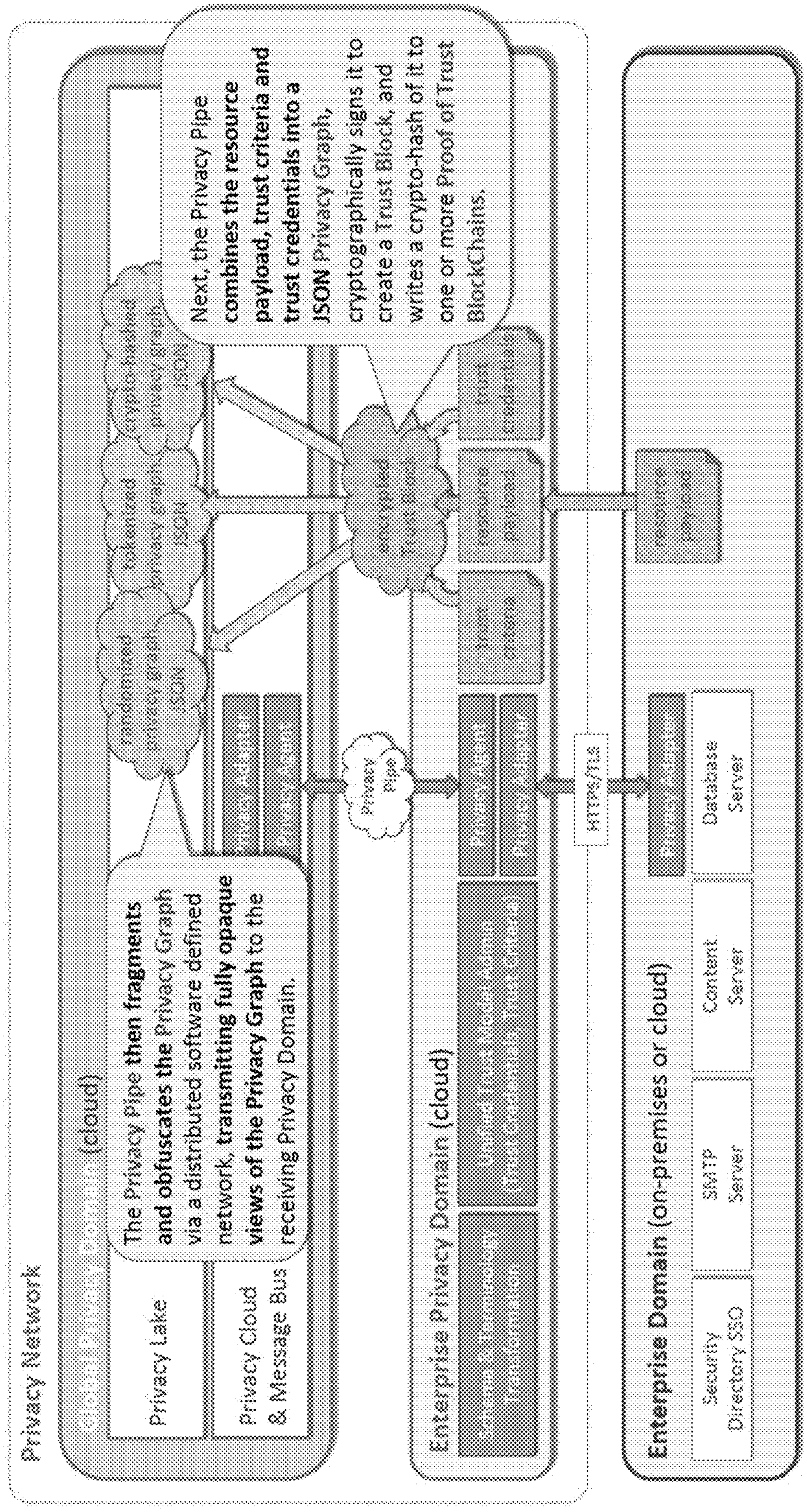
Figure 126:
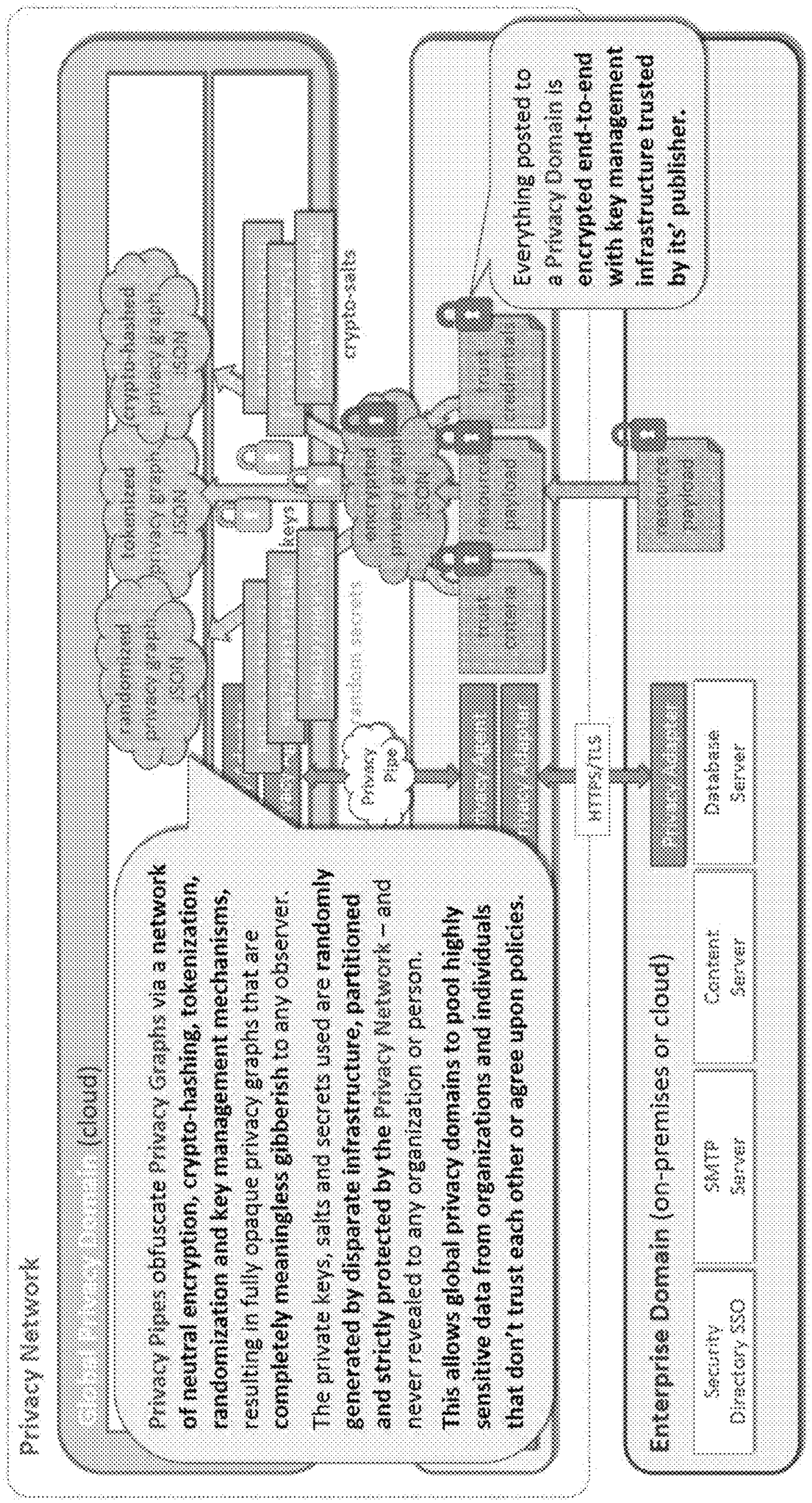
Figure 127:
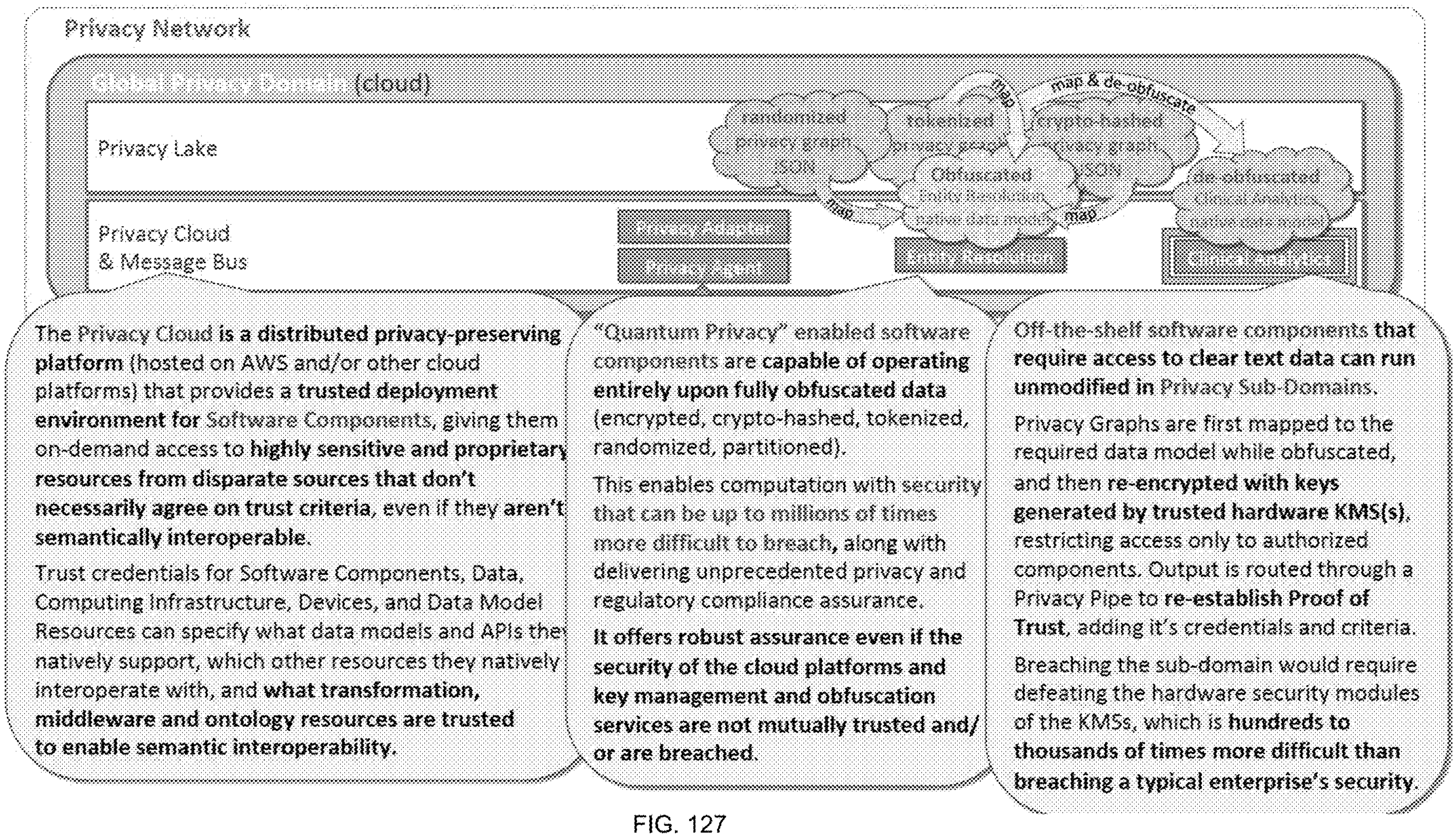
Figure 128:
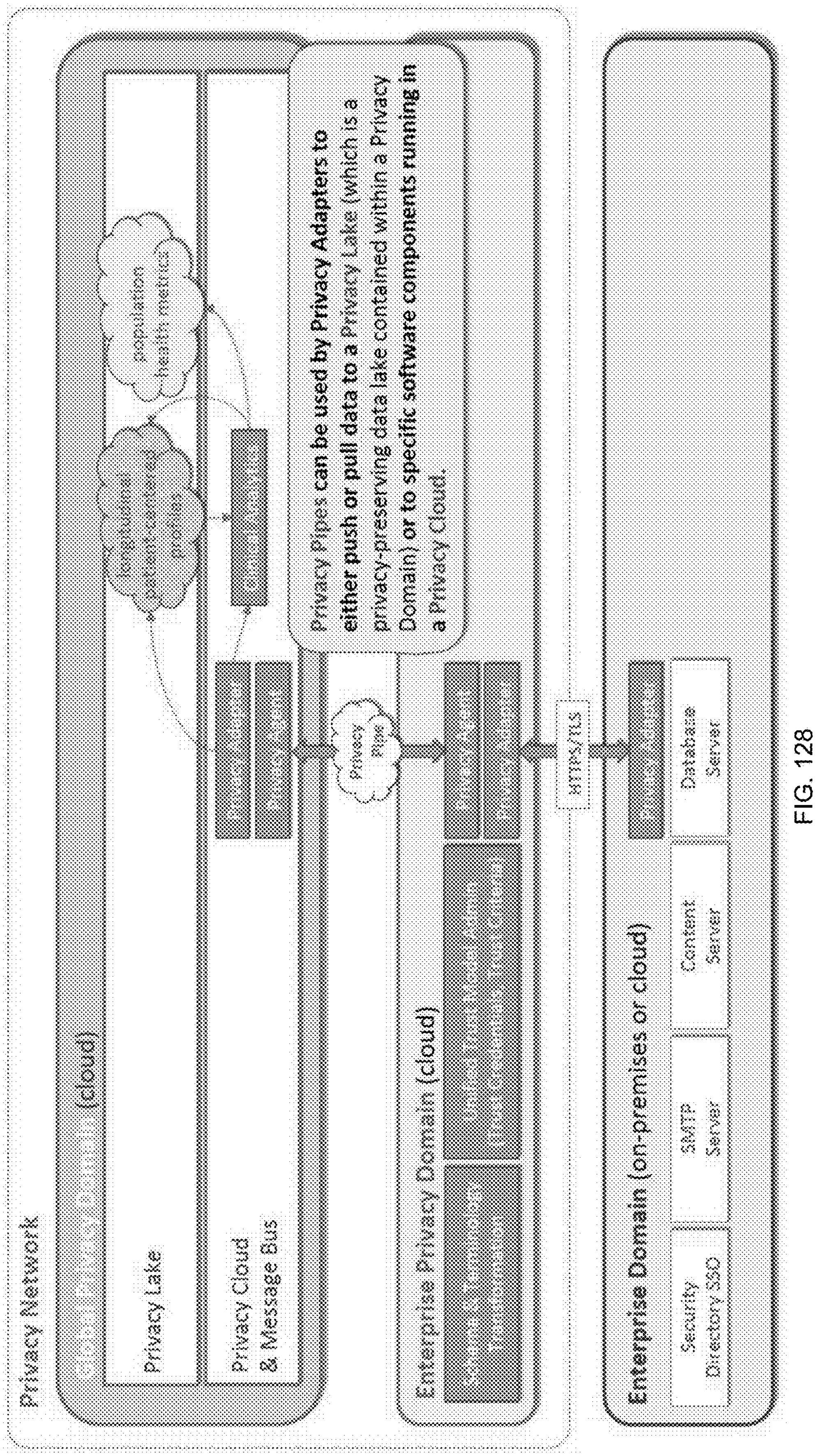
Figure 129:
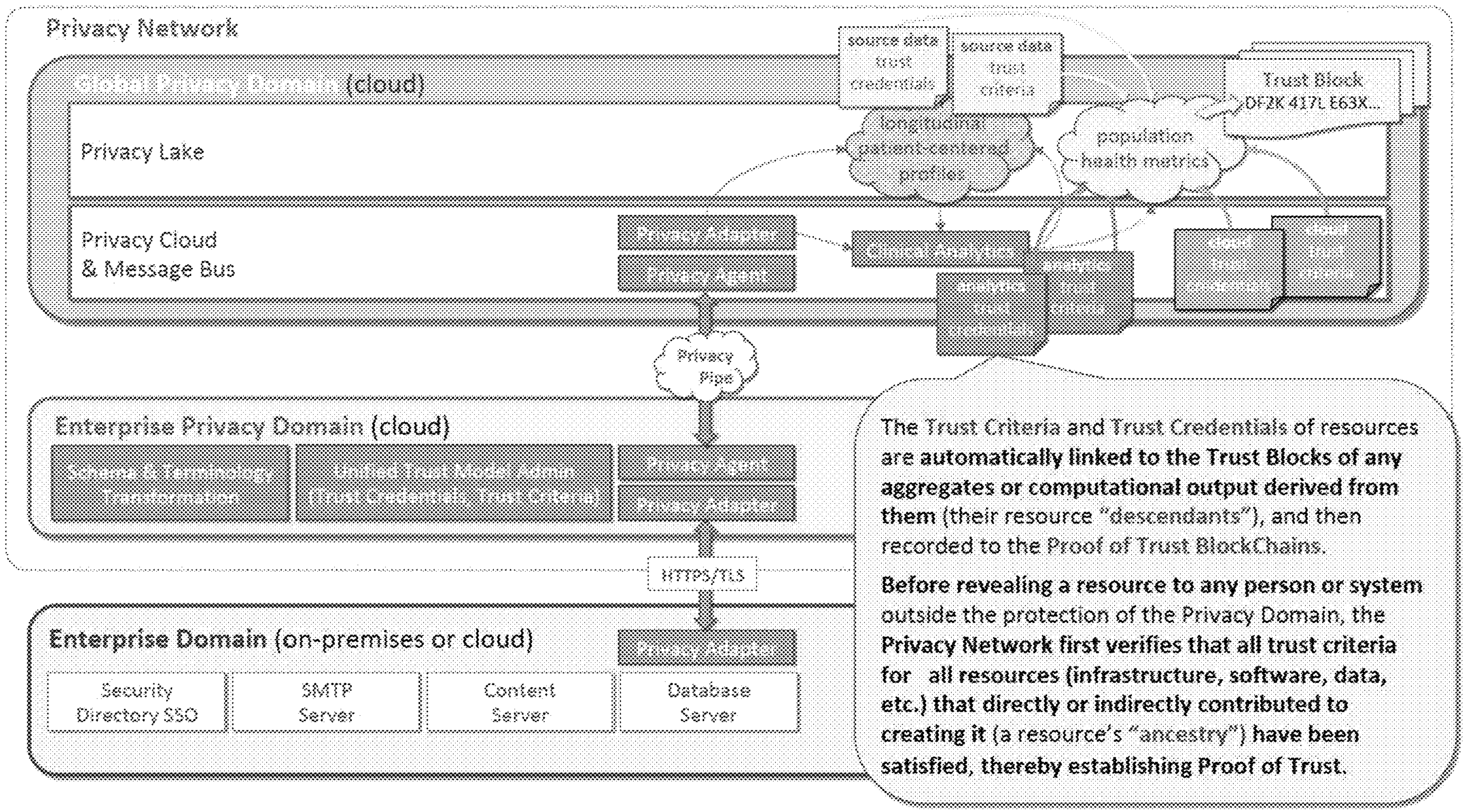

- Encrypted with intended recipient's public key
- Digitally signed by multiple trusted authorities
- Attributes verified with unprecedented assurance
- Linked to privacy-preserving trust authorities for cyber-security, regulatory compliance, licensing, etc.
- Eliminates identity theft and cyber-security fraud FIGS. 120-121 illustrate an embodiment of an authorization network that can connect a diverse network of data sources.

FIGS. 122-129 illustrate an example of a privacy network in data communication with an enterprise domain.

FIG. 130 illustrates a portion of code for the privacy network.

Figure 131:
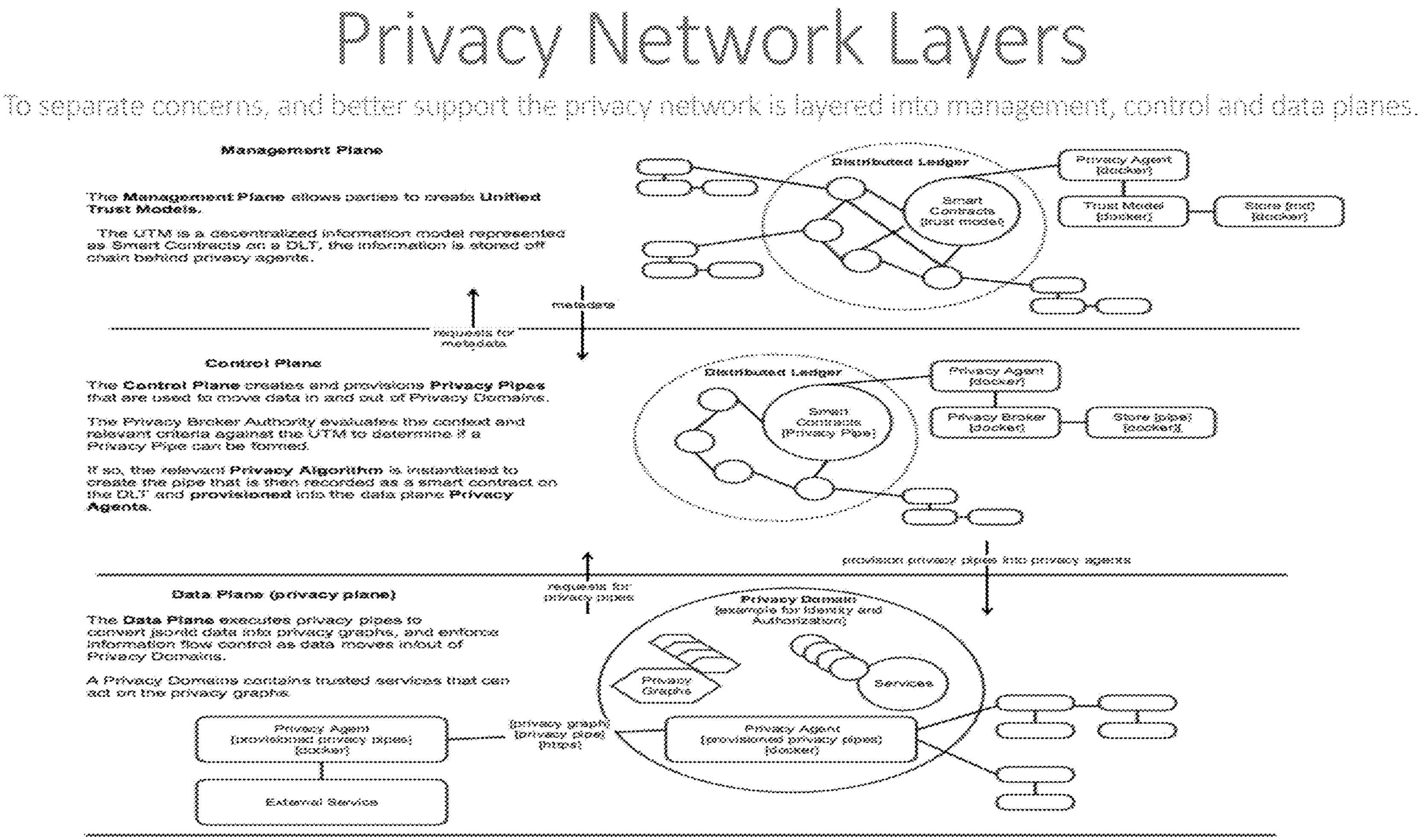
FIG. 131 illustrates an embodiment of privacy network layers.

FIG. 131 illustrates an embodiment of privacy network layers.

Figure 132:
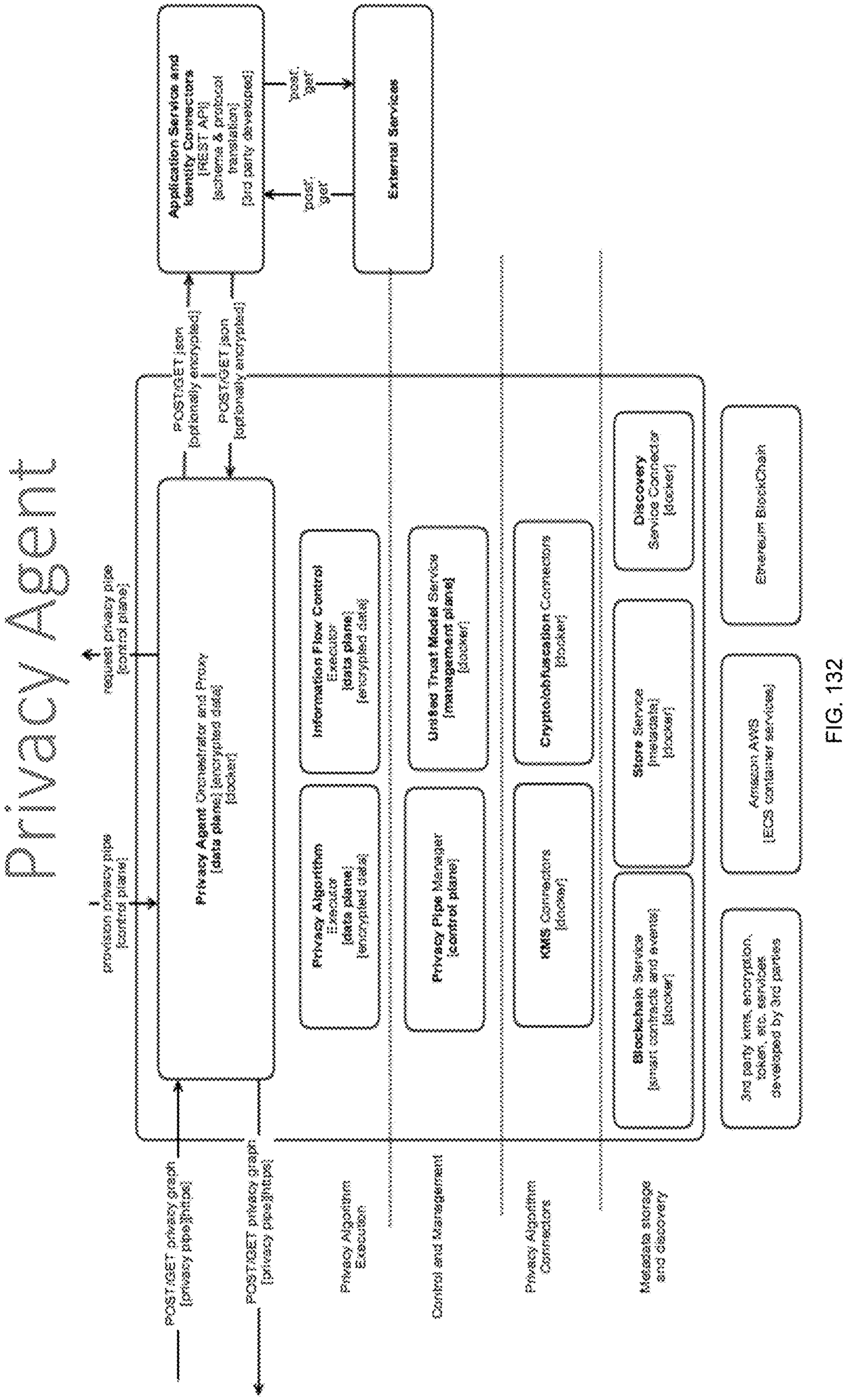
FIG. 132 illustrates a diagram of an embodiment of a privacy agent.

FIG. 132 illustrates a diagram of an embodiment of a privacy agent.

Figure 133:
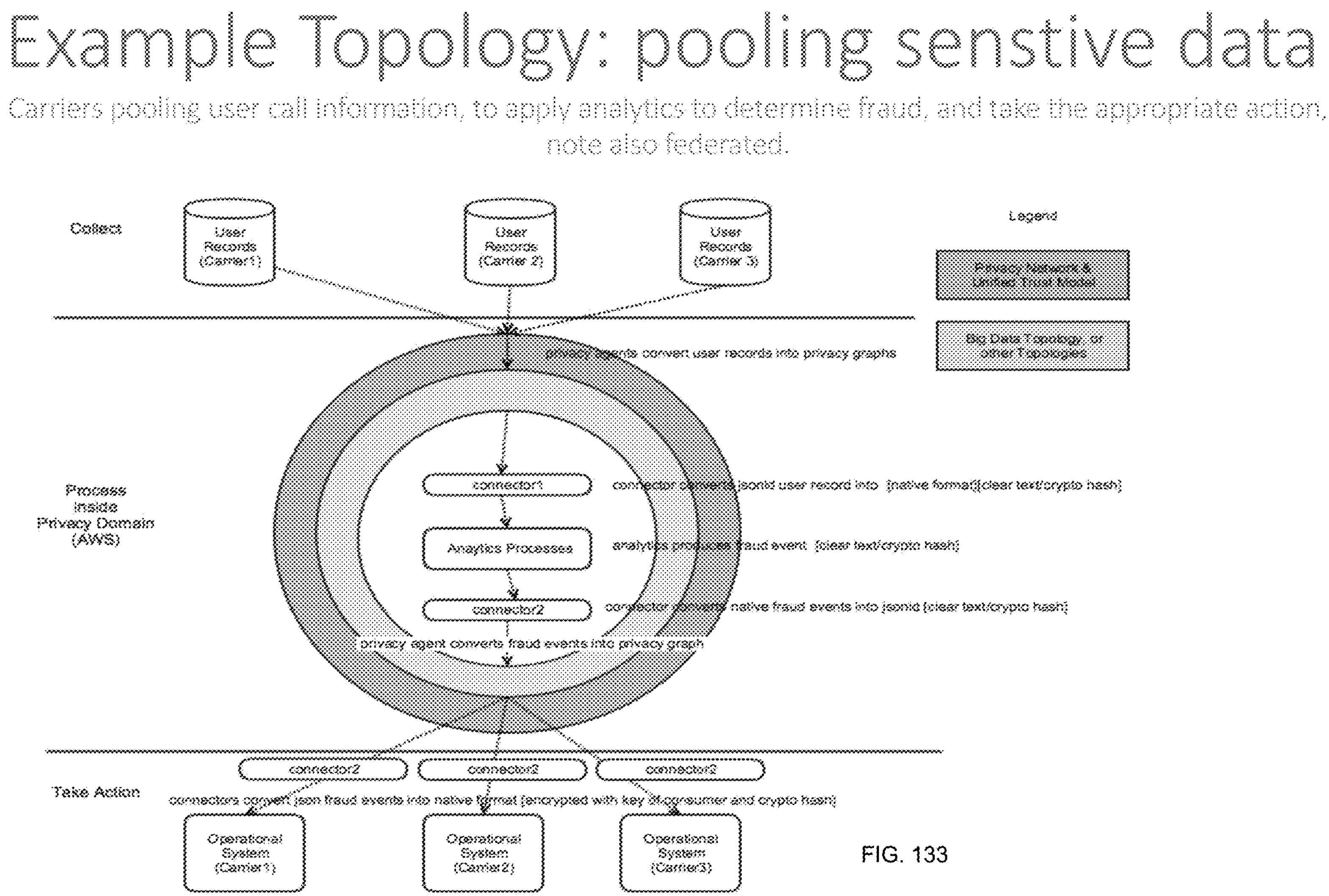
FIG. 133 illustrates a diagram of a topology method for pooling sensitive data.

FIG. 133 illustrates a diagram of a topology method for pooling sensitive data.

Figure 134:
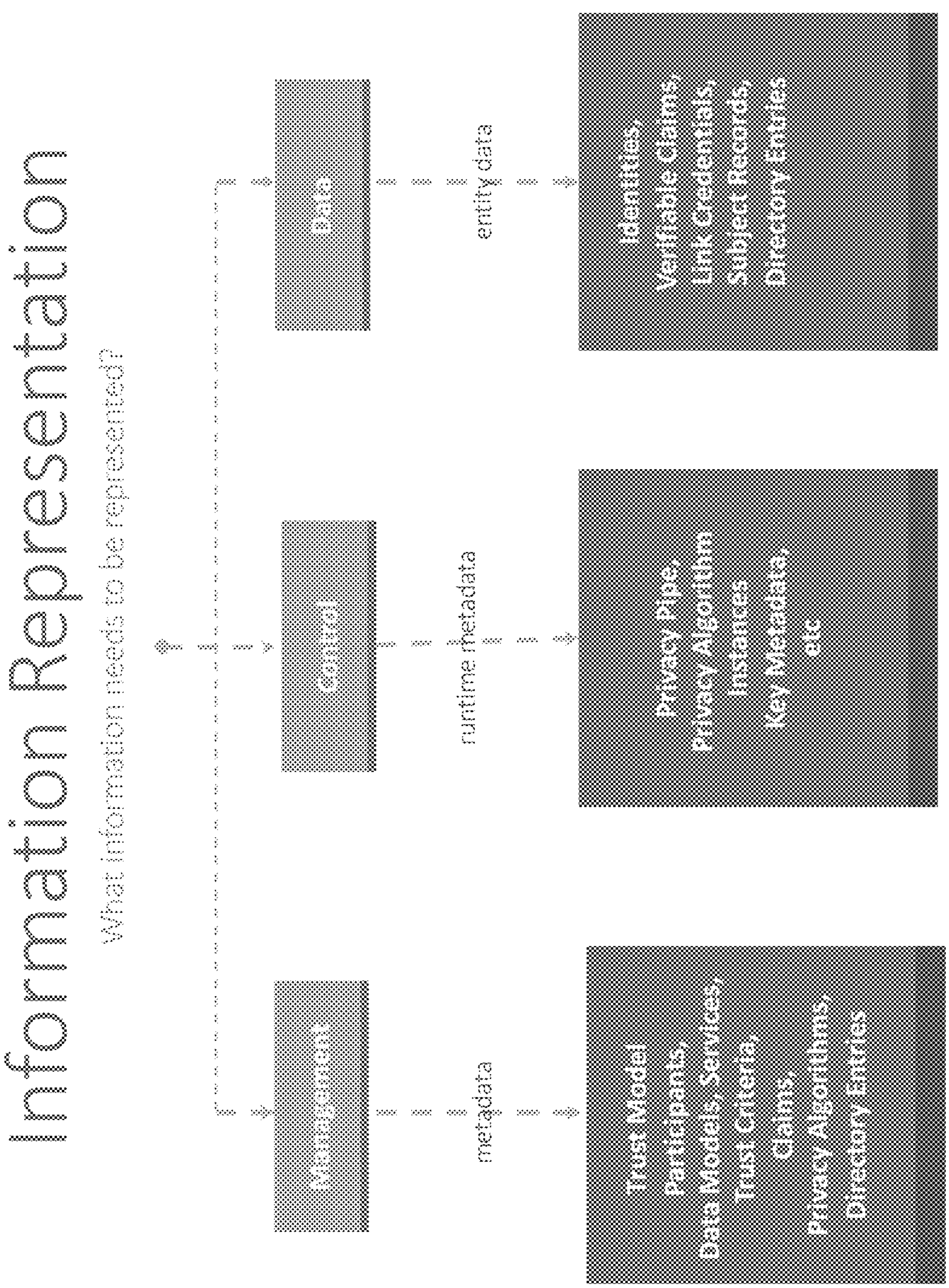
FIG. 134 illustrates a diagram of information representation.

FIG. 134 illustrates a diagram of information representation.

FIGS. 135 and 136 illustrate code for information format conversions to JSON-LD.

Figure 137:
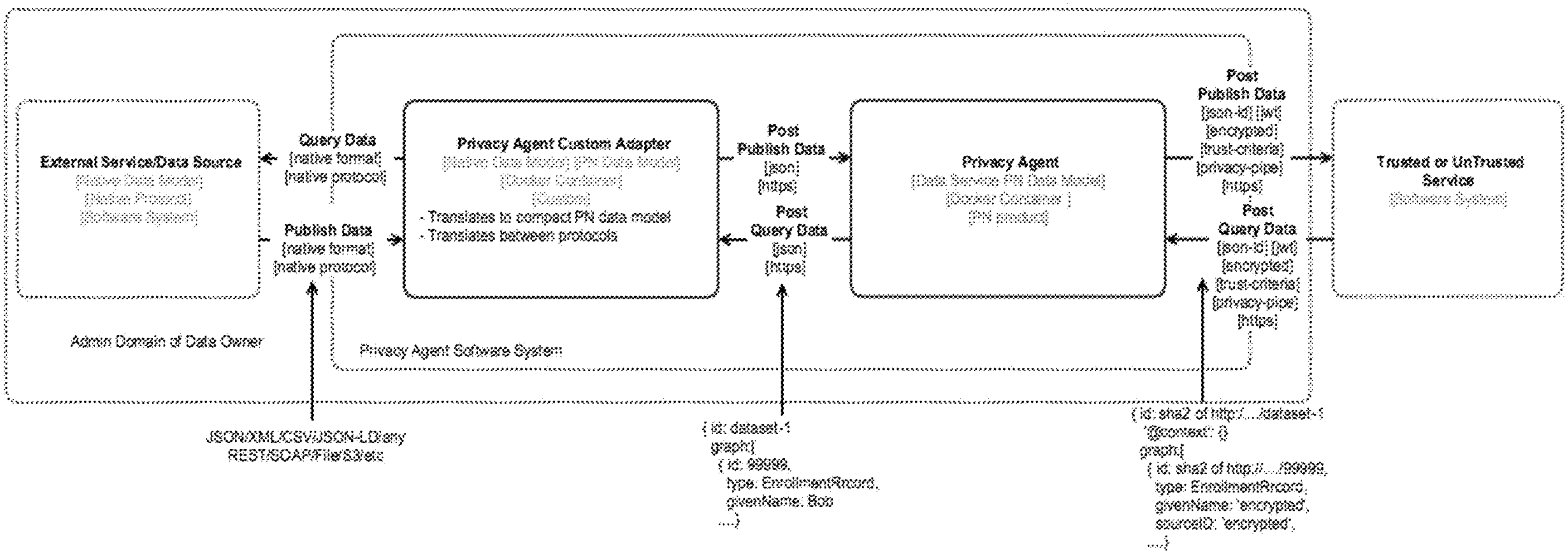
FIG. 137 illustrates a diagram of adapters for converting native data to privacy network data models.

FIG. 137 illustrates a diagram of adapters for converting native data to privacy network data models.

FIG. 138 illustrates code for data and metadata obfuscation.

Figure 139:
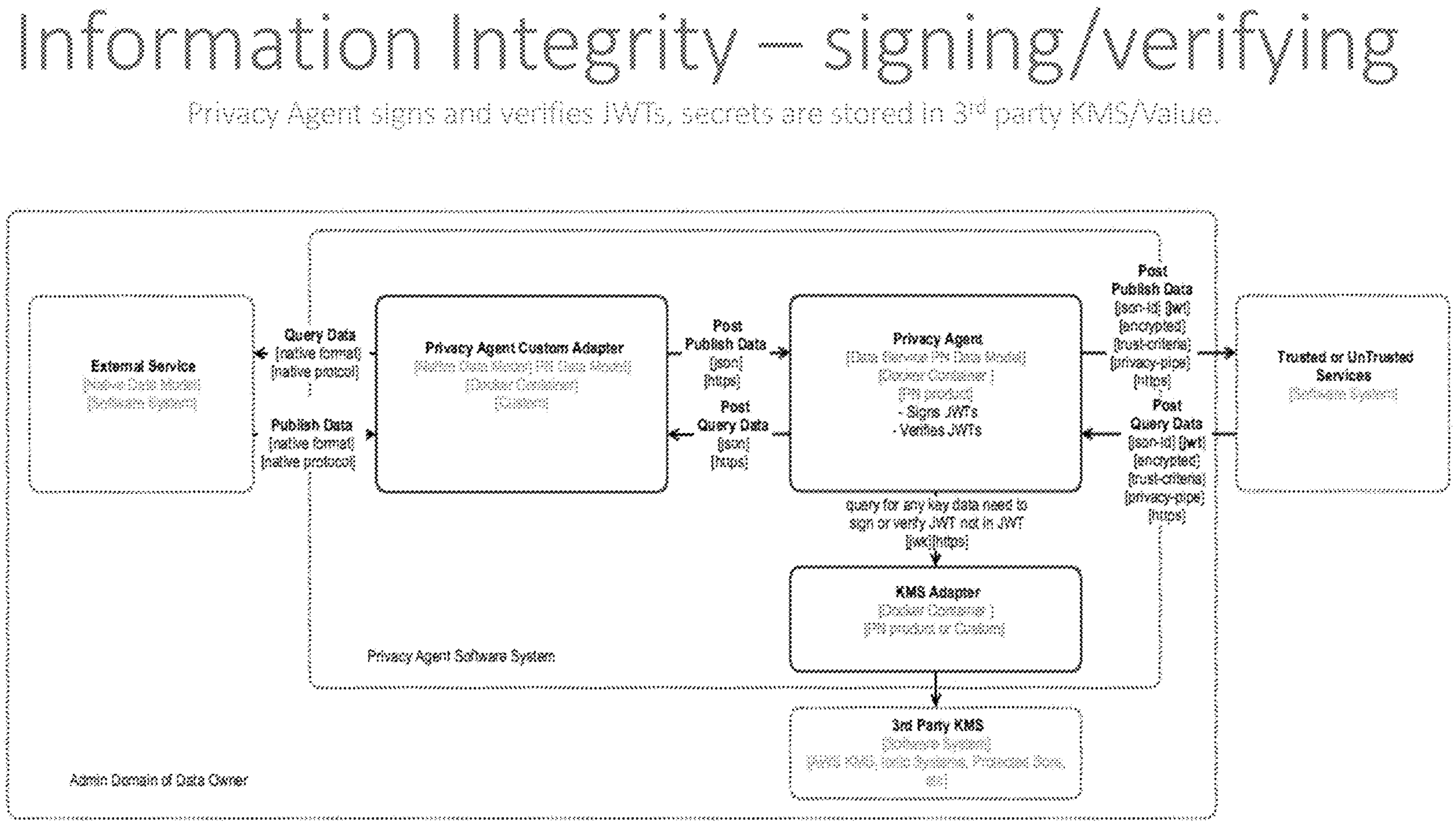
FIG. 139 illustrates a diagram for privacy agents to sign and verify information.

FIG. 139 illustrates a diagram for privacy agents to sign and verify information.

Figure 140:
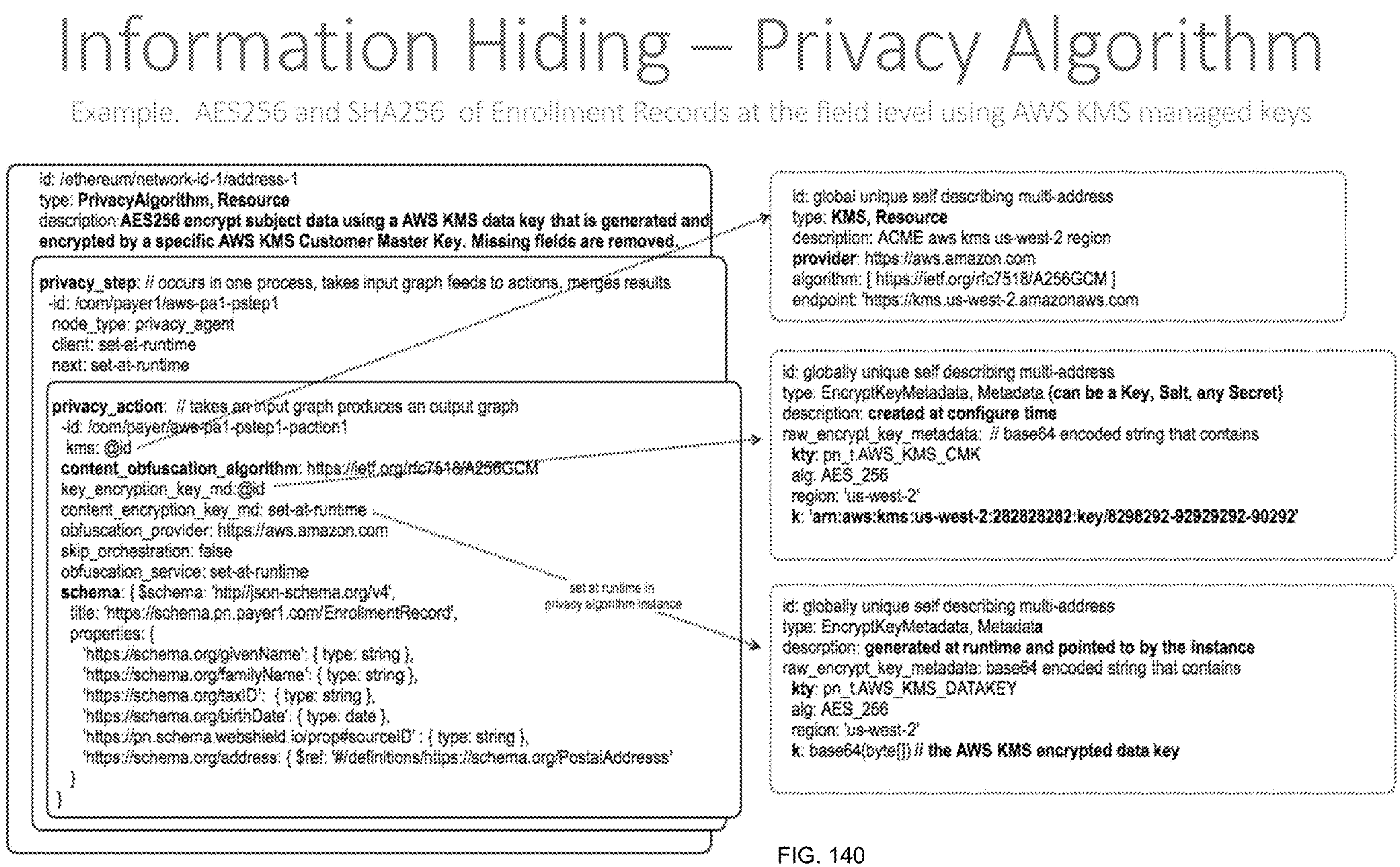
FIG. 140 illustrates an example of an information hiding privacy algorithm.

FIG. 140 illustrates an example of an information hiding privacy algorithm.

Figure 141:
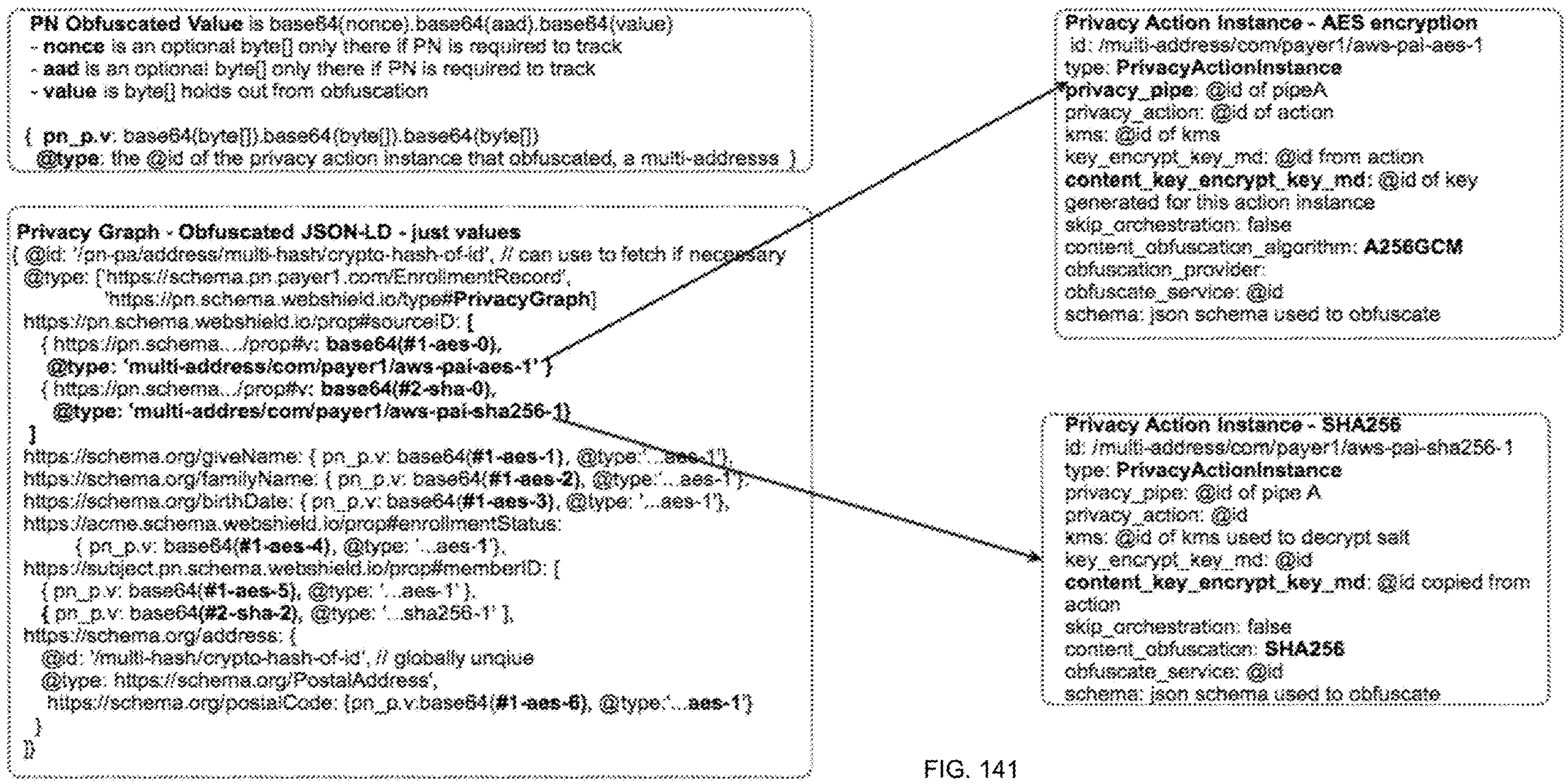
FIG. 141 illustrates an example of an information hiding privacy graph.

FIG. 141 illustrates an example of an information hiding privacy graph.

Figure 142:
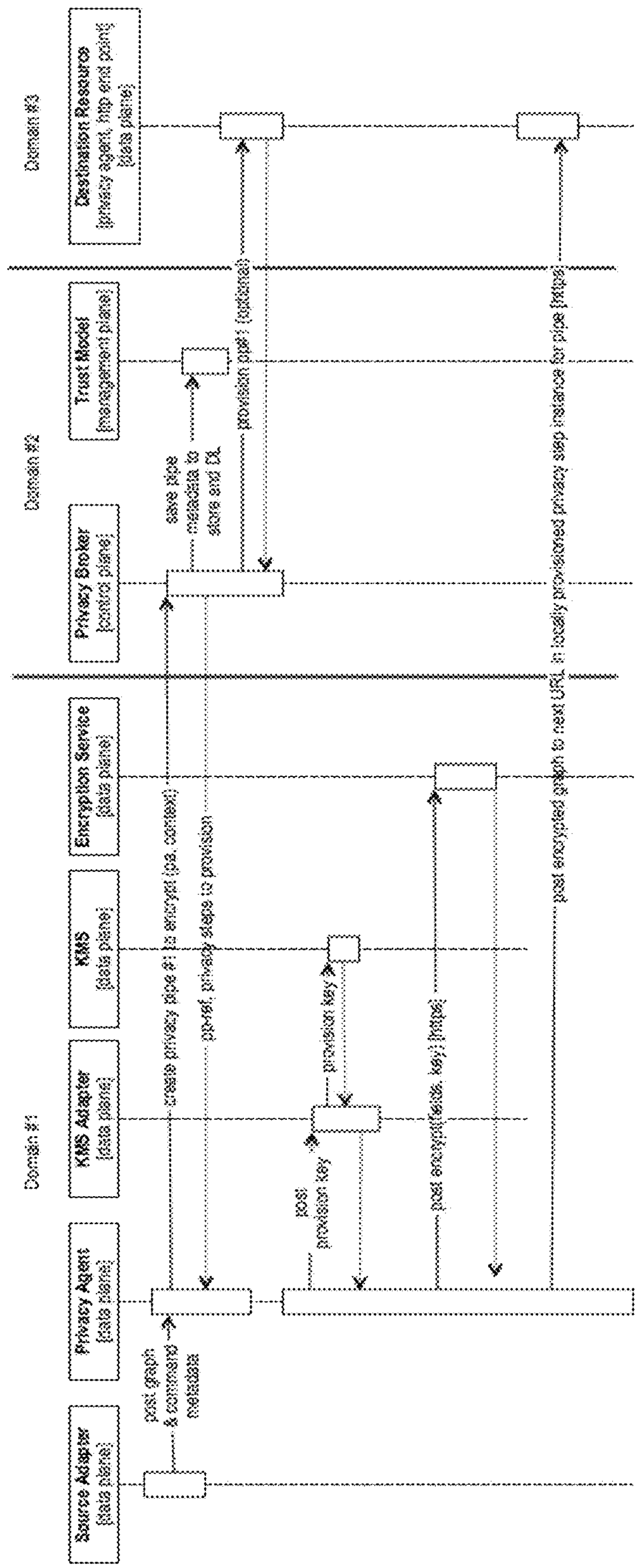
FIG. 142 illustrates a diagram of an information hiding sequence.

FIG. 142 illustrates a diagram of an information hiding sequence.

Figure 143:
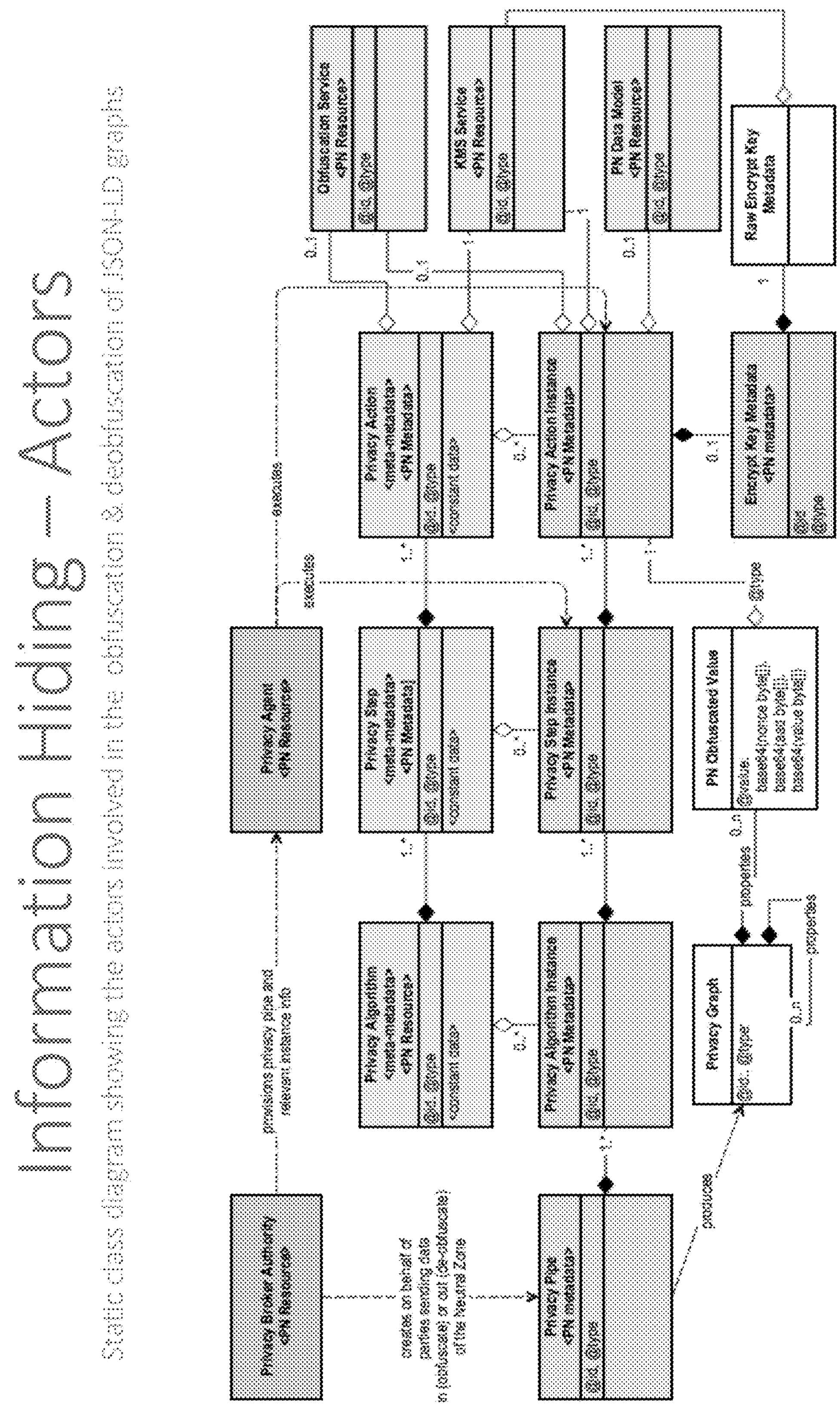
FIG. 143 illustrates a block diagram for information hiding.

FIG. 143 illustrates a block diagram for information hiding.

Figure 144:
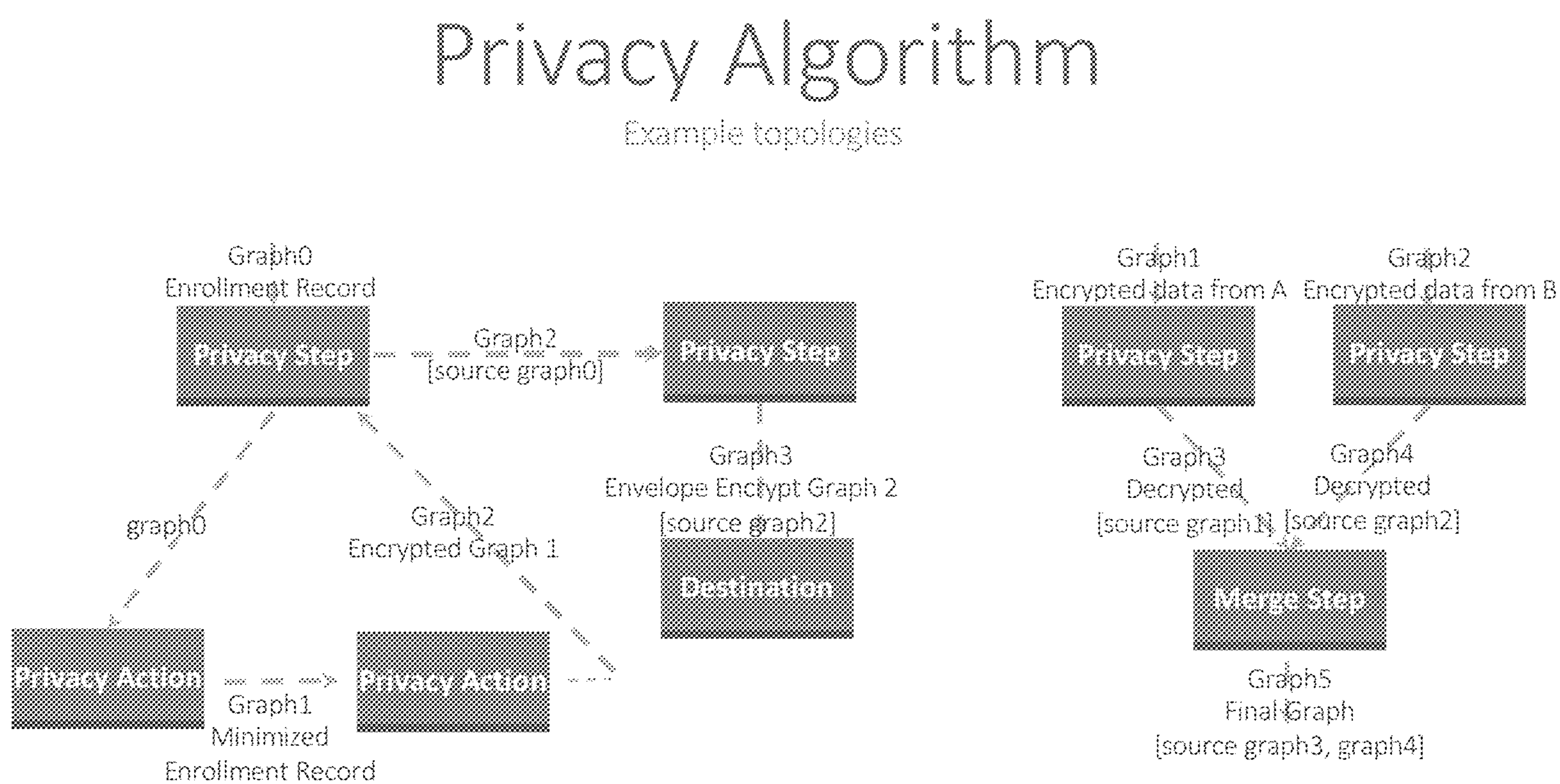
FIG. 144 illustrates a diagram of privacy processing.

FIG. 144 illustrates a diagram of privacy processing.

Figure 145:
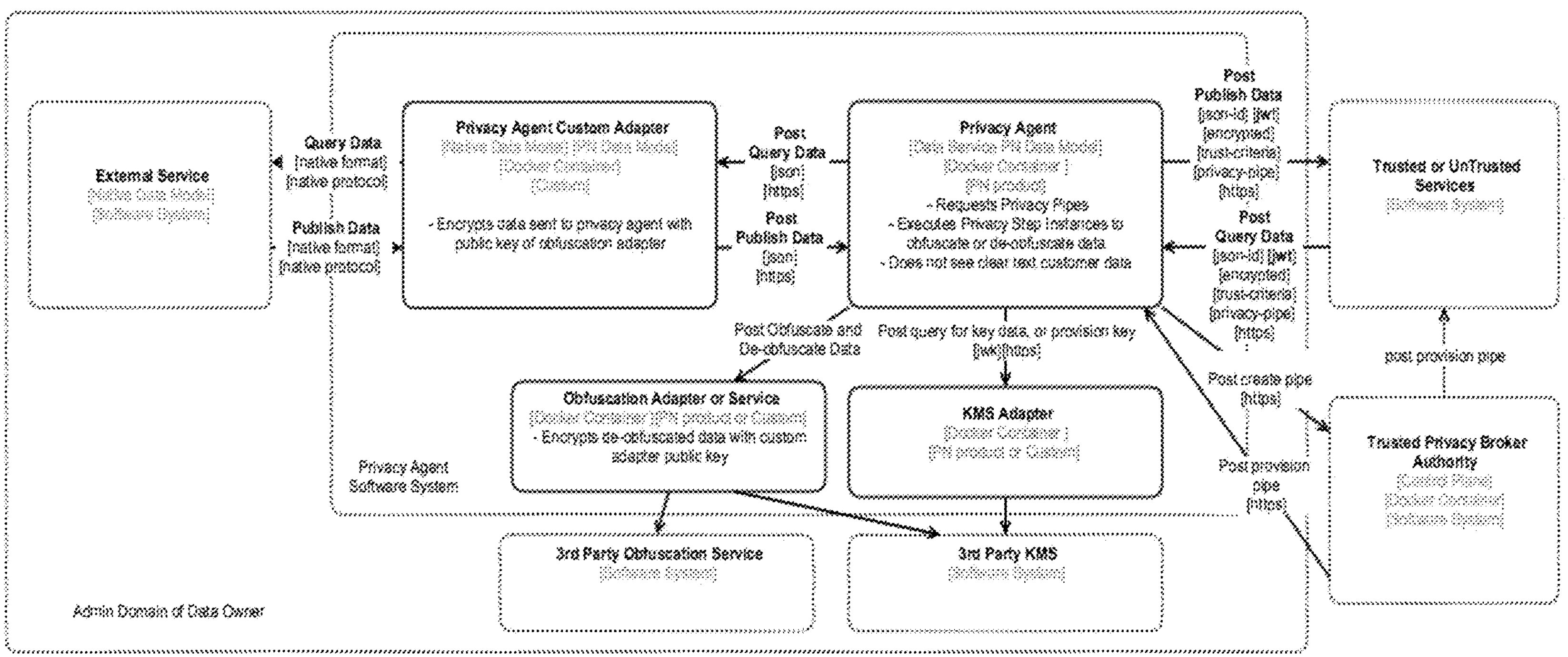
FIG. 145 illustrates a block diagram for information hiding through encryption.

FIG. 145 illustrates a block diagram for information hiding through encryption.

FIG. 146 illustrates examples of trust criteria and claims.

Figure 147:
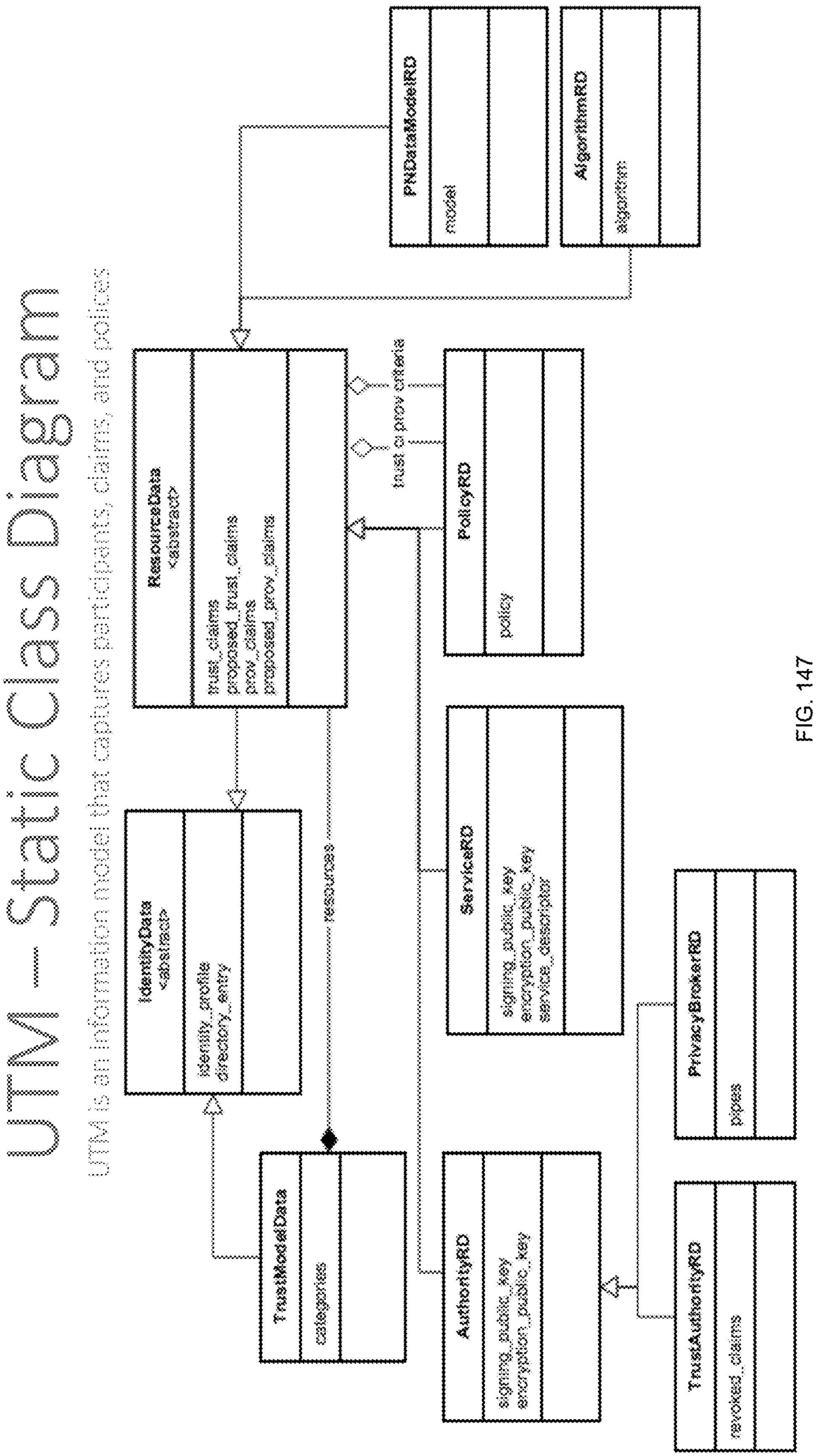
FIG. 147 illustrates a block diagram of an information model.

FIG. 147 illustrates a block diagram of an information model.

Agenda

Problem Statement.

Representing metadata, claims, and data as linked graphs using JSON-LD, vocabularies, and ontologies. Information integrity that stops tampering, adds simple provenance, using JWTs with digital signatures. Privacy Algorithms that support decentralized information hiding down to the field level using standard and proven cryptography, tokenization, enveloping, etc., technologies. Unified Trust Model a decentralized information model that supports cross organizational Information sharing down to the field level. Supports both the enforcement of privacy, compliance, and business policies; and provides provenance. Identity, Authorization and Discovery Service that creates global identity graphs, supports information discovery, and authorizes access to information based on identity an trust criteria. Big Picture and Next Steps Problem Statement. There is no easy way for organizations to: 1) Agree when they are talking about the same identity making it hard to enforce policies, or link data. 2) Trust each other to enforce privacy, compliance and business policies on each others data. 3) Trust shared infrastructure or services to access, process, transact the information. 4) Discover information across organizations and authorize access to it. There is a need for organizations to share, pool, transact and discover sensitive private data for purposes such as: Authentication, Fraud Prevention, Care Coordination, Cybersecurity Surveillance, etc.

Information Representation

An information model supporting diverse and decentralized parties sharing information What information needs to be modelled?

What format should be used to represent the information from all the participants?

How are external services with native data formats and protocols connected to the Privacy Network?

Information Format

Supporting diverse and decentralized parties sharing information

The problem. User's want to represent information in the management plane, control plane, and data plane using the same format such that all can use the Privacy Network sharing functionalities. Each data source has a native data model that needs to be shared, and protected.

System users want to combine data from different sources without loss of information and want to allow authorities to publish policies and claims that can be used to protect data, and have them enforced by software.

The inventive approach use semantic web technologies. All information is represented as JSON Linked Data (JSON-LD) graphs. JSON-LD is JSON that supports globally unique node ids, node types, and property names. These can be based on private and/or shared vocabularies, and can utilize ontologies. The JSON-LD graphs can be processed and merged using standard graph operations. Native data models are represented as PN Data Models, that are JSON-LD compliant, both policies and algorithms are defined across the PN Data Models. Information Integrity supporting diverse and decentralized parties sharing information The problem—As data can pass thru untrusted services, there is a need to ensure it has not been tampered with. There is a need to check that data came from a specific source, this data is from party A. There is a need to be able to support non-repudiation, party A did make this statement about Party B. The approach uses JSON Web Tokens (JWT) with digitally signed signatures.

All management plane, control plane, and data plane data that is output from a Privacy Agent is wrapped in a JWT that is signed with the private key of the Entity the Privacy Agent is representing. The JWT may contain a certificate with the public key, or reference to where the public key can be found.

All information sent to a Privacy Agent is wrapped by a JWT; the Privacy Agent verifies the JWT before any actions are taken.

JWTs may contain JWTs, uses standard and custom JWT claims (attributes)

Information Hiding Hiding information from untrusted parties using proven techniques and technologies The problem. Metadata and Data must not be seen by untrusted parties and needs to be hidden using proven techniques: cryptography, tokenization, enveloping, minimizing, etc; and proven technologies such as KMS, crypto libraries and 3$^{rd}$ party services. Data owners may want to share and hide data at the graph, object, field, and value level. Result graphs can contain data from many different producers, which have been hidden by different techniques. Client and destination may have different obfuscation requirements, for example, data owners require AES encryption of all fields, discovery service requires SHA of key fields.

The approach uses Privacy Pipes, Privacy Algorithms and Privacy Graphs

A Privacy Algorithm is metadata that describes a deterministic, distributed, multi-step process for the end-2-end information hiding of JSON-LD graphs, using standard techniques, and technologies. It takes as input a JSON-LD Graph and outputs a JSON-LD Privacy graph. A key aspect is the partioning of the metadata,keydata,anddata.

A Privacy Pipe instantiates a Privacy Algorithm Instance with HTTPs privacy agent end-points, runtime key metadata, authn, HTTPs services, etc. It records the necessary metadata such that trusted parties can reverse the process down to the field level. It is provisioned into privacy agents.

A Privacy Graph is output from a Privacy Pipe and is JSON-LD graph that contains data that is hidden by proven techniques down to the field level Privacy Pipe Overview Privacy pipes act as either forward or reverse HTTP proxies allowing services running inside or outside of a privacy domains to send and receive data with other services inside or outside of a privacy domain whilst meeting the required privacy, compliance and business policies.

A privacy pipe forward proxy accepts http verbs, headers and input data from an external service; it wraps the data with a privacy graph and then forwards the HTTP verb, headers, and graph onto a service in another privacy domain.

A privacy pipe reverse proxy proxies an external http service, it accepts http verbs, headers and a privacy graph from a service in another privacy domain, it verifies and unwraps the privacy graph and if ok then forwards the http verb, headers and data onto the external service.

Privacy pipes are configured within a privacy agent running in a privacy domain and are manifested as a URL specified in the configuration, for example 'https://pd.acme.com/ian/evaluate' see next slide for more, and as a smart contract on a block chain.

All communication between the external service and a privacy pipe is over TLS, this connection can optionally be further secured as follows: 1) authenticating between the external service and the pipe; 2) passing data between the external service and the pipe inside a JWT; 3) passing data between the external service and the pipe inside a JWE Privacy Pipe IAN Example IAN provides an HTTPs REST service to evaluate authorization request that accepts POSTs requests with a JSON body and returns a JSON body. The service runs in the IAN privacy domain behind a reverse proxy privacy pipe.

If ACME wanted to connect its services to the IAN service they would configure a forward proxy privacy pipe within their privacy domain with say the following URL 'https://pd.acme.com/ian/evaluate'

The ACME services would then just POST the JSON body to this URL as if they were posting directly to the protected service and would receive a HTTP response as if it came directly from the protected service. The only difference is that they may receive an HTTP Bad Gateway response code if there is a internal problem with the privacy pipe or verification of a privacy graph fails.

Unified Trust Model

Decentralized information model describing entities, claims and polices supporting decentralized parties sharing information The Problem Decentralized parties need a way to build trust between each other Parties need to be able to define policies to protect their assests that capture the privacy, compliance, and business requirements. These polices should be enforced by software, and inspectable by humans.

It should be possible for trusted authorities to help build trust, and provide standard polices that can be used by others Parties need to be able to audit the above.

The Approach

Capture all entities and claims in a decentralized information model named the Unified Trust Model that is recorded in a distributed ledger.

Enable trusted authorities to make verifiable claims about entities in the model, that can be used for trust and provenance.

Enable the creation of shareable policies, called criteria, that define the set of claims parties need to meet trust and provenance requirements.

Privacy agent cryptographically binds the trust criteria and provenance claims to the graph inside the JWT Authorities enforce criteria at pipe creation that is recorded in the distributed ledger, and pipes continue to enforce criteria during data flow.

UTM Topics

Decentralized information model describing entities, claims and polices supporting decentralized parties sharing information An example of trust criteria and the claims needed to meet them Static Class Diagram of Unified Trust Model Example of a Verifiable Claim made by an Authority Trust and Provenance Capturing the UTM in a Decentralized Ledger such as Ethereum Evaluate Criteria to determine if information can flow Privacy Pipe across the management, control and data planes UTM—Example Claim about a Resource Verifiable claims are signed attestations by an authority about a resource, is a PN Data Model, see FIG. 148.

UTM—Trust and Provenance

Verifiable claims and criteria are used to control flow based on trust and provenance Trust Parties express trust requirements in terms of trust criteria that state what claims must be true, and gain trust via verifiable claims issued to them by authorities. The verifiables claims contain credentials that are backedby-documentssimilartox509certificate policies, and Certification Practice Statement(CPS), see https://tcols.ietf.org/htn/rfc2527. Note the claims can be described by shared vocabularies and ontologies. A graph's trust criteria define a set of claims that must be a subset of the destinations owned trust claims for a pipe to be created and provisioned in the so the graph can be sent.

Provenance

The verifiable claims can also capture provenance, for example this Resource is a National Health Insurer, a National Attribute Provider, a Producer of Level 3 Link Credentials. Any provenance claims that are owned by the resource are inherited by any data it produces.

A destination can define provenance criteria that define a set of claims that must be a subset of the provenance claims owned by the input graph for a pipe to be created and provisioned so the graph can be sent.

Parties are free to define any additional provenance model within the data and use it as they need.

UTM—Determine if Data can Flow

To determine if a pipe can be formed between a source and destination the following occurs the source asks a trusted Privacy Broker Service, in the control plane, to provision a privacy pipe that can be used to send a data graph from source to destination. The PB is passed the relevant trust criteria; schema; source and destination addresses; context; and privacy algorithm information.

The PB evaluates the trust criteria by asking the destination for proof of the required claims; these are returned as a graph signed by owner; and performing a subset operation. The PB evaluates any provenance criteria by asking the source for proof of the required claims; these are returned as a graph of claims signed by owner; and performing a subset operation. If all claims are meet then the PB creates a new privacy pipe and provisions the necessary metadata into the source and destination. The privacy pipe instance, a PN data Model, is obfuscated, wrapper in a JWT and stored locally. A reference is written to the DL privacy broker contract.

The privacy agents use the provisioned privacy pipe session metadata to: (1) authenticate end points; (2) apply privacy algorithms to obfuscate or de-obfuscate, if graph not known to PA then data is dropped; (3) continue to check that hash of trust criteria matches provisioned pipe value; and hash of prov claims match provisioned pipe value. Three checks: at pipe creation; by privacy algorithm; by hash values.

Identity, Authorization & Discovery Service

A service, schema and protocols that supports identity operations, authorization, and discovery using obfuscated data.

The Problem

Organizations would like to pool and link identity data for proofing, enrichment, attribute verification, authentication, authorization, cybersecurity surveillance, etc. But sharing faces the challenges of the opening problem statement. Parties would like to query across organizations for data using their identity attributes, relevant metadata, and provenance; and if allowed receive authorization to access the data from its source. But this faces challenges of fragmented identity and data sharing.

The Approach

Use the privacy network and trust models to enable the sharing of identity and directory data.

Provide a common identity information model across the PN Data Models that does not loose information, and eases sharing/querying on identity.

Provide services, schemas, and protocols that enable the linking of identities, using 3rd party analytics, into global identity graphs that preserve the trust criteria and provenance.

Allow parties to publish directory entries that contain crypto-hashed key attributes, descriptive metadata; references to the data, and associated trust criteria Provide a query interface that enforces trust criteria, and returns identity data for authentication, and record request credentials for data.

Data Flow Topologies

How the 'data'—subject linking data needed by services; subject indexing data needed IAD; and link claims move around Real time—Data sources send crypto-obfuscated 'data' to the IAD in PN data model format. The IAD: updates its index; orchestrates sending the subject link data to the link services; receives the link credential; and updates its index accordingly. Properties: REST protocol and schema; real time, ad-hoc, small batch size, encryption for link service needs to be know upfront, IAD manages all data, is centralized.

Data Lake—Data sources send crypto-obfuscated 'data' to a Data Lake(s) as PN data model format; its Event System raises events that orchestrate indexing and linking; the IAD and Link Service(s) pull from the Data Lake; the Link Services pushes the link credential back to the Data Lake that raises an Event causing the IAD to pull it and update its index. Properties: large data sizes, batch/streams, IAD just manages indexes and references to the data; centralized around data lakes, need to know encryption upfront.

Directory—Data sources publish references to the 'data' to a centralized or decentralized directory, the publication raises events for the IAD and the linking services; they independently form privacy pipes to pull the data from the sources using the references; the link services publishes a reference to the link that can be pulled by the IAD. Properties: If publish references to block chain any trusted party can use; can build (1) and (2) on top of; can refresh data; encryption has late binding.

Common Identity Information Model

CIIM is a view over PN data models that supports querying, eases reasoning about Identity, and a target for crypto hashing. The CIIM is an information model that is used to support querying and ease reasoning about identity across different PN data models. The CIIM contains a schema based on schema.org and mappings between the PN data models and the schema. It covers demographic attributes, and other common attributes such as taxID. To avoid loss of information the CIIM is only a view over the source data graphs. The source data graphs can contain any information and are still moved around as needed using Privacy Pipes. The Match and Graph Linking services can use the CIIM to simplify mapping between PN Data Models, but they always work on the obfuscated or clear text PN Data Model data graphs.

The Discovery service uses the CIIM as its index schema; it is used in the Privacy Algorithm that describes how to use the crypto hash index attributes; and it allows parties to query for information using their PN data model identity attributes, and get identity attributes back in the PN.

Identity Matching and Linking

Trusted Identity Link and Identity Match services are used to link identity graphs together into global identity graphs. Identity Match and Identity Graph Linking Services are PN resources that process input source graphs to produce identity link claims that assert that two identities together to some level confidence and quality. An identity link claim is represented by a PN data model and can be protected by trust criteria and crypto-obfuscated by a privacy algorithm. As the services are PN resources the quality (provenance) can be attested to by trust authorities, for example SAFE BioPharma attest this is a level-3 linking service. An identity match services manages a set of identities and has analytics that can pin input identity graphs to its managed identities. It produces a claim that states that an input graph is linked to one its identities. Note this service can also enrich an input graph with attributes, and verify attributes.

A graph linking service does not manage identities, it takes source identity graphs and determines which of the contained identities are equal based only on the graph data, and issues a claim that states that two input graphs are for the same identity. All input and output to the service is via Privacy Pipes; the service has a native data model that is represented as a PN Data model, this is mapped into the CIIM. The services can use the CIIM to simplify mapping between PN Data Models, but they always work on the obfuscated or clear text source data graphs.

Identity Link Claim

Claims that two identities are same to some level of confidence and quality, see FIG. 149.

Figure 150:
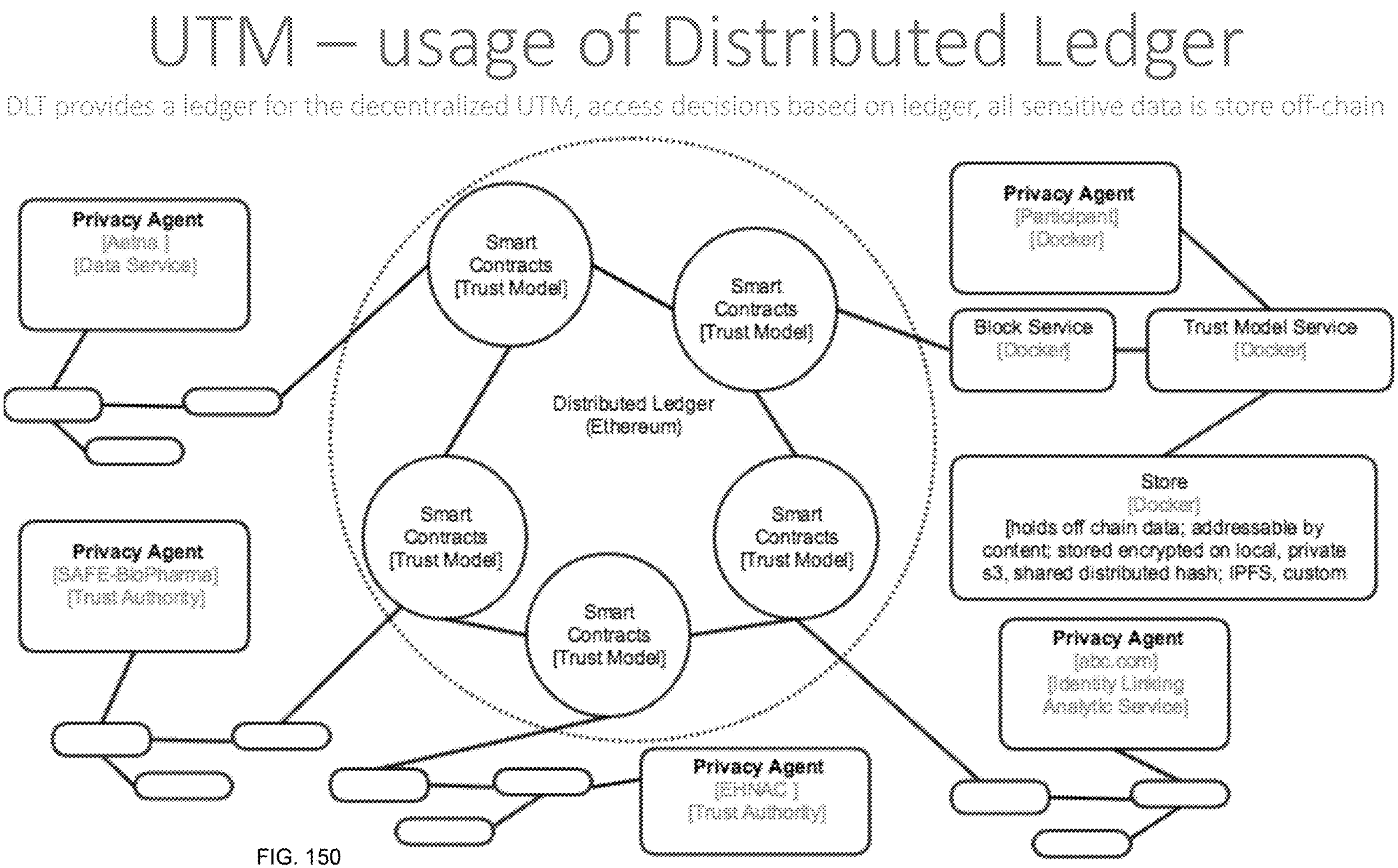

FIG. 150 illustrates a diagram of a distributed ledger.

Figure 151:
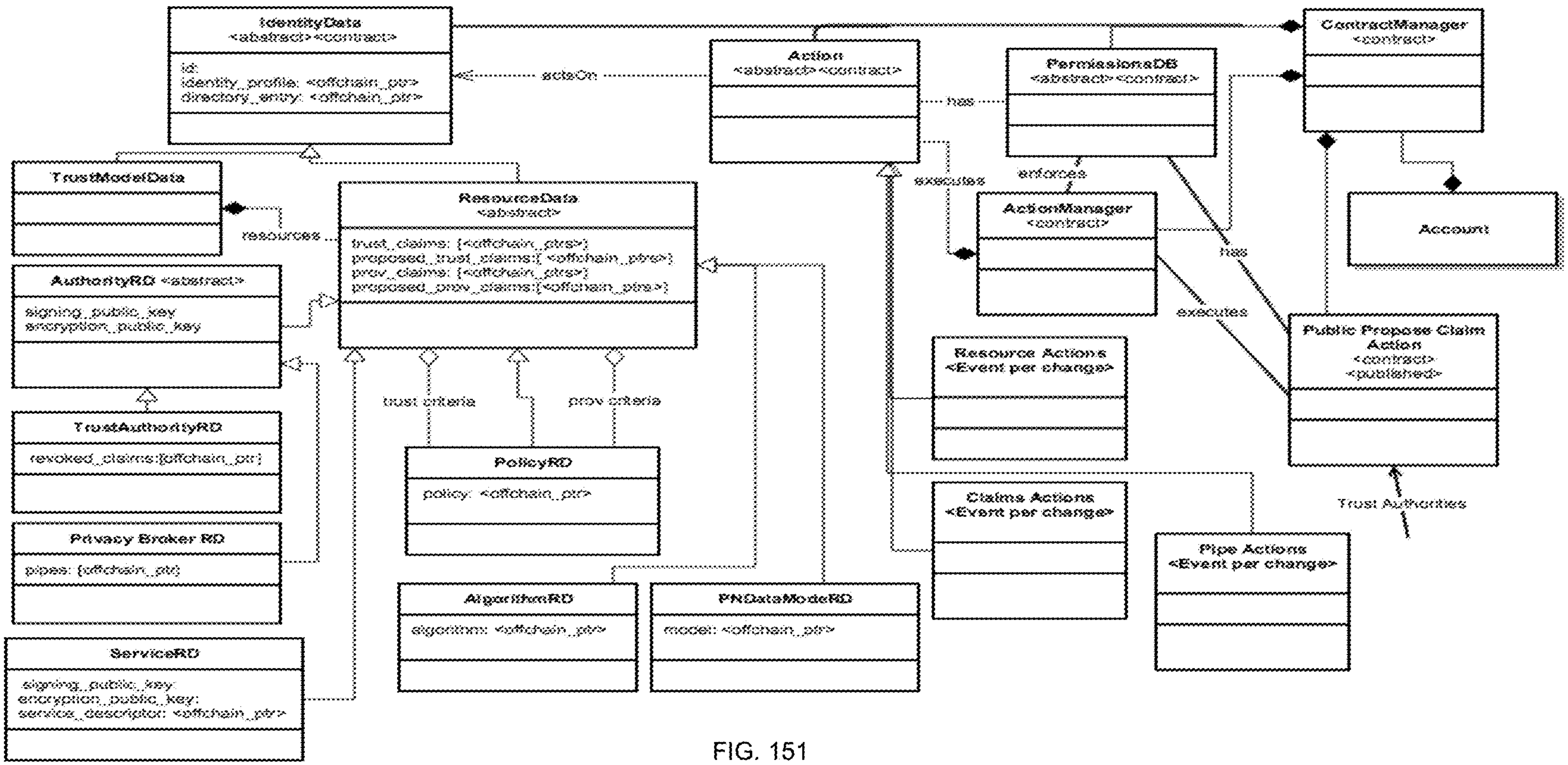

FIG. 151 illustrates a block diagram of smart contracts.

Figure 152:
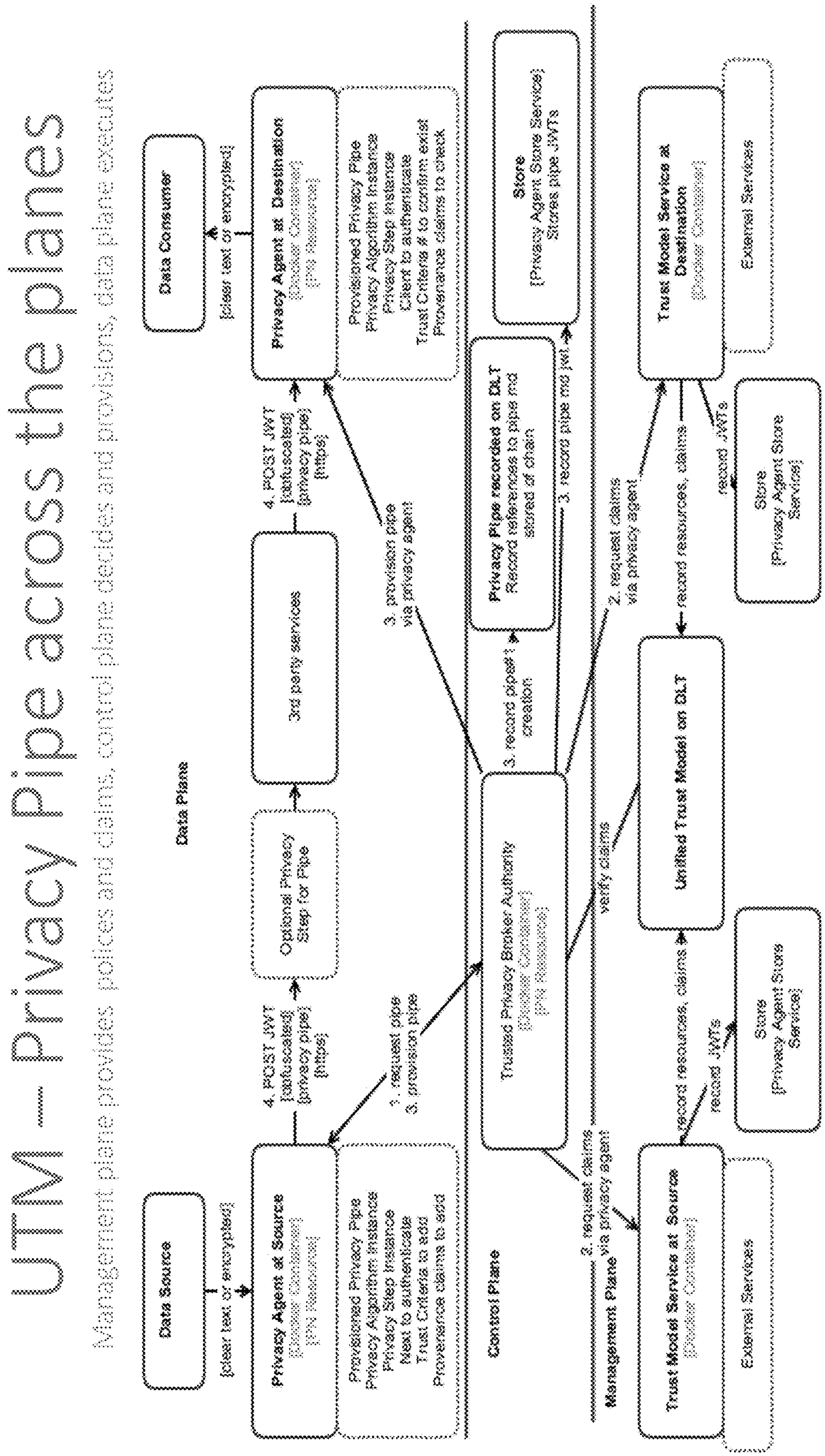

FIG. 152 illustrates an embodiment of a privacy pipe.

Figure 153:
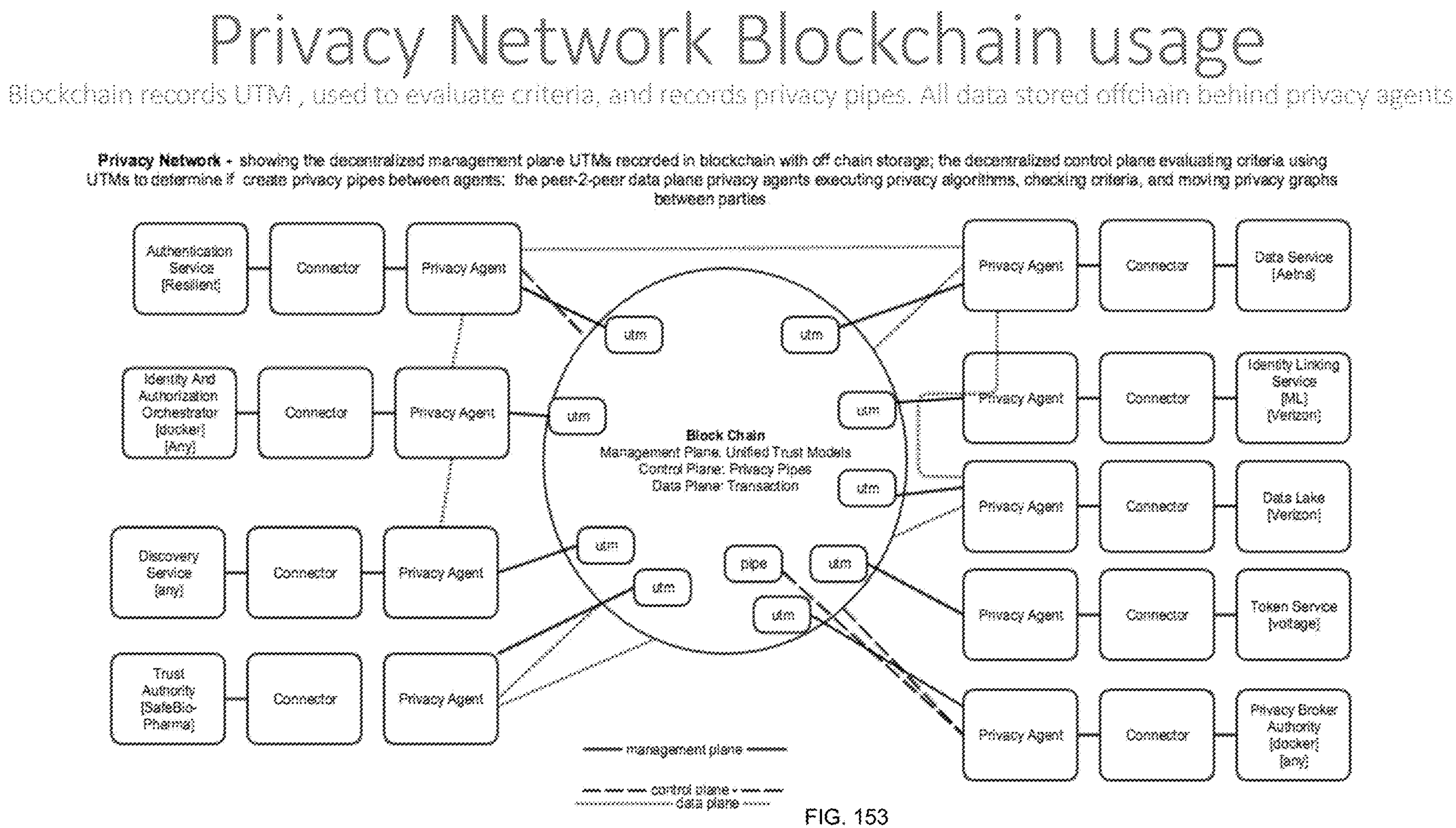

FIG. 153 illustrates an embodiment of an example of a privacy network blockchain.

FIG. 154 illustrates an embodiment of UTMs usage.

Figure 155:
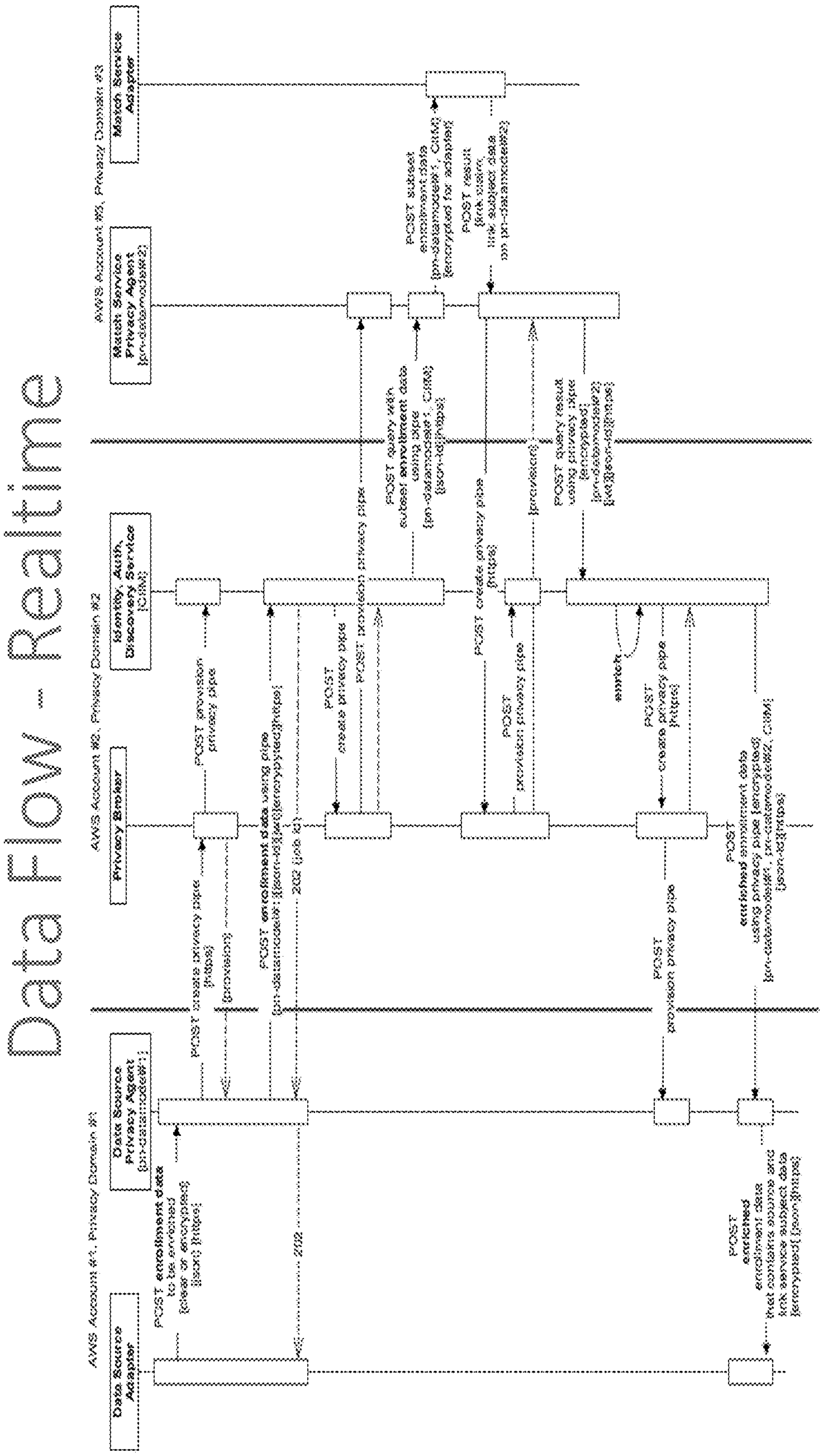

FIG. 155 illustrates an embodiment of a privacy domain data flow diagram.

Figure 156:
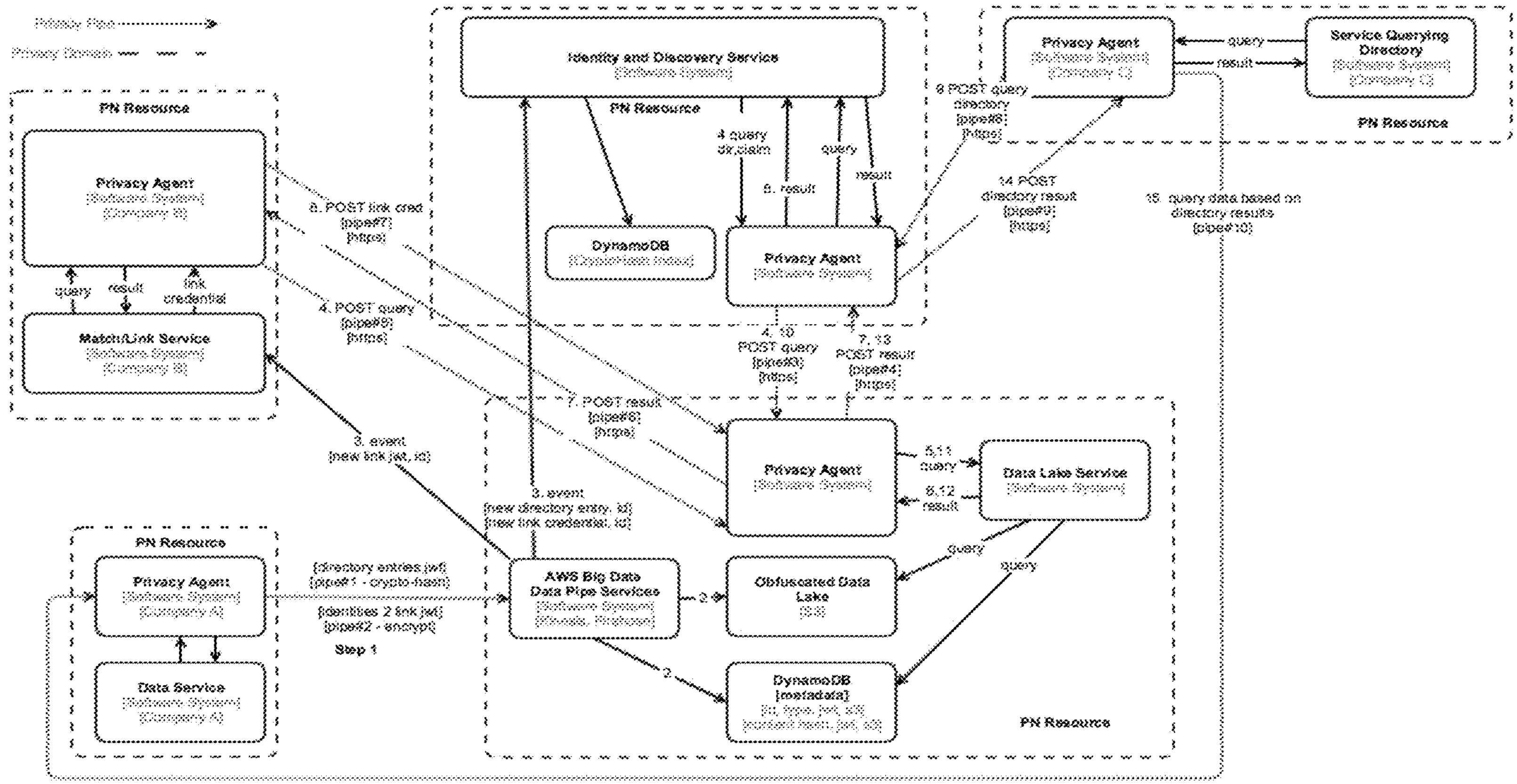

FIG. 156 illustrates an embodiment of a data flow architecture.

Figure 157:
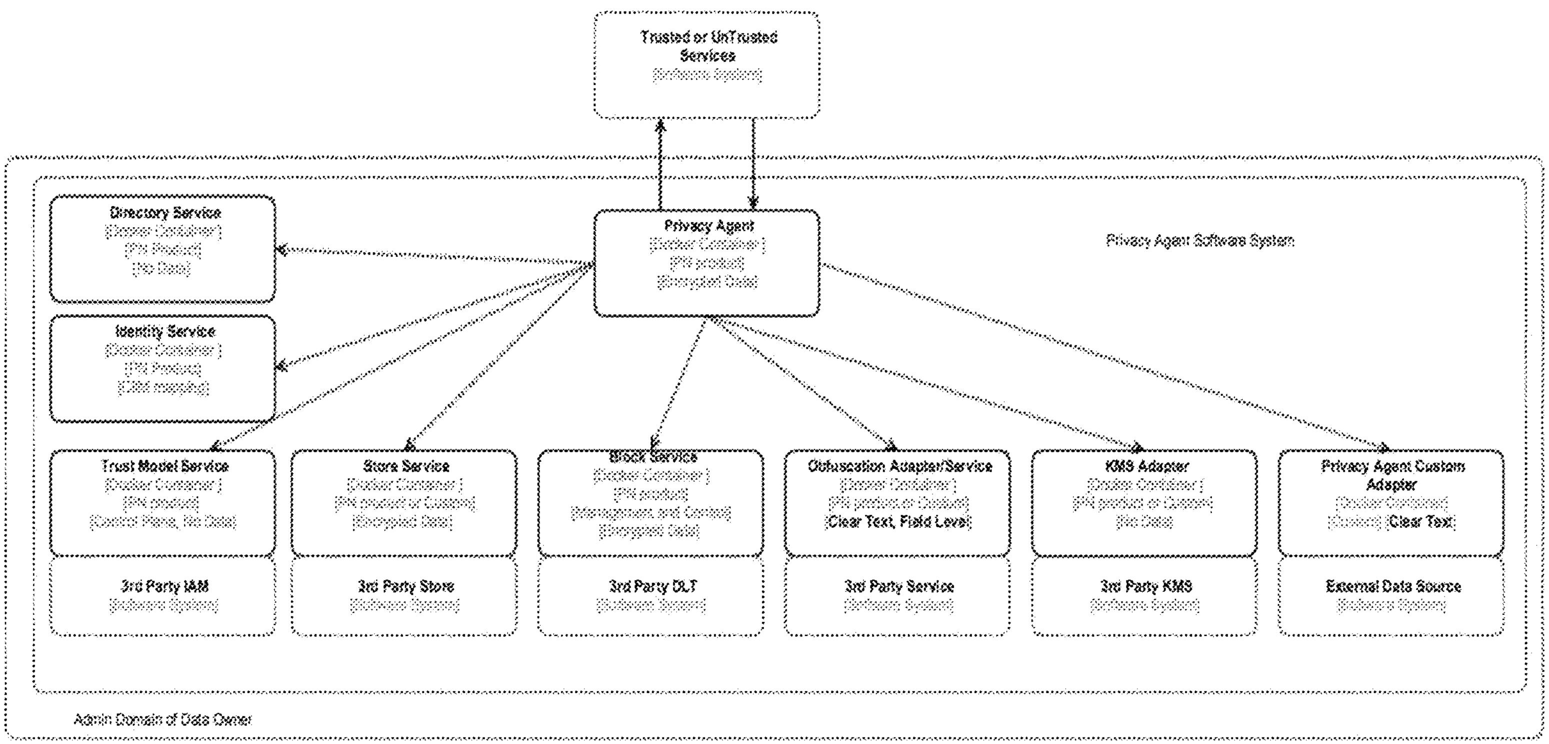

FIG. 157 illustrates an embodiment privacy agent services.

Next Step

Discovery Session to Identify target use cases and necessary resources. Use Cases can include: Identify Privacy Domains, Trust Model requirements, Privacy Algorithm requirements, Encryption methods, KMS methods, Identify Data Sources, Services, Transformations, Adapters, Identity and Linking integration, Compute and Storage environment Engineering skills and LOE, Timeline and milestones

TABLE 1

Main Technologies

| Area | Technologies |
|---|---|
| Extension Points | Define JSON-LD Metadata; REST protocol and schema to add adapters. |
| Code | Node, Go-Lang, Docker, Ethereum, React/Redux |
| Crypto | Standard Crypto libraries, KMS, adapters |
| Information Representation | JSON-LD, JSON-Schema, JWT, JOSE, Verifiable Claims, semantic web linked data, GraphQL |
| Web | TLS 1.2, Mutual Authentication, NGINX, X509.v3 |
| Cloud | AWS (VPN, ECS, S3, KMS, Route, Cloud Trail, DynamoDB, . . . ) |

Privacy Network and Unified Trust Model Definitions:

Privacy Networks (PN) and the Universal Trust Model (UTM) allows individuals and organizations that don't trust each other or agree upon policies to easily pool, share, transact, and re-use their most sensitive, regulated and proprietary resources, and transform them into precision personalized services and process optimization networks, The PN and the UTM are the building blocks for the Privacy Network Exchange (Authorization Network, Payment Network, Data Sharing Network, and Trust Model Network), and for the Value Sharing Networks (Clinical Trials Networks, etc.)

Privacy Network

A Privacy Network consists of one or more Privacy Domains connected by Privacy Pipes (running over HTTPs) and managed by the UTM.

Privacy Domains

Privacy Domains act as trusted privacy and compliance preserving secure perimeter for the services and information that are within them. The information inside the domain may be protected by Trust Blocks ensuring that the enclosed information is blinded inside a privacy graph, is protected by trust criteria, and is bound to its trust credentials. Domains may hold information from a single or multiple enterprises.

A Privacy Domain is metadata that represents some compute environment containing local resources such as data, services, analytics, algorithms, policies, credentials, and etc; that an organization wants to share with the network. The Privacy Domains may be inside the same organization or across organizations.

The domain is represented in the network's management plane by a PN Resource that has a globally unique ID and descriptive metadata. Resources can be the subject of Trust Credentials that are issued by a Trust Authorities based on their accreditation programs called Trust Models.

A domain's admin can create Privacy Pipe Endpoints that allow other Privacy Domains to connect to it over privacy pipes thus forming Privacy Networks. The endpoints are realized as URLs by the domain's Privacy Agent, are published in the domain's metadata (PN resource), and can be connected to the domain's services thru Privacy Adapters. The Endpoints produce and consume Trust Blocks.

A domain's admin can also create Outbound Privacy Pipes allowing its domains services to connect to other other domain's Privacy Pipe Endpoints. Outbound pipes are realized as local URLs by the domain's Privacy Agent and can be connected to the domains services thru Privacy Adapters. The Outbound Privacy Pipes produce and consume Trust Blocks.

Privacy Pipes

Privacy Pipes provide trusted privacy preserving and secure communication between domains.

Pipes run over HTTPs and are instantiated at runtime based on metadata such as the: trust, privacy and compliance requirements; the pipe metadata; relevant privacy algorithms; the privacy domains; the data models; the trust criteria; the trust credentials, and etc.

The Instantiation at the Network Control Plan Covers:

1. The authorization decisions needed to form a pipe, this involves a Proof of Trust blockchain calculation to determine if the relevant trust credential graphs are valid.
2. The selection of what Privacy Algorithm and services should be used to blind the data. The blinding mechanisms use industry standard products and algorithms that cover encryption, crypto-hash, tokenization, etc. that may be in other privacy domains. Hence a privacy algorithm may introduce Intermediate Privacy Domain's that blind/unblind the information before it reaches the required endpoint. Each domain involved in the pipe is instantiated with its own Privacy Step the contains the pipe meta data that the local agent needs to execute.
3. Determination of what trust criteria and trust credentials should be associated with outbound data, and what trust criteria should be applied to inbound data based on the management plane metadata and resource owners input.

Once Instantiated at the Network Data Plane the Pipes are Responsible for:

1. Enforcing outbound and inbound information flow control between domains based on the currently relevant trust credentials and trust criteria.
2. Applying their part of multi-step privacy algorithm called a privacy step that either blinds the input to produce a new privacy graph, or reveals the input privacy graph to produce an output that may be clear text or another privacy graph.
3. Enveloping any outbound privacy graph in trust blocks that cryptographically bind it to the relevant Trust Credentials (provenance) and Trust Criteria (policies)
4. Verifying inbound trust blocks and associated trust credentials, this involves a Proof of Trust blockchain calculation.

Unified Trust Model and Trust Models

Trust authorities own trust models that represent accreditation programs that issue trust credentials to entities in the network.

Trust credentials may depend on other trust credentials forming an acyclic directed graph that is evaluated for correctness by a proof of trust blockchain calculation.

Trust models and trust credentials are the basis of trust in the privacy network and can be used to partition privacy networks into finer grained dynamic trusted networks, for example the Authorization Network, or Clinical Trials network.

Trust models and trust credentials can be of any format or schema and are represented in the networks management plane as resources.

The Unified Trust Model (UTM) is a meta-model (information model) designed to help resolve the conflicts and interoperability issues with so many different models and credentials that stop the flow of information.

The UTM meta-model is defined by WebShield, using JSON-LD, and is used to normalizes the authority specific trust models and trust credentials allowing the cross organizational proof of trust block calculations and control plane authorization decisions to be made.

Proof of Trust Blockchain

Network entities such as authorities, resources, and privacy pipes have globally unique identifiers that associate them with an instance of a smart contract on a DL T. The smart contracts are used to associate entities with their signed metadata and any trust credentials they have earned, note credentials may depend on other credentials. The metadata and credentials are stored off chain in shared privacy domains and are referenced thru hashes. Trust credentials are themselves associated with the trust model accreditation artifacts thru hash references. Trust credentials can also be revoked by the issuing party.

As part of a privacy pipe authorization decision a proof of trust block chain calculation is run over the DL to first generate a trust credential graph and then verify that the credentials are not revoked and are still aligned with the trust model artifacts. The set of authorities that must perform the calculation is specified symbolically by the data owner and destination privacy domain.

Privacy pipe smart contract are used to record the authorization decisions and trust blocks that flow between privacy domains. The verification of a trust block also involves a trust block chain calculation to verify the trust credentials within the trust block.

Figure 158:
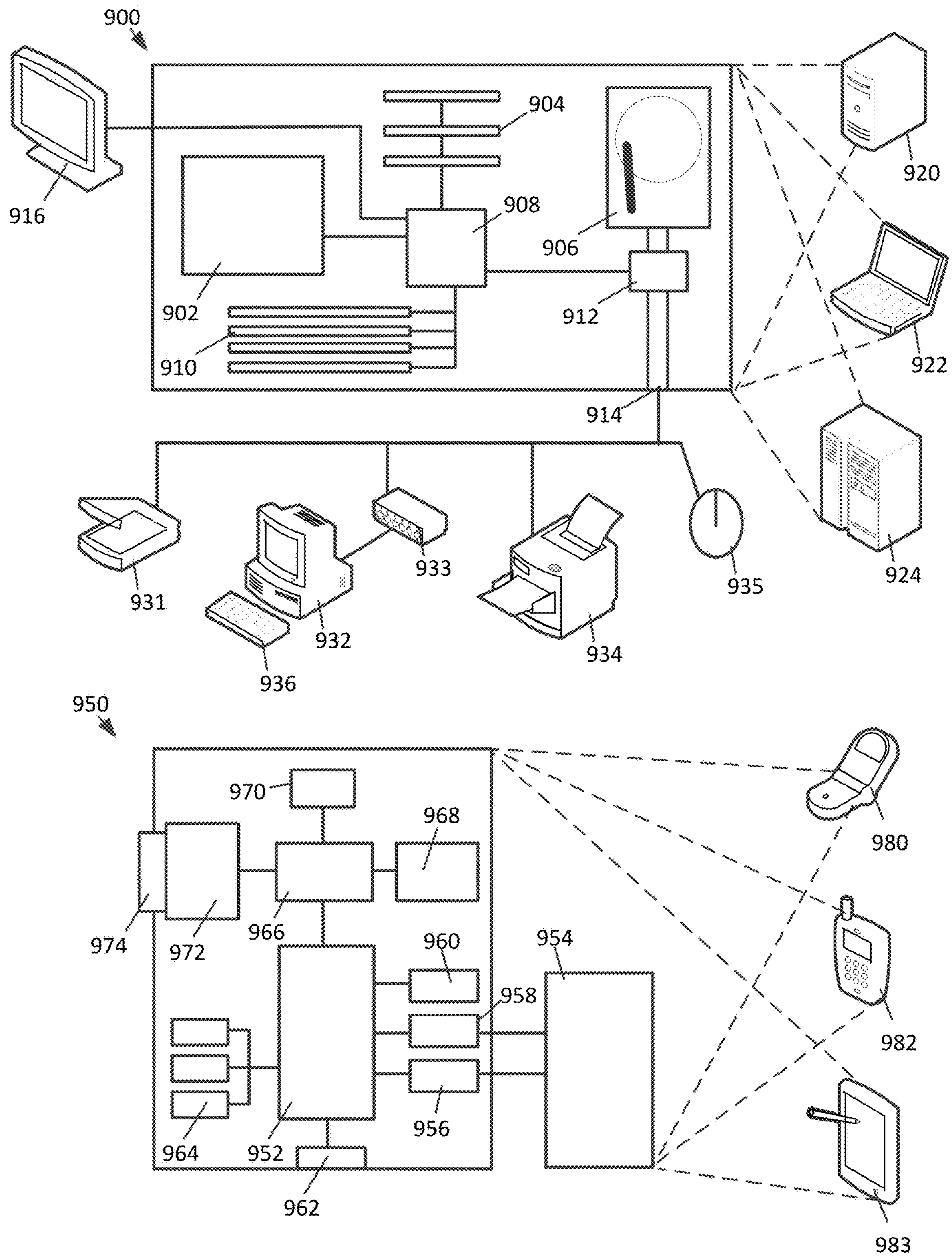

FIG. 158 shows an example of a generic computer device 900 and a generic mobile computer device 950, which may be used to implement the processes described herein, including the mobile-side and server-side processes for installing a computer program from a mobile device to a computer. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components processor 902, memory 904, storage device 906, high-speed interface 908, high-speed expansion ports 910, and low speed interface 912 are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple busses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port 914, which may include various communication ports (e.g., USB, Bluetooth, Ethernet, wireless Ethernet), may be coupled to one or more input/output devices, such as a keyboard 936 in communication with a computer 932, a pointing device 935, a scanner 931, or a networking device 933 such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a Microdrive, solid state memory or other device, to provide additional storage. Each of the components computing device 950, processor 952, memory 964, display 954, communication interface 966, and transceiver 968 are interconnected using various busses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, a tablet computer 983 or other similar mobile computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A privacy network comprising:

data source computers;

client computers;

a privacy network server computer in communication with the data source computers and the client computers wherein the privacy network server computer includes a processor running a privacy algorithm that obfuscates data and metadata;

a service provider server in communication with the client computers and the privacy network; and a blockchain, a distributed ledger, or a database in communication with the privacy network wherein trust criteria or trust credential data are written to the blockchain, the distributed ledger, or the database;

wherein the processor produces an obfuscated output that is transmitted from the privacy network to the client computers.

2. The privacy network of claim 1 further comprising:

a trust model running on the privacy network server computer that allows data to be shared or processed without revealing confidential information.

3. The privacy network of claim 1 further comprising:

a trust model running on the privacy network server computer wherein the trust model assigns weights or trust credentials to data sources and determines if the weights or the trust credentials of the data sources or metrics or trust ranks derived by the trust model are sufficient to satisfy specified trust criteria.

4. The privacy network of claim 1 further comprising:

a database of policies for the privacy network wherein the policies of the privacy network and trust model are consistently enforced through trust criteria to ensure no information is revealed during computation wherein the privacy network obfuscates data for secure transport to authorized and identity-proofed recipients, and enables revocation of trust as necessary.

5. The privacy network of claim 1 further comprising:

obfuscated transaction graphs and obfuscated audit records that enable privacy-preserving payment, billing, reporting, audit, and/or compliance services.

6. The privacy network of claim 1 further comprising:
privacy graphs created by the service providing server wherein the privacy graphs are opaque and computable with no loss of information.

7. The privacy network of claim 1 further comprising:
a cryptographic syndicate that obfuscates data or graphs of data over a sequence of steps, using a plurality of key generation, key distribution, encryption, crypto-hashing, tokenization, routing, or policy evaluation services orchestrated via the privacy network.

8. The privacy network of claim 1 further comprising:
a set of trust blocks consisting of trust credential data and/or trust criteria data cryptographically bound to resources or resource descriptions by the service provider server.

9. The privacy network of claim 8 further comprising
a set of trust blocks written to the blockchain, the distributed ledger, or the database to create a "proof of trust" blockchain.

10. The privacy network of claim 1 further comprising:
a "privacy domain" that is a trusted privacy and compliance-preserving perimeter.

11. The privacy network of claim 1 further comprising:
a blockchain mechanism produces trust blocks on a block chain by processing trust criteria, resource descriptions and trust credentials;
wherein the privacy network having privacy pipes that produce and consume trust blocks.

12. The privacy network of claim 1 further comprising:
an "authorization network" that contains identities, identity verification data, and linked data to support authorizing access to data, digital content, or application functionality.

13. The privacy network of claim 1 further comprising:
an authorization network in communication with the service provider server that incorporates privacy-preserving shared services for cybersecurity, surveillance, reputation, and/or systems management.

14. The privacy network of claim 1 further comprising:
a privacy pipe that is a JavaScript Object Notation Linked Data (JSON LD) or a semantic web data structure that contains subject link credentials used to create a global subject or a global subject graph.

15. The privacy network of claim 1 further comprising:
a privacy pipe that obfuscates JavaScript Object Notation Linked Data (JSON LD) or semantic web data structures and writes the JavaScript Object Notation Linked Data (JSON LD) or the semantic web data structures to a blockchain, distributed ledger, or database.

16. A privacy network comprising:
data source computers;
client computers;
a privacy network server computer in communication with the data source computers and the client computers wherein the privacy network server computer includes a processor running a privacy algorithm that obfuscates data and metadata;
a service provider server in communication with the client computers and the privacy network; and
a blockchain, a distributed ledger, or a database in communication with the privacy network wherein trust criteria or trust credential data are cryptographically bound to resources or resource descriptions and written to the blockchain, the distributed ledger, or the database;
wherein the processor produces an obfuscated output that is transmitted from the privacy network to the client computers.

17. A privacy network comprising:
data source computers;
client computers;
a privacy network server computer in communication with the data source computers and the client computers wherein the privacy network server computer includes a processor running a privacy algorithm that obfuscates data and metadata;
a service provider server in communication with the client computers and the privacy network; and
a blockchain mechanism produces trust blocks by processing trust criteria, resource descriptions and trust credentials;
wherein the Privacy Network has privacy pipes that produce and consume trust blocks, and the processor produces an obfuscated output that is transmitted from the privacy network to the client computers.

18. A privacy network comprising:
data source computers;
client computers;
a privacy network server computer in communication with the data source computers and the client computers wherein the privacy network server computer includes a processor running a privacy algorithm that obfuscates data and metadata;
a service provider server in communication with the client computers and the privacy network; and
a privacy pipe that is a JavaScript Object Notation Linked Data (JSON LD) or semantic web data structure that contains subject link credentials used to create a global subject or a global subject graph;
wherein the processor produces an obfuscated output that is transmitted from the privacy network to the client computers.

19. A privacy network comprising:
data source computers;
client computers;
a privacy network server computer in communication with the data source computers and the client computers wherein the privacy network server computer includes a processor running a privacy algorithm that obfuscates data and metadata;
a service provider server in communication with the client computers and the privacy network;
a privacy pipe that obfuscates JavaScript Object Notation Linked Data (JSON LD), RDF, or other semantic web data structures and writes them to a blockchain, a distributed ledger, or a database;
wherein the processor produces an obfuscated output that is transmitted from the privacy network to the client computers.

* * * * *